US012656861B2

(12) United States Patent
Kim

(10) Patent No.: US 12,656,861 B2
(45) Date of Patent: Jun. 16, 2026

(54) SYSTEM FOR CONTROLLING MEDIA PLAY

(71) Applicant: HYUNDAI MOBIS Co., Ltd., Seoul (KR)

(72) Inventor: Kyung Hoon Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/089,671

(22) Filed: Dec. 28, 2022

(65) Prior Publication Data

US 2023/0221798 A1 Jul. 13, 2023

(30) Foreign Application Priority Data

| Jan. 11, 2022 | (KR) | 10-2022-0004317 |
| Jan. 11, 2022 | (KR) | 10-2022-0004318 |
| Jan. 11, 2022 | (KR) | 10-2022-0004319 |
| Jan. 11, 2022 | (KR) | 10-2022-0004320 |
| Jan. 11, 2022 | (KR) | 10-2022-0004321 |
| Jan. 11, 2022 | (KR) | 10-2022-0004322 |
| Jan. 11, 2022 | (KR) | 10-2022-0004323 |
| Jan. 11, 2022 | (KR) | 10-2022-0004324 |
| Jan. 11, 2022 | (KR) | 10-2022-0004325 |

(Continued)

(51) Int. Cl.
*G06F 3/01* (2006.01)
*B60K 35/10* (2024.01)
(Continued)

(52) U.S. Cl.
CPC .............. *G06F 3/013* (2013.01); *B60K 35/10* (2024.01); *B60K 35/235* (2024.01); *B60K 35/26* (2024.01);
(Continued)

(58) Field of Classification Search
CPC .......................... B60K 2370/149; G06F 3/013
See application file for complete search history.

(56) References Cited

U.S. PATENT DOCUMENTS

| 2012/0082424 A1* | 4/2012 | Hubner | ................ H04N 21/242 386/E5.032 |
| 2013/0235347 A1* | 9/2013 | Hennessey | ............. G06V 40/19 351/210 |

(Continued)

FOREIGN PATENT DOCUMENTS

| DE | 102 16 904 C1 | 9/2003 |
| KR | 10-2017-0135522 A | 12/2017 |

(Continued)

OTHER PUBLICATIONS

Korean Office Action issued on Feb. 26, 2026, in counterpart Korean Patent Application No. 10-2022-0004328 (5 pages in Korean).

*Primary Examiner* — Bipin Gyawali
(74) *Attorney, Agent, or Firm* — NSIP Law

(57) ABSTRACT

According to an aspect of the present disclosure, there is provided a system for controlling media play comprising: a control target recognition unit configured to recognize target medium that is to be controlled by the user, among mediums that are played using a vehicle display, a control command generation unit configured to generate a control command according to a result of recognizing a user's request for the target medium; and a medium control unit configured to control the target medium according to the control command.

12 Claims, 162 Drawing Sheets

EXTERNAL-THEATER MODE
- CONTENT IS REPRODUCED FRONT SIDE BACK ON PROJECTION DISPLAY
- SOUND IS REPRODUCED TO OUTSIDE THROUGH SURFACE VIBRATION SPEAKER
- ATTACHABLE AND DETACHABLE SEAT
- CONTENT ON MEDIUM IS CONTROLLED THROUGH SMARTPHONE: VOLUME OF SOUND/REPRODUCTION

EXTERNAL SURFACE VIBRATION SPEAKER -
PURPOSE OF COMMUNICATION WARNING
- REPRODUCING OF SOUND ACCORDING TO DIRECTION THAT VARIES WITH LOCATION OF PEDESTRIAN
- DIRECTION OF MOVEMENT OUT OF SAFETY AREA
- INDICATOR LIGHT

SMART PHONE

ATTACHABLE AND DETACHABLE SEAT

INTERNAL-THEATER MODE
- HEADREST SPEAKER FORMS SOUND BUBBLE IN ORDER TO PREVENT INTERFERENCE WITH EXTERNAL SOUND
- HEADREST SPEAKER BLOCKS EXTERNAL NOISE BY PERFORMING ACTIVE NOISE CANCELING FUNCTION

(30) Foreign Application Priority Data

| | | |
|---|---|---|
| Jan. 11, 2022 | (KR) | 10-2022-0004326 |
| Jan. 11, 2022 | (KR) | 10-2022-0004327 |
| Jan. 11, 2022 | (KR) | 10-2022-0004328 |
| Jan. 11, 2022 | (KR) | 10-2022-0004329 |
| Jan. 11, 2022 | (KR) | 10-2022-0004330 |

(51) Int. Cl.

| | |
|---|---|
| *B60K 35/22* | (2024.01) |
| *B60K 35/235* | (2024.01) |
| *B60K 35/26* | (2024.01) |
| *B60K 35/28* | (2024.01) |
| *B60K 35/29* | (2024.01) |
| *B60K 35/81* | (2024.01) |
| *B60N 2/14* | (2006.01) |
| *B60N 2/70* | (2006.01) |
| *B60N 2/72* | (2006.01) |
| *B60N 2/90* | (2018.01) |
| *G02B 27/01* | (2006.01) |
| *G02F 1/1333* | (2006.01) |
| *G06F 3/04845* | (2022.01) |
| *G06F 3/16* | (2006.01) |
| *G06T 19/00* | (2011.01) |
| *B60K 35/65* | (2024.01) |
| *G02F 1/153* | (2006.01) |

(52) U.S. Cl.

CPC .............. *B60K 35/28* (2024.01); *B60K 35/29* (2024.01); *B60K 35/81* (2024.01); *B60N 2/14* (2013.01); *B60N 2/7005* (2013.01); *B60N 2/72* (2013.01); *B60N 2/933* (2018.02); *B60N 2/995* (2018.02); *G02B 27/0101* (2013.01); *G02F 1/133342* (2021.01); *G06F 3/04845* (2013.01); *G06F 3/165* (2013.01); *G06T 19/006* (2013.01); *B60K 35/22* (2024.01); *B60K 35/65* (2024.01); *B60K 2360/146* (2024.01); *B60K 2360/148* (2024.01); *B60K 2360/176* (2024.01); *B60K 2360/177* (2024.01); *B60K 2360/18* (2024.01); *B60K 2360/21* (2024.01); *G02B 2027/0141* (2013.01); *G02F 1/153* (2013.01)

(56) References Cited

U.S. PATENT DOCUMENTS

| | | | | |
|---|---|---|---|---|
| 2016/0282940 A1* | 9/2016 | Hong | G06F 3/1446 | |
| 2018/0154854 A1* | 6/2018 | Thieberger | G06F 3/011 | |
| 2019/0053021 A1* | 2/2019 | Fuke | H04W 4/48 | |
| 2020/0073615 A1* | 3/2020 | Kim | G09G 3/2096 | |
| 2020/0223328 A1* | 7/2020 | Kobayashi | B60K 35/10 | |
| 2020/0319705 A1* | 10/2020 | Rohrbacher | G06F 3/04842 | |
| 2021/0072831 A1 | 3/2021 | Edwards | | |
| 2021/0208841 A1* | 7/2021 | Wilberding | G10L 25/51 | |
| 2022/0032920 A1* | 2/2022 | Varughese | H04W 4/40 | |
| 2022/0135081 A1* | 5/2022 | Lee | B60K 35/50 | |
| | | | | 701/23 |
| 2022/0365593 A1* | 11/2022 | Yasuda | G06V 20/56 | |
| 2023/0120933 A1* | 4/2023 | Kim | G06T 11/00 | |
| | | | | 345/633 |
| 2023/0194663 A1* | 6/2023 | Zhang | G01S 7/41 | |
| | | | | 701/49 |
| 2023/0306806 A1* | 9/2023 | Van Wiemeersch | G01S 13/89 | |
| | | | | 340/5.61 |
| 2023/0334921 A1* | 10/2023 | Cheikh | B60R 25/209 | |
| 2024/0375511 A1* | 11/2024 | Bove, Jr. | G06V 40/10 | |

FOREIGN PATENT DOCUMENTS

| | | | |
|---|---|---|---|
| WO | WO 2017/100790 A1 | 6/2017 | |
| WO | WO 2018/022329 A1 | 2/2018 | |
| WO | WO 2021/241718 A1 | 12/2021 | |

* cited by examiner

FIG. 4

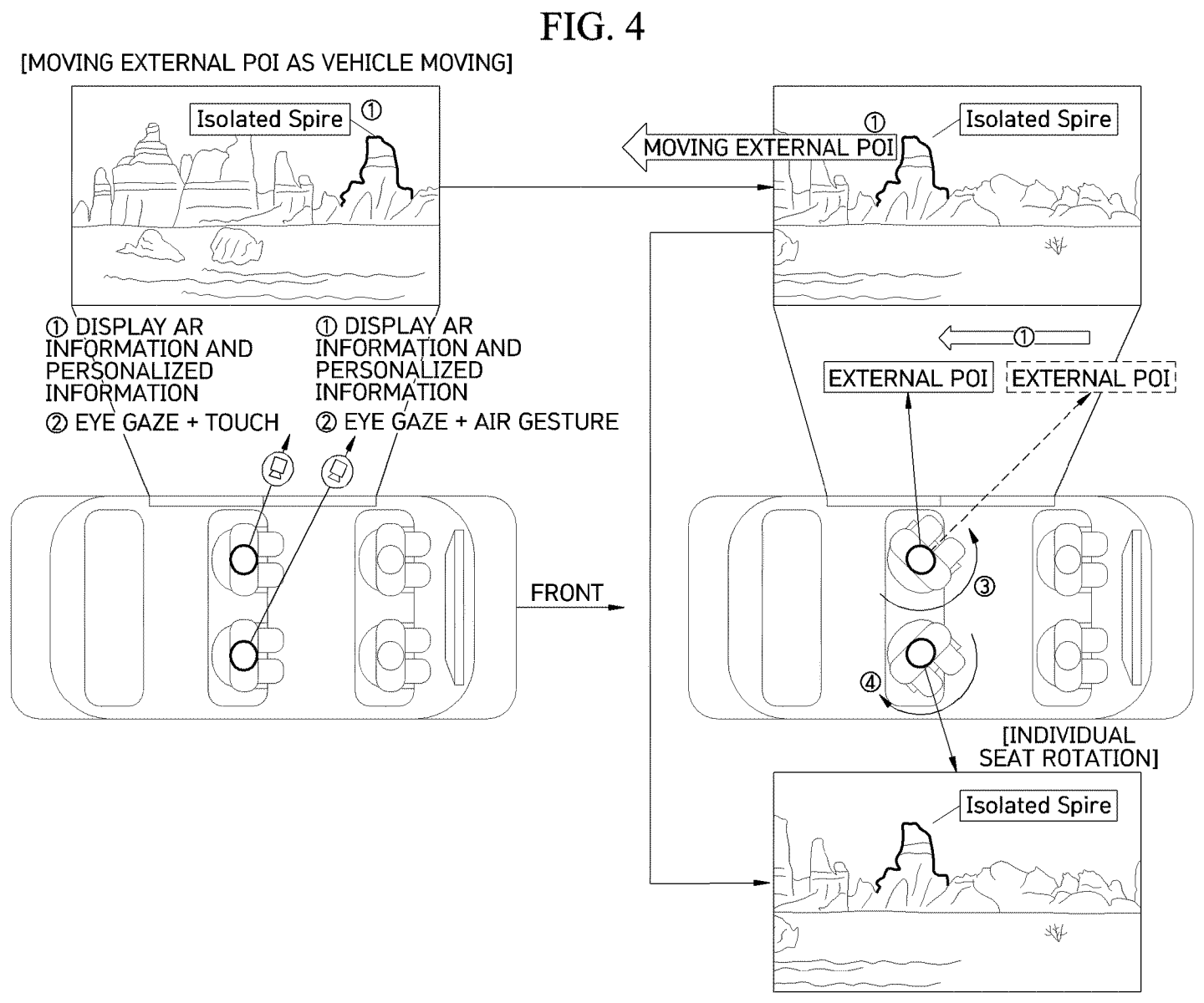

[MOVING EXTERNAL POI AS VEHICLE MOVING]

Isolated Spire ①

① DISPLAY AR INFORMATION AND PERSONALIZED INFORMATION
② EYE GAZE + TOUCH

① DISPLAY AR INFORMATION AND PERSONALIZED INFORMATION
② EYE GAZE + AIR GESTURE

FRONT

Isolated Spire

MOVING EXTERNAL POI

① ①

EXTERNAL POI

EXTERNAL POI

EXTERNAL POI

③ ④

[INDIVIDUAL SEAT ROTATION]

Isolated Spire

S501  OBTAIN OCCUPANT GAZE INFORMATION

S502  DETERMINE POI

S503  CONTROL SEAT POSITION

S504  CONTROL DISPLAY

601

FIRST
OCCUPANT GAZE
RECOGNITION UNIT

602

SECOND
OCCUPANT GAZE
RECOGNITION UNIT

603

UNIT CONFIRMING INTEREST
INFORMATION CROSSOVER
AND DETERMINING PROIRITY

604

DISPLAY
CONTROL
UNIT

FIG. 8B

S901   RECOGNIZE PLURALITY OCCUPANT GAZE INFORMATION

S902   CONFIRM INTEREST INFORMATION

S903   CONFIRM INTEREST INFORMATION CROSSOVER

S904   CONTROL DISPLAY

FIG. 10

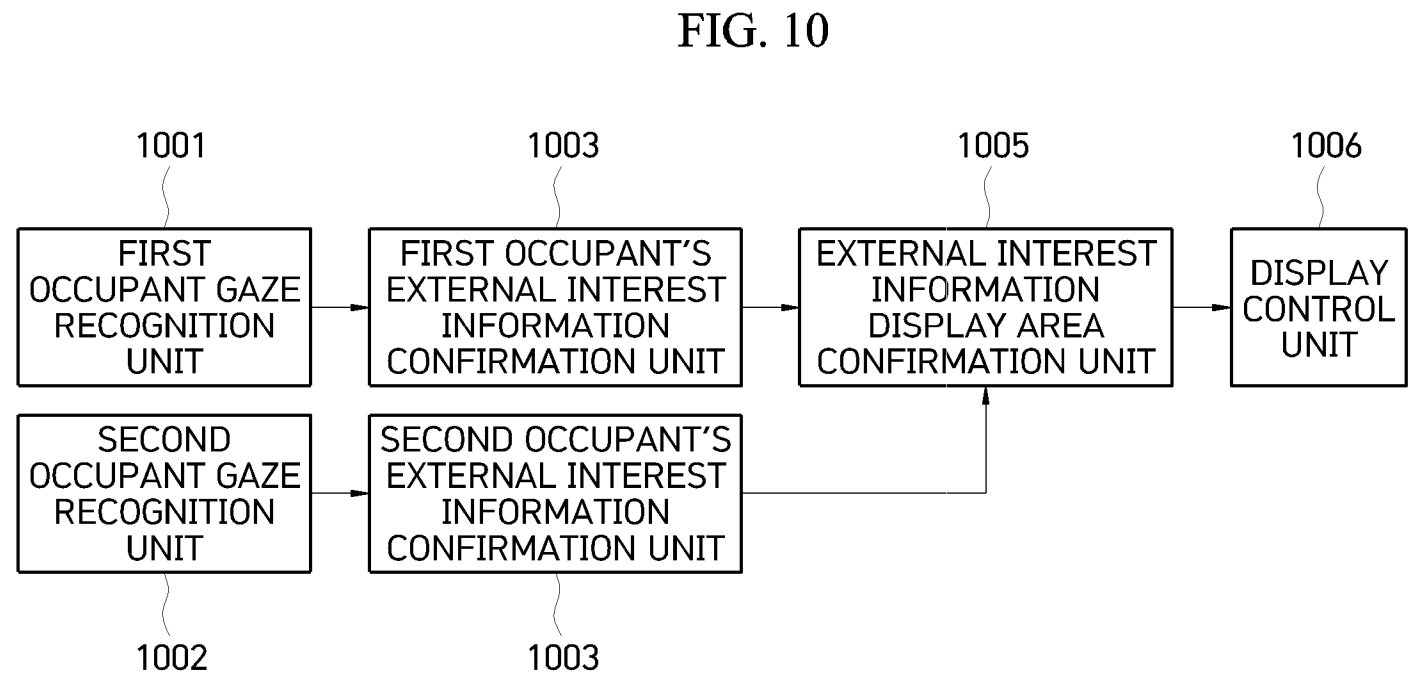

1001 — FIRST OCCUPANT GAZE RECOGNITION UNIT

1002 — SECOND OCCUPANT GAZE RECOGNITION UNIT

1003 — FIRST OCCUPANT'S EXTERNAL INTEREST INFORMATION CONFIRMATION UNIT

1003 — SECOND OCCUPANT'S EXTERNAL INTEREST INFORMATION CONFIRMATION UNIT

1005 — EXTERNAL INTEREST INFORMATION DISPLAY AREA CONFIRMATION UNIT

1006 — DISPLAY CONTROL UNIT

S1201 — RECOGNIZE PLURALITY OCCUPANT GAZE INFORMATION

S1202 — CONFIRM EXTERNAL INTEREST INFORMATION DISPLAY AREA

S1203 — CONTROL DISPLAY

FIG. 14

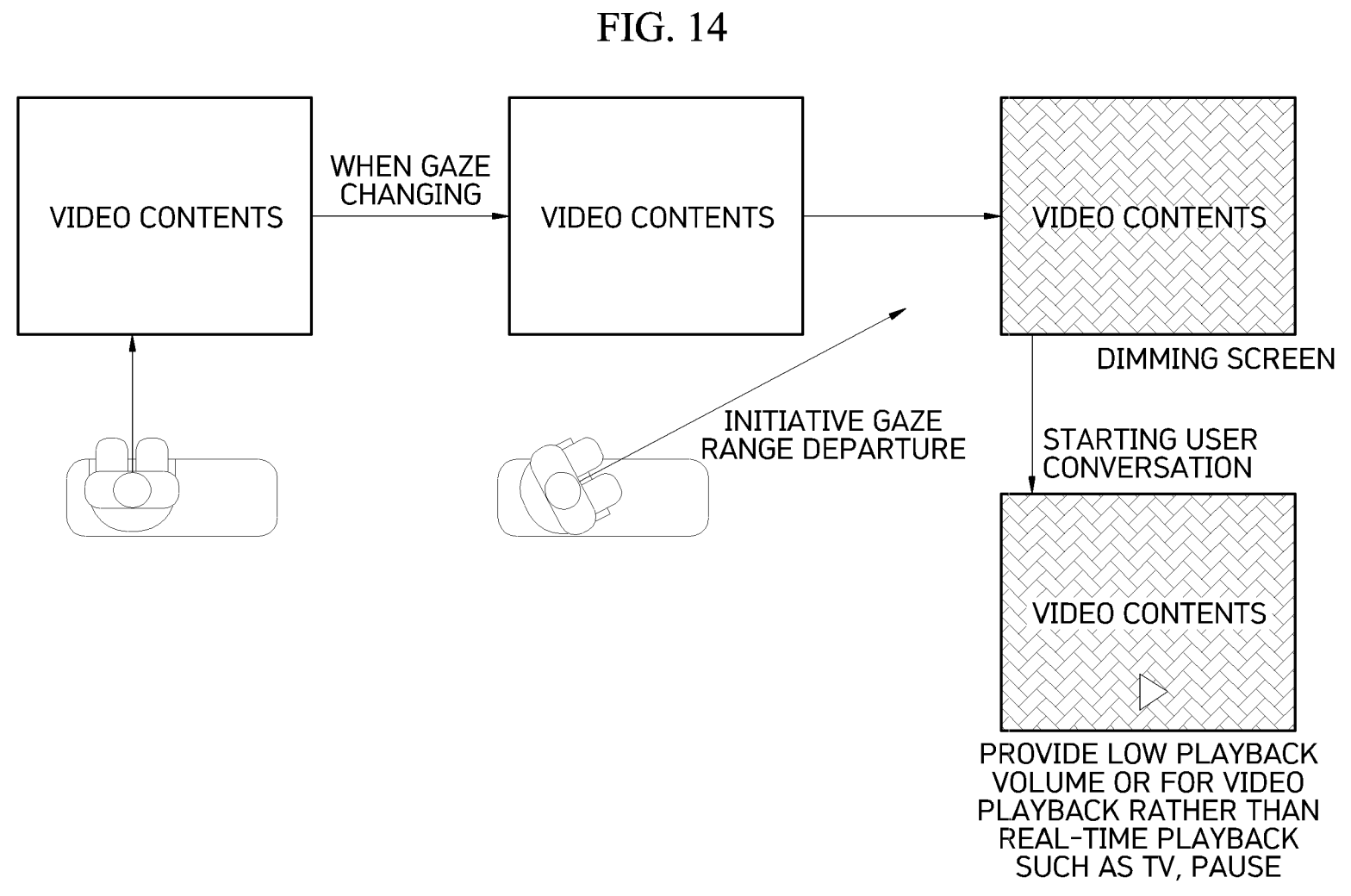

VIDEO CONTENTS

WHEN GAZE CHANGING

VIDEO CONTENTS

INITIATIVE GAZE RANGE DEPARTURE

VIDEO CONTENTS

DIMMING SCREEN

STARTING USER CONVERSATION

VIDEO CONTENTS

PROVIDE LOW PLAYBACK VOLUME OR FOR VIDEO PLAYBACK RATHER THAN REAL-TIME PLAYBACK SUCH AS TV, PAUSE

Figure 17:
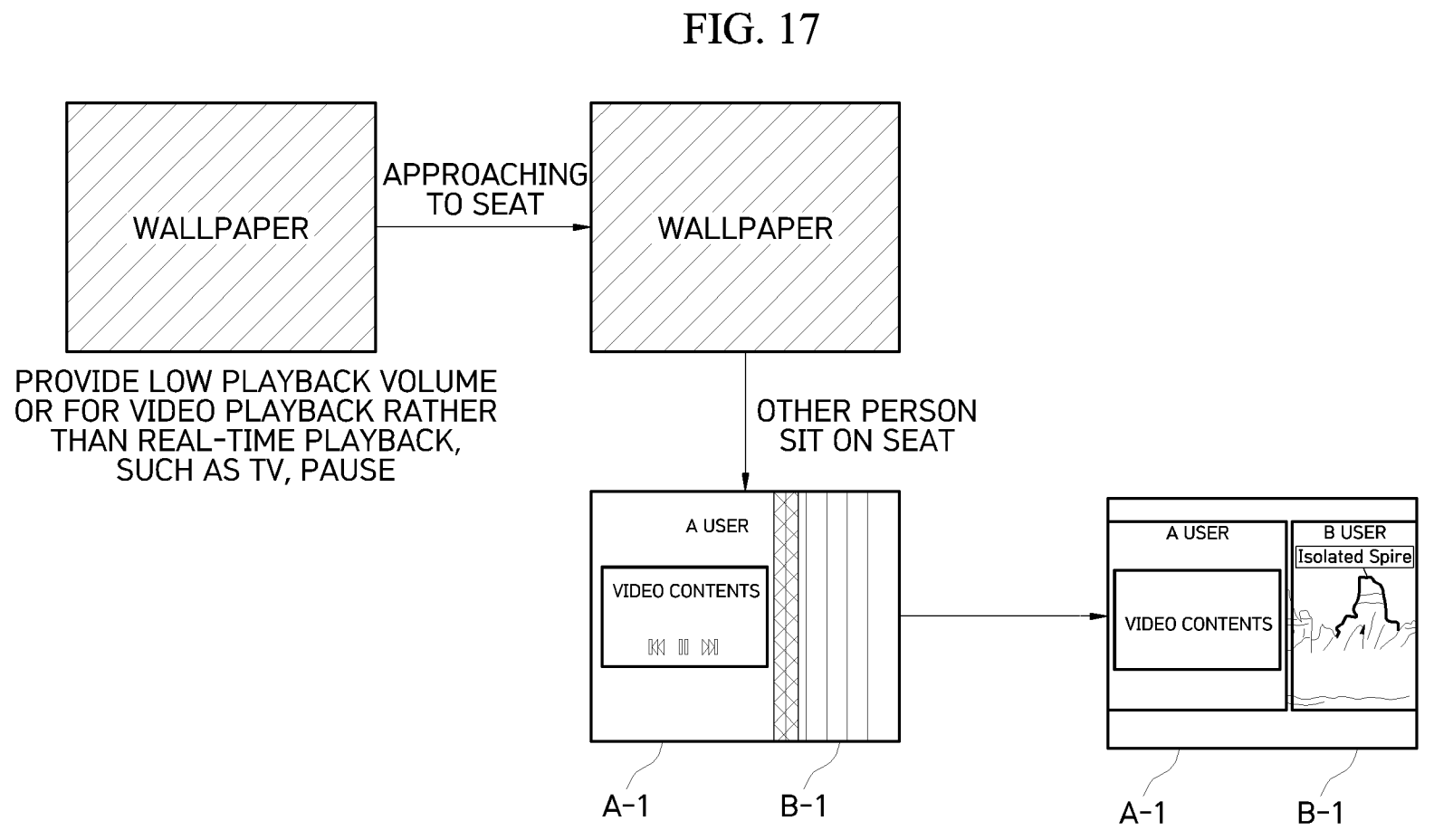

WALLPAPER

APPROACHING TO SEAT

WALLPAPER

PROVIDE LOW PLAYBACK VOLUME
OR FOR VIDEO PLAYBACK RATHER
THAN REAL-TIME PLAYBACK,
SUCH AS TV, PAUSE

OTHER PERSON
SIT ON SEAT

A USER

VIDEO CONTENTS

A-1    B-1

A USER    B USER
[Isolated Spire]

VIDEO CONTENTS

A-1    B-1

DISPLAY FUNCTION THAT USER USED BEFORE

S1901

OBTAIN OCCUPANT GAZE
INFORMATION, VOICE INFORMATION,
SITTING STATUS INFORMATION

S1902

CONTROL DISPLAY

FIG. 21

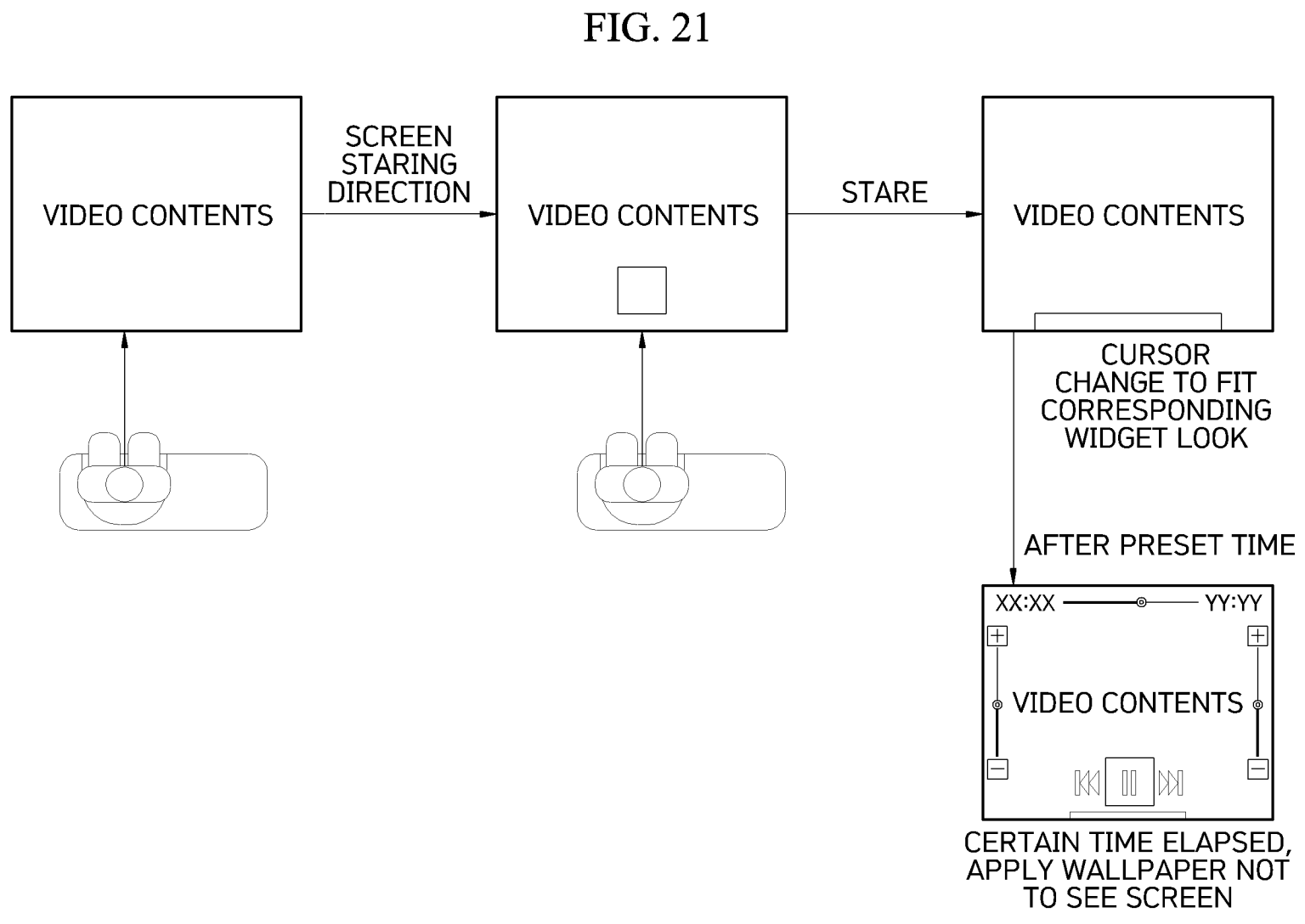

VIDEO CONTENTS

SCREEN STARING DIRECTION

VIDEO CONTENTS

STARE

VIDEO CONTENTS

CURSOR CHANGE TO FIT CORRESPONDING WIDGET LOOK

AFTER PRESET TIME

XX:XX — YY:YY

VIDEO CONTENTS

CERTAIN TIME ELAPSED, APPLY WALLPAPER NOT TO SEE SCREEN

FIG. 25

S2601 RECOGNIZE OCCUPANT GAZE

S2602 CONTROL BUTTON DISPLAY

S2603 CONTROL THE INITIATIVE SWITCH

S2604 DIVIDE SCREEN AREA AND CONTROL GAZE INFORMATION BASED DISPLAY

S2901
CONFIRM EXTERNAL INTEREST INFORMATION

S2902
CONFIRM POSITION OF OCCUPANT ONBOARD

S2903
CONTROL DISPLAY

- WHEN DETECTING EXTERNAL
INTEREST INFORMATION, 3D FORM
SYNTHESIZED AND DISPLAYED

- WHEN 3D OBJECT DRAGGED
TO RIGHT, ROTATE TO RIGHT SIDE
BY OPERATED VALUE

Ⓐ

AFTER PRESET TIME

- WHEN NO INPUT FOR N SECS, RESTORED
TO ACTUAL EXTERNAL INTEREST OBJECT POSITION

S3301 — CONFIRM EXTERNAL INTEREST INFORMATION

S3302 — RECOGNIZE OCCUPANT OPERATION INFORMATION

S3303 — CONTROL DISPLAY

S3401 — OCCUPANT OPERATION RECOGNITION UNIT

S3402 — DISPLAY CONTROL UNIT

S3403 — EXTERNAL INTEREST INFORMATION TRANSMISSION UNIT

FIG. 37C
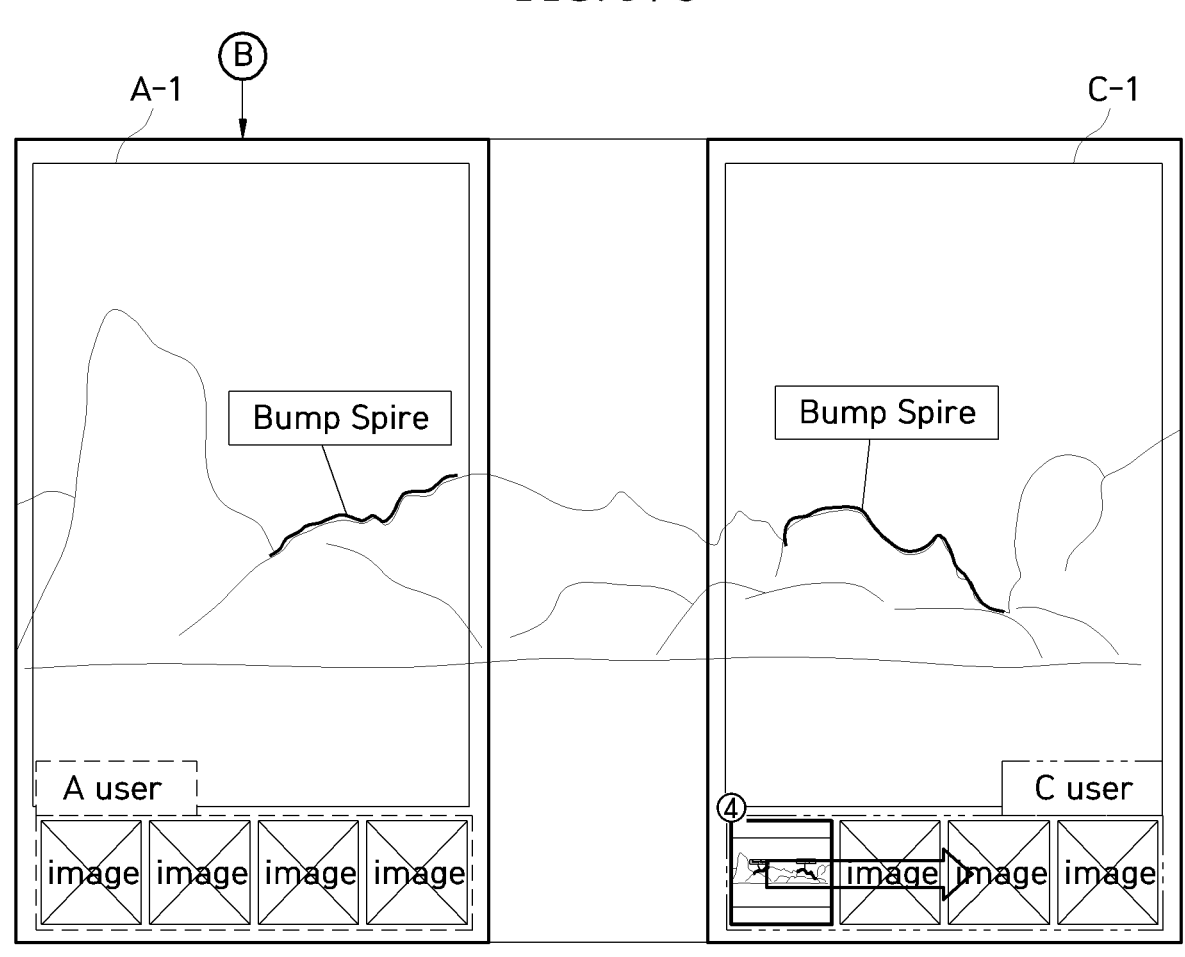
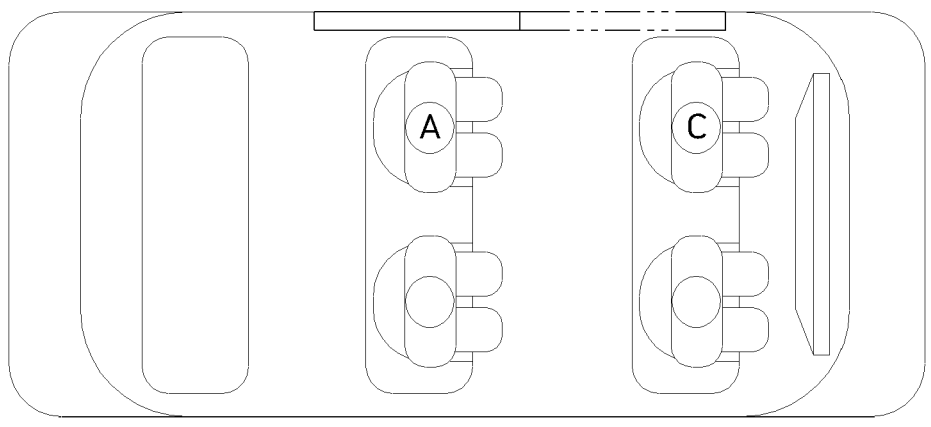

S4201

CONFIRM EXTERNAL INTEREST
INFORMATION DISPLAY AREA

S4202

ADJUST EXTERNAL INTEREST
INFORMATION DISPLAY AREA BASED ON
AT LEAST ANY ONE OF THE INITIATIVE
AND INFORMATION IMPORTANCE

S4501  CONFIRM EXTERNAL INTEREST OBJECT

S4502  DISPLAY EXTERNAL INTEREST INFORMATION

S4503  SET ROUTE ACCORDING TO
DESTINATION SETTING REQUEST

4610

4620

4630

TRAVELING ENVIRONMENT
RECOGNITION UNIT

CONTROL UNIT

DISPLAY UNIT

FIG. 50B
ENVIRONMENT OUTSIDE
OF VEHICLE – ACTUAL
ENVIRONMENT WHERE BUILDING
IS UNDER CONSTRUCTION
PRESENTATION OF INFORMATION
RESULTING FROM CONVERSION OF
BUILDING INFORMATION,
THROUGH TRANSPARENT DISPLAY
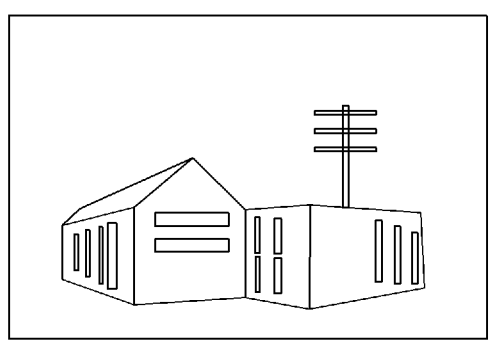
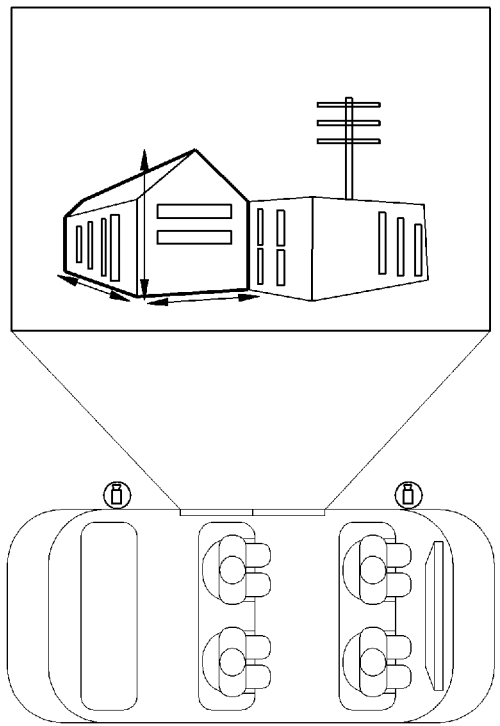

- OCCUPANT B EXPANDS EXPANSION BUTTON ① ON SIDE-WINDOW VIDEO REPRODUCTION REGION TO DISPLAY FOR OCCUPANT C BY USING GAZING RECOGNITION AND GESTURE

- OCCUPANT C IS ALLOCATED ONE REGION OF DISPLAY AND IS CHECKING AR INFORMATION

- OCCUPANT A WATCHES VIDEO ON FRONT-SIDE DISPLAY
- OCCUPANT B WATCHES VIDEO ON SIDE-WINDOW DISPLAY

FIG. 57A
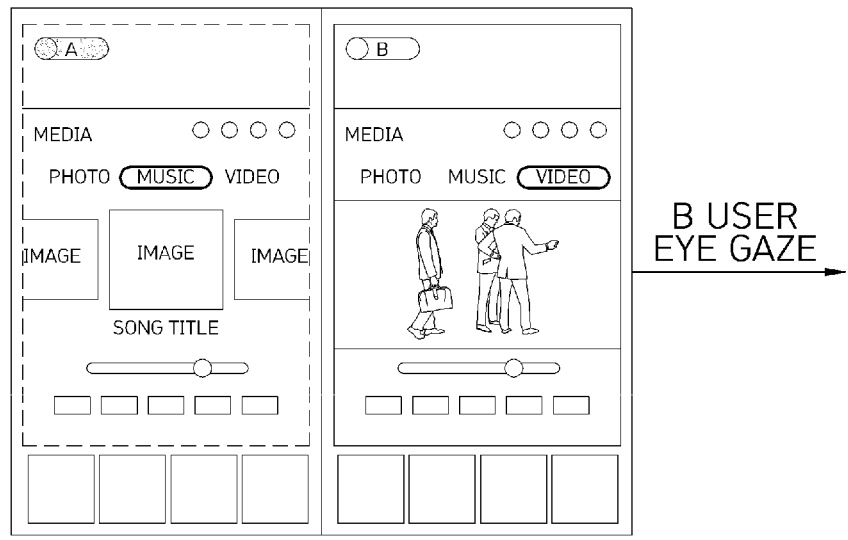
B USER
EYE GAZE
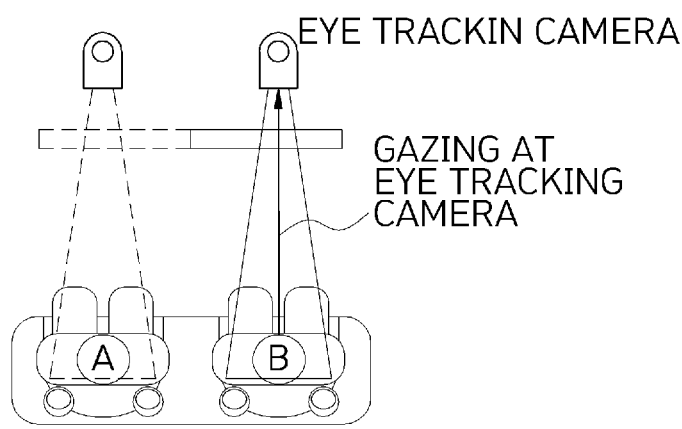
EYE TRACKIN CAMERA
GAZING AT
EYE TRACKING
CAMERA
USER A IS NOT GAZING AT
EYE TRACKING CAMERA
USER B IS IN STATE WHERE HE/
SHE CAN ACQUIRE INITIATIVE
USER A IS GAZING AT
EYE TRACKING CAMERA
USER B IS IN STATE WHERE HE/
SHE CANNOT ACQUIRE INITIATIVE

FIG. 57B
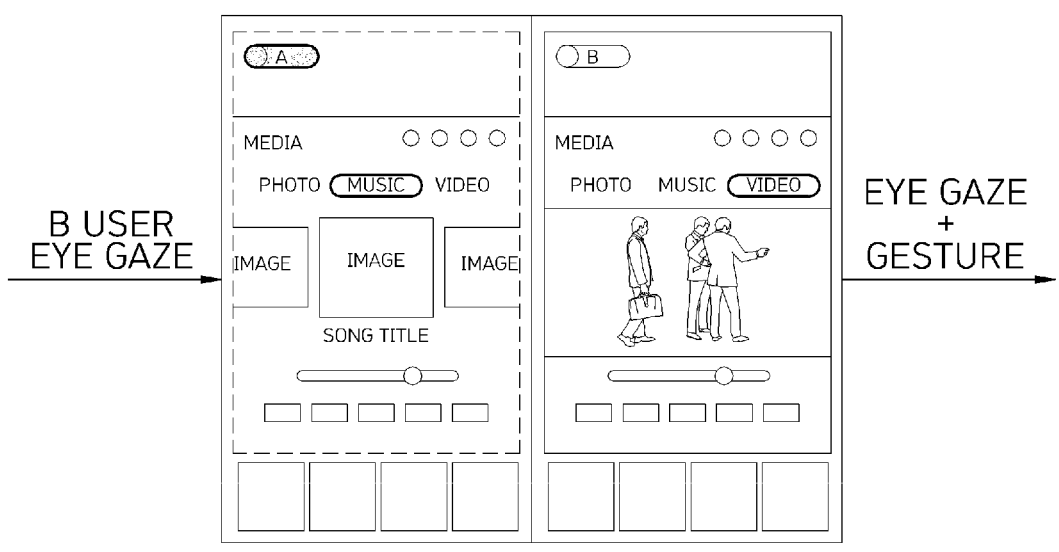
B USER
EYE GAZE
EYE GAZE
+
GESTURE
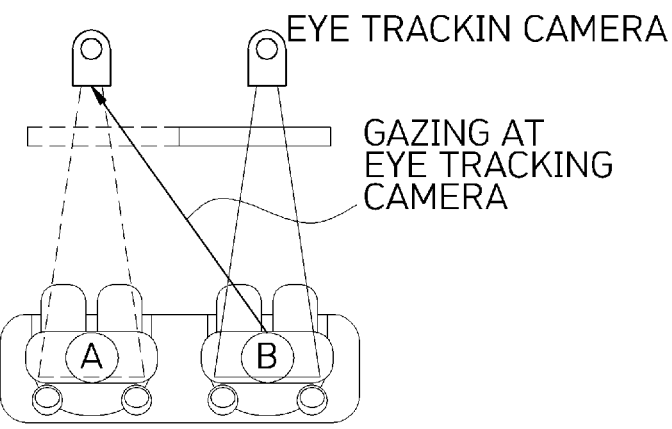
EYE TRACKIN CAMERA
GAZING AT
EYE TRACKING
CAMERA

FIG. 57C
EYE GAZE
+
GESTURE
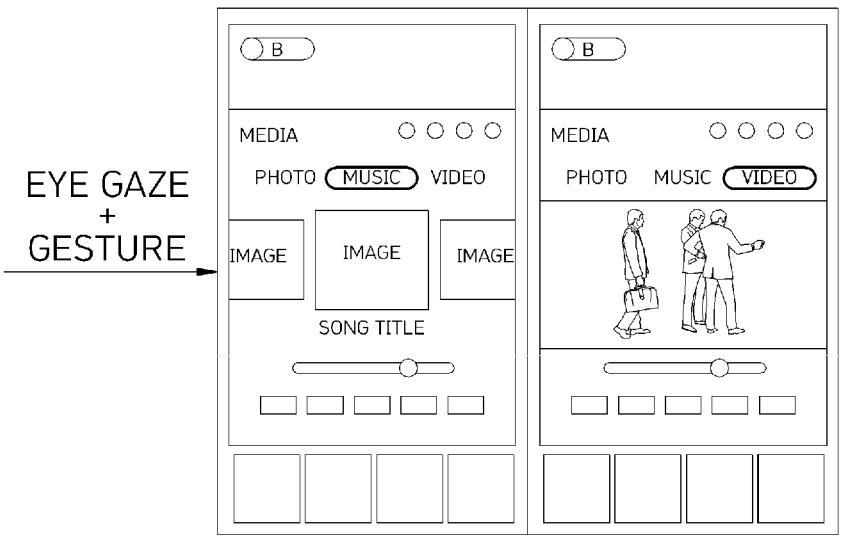
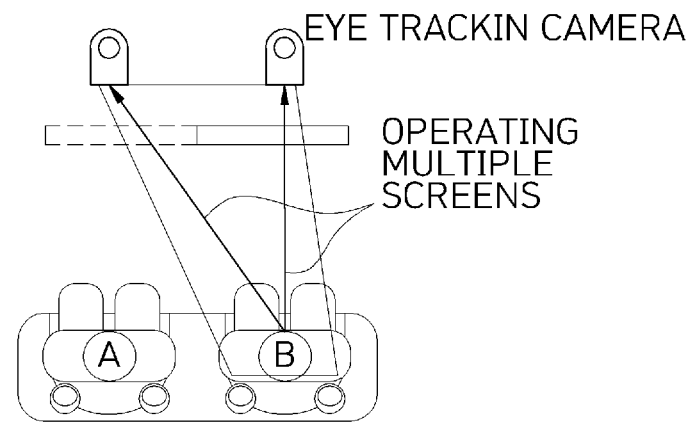
EYE TRACKIN CAMERA
OPERATING
MULTIPLE
SCREENS

FIG. 58A
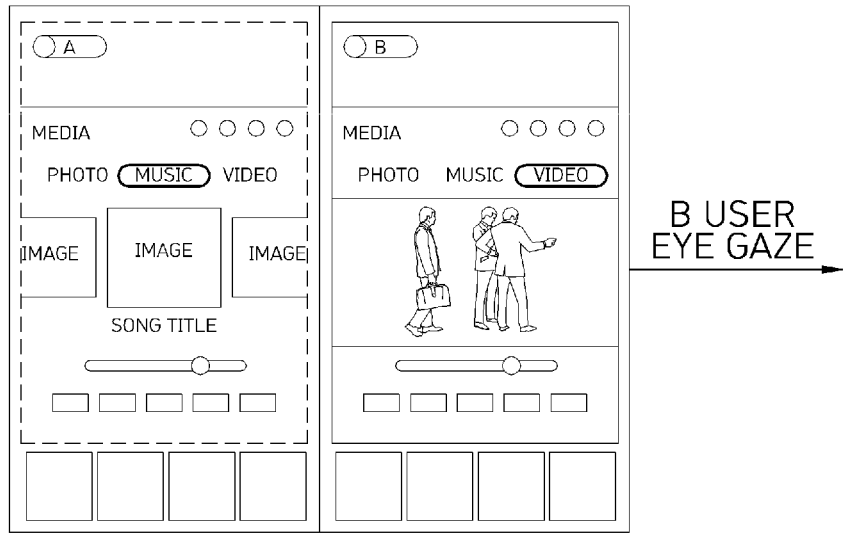
B USER
EYE GAZE
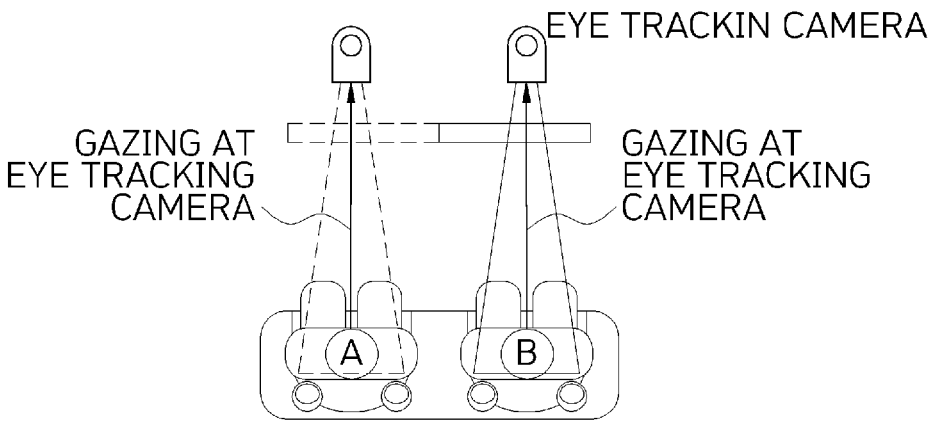
EYE TRACKIN CAMERA
GAZING AT
EYE TRACKING
CAMERA
GAZING AT
EYE TRACKING
CAMERA

FIG. 58B
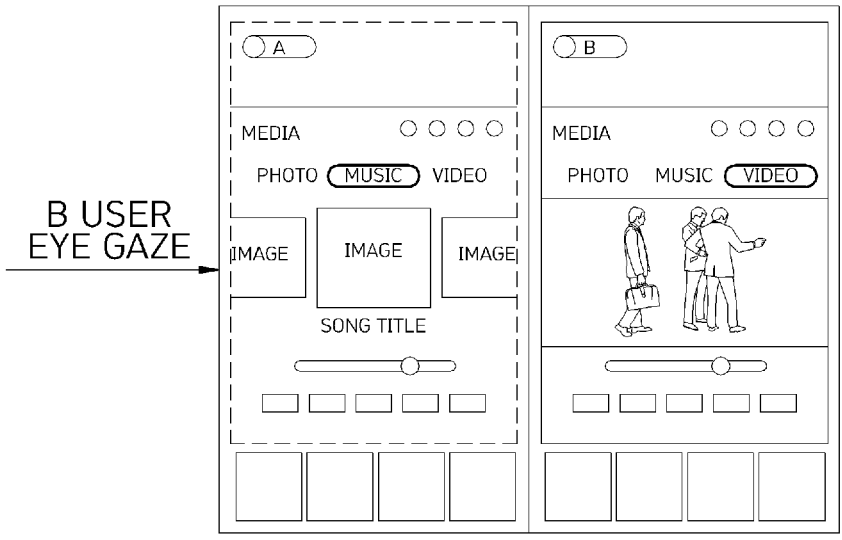
B USER
EYE GAZE
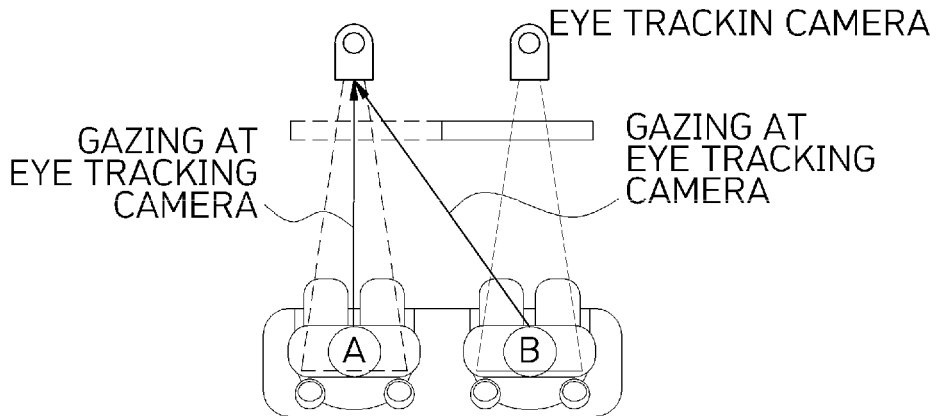
EYE TRACKIN CAMERA
GAZING AT
EYE TRACKING
CAMERA
GAZING AT
EYE TRACKING
CAMERA

FIG. 59A
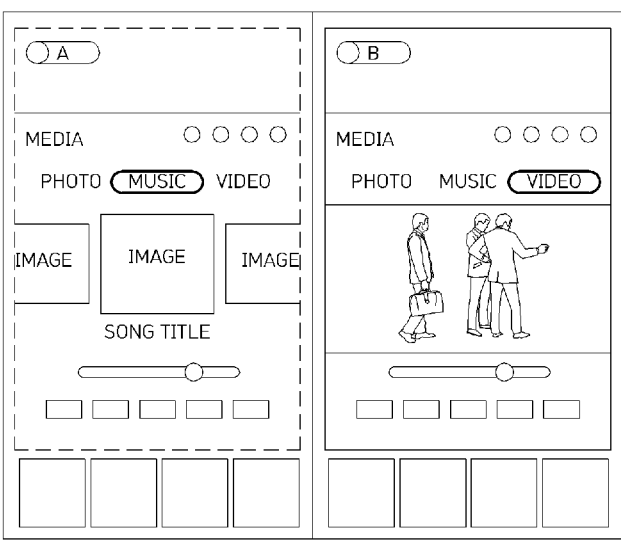
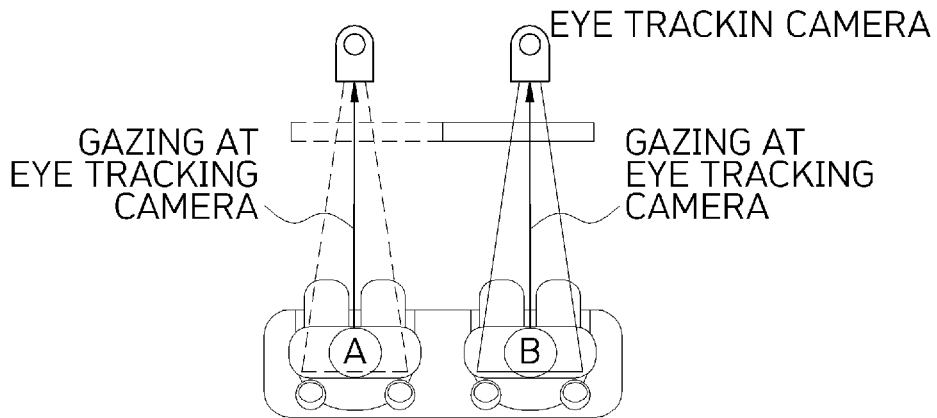

FIG. 59B
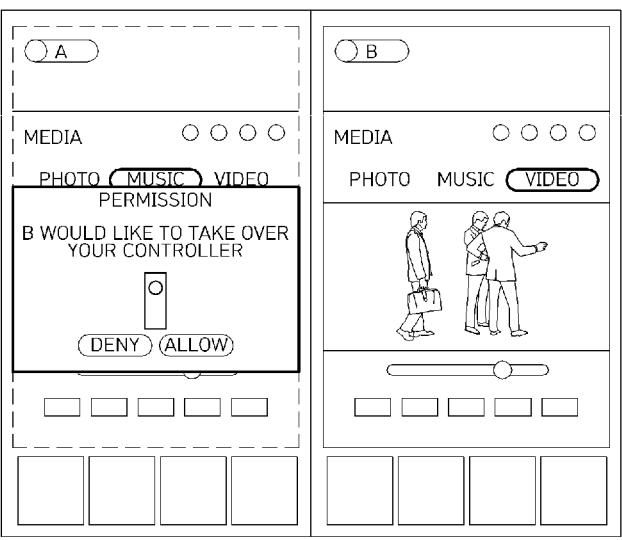
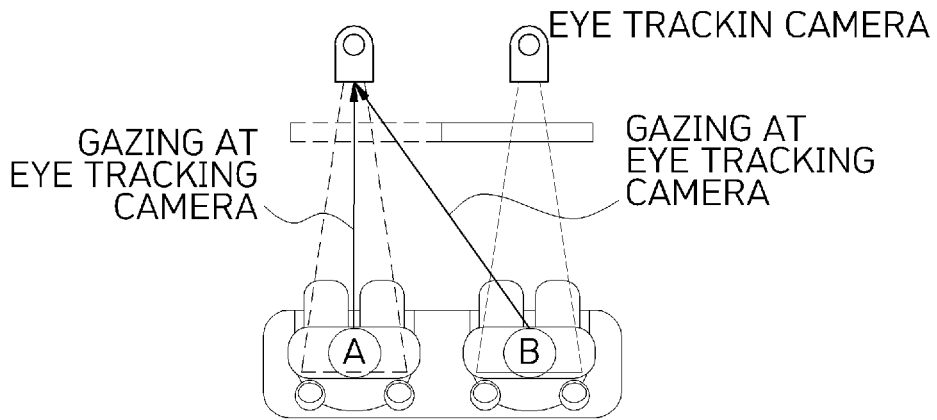

FIG. 59C
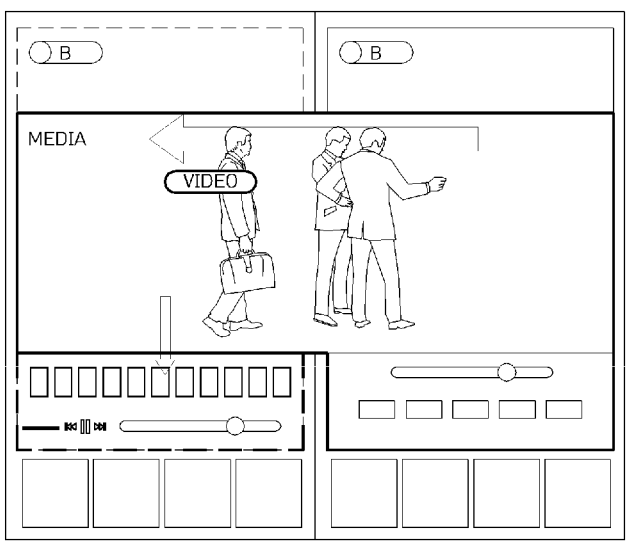
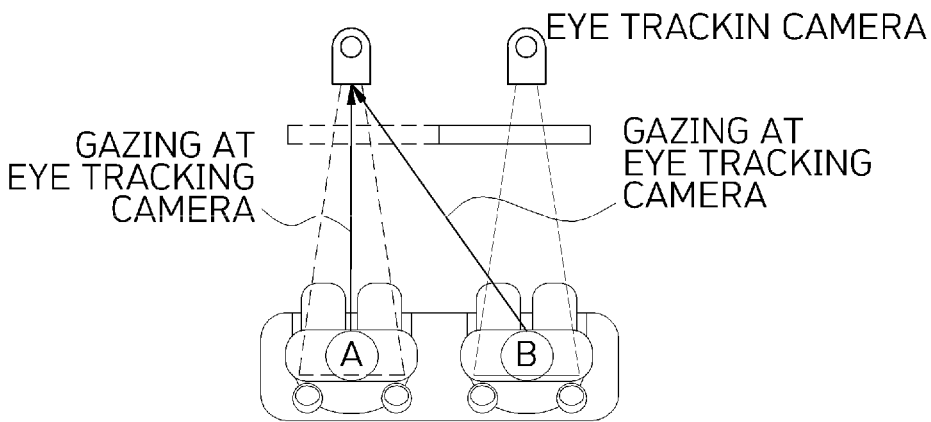

FIG. 62A
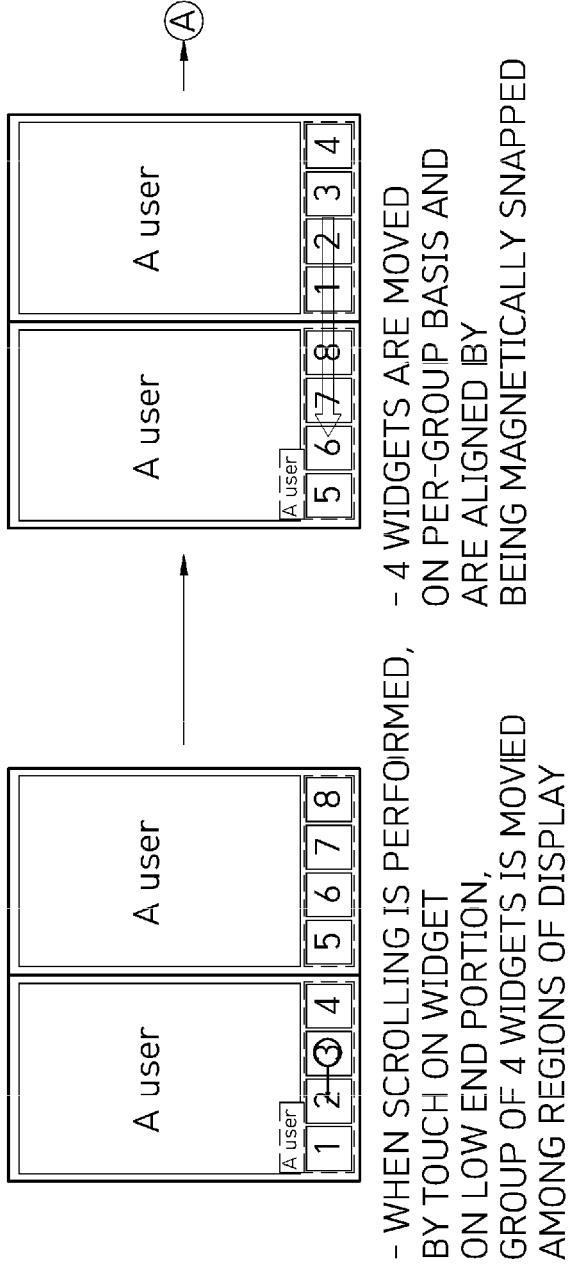
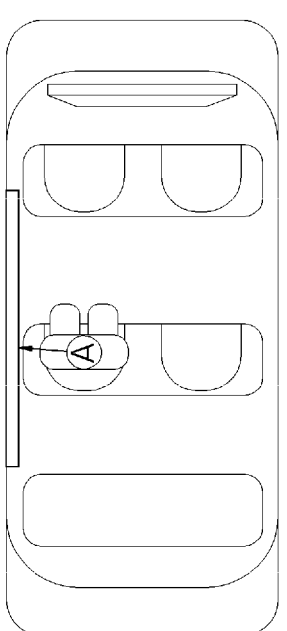
- WHEN SCROLLING IS PERFORMED, BY TOUCH ON WIDGET ON LOW END PORTION, GROUP OF 4 WIDGETS IS MOVED AMONG REGIONS OF DISPLAY
- 4 WIDGETS ARE MOVED ON PER-GROUP BASIS AND ARE ALIGNED BY BEING MAGNETICALLY SNAPPED

FIG. 62B

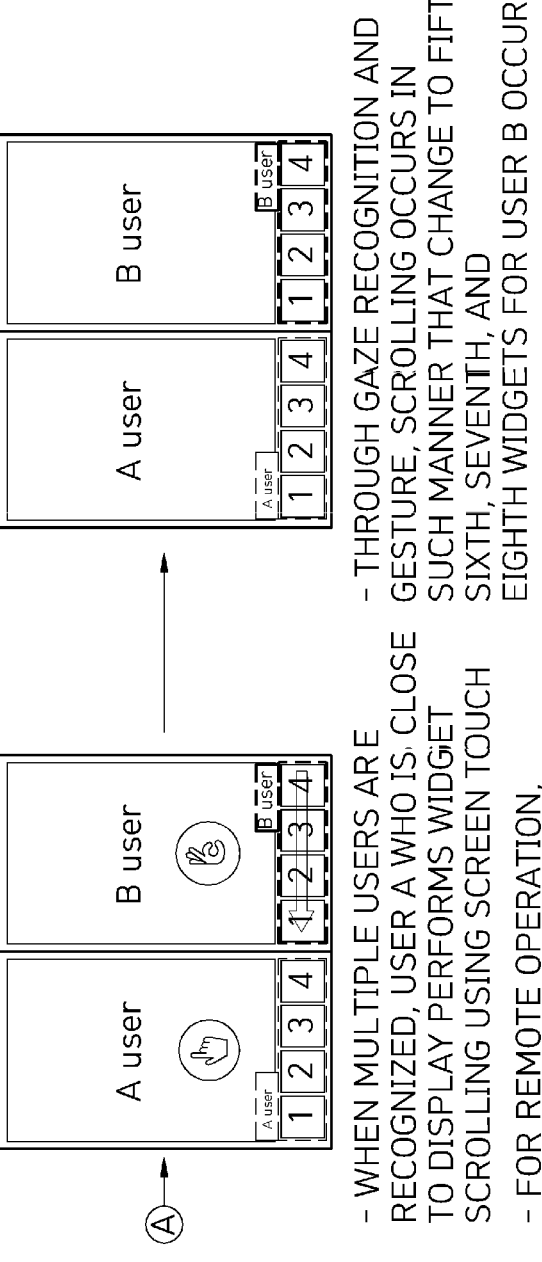

- WHEN MULTIPLE USERS ARE RECOGNIZED, USER A WHO IS CLOSE TO DISPLAY PERFORMS WIDGET SCROLLING USING SCREEN TOUCH

- FOR REMOTE OPERATION, USER B WHO IS REMOTE FROM DISPLAY PERFORMS WIDGET SCROLLING THROUGH GAZE RECOGNITION, GESTURE, OR OPERATION OF SMARTPHONE

- THROUGH GAZE RECOGNITION AND GESTURE, SCROLLING OCCURS IN SUCH MANNER THAT CHANGE TO FIFTH, SIXTH, SEVENTH, AND EIGHTH WIDGETS FOR USER B OCCURS

EYE TRACKING CAMERA

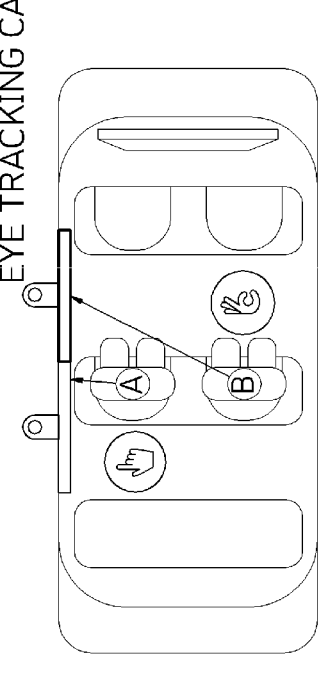

- IN CASE WHERE GAZE OF EACH OF TWO PERSONS IS RECOGNIZED, WIDGET DRAWER IS PROVIDED ON PER-USER BASIS

- WHEN SCROLLING IS PERFORMED ON DISPLAY A, SCROLLING IS OPERATIVE ONLY ON CORRESPONDING DRAWER

FIG. 65

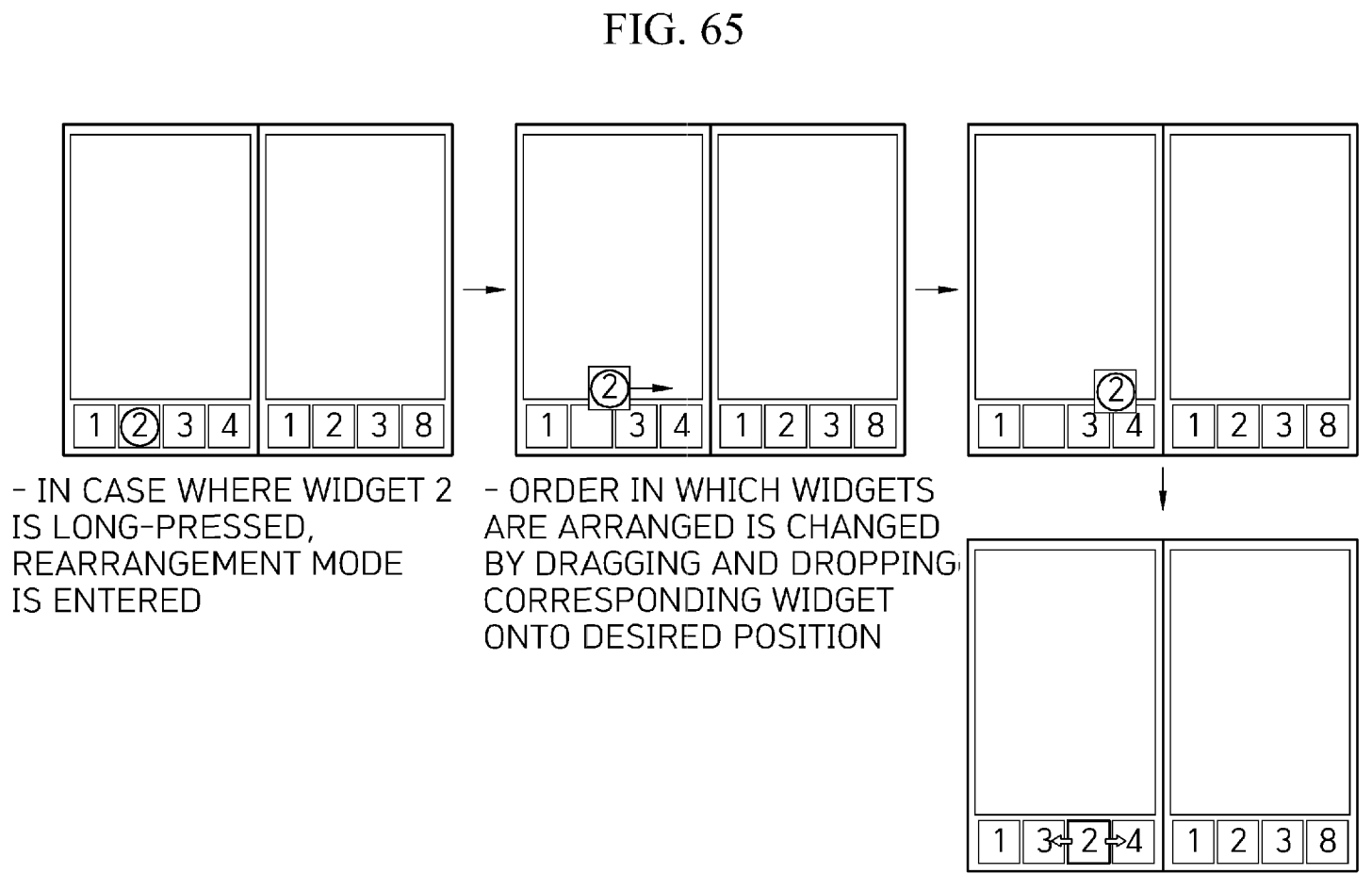

- IN CASE WHERE WIDGET 2
IS LONG-PRESSED,
REARRANGEMENT MODE
IS ENTERED

- ORDER IN WHICH WIDGETS
ARE ARRANGED IS CHANGED
BY DRAGGING AND DROPPING
CORRESPONDING WIDGET
ONTO DESIRED POSITION

FIG. 66A

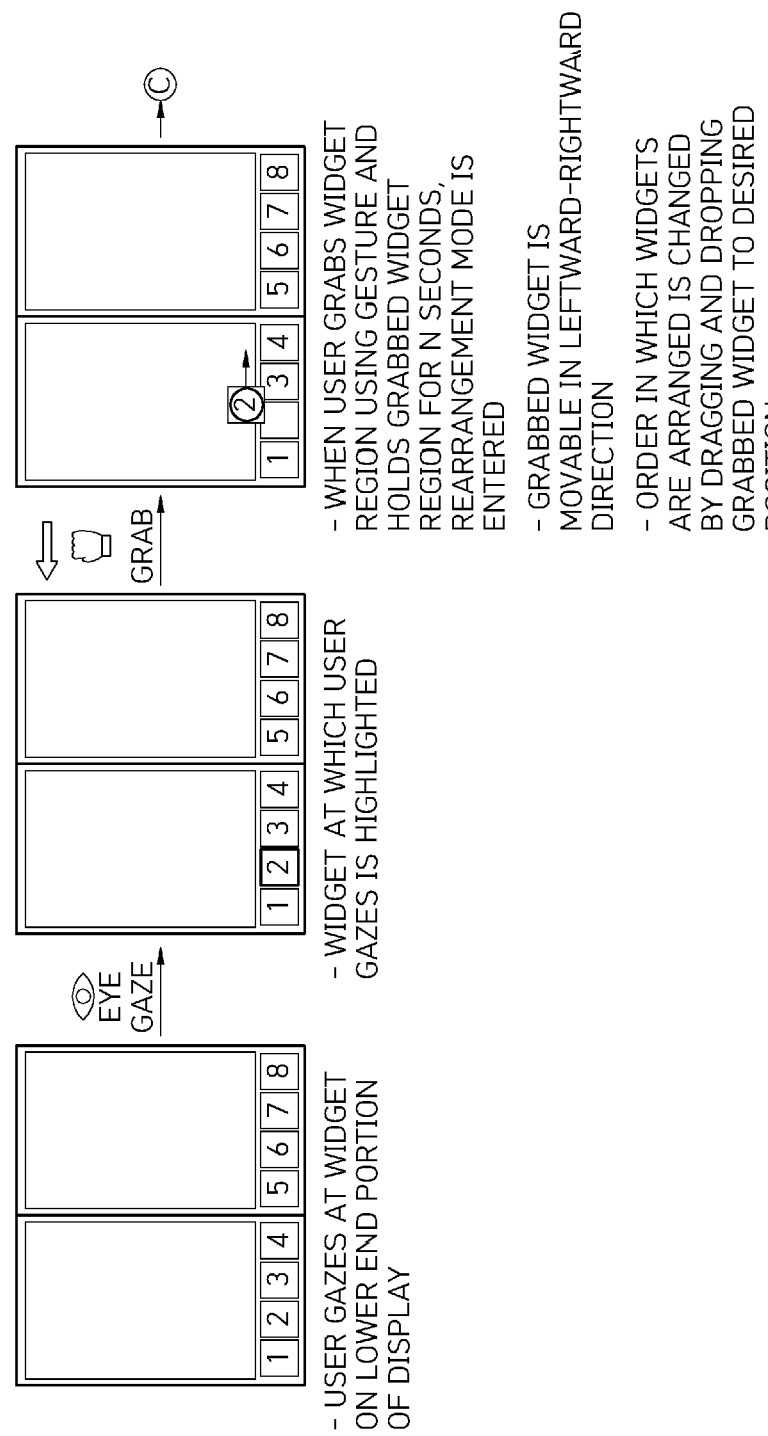

- USER GAZES AT WIDGET ON LOWER END PORTION OF DISPLAY

- WIDGET AT WHICH USER GAZES IS HIGHLIGHTED

- WHEN USER GRABS WIDGET REGION USING GESTURE AND HOLDS GRABBED WIDGET REGION FOR N SECONDS, REARRANGEMENT MODE IS ENTERED

- GRABBED WIDGET IS MOVABLE IN LEFTWARD-RIGHTWARD DIRECTION

- ORDER IN WHICH WIDGETS ARE ARRANGED IS CHANGED BY DRAGGING AND DROPPING GRABBED WIDGET TO DESIRED POSITION

- IN CASE WHERE WIDGET ON DISPLAY A IS DRAGGED AND HELD ONTO END PORTION OF DISPLAY A, WIDGET GROUP ON LOWER END PORTION IS MOVED

- FIFTH TO EIGHTH GROUPS ARE MOVED TO DISPLAY A
- FIRST TO FOURTH GROUPS ARE MOVED TO DISPLAY B

FIG. 67B

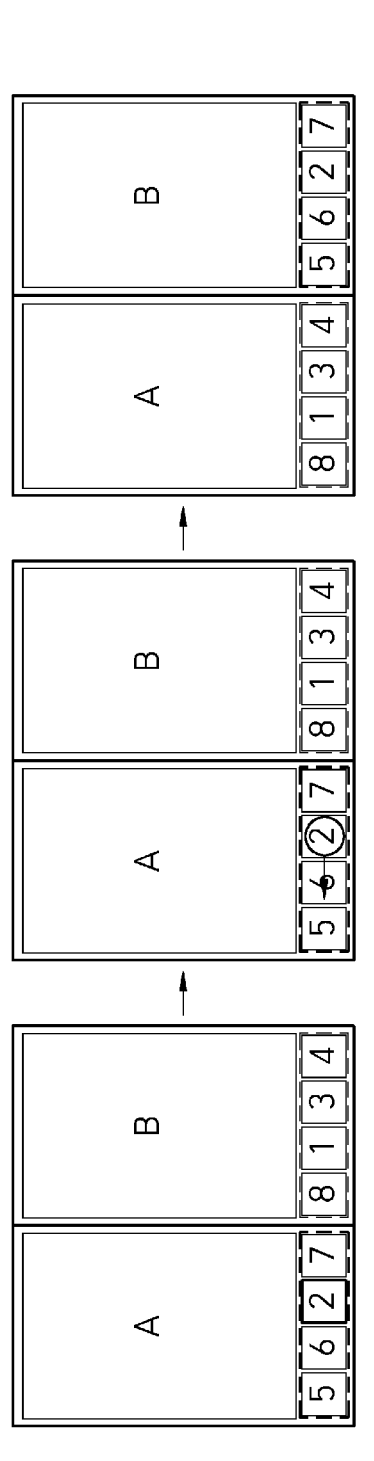

- IN CASE WHERE WIDGET IS RELEASED TO DESIRED POSITION, ORDER IN WHICH WIDGETS ARE ARRANGED IS COMPLETELY CHANGED

- WHEN LEFT SIDE OF DISPLAY B IS SWIPED TO LEFT-SIDE WIDGET GROUP, WIDGET GROUP IS MOVED AMONG DISPLAY A AND DISPLAYS B

METHOD OF EASILY MOVING WIDGET AMONG TWO DISPLAYS THAT ARE SEPARATED FROM EACH OTHER

- IN ORDER TO MOVE ONE WIDGET TO SEPARATED DISPLAY, CORRESPONDING WIDGET MAY BE ARRANGED AT DESIRED POSITION BY BEING DRAGGED AND DROPPED

- HOWEVER, BECAUSE SCREEN IS PHYSICALLY DIVIDED, WHEN DRAGGING FROM DISPLAY A TO DISPLAY B IS PERFORMED, PHENOMENON OCCURS WHERE TOUCH DOES NOT OCCUR THEREBETWEEN

- IN CASE WHERE WIDGET ON DISPLAY A IS DRAGGED AND HELD FARTHEST IN DIRECTION IN WHICH WIDGET ON DISPLAY A IS TO BE MOVED, WIDGET GROUP ON LOWER END PORTION OF DISPLAY A IS MOVED AND ARRANGED AT DESIRED POSITION

- IT IS POSSIBLE TO MOVE GROUP OF PLURALITY OF WIDGETS BY MOVING ONE WIDGET

FIG. 70
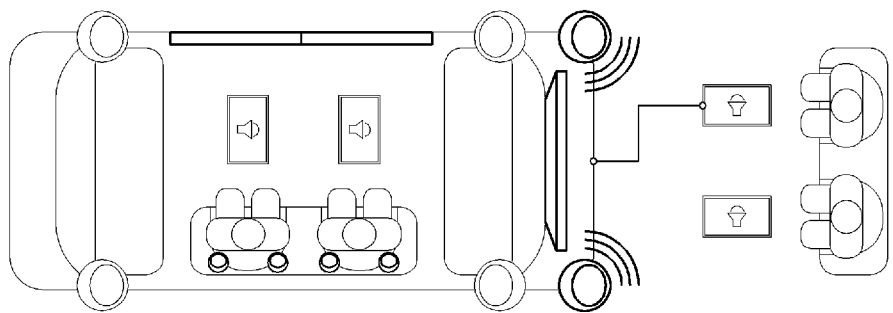
WIFI DIRECT VIDEO CAST & CONTROL
 - USING WIFI DIRECT TECHNOLOGY, DISPLAY ON
 WHICH VIDOCASTING IS PERFORMED IS
 SELECTED FROM SMARTPHONE
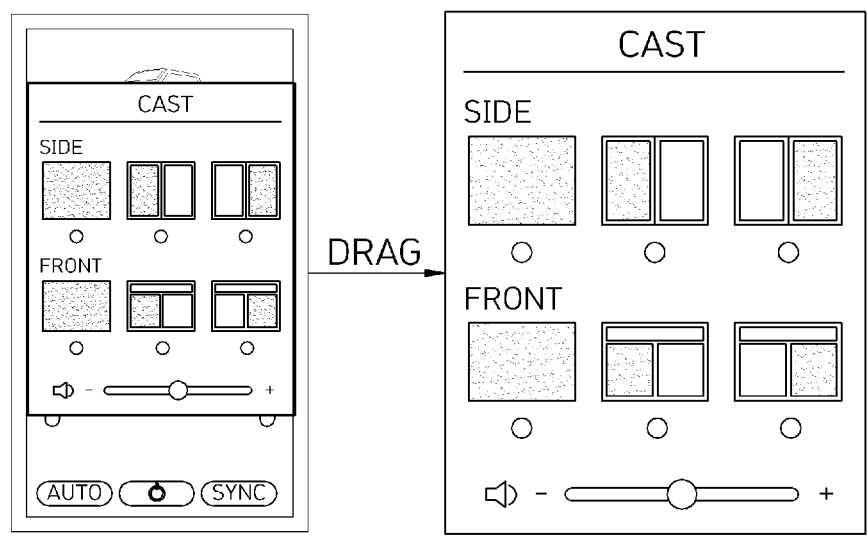
SMARTPHONE APPLICATION
 - DISPLAY ON WHICH CONTENT ON MEDIUM IS TO BE
 REPRODUCED IS SELECTED, AND VOLUME OF
 SOUND FROM CONTENT IS ADJUSTED THROUGH
 DRAGGING ICON FOR VOLUME OF SOUND

FIG. 71

EYE TRACKING CAMERA

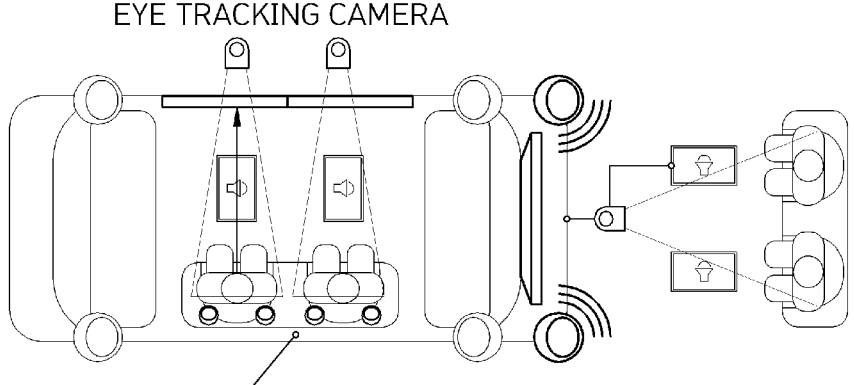

GAZE RECOGNITION AND PERFORMING OF REMOTE
FUNCTION OF SMARTPHONE APPLICATION
- TARGET CONTENT ON MEDIUM, VOLUME OF
  SOUND FROM WHICH NEEDS TO BE ADJUSTED,
  IS DETERMINED THROUGH EYE TRACKING CAMERA
- VOLUME OF SOUND IS ADJUSTED BY PERFORMING
  ROMOTE FUNCTION OF SMARTPHONE APPLICATION

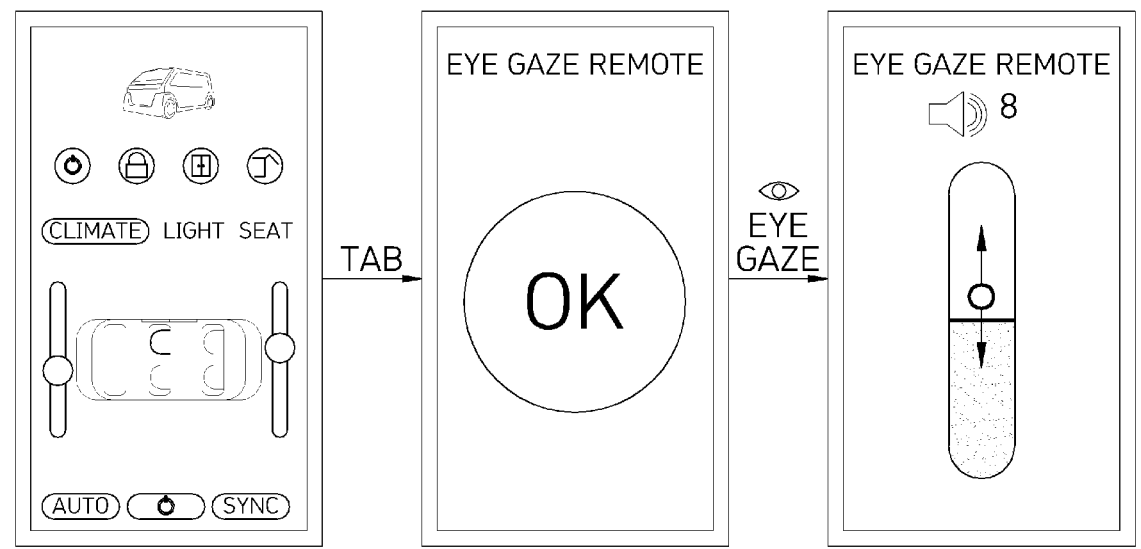

SMARTPHONE APPLICATION
- USER ADJUSTS VOLUME OF SOUND THROUGH MENU ITEM SWIPE UP AND
  DOWN ON SMARTPHONE AT REMOTE LOCATION WHILE GAZING AT
  DISPLAY ON WHICH CONTENT ON MEDIUM IS BEING REPRODUCED

FIG. 72

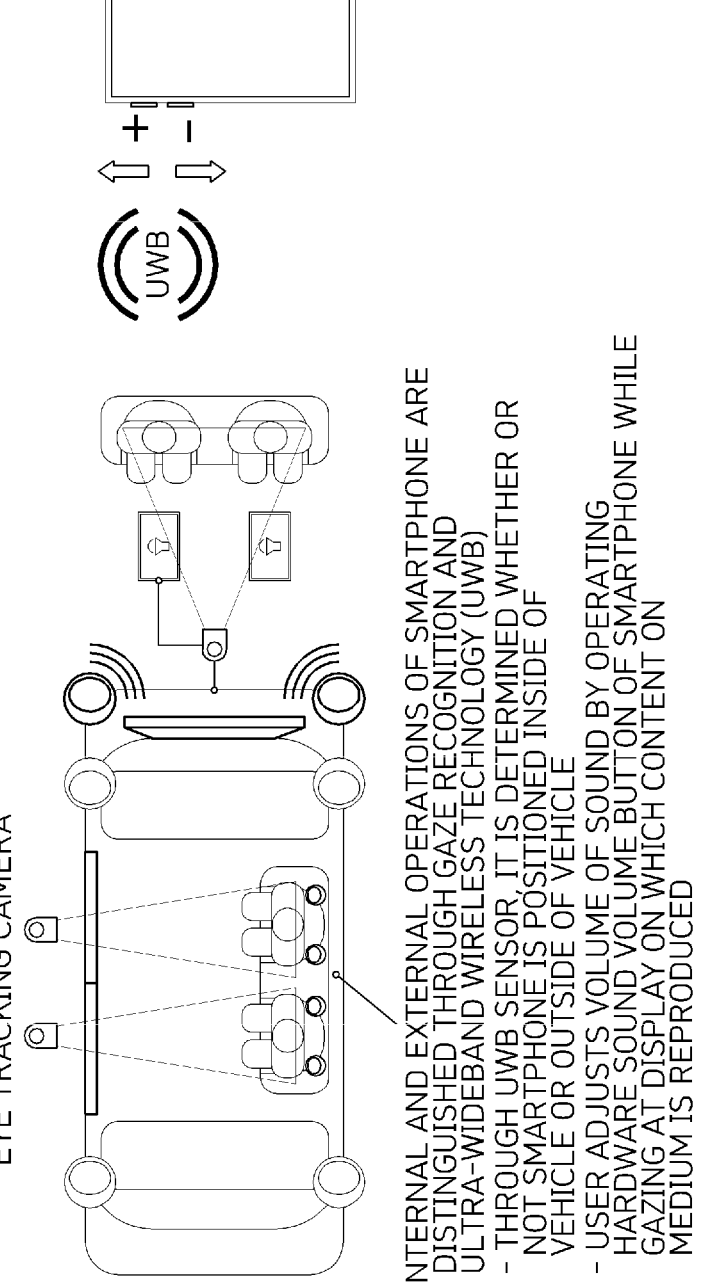

EYE TRACKING CAMERA

UWB

INTERNAL AND EXTERNAL OPERATIONS OF SMARTPHONE ARE DISTINGUISHED THROUGH GAZE RECOGNITION AND ULTRA-WIDEBAND WIRELESS TECHNOLOGY (UWB)

- THROUGH UWB SENSOR, IT IS DETERMINED WHETHER OR NOT SMARTPHONE IS POSITIONED INSIDE OF VEHICLE OR OUTSIDE OF VEHICLE

- USER ADJUSTS VOLUME OF SOUND BY OPERATING HARDWARE SOUND VOLUME BUTTON OF SMARTPHONE WHILE GAZING AT DISPLAY ON WHICH CONTENT ON MEDIUM IS REPRODUCED

S7310

RECOGNIZE INFORMATION ON ENVIRONMENT
FOR CONTROLLING CONTENT ON MEDIUM

S7320

GENERATE CONTROL COMMAND FOR
CONTENT ON MEDIUM

S7330

PERFORM CONTROL FOR REPRODUCING
CONTENT ON MEDIUM 7410                     7420                     7430

| REPRODUCTION ENVIRONMENT RECOGNITION UNIT | → | CONTROL COMMAND GENERATION UNIT | → | MEDIUM CONTENT CONTROL UNIT |

FIG. 75

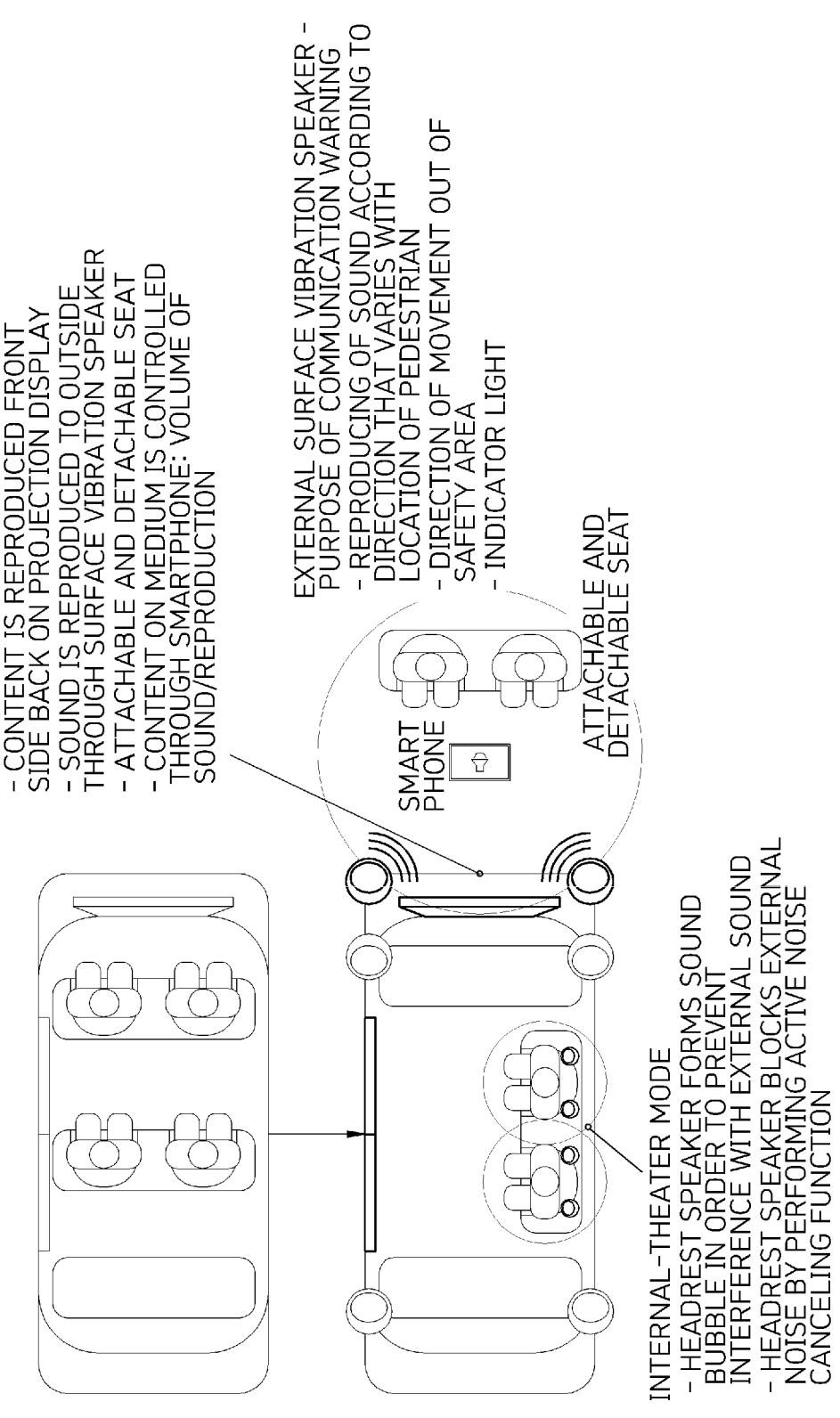

EXTERNAL-THEATER MODE
- CONTENT IS REPRODUCED FRONT SIDE BACK ON PROJECTION DISPLAY
- SOUND IS REPRODUCED TO OUTSIDE THROUGH SURFACE VIBRATION SPEAKER
- ATTACHABLE AND DETACHABLE SEAT
- CONTENT ON MEDIUM IS CONTROLLED THROUGH SMARTPHONE: VOLUME OF SOUND/REPRODUCTION

EXTERNAL SURFACE VIBRATION SPEAKER -
PURPOSE OF COMMUNICATION WARNING
- REPRODUCING OF SOUND ACCORDING TO DIRECTION THAT VARIES WITH LOCATION OF PEDESTRIAN
- DIRECTION OF MOVEMENT OUT OF SAFETY AREA
- INDICATOR LIGHT

SMART PHONE

ATTACHABLE AND DETACHABLE SEAT

INTERNAL-THEATER MODE
- HEADREST SPEAKER FORMS SOUND BUBBLE IN ORDER TO PREVENT INTERFERENCE WITH EXTERNAL SOUND
- HEADREST SPEAKER BLOCKS EXTERNAL NOISE BY PERFORMING ACTIVE NOISE CANCELING FUNCTION

FIG. 78B

※ LOGIC FOR DETERMINING EXTERNAL RISK ELEMENT

1. USER
 - NON-REGISTERED USER
 (CHECKING FACE ID THROUGH EXTERNAL CAMERA)
 - PERSON WHO DOES NOT RETAIN KEY
 (DIGITAL KEY/ SMART KEY)

2. DISTANCE
- IN CASE WHERE NON-REGISTERED PERSON STAYS
 AT SHORT DISTANCE AWAY FROM VEHICLE FOR
 SPECIFIC TIME OR LONGER
- IN CASE WHERE NON-REGISTERED PERSON
 TOUCHES HIS/HER HAND ON VEHICLE OR
 APPLIES IMPACT TO VEHICLE

3. DETERMINATION OF TARGET
- MEASURING OF DISTANCE AND RECOGNIZING OF
 SHAPE THROUGH LIDAR/RADAR SENSOR OF VEHICLE
- (VERY-SHORT DISTANCE) RADAR:
 DETERMINING OF PRESENCE OR ABSENCE OF
 TARGET/DISTANCE/SIZE
- LIDAR: RECOGNIZING OF SHAPE OF
 TARGET/ RECOGNIZING SURROUNDING
 ENVIRONMENT AROUND 360 DEGREES RELATIVE TO VEHICLE
- CAMERA: IDENTIFYING OF NEIGHBORING OBJECT

4. TYPES OF WARNING
- PROVIDING OF WARNING THAT VARIES ACCORDING TO
 TARGET (PERSON/ WILD ANIMAL)
- PERSON: DISPLAYING OF MESSAGE ON EXTERNAL
 DISPLAY AND PROVIDING OF WARNING SIREN SOUND
- WILD ANIMAL: FLICKERING OF EXTERNAL LIGHT SOURCE AND
 WARNING SOUND THAT VARIES ACCORDING TO KIND OF ANIMAL
- EX) PROVIDING OF WARNING SOUND HAVING LOW FREQUENCY
 (150 TO 8000 HZ) TO WILD PIG

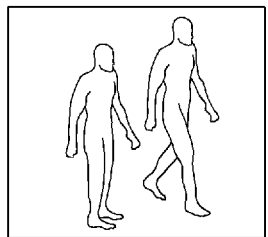    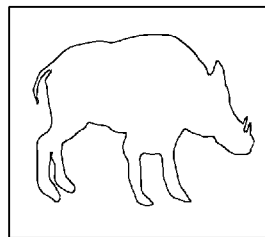

DETERMINING OF       DETERMINING OF
SHAPE OF PERSON    SHAPE OF WILD ANIMAL

S7910
| RECOGNIZE APPROACHING/LEAVING OBJECT |

S7920
| GENERATE CONTROL COMMAND |

S7930
| PROVING WARNING NOTIFICATION |

8010

MOTION-SICKNESS
REDUCTION CONTROL
REQUEST UNIT

8020

CONTROL COMMAND
GENERATION UNIT

8030

DISPLAY AND
IN-VEHICLE LAYOUT
CHANGE UNIT

FIG. 81A
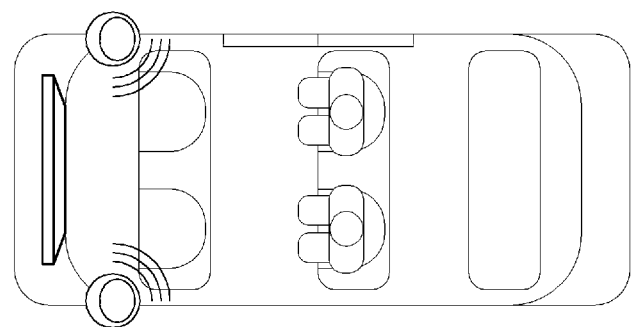
DETECTION OF BIO-SIGNAL
- MEASURING OF HEART RATE AND
  RESPIRATION RATE ON BASIS OF IN-CABIN
  CAMERA/WIRELESS RADAR
- REPRODUCING OF CONTENT PROJECTION DISPLAY
  (FRONT-SIDE GLASS PANE)
PROJECTION DISPLAY: FRONT-SIDE GLASS PANE
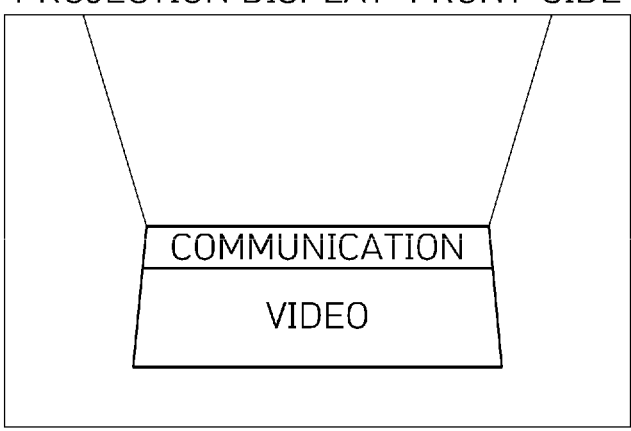
COMMUNICATION
VIDEO

FIG. 81B
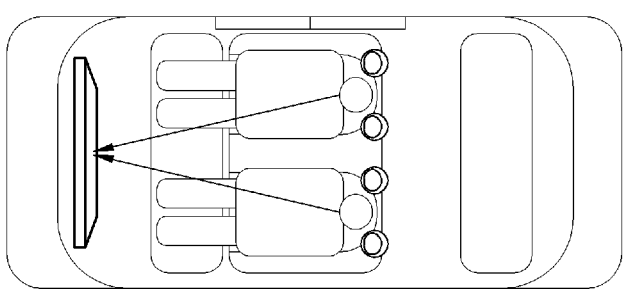
MOTION-SICKNESS REDUCTION
- GRAVITY-FREE SEAT
- REPRODUCING OF CONTENT USING PROJECTION
  DISPLAY (ROOF GLASS PANE)
    : APPLICATION OF ANC/RANC
    : SEAT-TO-SEAT CONVERSATION
    : SOUND
PROJECTION DISPLAY: ROOF GLASS PANE
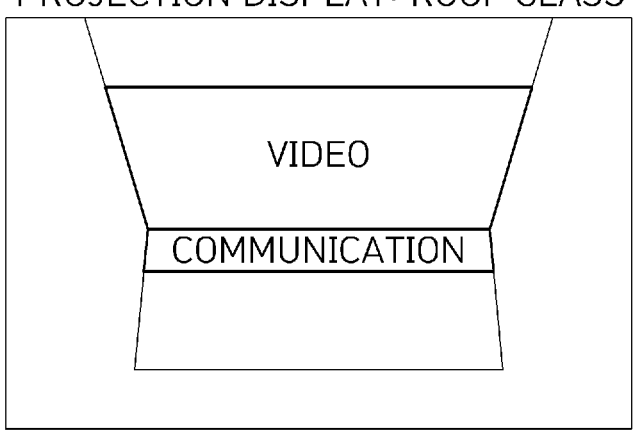

FIG. 81C

SOUND
- REPRODUCING OF EXTERNAL SOUND IN SUCH
  MANNER THAT USER CAN FEEL VEHICLE SPEED
- REPRODUCING OF SOUND ASSOCIATED
  WITH RELAXATION
- REPRODUCING OF SOUND OF NATURE

- REPRODUCING OF SOUND IN TWO CHANNELS
  WHEN VEHICLE TRAVELS IN STRAIGHT LINE
- REPRODUCING OF SOUND IN LEFT CHANNEL
  WHEN VEHICLE TURNS TO LEFT
- REPRODUCING OF SOUND IN RIGHT CHANNEL
  WHEN VEHICLE TURNS TO RIGHT

 "LEFT"    "RIGHT"

FIG. 83A
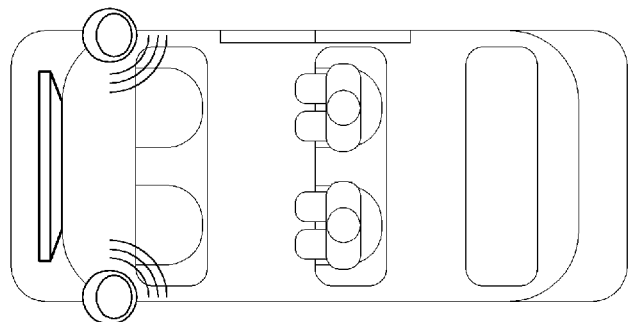
DETECTION OF BIO-SIGNAL
- MEASURING OF HEART RATE AND
  RESPIRATION RATE
- REPRODUCING OF CONTENT PROJECTION DISPLAY
  (FRONT-SIDE GLASS PANE)
PROJECTION DISPLAY: FRONT-SIDE GLASS PANE
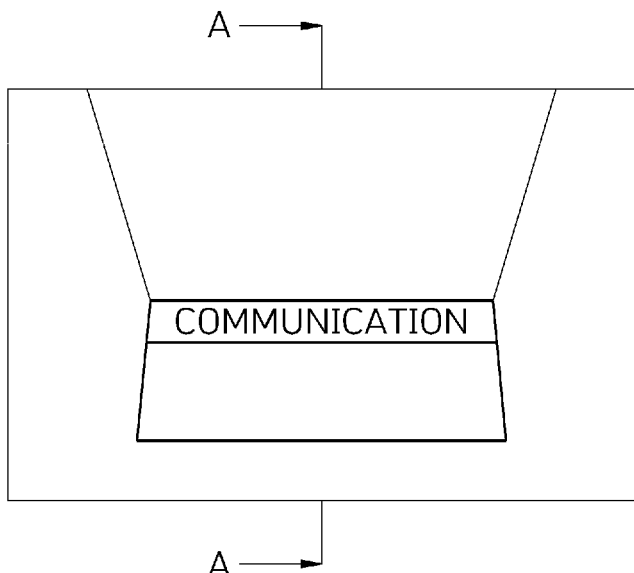

<VIEW OF LEFT-SIDE SURFACE
(CROSS-SECTIONAL VIEW OF VEHICLE
PACKAGE TAKEN ALONG LINE A-A>

<FRONT VIEW - PROJECTOR>

FIG. 85A
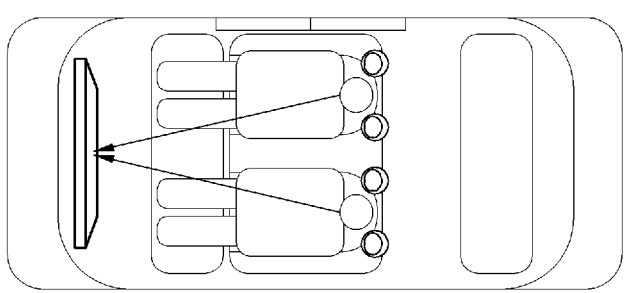
MOTION-SICKNESS REDUCTION
- GRAVITY-FREE SEAT
- REPRODUCING OF CONTENT USING PROJECTION
  DISPLAY (ROOF GLASS PANE)
- REPRODUCING OF MOTION-SICKNESS
  REDUCTION SOUND (TBD)
- USE OF HEADREST SPEAKER IS UNDER
  CONSIDERATION
    : APPLICATION OF ANC/RANC
    : SEAT-TO-SEAT CONVERSATION
     PROJECTION DISPLAY: ROOF GLASS PANE
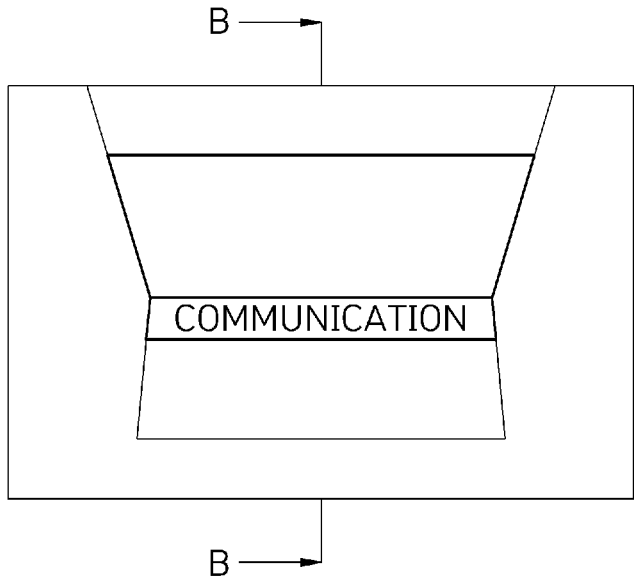

TRAVELING INFORMATION

EXTERIOR APPEARANCE OF VEHICLE

IMAGE WATCHING REGION

VIEWING ANGLE

WHEN PROJECTOR IS ROTATED, IT IS ALSO POSSIBLE TO SECURE ALL EXISTING IMAGE INFORMATION REGIONS

SEAT RECLINING

EXTERIOR APPEARANCE OF VEHICLE

ANGLE OF VIEW OF PROJECTOR

<VIEW OF LEFT-SIDE SURFACE
(CROSS-SECTIONAL VIEW OF VEHICLE
PACKAGE TAKEN ALONG LINE B-B>

<FRONT VIEW - PROJECTOR>

- VIDEO IS WATCHED THROUGH FRONT-SIDE DISPLAY

- REGION OF EXTERNAL
  COMMUNICATION LAMP
  IS MAINTAINED

- VIDEO IS REPRODUCED ON
  LOWER END PORTION IN
  MANNER THAT IS FITTED TO
  FULL SIZE OF SCREEN

- WHEN FUNCTION OF REDUCING
  MOTION-SICKNESS IS PERFORMED,
  IN STATE WHERE REGION OF
  EXTERNAL COMMUNICATION LAMP
  IS MAINTAINED, VIDEO IS MOVED
  TO ROOF GLASS PANE

- SEAT RECLINING OPERATION
  IS PERFORMED

- VIDEO IS REPRODUCED
ON ROOF GLASS PANE

- EXTERNAL COMMUNICATION
LAMP OPERATES CONCURRENTLY

- VIDEO IS BEING REPRODUCED ON ROOF GLASS PANE

- GUI ANIMATION IS PLAYED ON FILM REGION OF END PORTION IN ORDER FOR USER TO FEEL MOVING SPEED OF VEHICLE

- EXAMPLE) LINE ANIMATION IS REPRODUCED AS IF VEHICLE WERE PASSING BETWEEN TWO LINES OF LAMPPOSTS

- SOUND OF WHICH SPEED CORRESPONDS TO SPEED OF VEHICLE AND SOUND OF NATURE ARE REPRODUCED THROUGH HEADREST SPEAKER

- VIDEO IS BEING REPRODUCED ON ROOF GLASS PANE

- EXTERNAL TRAVELING SITUATION IS MADE TO BE RECOGNIZABLE BY MAKING REGION OF EXTERNAL COMMUNICATION LAMP TRANSPARENT, AND THUS SENSATION OF SPEED OF VEHICLE IS MADE TO BE EXPERIENCED.

- VIDEO IS BEING REPRODUCED
ON ROOF GLASS PANE

- EXTERNAL TRAVELING SITUATION
IS MADE TO BE RECOGNIZABLE BY
MAKING ENTIRE FRONT-SIDE
DISPLAY TRANSPARENT, AND
THUS SENSATION OF SPEED OF
VEHICLE IS MADE TO BE EXPERIENCED

S8810

RECEIVE REQUEST FOR
MOTION-SICKNESS REDUCTION CONTROL

S8820

GENERATE CONTROL COMMAND

S8830

CHANGE SETTING OF
DISPLAY AND IN-VEHICLE LAYOUT

1. IMAGE IS WATCHED THROUGH FRONT-SIDE PROJECTION IMAGE
- PROJECTION DISPLAY
- SOUND IS REPRODUCED THROUGH LEFT AND RIGHT SPEAKERS

FIG. 90B
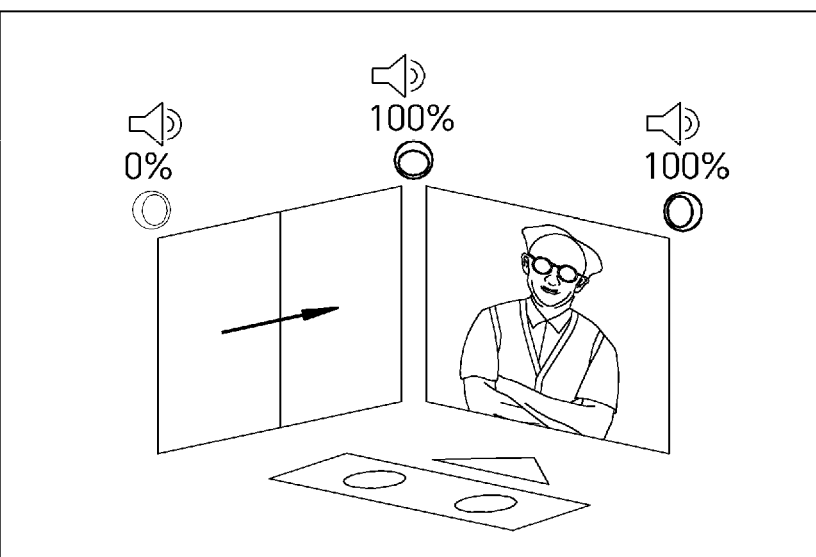
2. WHEN IMAGE IS MOVED AND REPRODUCED, SIDE-WINDOW DISPLAY IS MOVED
- IMAGE IS MOVED USING GESTURE, BUTTON ON SCREEN, OR SMARTPHONE
- WHEN IMAGE IS MOVED, IN ORDER TO MINIMIZE DISTANCE BETWEEN TWO DISPLAYS, TRANSPARENT DISPLAY IS MOVED TOWARD FRONT-SIDE PROJECTION DISPLAY.
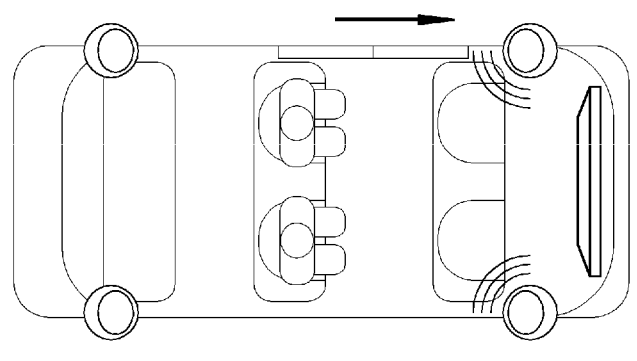

FIG. 90C
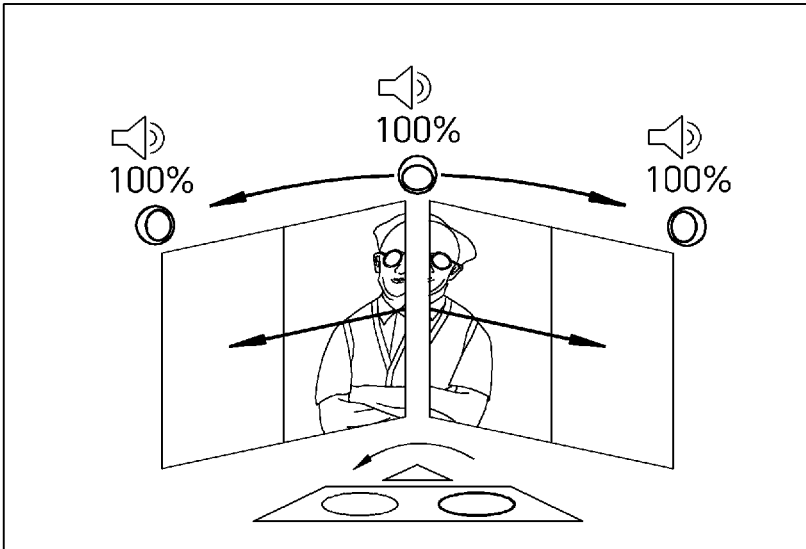
3. MOVING OF IMAGE
- IMAGE IS MOVED FROM PROJECTION DISPLAY TO TRANSPARENT DISPLAY
- ROTATING OF SEAT
- BY ADJUSTING SPEAKER PHASE, AUDIO OUTPUT SOURCE IS MOVED TOGETHER WITH IMAGE, AND SOUND IS REPRODUCED
- IMAGE, AUDIO OUTPUT SOURCE, AND SEAT ARE CONCURRENTLY ROTATED
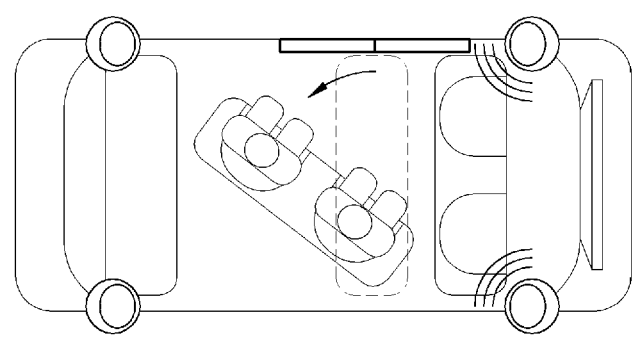

FIG. 90D
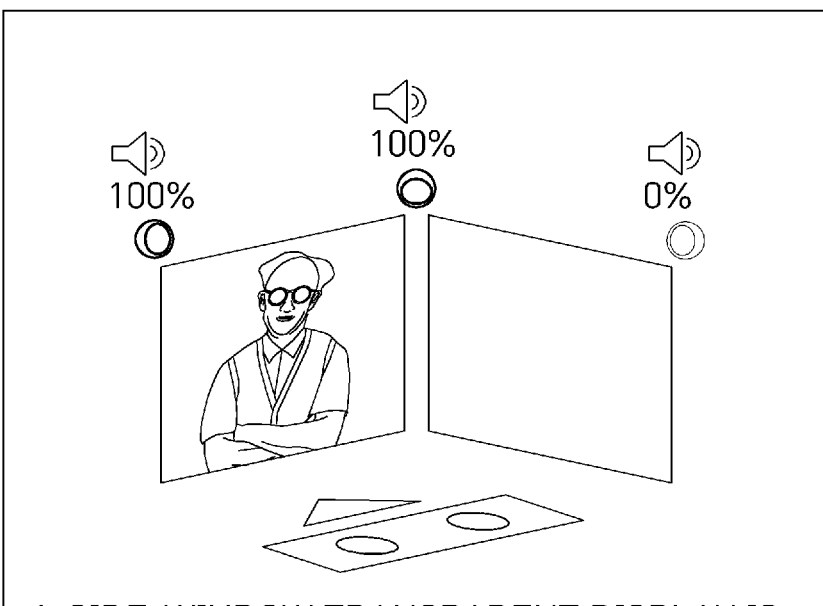
4. SIDE-WINDOW TRANSPARENT DISPLAY IS COMPLETELY MOVED
- IMAGE IS COMPLETELY MOVED TO SIDE-WINDOW DISPLAY
- DISPLAY IS COMPLETELY MOVED TO POSITION FOR WATCHING IMAGE
- SEAT LAYOUT IS COMPLETELY CHANGED
- STEREO SOUND IS REPRODUCED WITH RESPECT TO SIDE-WINDOW DISPLAY
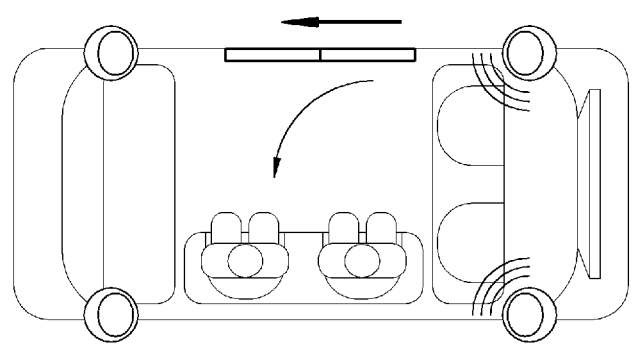

9210

DISPLAY MOVEMENT
REQUEST
RECEPTION UNIT

9220

CONTROL COMMAND
GENERATION UNIT

9230

ADDITIONAL
INFORMATION
DISPLAY UNIT

FIG. 94A
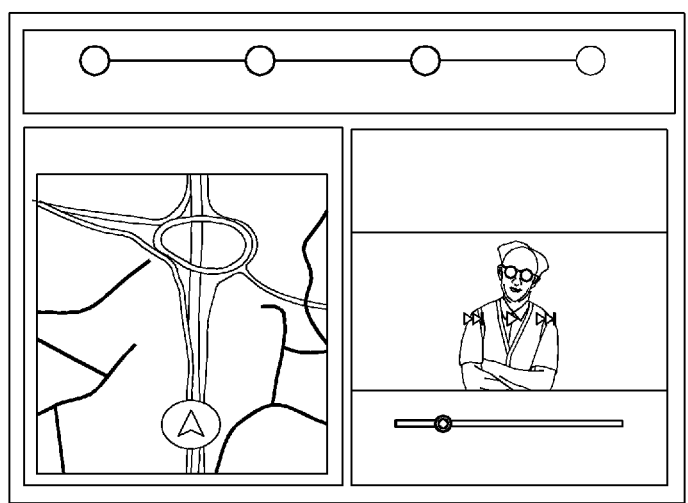
1. WHILE FRONT-SIDE PROJECTION DISPLAY
IS BEING INDIVIDUALLY USED, NAVIGATION
APPLICATION IS BEING EXECUTED ON
LEFT-SIDE SCREEN
2. IN CASE OF FRONT-SIDE PROJECTION DISPLAY,
SWITCHING BETWEEN TRANSPARENT MODE AND
NON-TRANSPARENT MODE IS POSSIBLE,
BUT EXPRESSING INFORMATION ON SITUATION
IN FRONT OF VEHICLE IN AR FORMAT IS IMPOSSIBLE
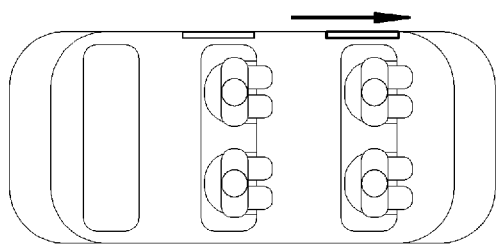

FIG. 94B
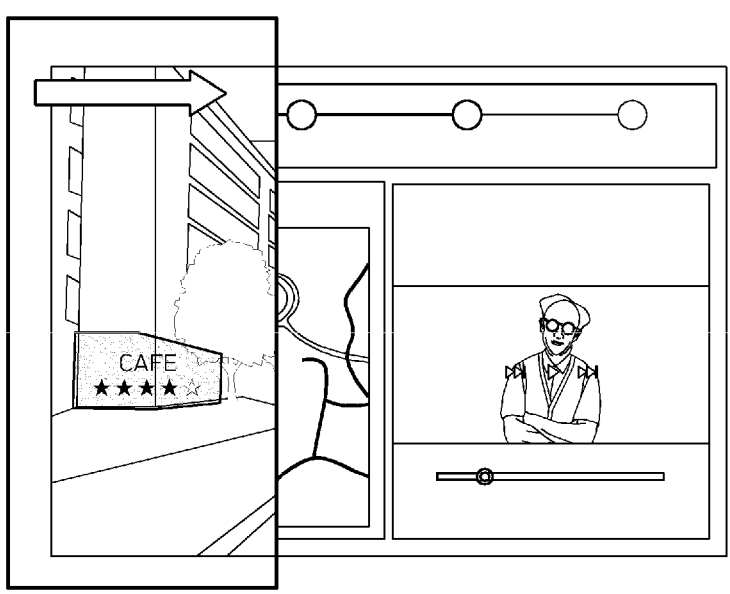
1. TRANSPARENT DISPLAY POSITIONED ON
SIDE OF VEHICLE IS MOVED TO FRONT OF VEHICLE
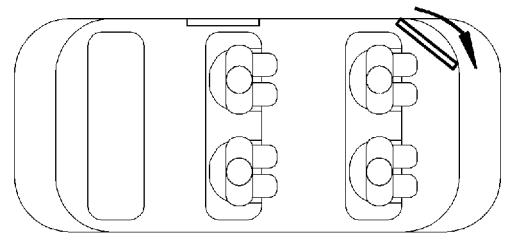

FIG. 94C

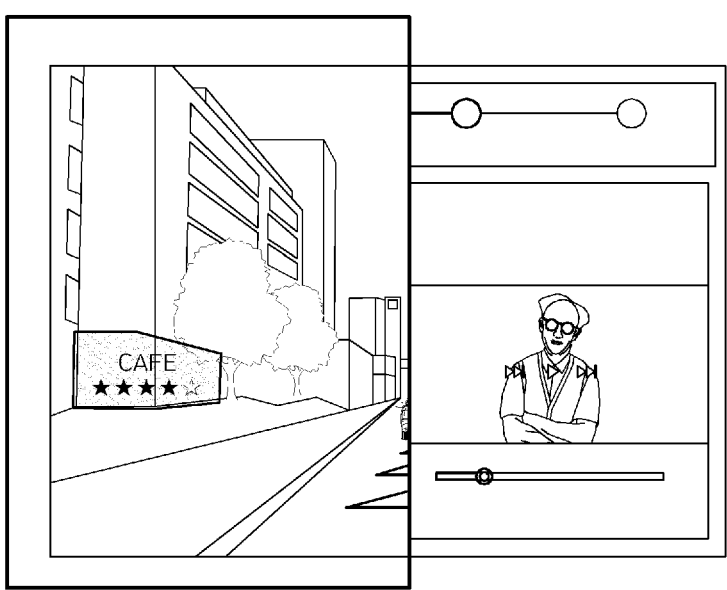

1. REGION OF FRONT-SIDE PROJECTION DISPLAY, ON WHICH CONTENT (NAVIGATION INFORMATION) IS REPRODUCED, IS MADE TO BE TRANSPARENT, AND AR INFORMATION IS DISPLAYED THROUGH TRANSPARENT DISPLAY

2. BY MAKING FRONT-SIDE PROJECTION DISPLAY TRANSPARENT AND UPGRADING INFORMATION TYPE FROM EXISTING NON-TRANSPARENT NAVIGATION CONTENT TO AR CONTENT, IT IS POSSIBLE TO CHECK SURROUNDING-ENVIRONMENT INFORMATION

3. IN CASE WHERE INFORMATION DISPLAYED ON FRONT-SIDE DISPLAY IN MANNER THAT IS FITTED TO FULL SIZE OF SCREEN IS BLOCKED FROM VIEW BY TRANSPARENT DISPLAY, INFORMATION IS DISPLAYED WITHOUT INFORMATION LOSS BY ADJUSTING AMOUNT OF INFORMATION FOR OCCUPANT ON LEFT SIDE

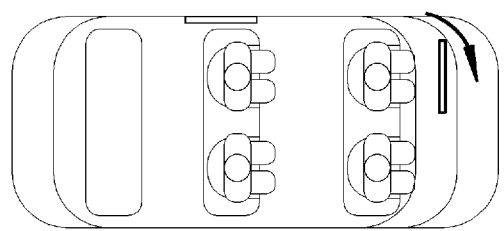

S9510

RECEIVE REQUEST FOR
MOVEMENT OF DISPLAY

S9520

GENERATE CONTROL COMMAND

S9530

MOVE DISPLAY AND
DISPLAY ADDITION INFORMATION

FIG. 97A
► EXAMPLES OF SHAPE ON
BASIS OF EACH OCCUPANT'S
LOCATION AND EXAMPLES OF
WARPED IMAGE
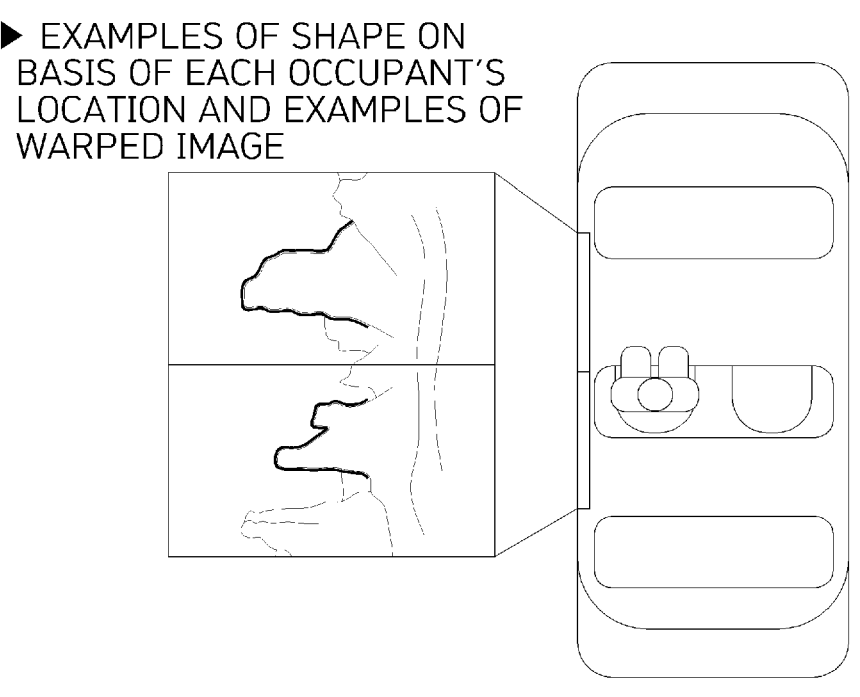
[ISO VIWE]
[FRONT VIEW OF DISPLAY]
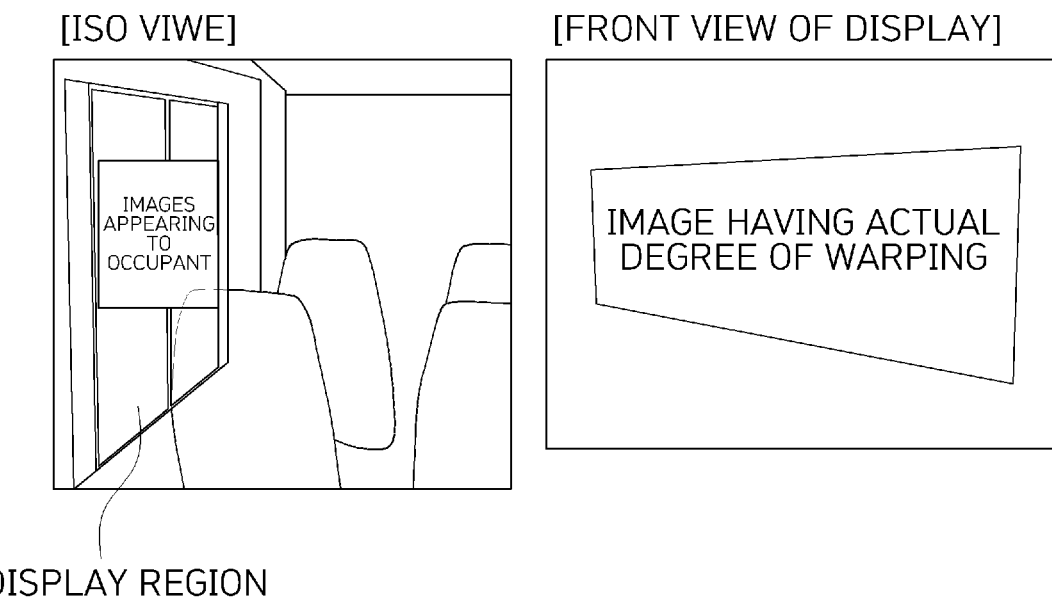
DISPLAY REGION

FIG. 97B
▶ EXAMPLES OF SHAPE ON BASIS OF EACH OCCUPANT'S LOCATION AND EXAMPLES OF WARPED IMAGE
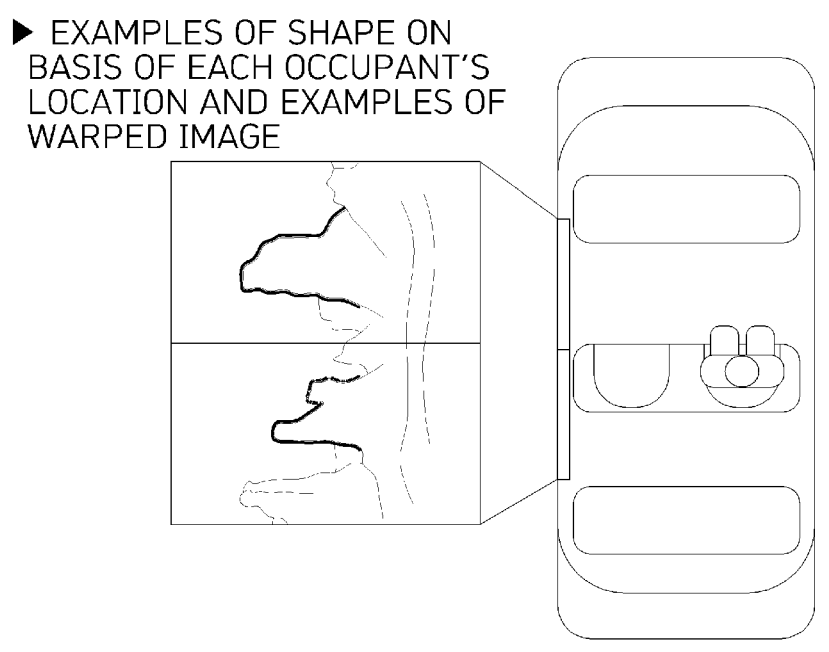
[ISO VIWE]
[FRONT VIEW OF DISPLAY]
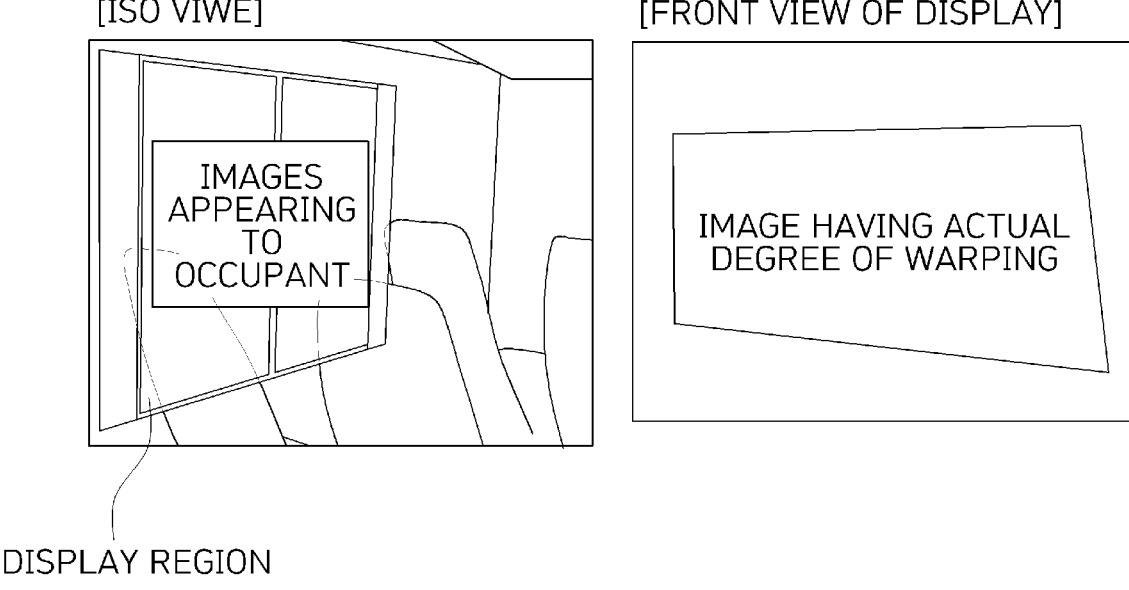
IMAGES APPEARING TO OCCUPANT
IMAGE HAVING ACTUAL DEGREE OF WARPING
DISPLAY REGION

FIG. 98
[ISO VIWE]
[FRONT VIEW OF DISPLAY]
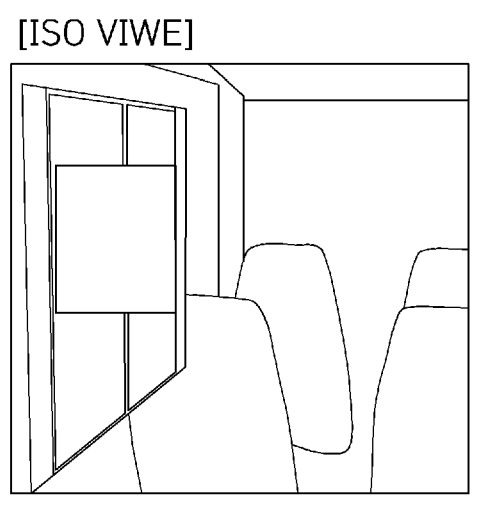
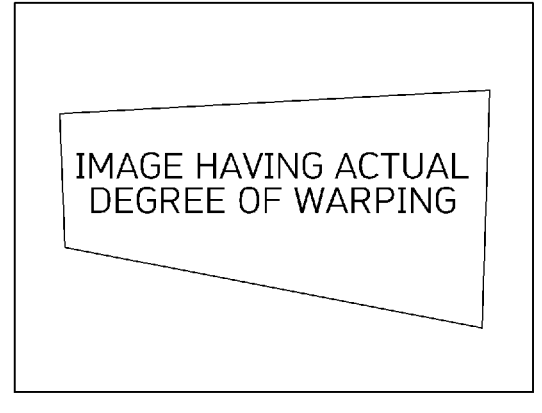
IMAGE HAVING ACTUAL
DEGREE OF WARPING
[FRONT VIEW OF DISPLAY]
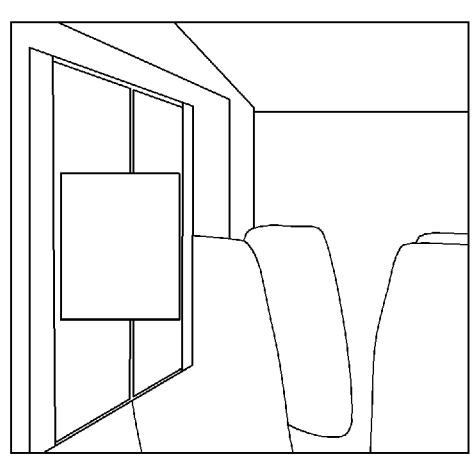
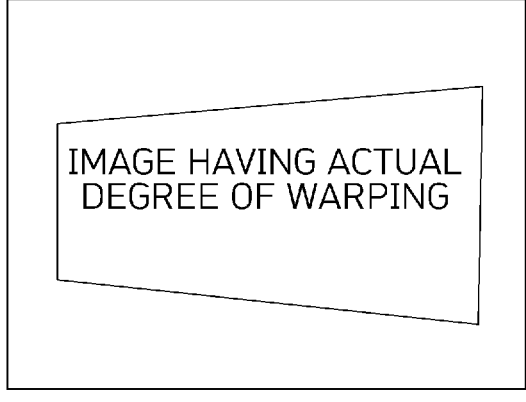
IMAGE HAVING ACTUAL
DEGREE OF WARPING

FIG. 99
EXAMPLE OF SITUATION IN WHERE IMAGE IS
WATCHED IN STATE WHERE SEAT IS ROTATED
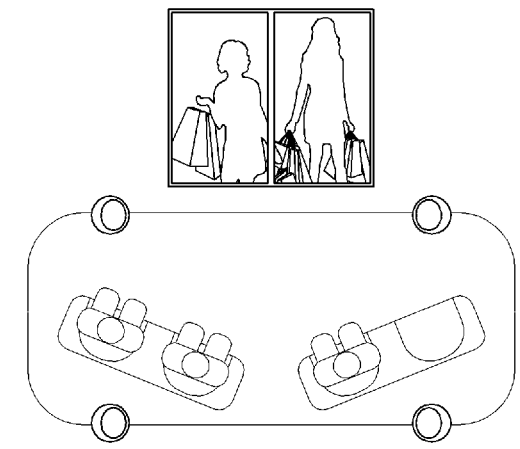
[ACTUAL ISO VIEW]
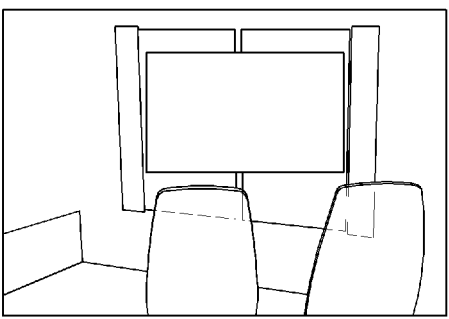
[FRONT VIEW OF DISPLAY –
SITUATION WHERE IMAGE IS WARPED]
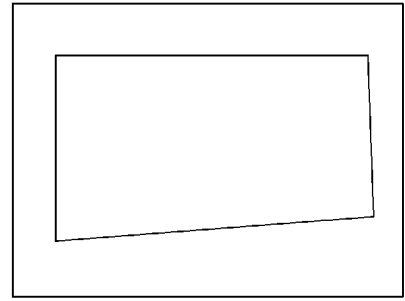

FIG. 102A

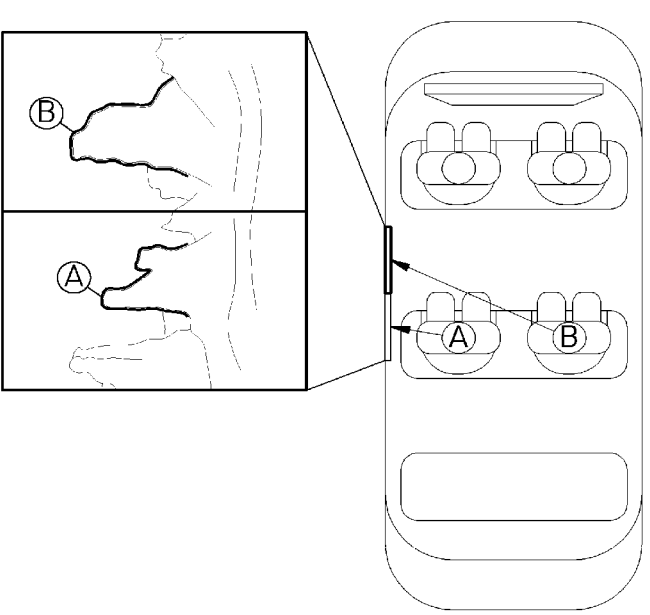

▶ BECAUSE DISTANCE TO DISPLAY VARIES WITH POSITION OF OCCUPANT,
  IMAGES APPEARING TO OCCUPANTS HAVE DIFFERENT SIZES
   – ALTHOUGH DISTANCES ARE DIFFERENT, NUMBER OF DIVISIONS OF
    SCREEN IS DETERMINED CONSIDERING INFORMATION ON DISTANCES
      → ALTHOUGH SITTING ON DIFFERENT SEATS, USERS MAY WATCH REGIONS,
      RESPECTIVELY, THAT RESULT FROM DIVIDING DISPLAY AT
      SAME DIVISION RATIO OF IMAGE
   – DETERMINING OF DISTANCES: IN-VEHICLE CAMERA
    (EX. TOF OR RGB CAMERA)
      → POSITIONS OF USER'S EYES ARE DETERMINED USING EYE-GAZING
      CAMERA, AND SAME VALUE OF LENGTH OF DISPLAY THAT IS SEEN BY
      USER'S EYES IS SET NOT ONLY BY USING PREDETERMINED POSITION OF
      DISPLAY, BUT ALSO BY CALCULATING TRIGONOMETRIC RATIO
      → NUMBER OF DIVISIONS OF IMAGE IS AUTOMATICALLY DETERMINED
      ACCORDING TO WIDTH-TO-LENGTH RATIO OF IMAGE PROVIDED TO
      OCCUPANT

FIG. 102B

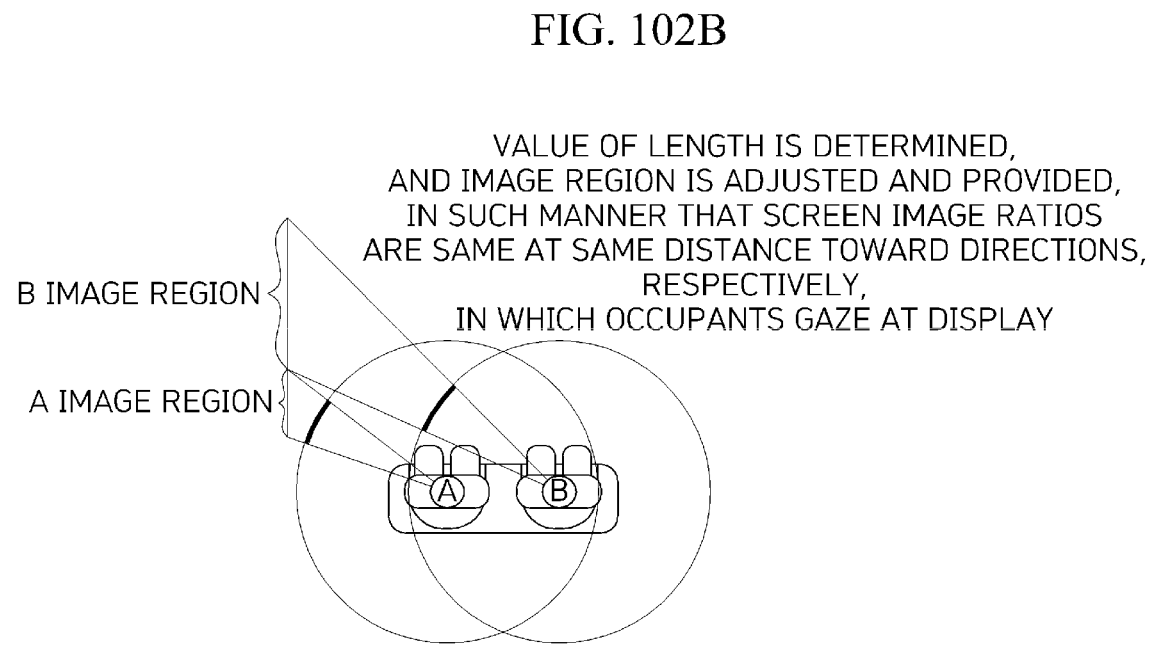

VALUE OF LENGTH IS DETERMINED,
AND IMAGE REGION IS ADJUSTED AND PROVIDED,
IN SUCH MANNER THAT SCREEN IMAGE RATIOS
ARE SAME AT SAME DISTANCE TOWARD DIRECTIONS,
RESPECTIVELY,
IN WHICH OCCUPANTS GAZE AT DISPLAY

B IMAGE REGION

A IMAGE REGION

Ⓐ     Ⓑ

S10310

PERFORM MONITORING
INFORMATION OF OCCUPANT

S10320

GENERATE CONTROL COMMAND

S10330

PROVIDING REGIONS THAT RESULT
FROM DIVIDING DISPLAY

134

134

134

134

(A)    (B)    (C)    (D)

SYSTEM FOR CONTROLLING MEDIA PLAY

CROSS-REFERENCE TO RELATED APPLICATION

This application claims priority to and the benefit of Korean Patent Application Nos. 10-2022-0004317, 10-2022-0004318, 10-2022-0004319, 10-2022-0004320, 10-2022-0004321, 10-2022-0004322, 10-2022-0004323, 10-2022-0004324, 10-2022-0004325, 10-2022-0004326, 10-2022-0004327, 10-2022-0004328, 10-2022-0004329, and 10-2022-0004330 filed on Jan. 11, 2022, the disclosure of which is incorporated herein by reference in its entirety.

BACKGROUND

1. Technical Field

The present disclosure relates to a system for controlling media play and, more particularly, to a system for distinguishing and recognizing media controls among a plurality of multimedia playbacks using a vehicle display and performing media playback control.

2. Related Art

Techniques for synthesizing and outputting augmented reality content on a forward object that is highly likely to be watched by the driver are known. But it does not disclose distinguishing and recognizing media controls during playback of multiple multimedia.

SUMMARY

According to an aspect of the present disclosure, there is provided a system for controlling media play comprising: a control target recognition unit configured to recognize target medium that is to be controlled by the user, among mediums that are played using a vehicle display, a control command generation unit configured to generate a control command according to a result of recognizing a user's request for the target medium; and a medium control unit configured to control the target medium according to the control command.

In the system for controlling media play, the control target recognition unit recognizes the target medium using at least one of gaze information of the user, control request information that is received from a device carried by the user, or positional information of the device carried by the user.

In the system for controlling media play, the control command generation unit checks whether that the device carried by the user is positioned inside or outside of the vehicle, using a UWB sensor, and accordingly generates the control command for the target medium.

In the system for controlling media play, the control command generation unit recognizes the user's request including a request for adjustment of the sound of the target medium and generates the control command.

According to an aspect of the present disclosure, there is provided a method for controlling media play comprising: (a) acquiring information on the environment for controlling content medium; (b) generating a control command for determining target medium using the information on the environment for controlling content, and generating a control command for the target medium; and (c) performing control for the target medium according to the control command.

The step (a) acquires information on a plurality of content items on mediums that are played on a plurality of display regions.

The step (b) recognizes the target medium using at least one of gaze information of the user, control request information that is received from a device carried by the user, or positional information of the device carried by the user.

The step (b) checks whether a request is for controlling the content on the medium that the occupant staying inside of the vehicle watches or for controlling the content on the medium that the user staying outside of the vehicle watches.

The step (c) controls sound of the target medium according to the control command.

According to the present disclosure, there is an effect of increasing usability by distinguishing and recognizing media controls and performing media playback control.

BRIEF DESCRIPTION OF THE DRAWINGS

FIGS. 2 to 4 are views showing an indoor layout change based on an occupant's intent according to the embodiment of the present disclosure.

FIG. 8A and FIG. 8B are views showing the vehicle windshield display control for each area, in consideration of priority during a relative movement of an external interest object, according to another embodiment of the present disclosure.

FIG. 10 is a view showing an external interest information display area determination and vehicle display control system based on an occupant's gaze according to another embodiment of the present disclosure.

FIGS. 14 to 17 are views showing an example of vehicle display control in an occupant gaze departure situation according to another embodiment of the present disclosure.

3

Figure 20:
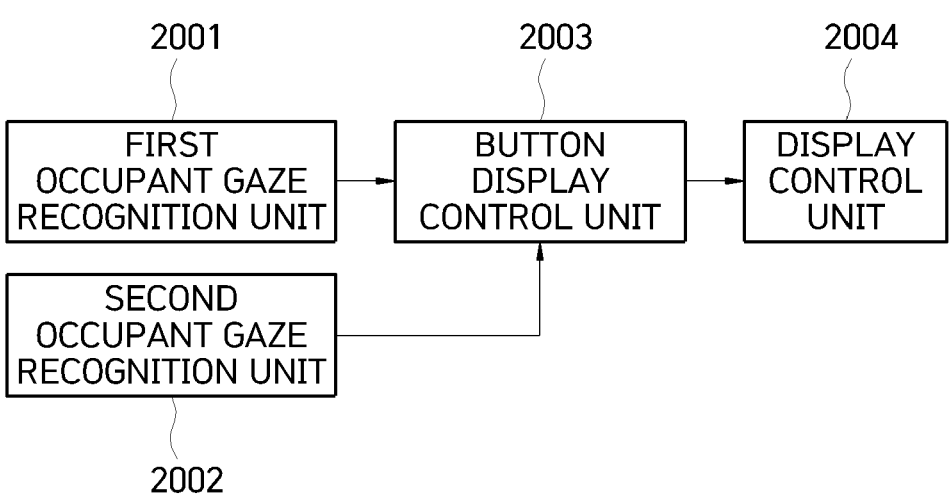

FIG. 20 is a view showing a button display control in an occupant gaze-based vehicle display and initiative control system according to another embodiment of the present disclosure.

Figure 22:
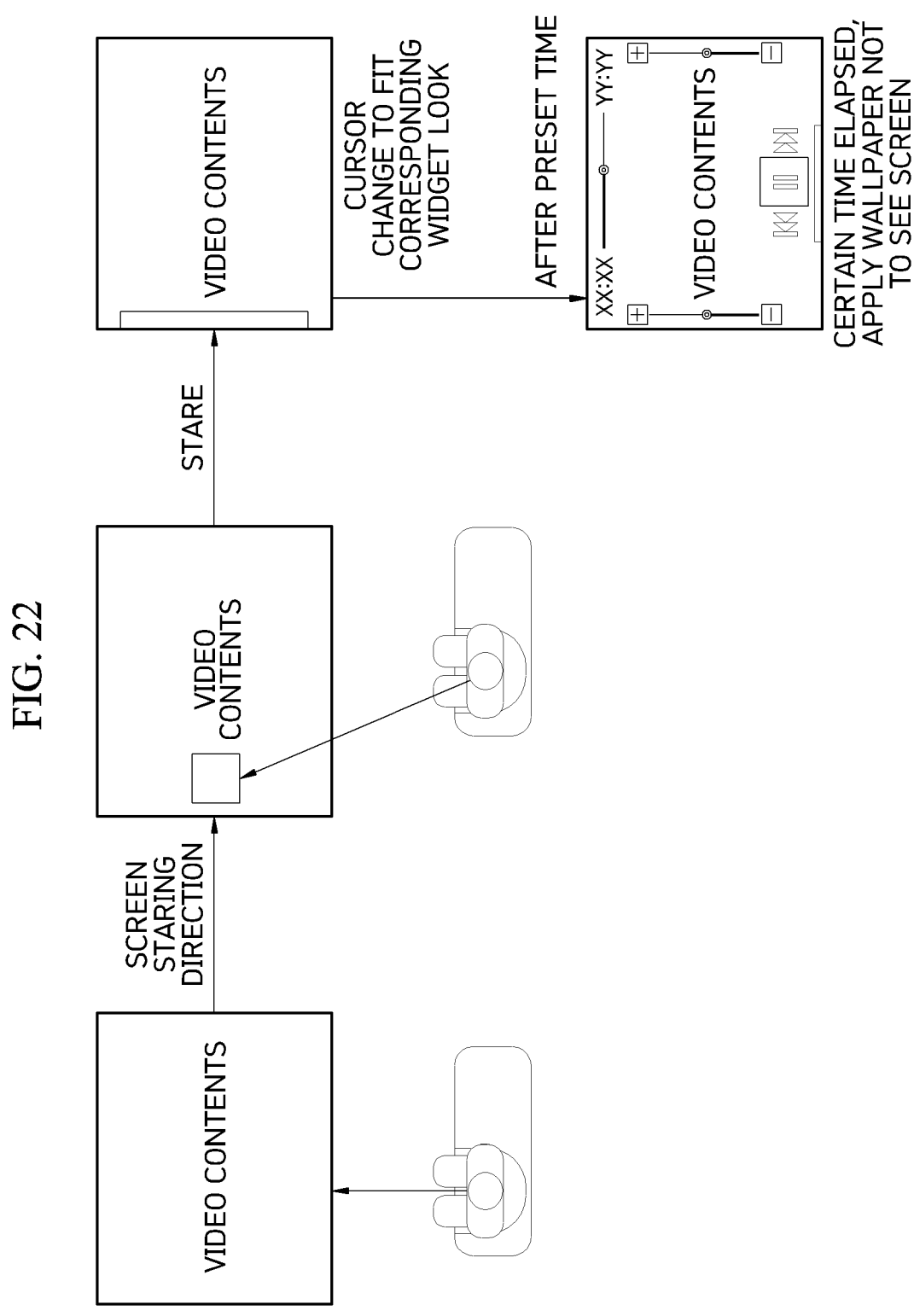
Figure 23:
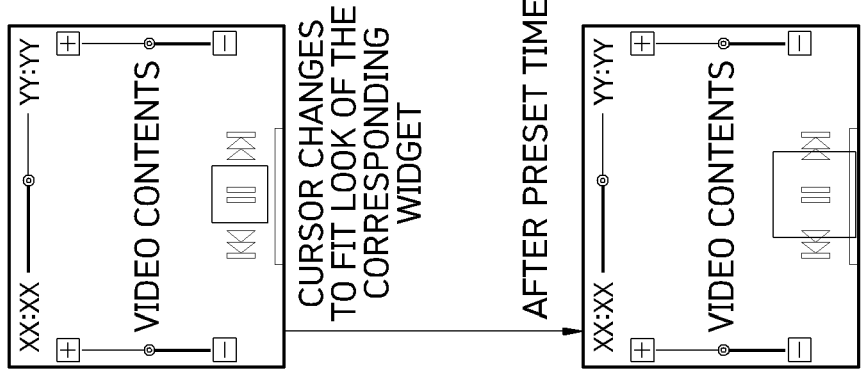

FIGS. 21 to 23 are views showing button display control according to another embodiment of the present disclosure.

Figure 24:
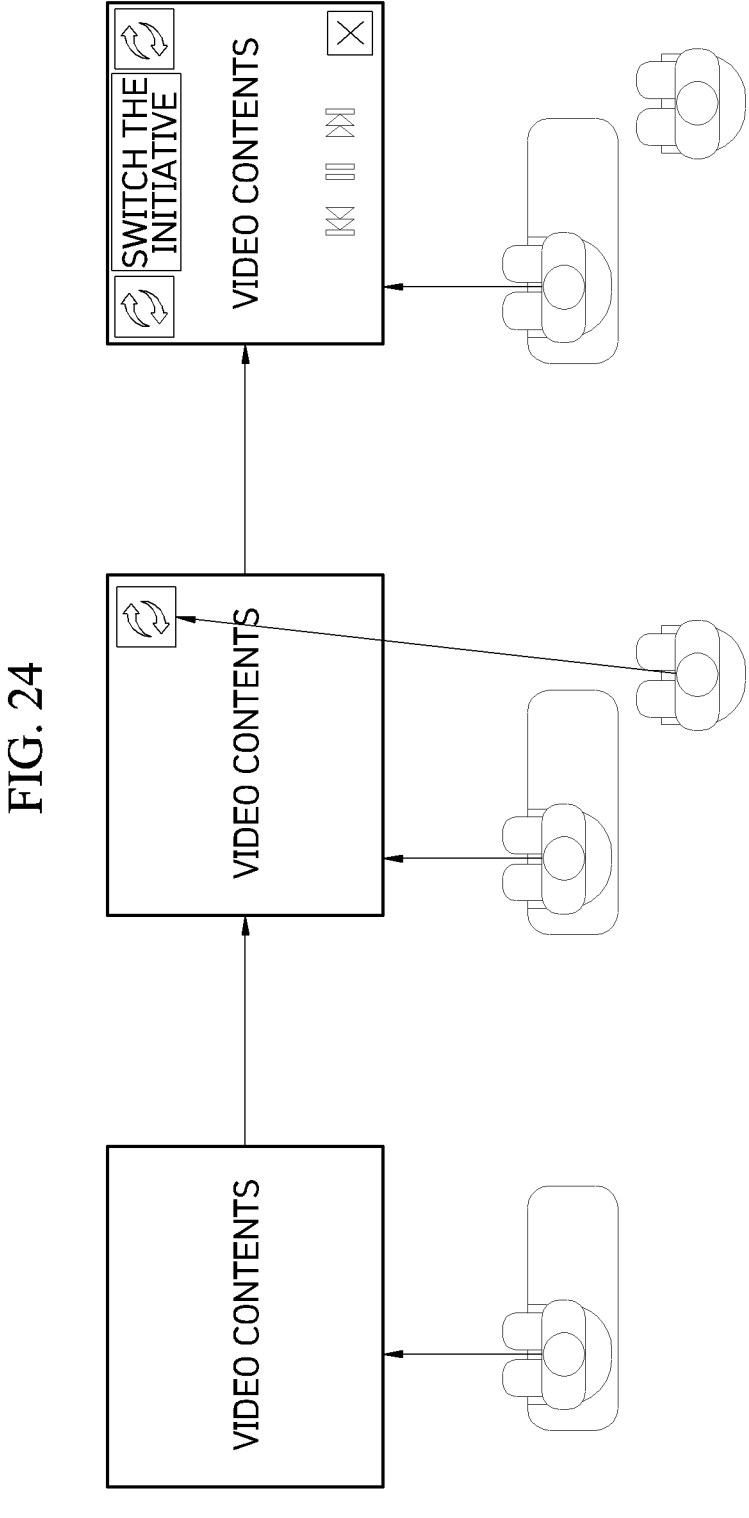

FIG. 24 is a view showing an initiative switch in another occupant's participation according to another embodiment of the present disclosure.

Figure 25:
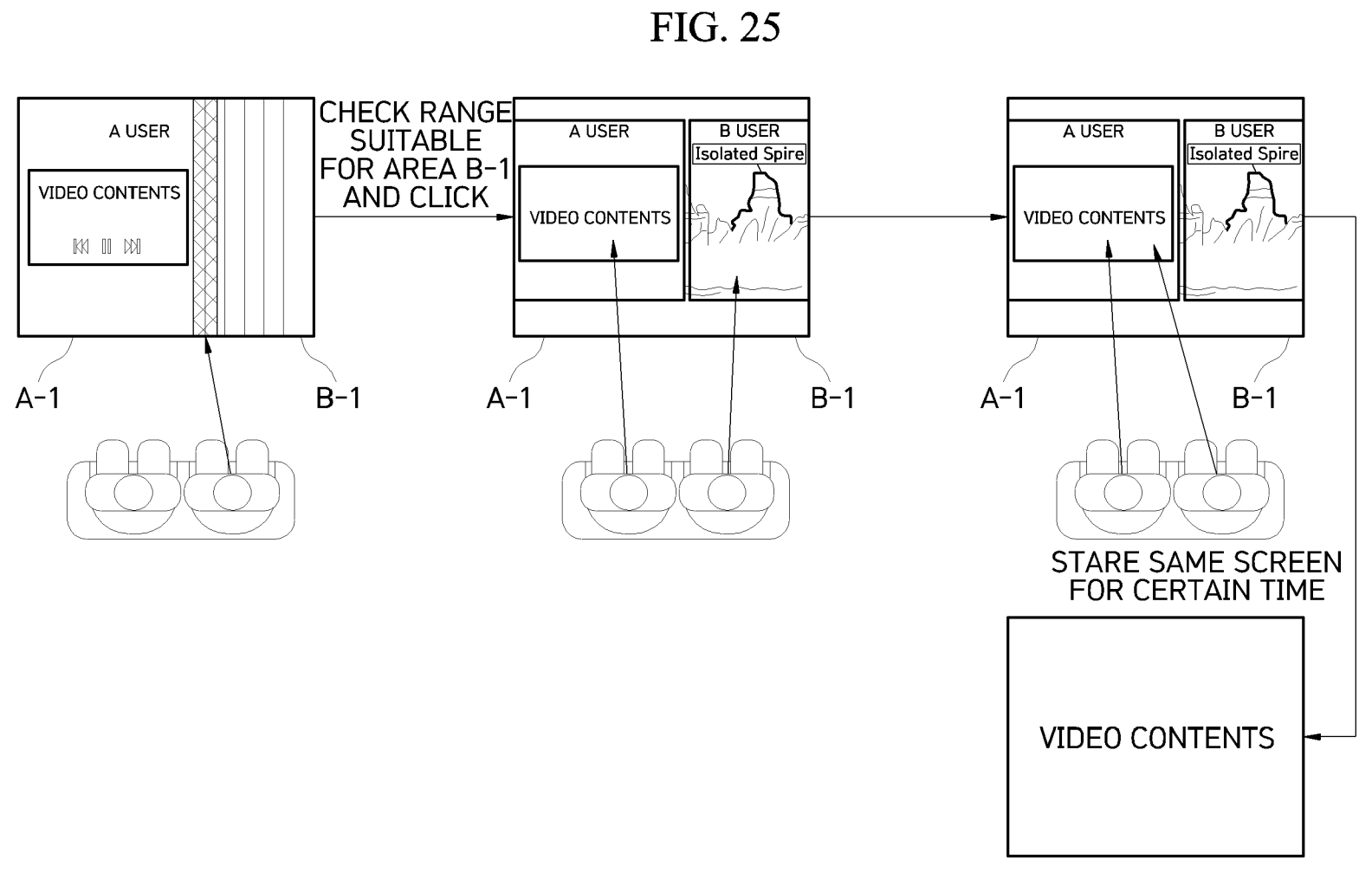

FIG. 25 is a view showing display control based on screen area division and gaze information upon another occupant's participation according to another embodiment of the present disclosure.

Figure 26:
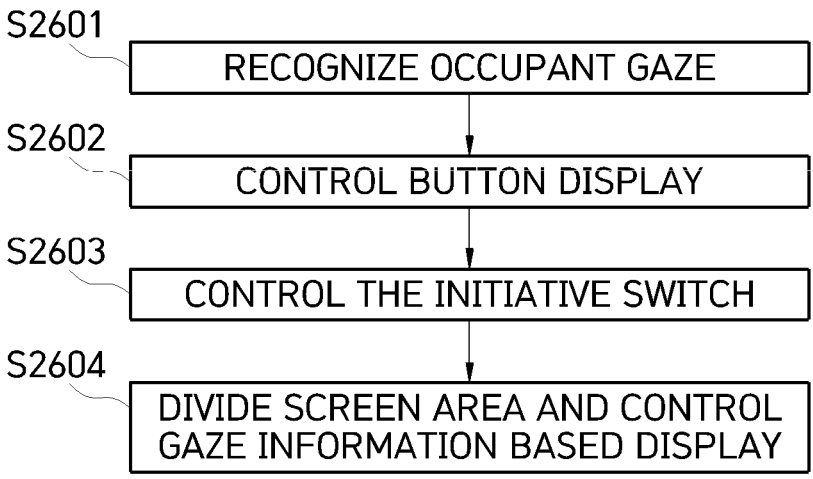

FIG. 26 is a view showing a method for button display control in an occupant gaze-based vehicle display and initiative control according to another embodiment of the present disclosure.

Figure 27:
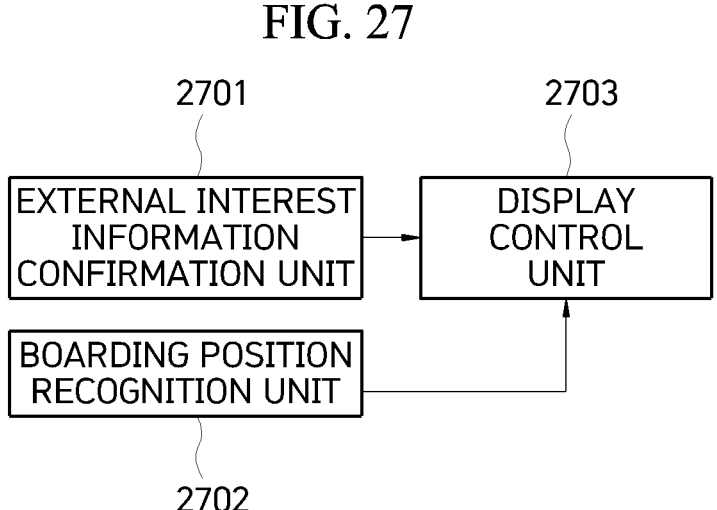

FIG. 27 is a view showing a vehicle display control system for transmitting external interest information according to another embodiment of the present disclosure.

Figure 28A:
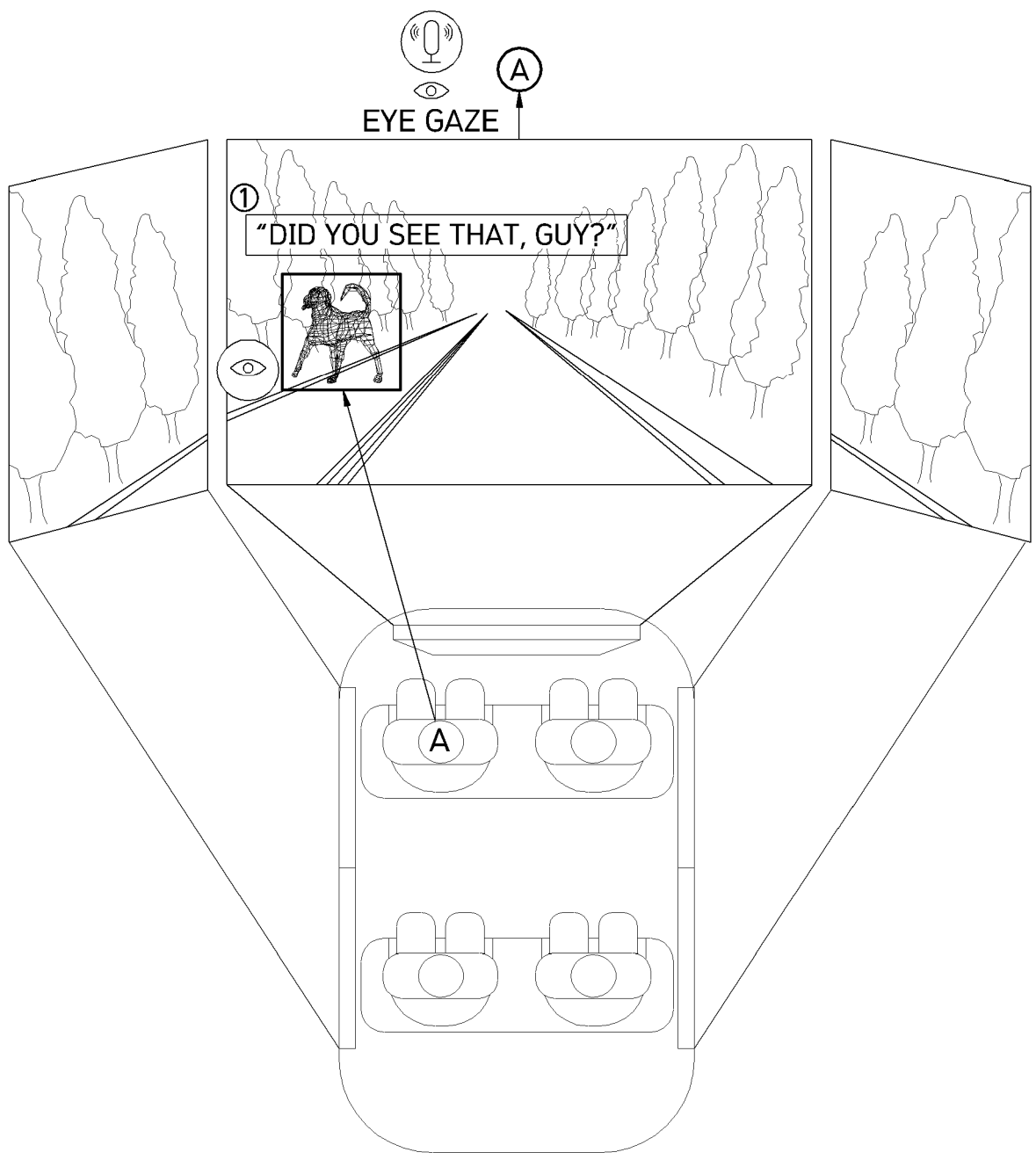
Figure 28B:
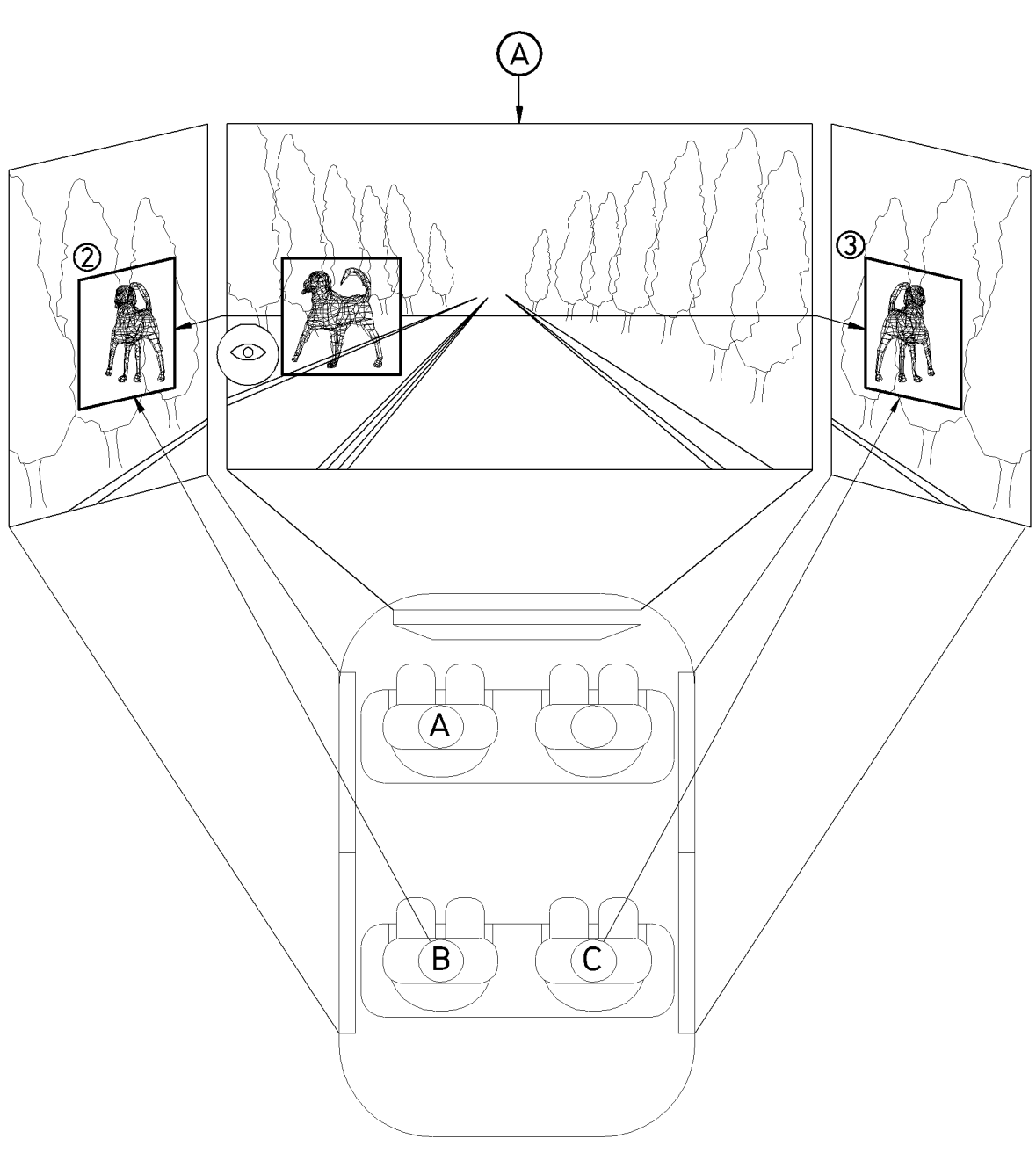

FIG. 28A and FIG. 28B are views showing external interest information display and external interest information display area control according to another embodiment of the present disclosure.

Figure 29:
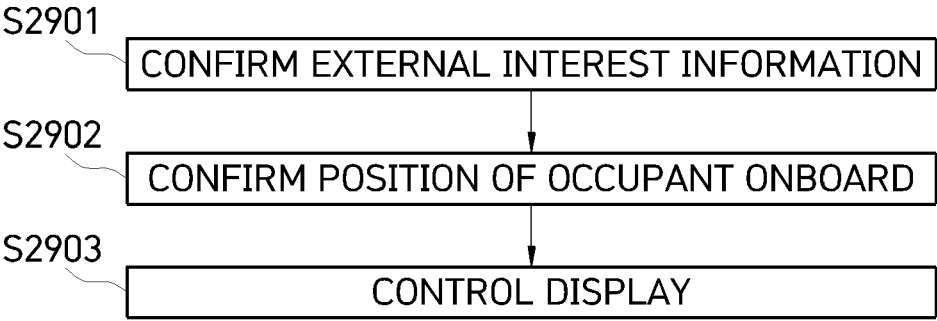

FIG. 29 is a view showing a vehicle display control method for conveying external interest information according to another embodiment of the present disclosure.

Figure 30:
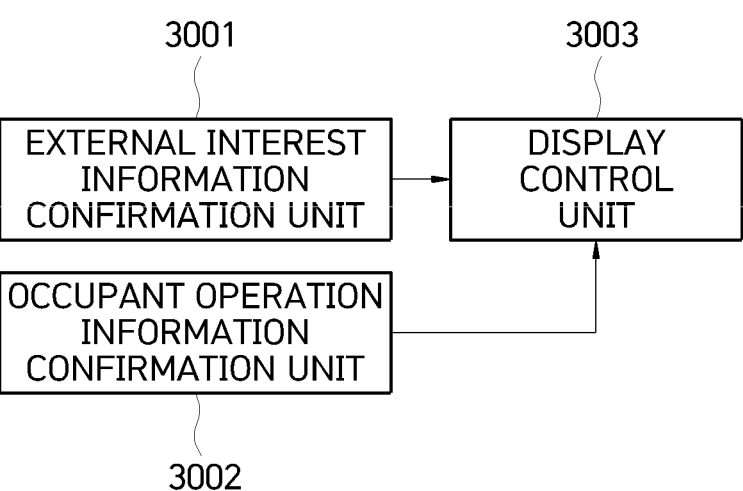

FIG. 30 is a view showing a vehicle display control system for synthesizing and displaying external interest information according to another embodiment of the present disclosure.

Figure 31A:
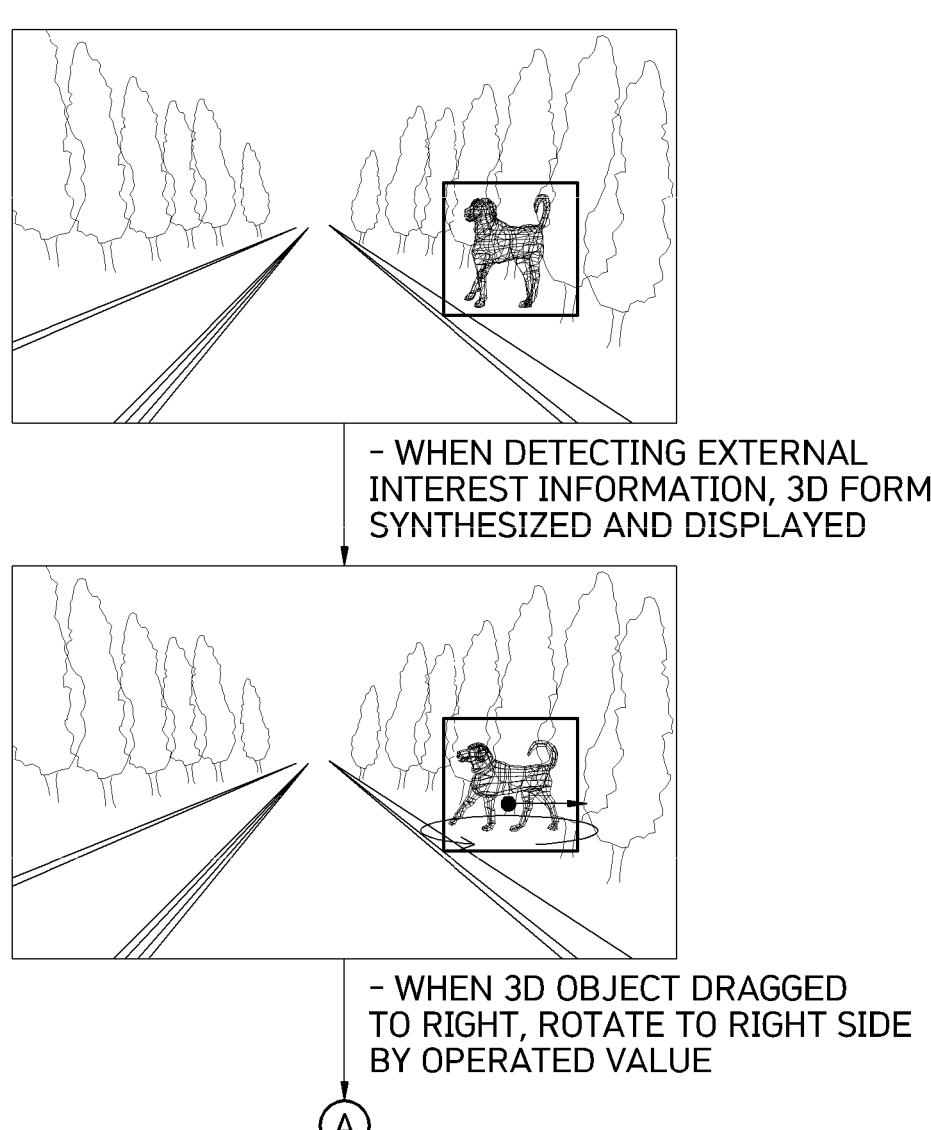
Figure 31B:
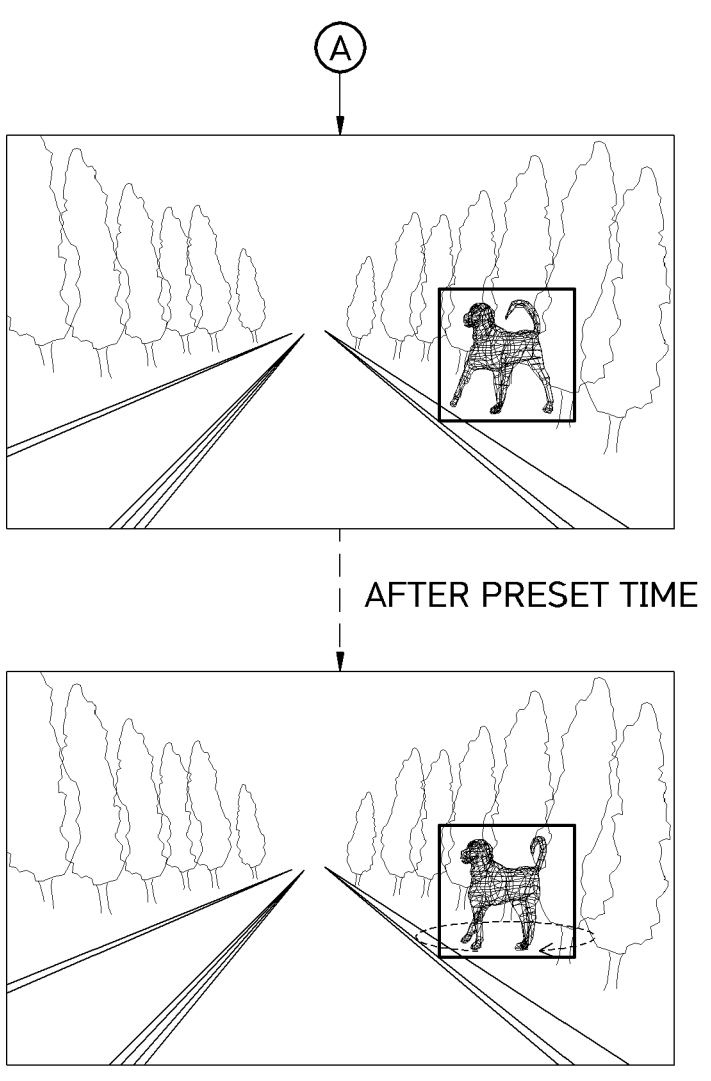
Figure 32:
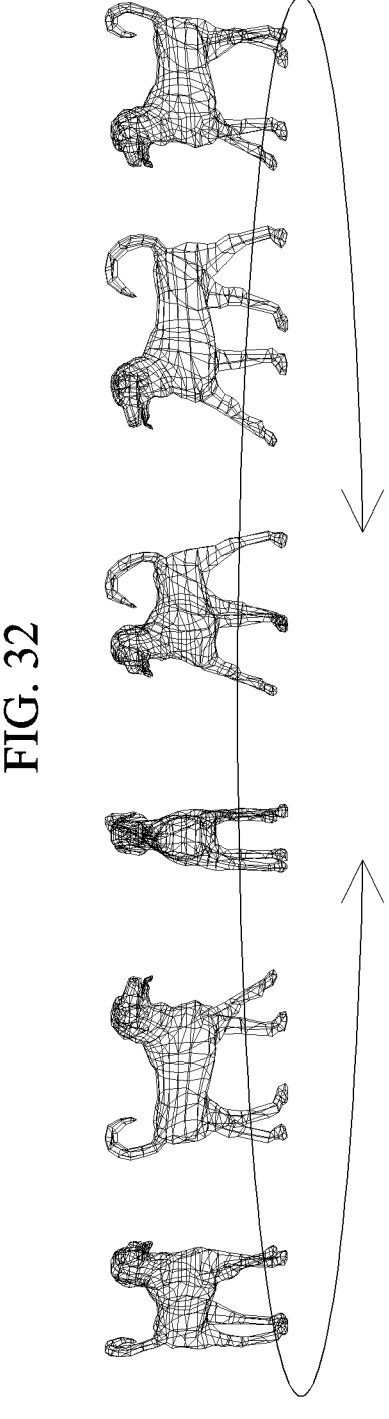

FIGS. 31A, 31B and 32 are views showing external interest information display and rotation according to still another embodiment of the present disclosure.

Figure 33:
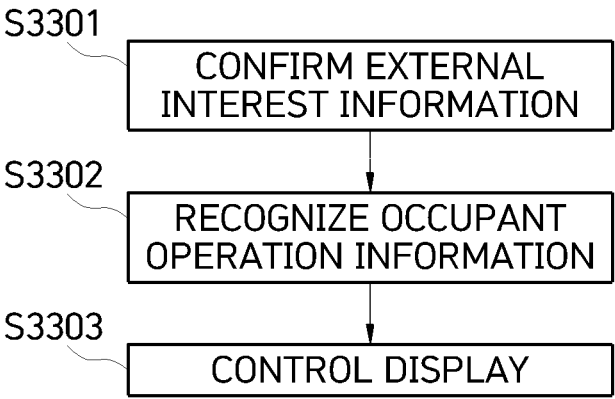

FIG. 33 is a view showing a vehicle display control method for synthesizing and displaying external interest information according to another embodiment of the present disclosure.

Figure 34:
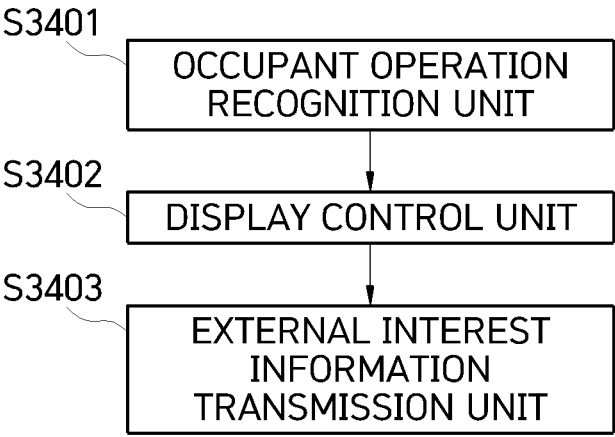

FIG. 34 is a view showing a vehicle display control system for storing and sharing external interest information according to another embodiment of the present disclosure.

Figure 35A:
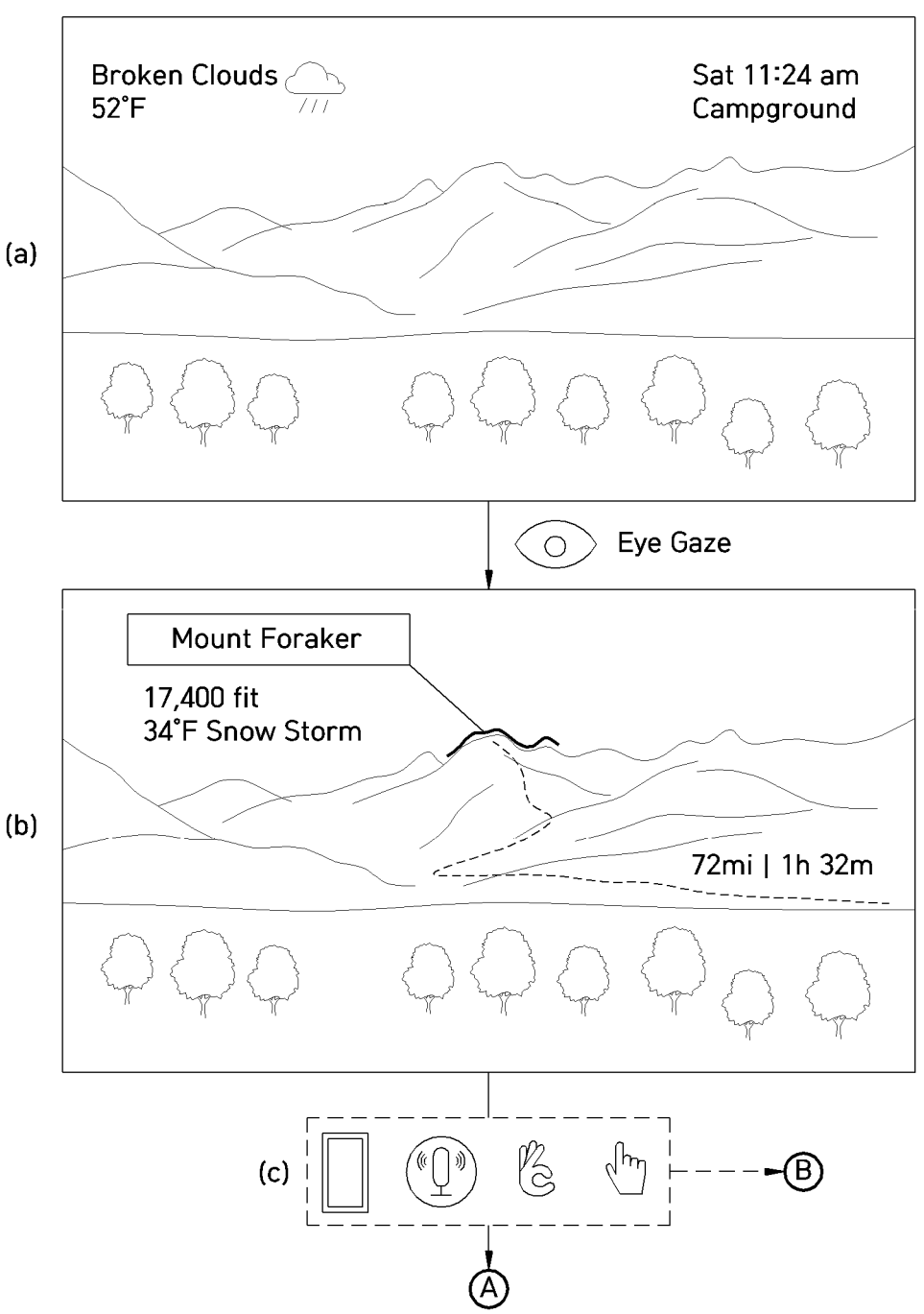
Figure 35B:
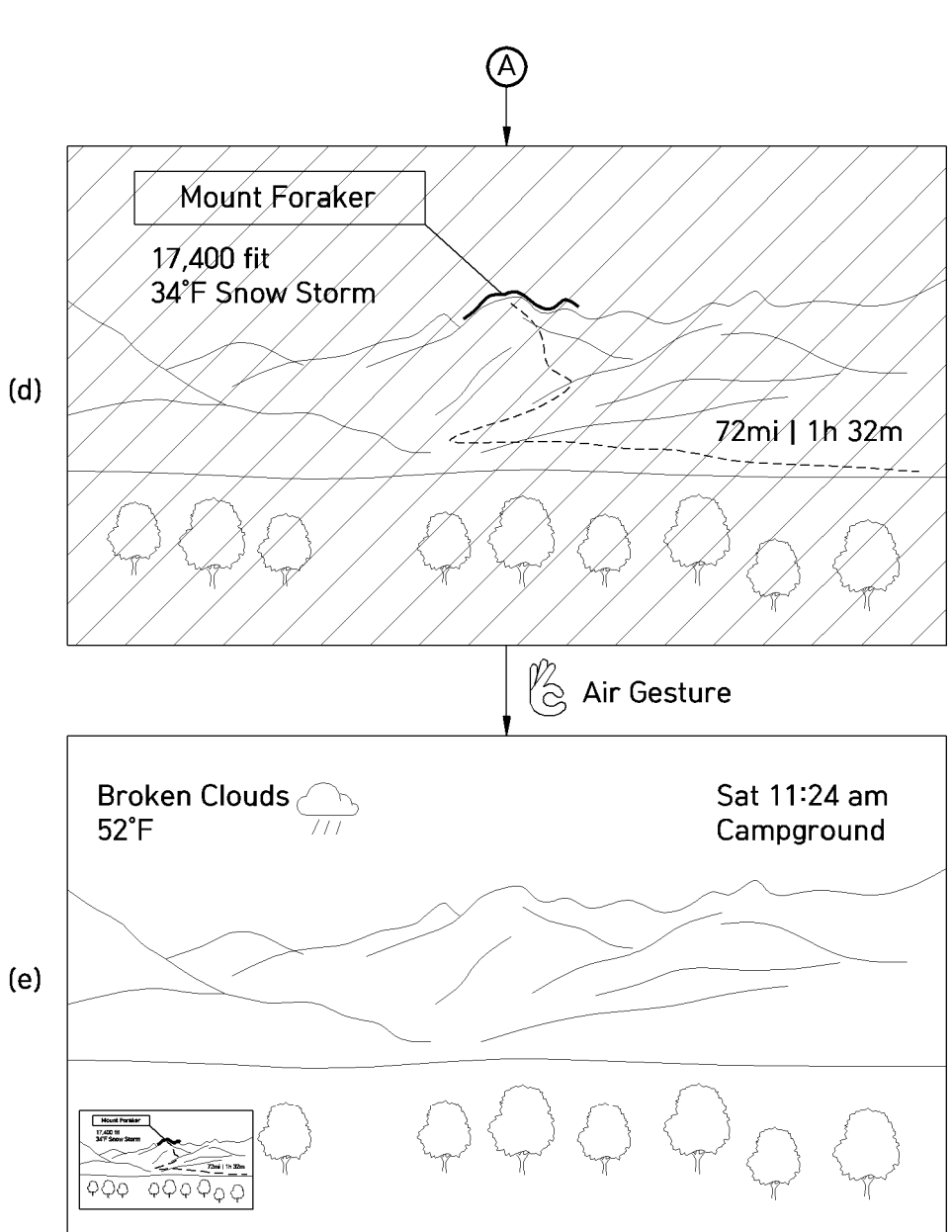
Figure 35C:
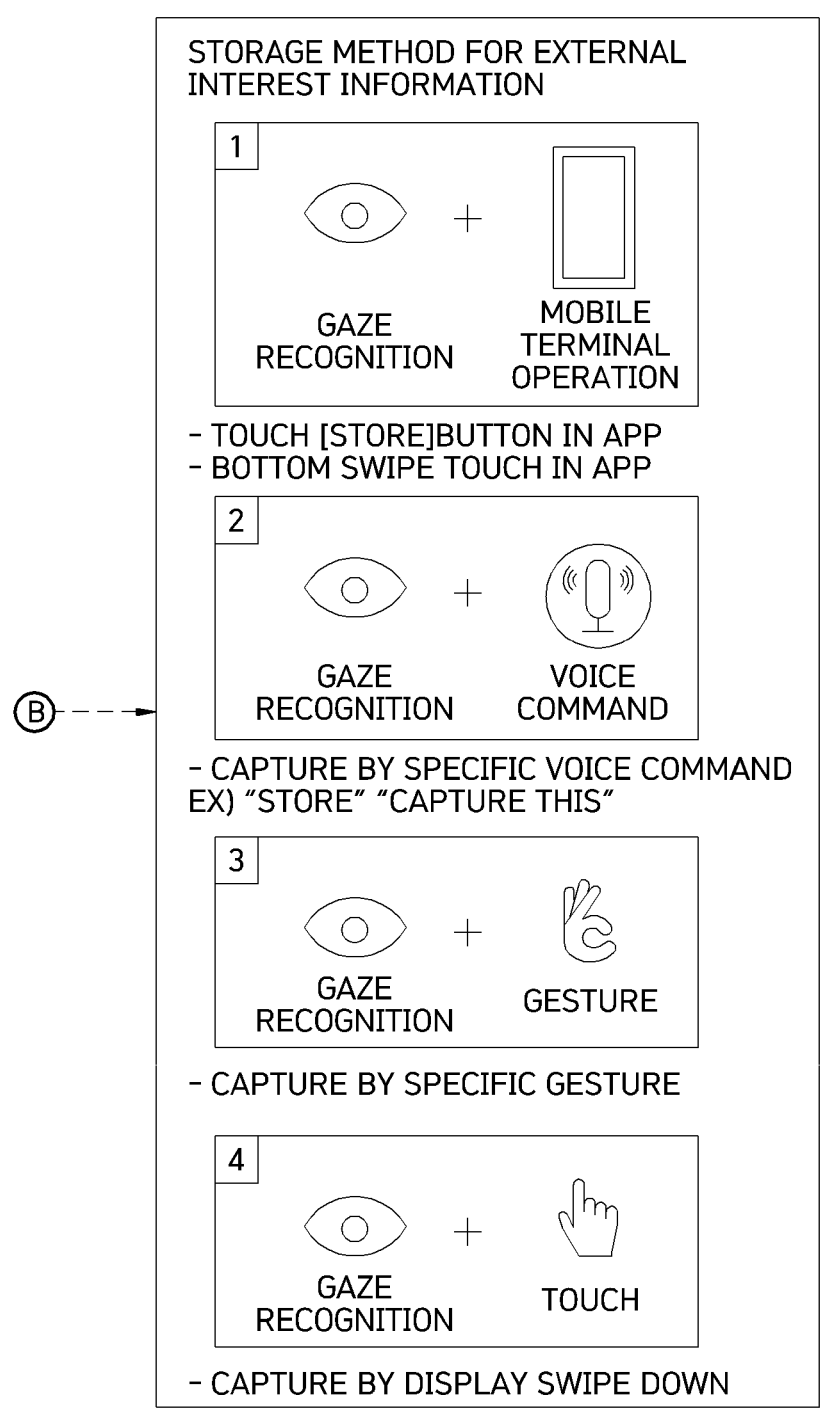

FIGS. 35A through 35C are views showing a process of capturing the external interest information according to another embodiment of the present disclosure.

Figure 36A:
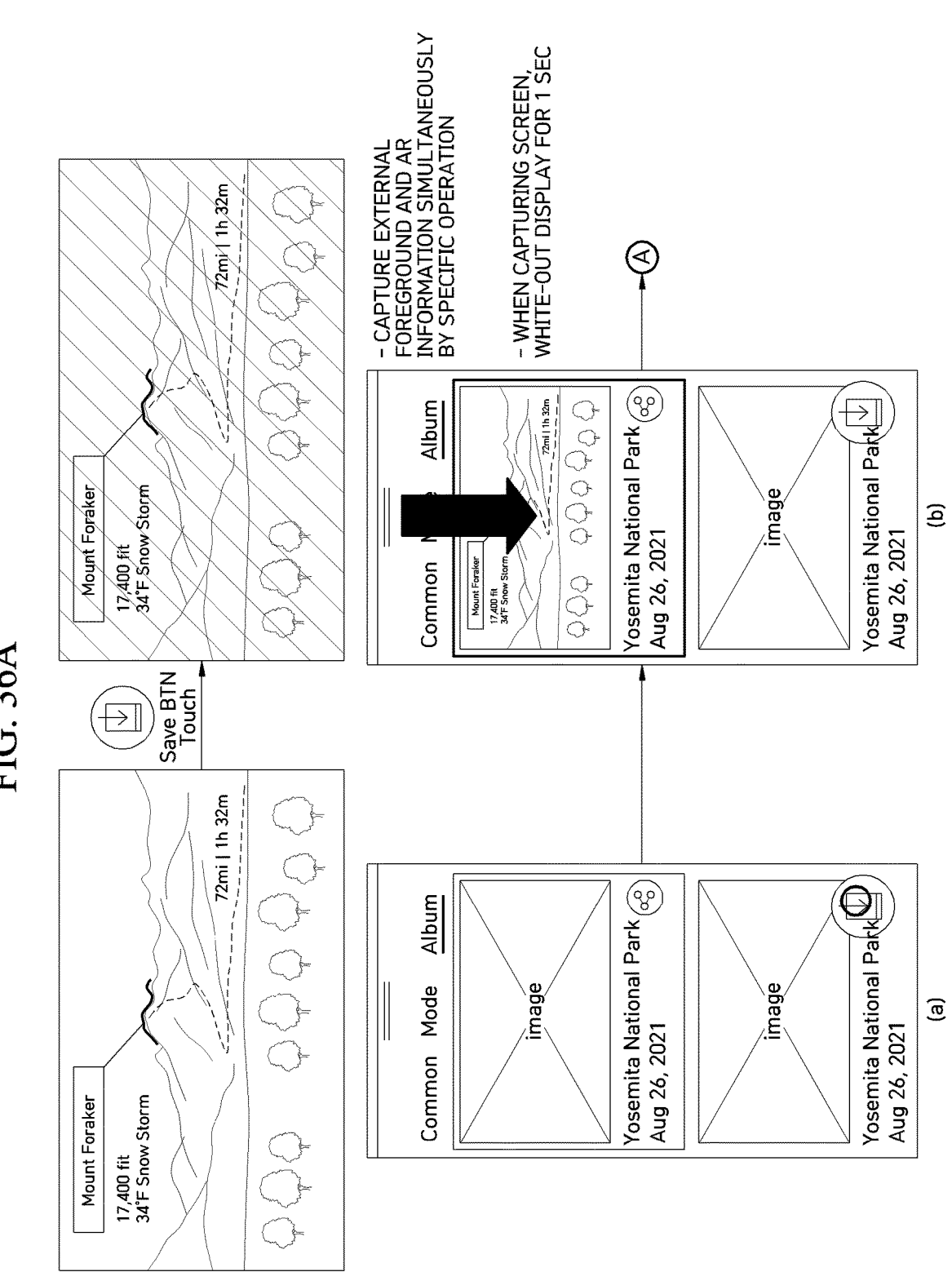
Figure 36B:
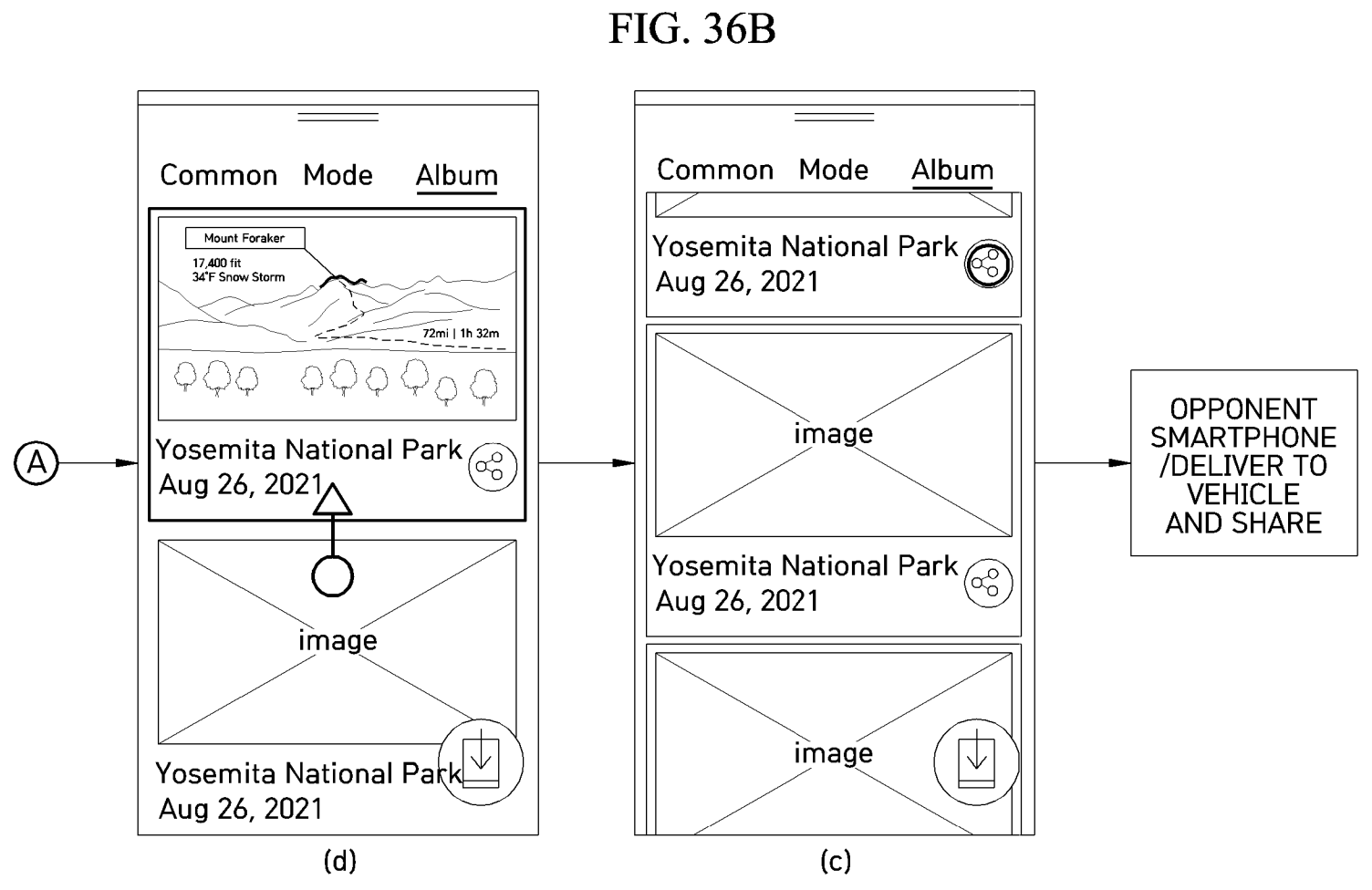

FIG. 36A and FIG. 36B are views showing a process of sharing the external interest information with a smartphone according to another embodiment of the present disclosure.

Figure 37A:
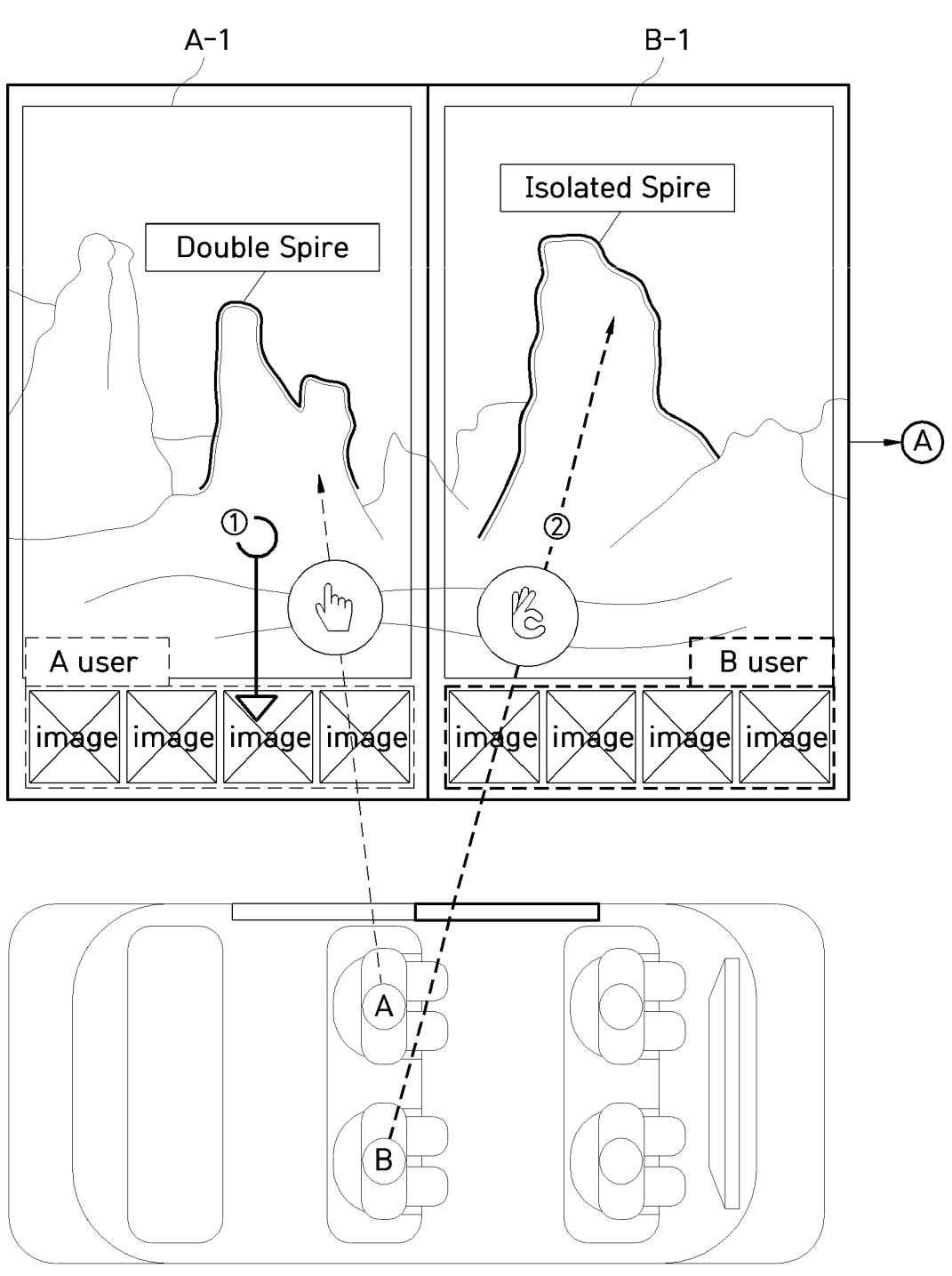
Figure 37B:
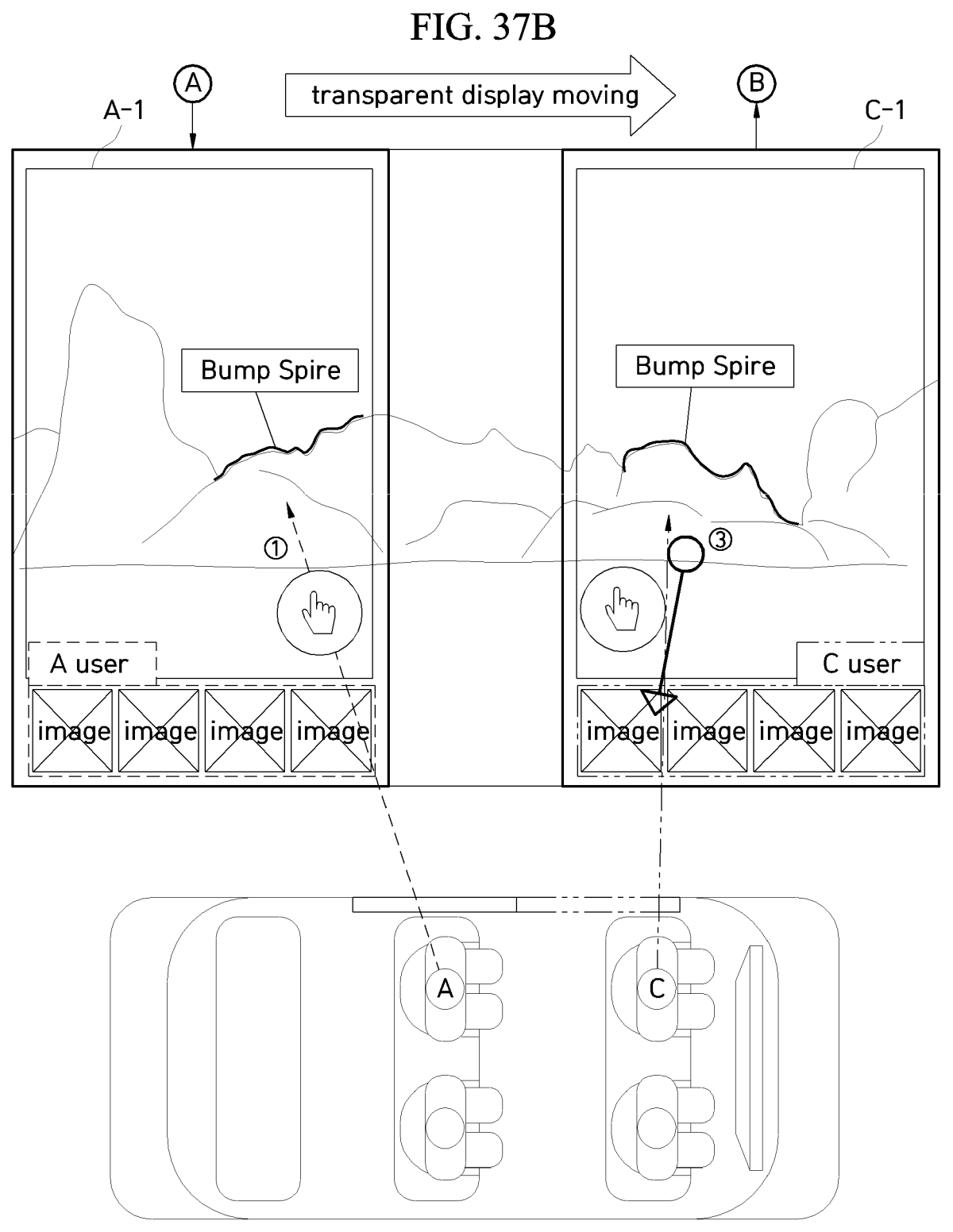

FIG. 37A to FIG. 37C are views showing a process of storing and confirming external interest information for each occupant through a transparent display sliding according to another embodiment of the present disclosure.

Figure 38A:
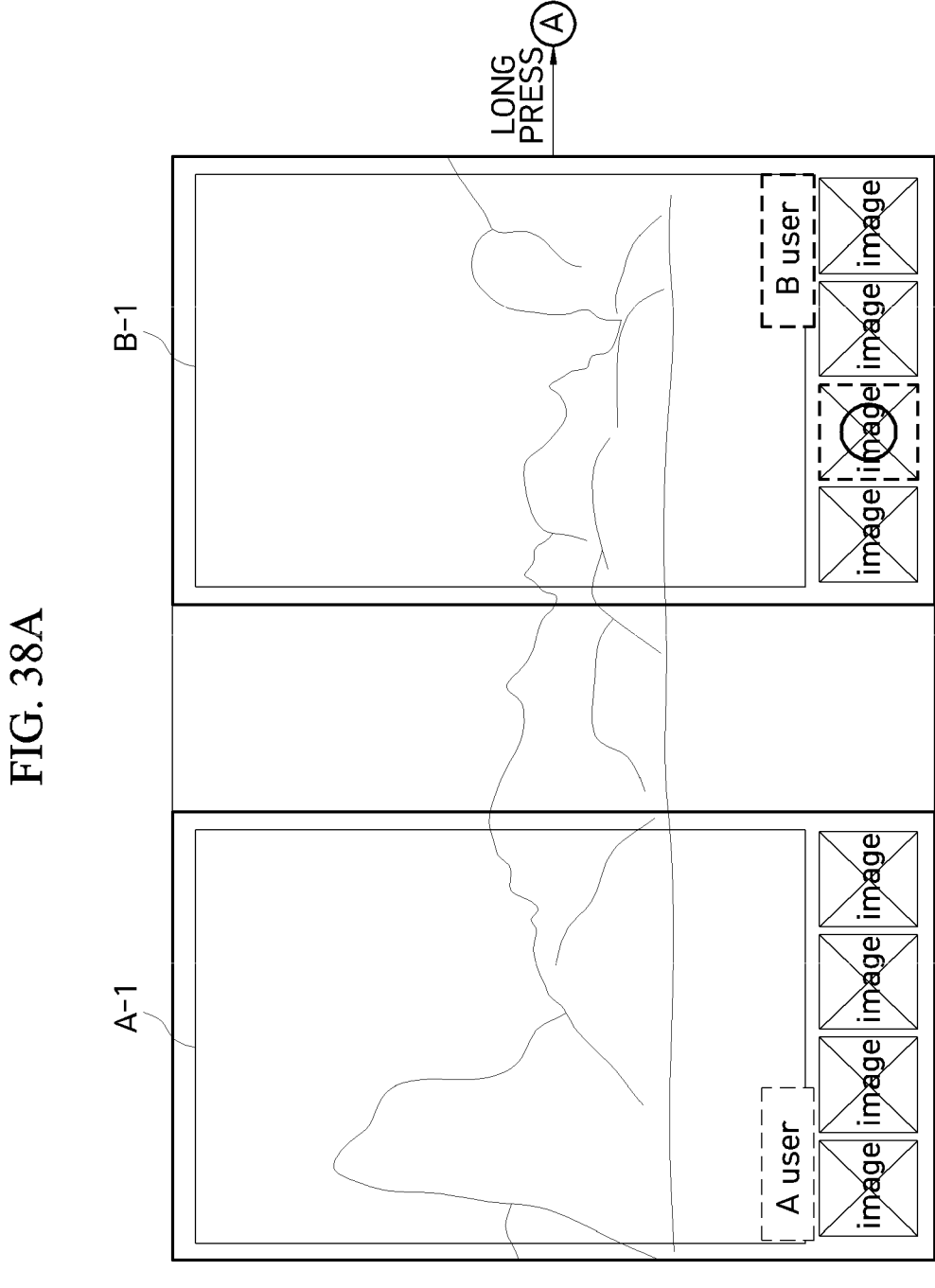
Figure 38B:
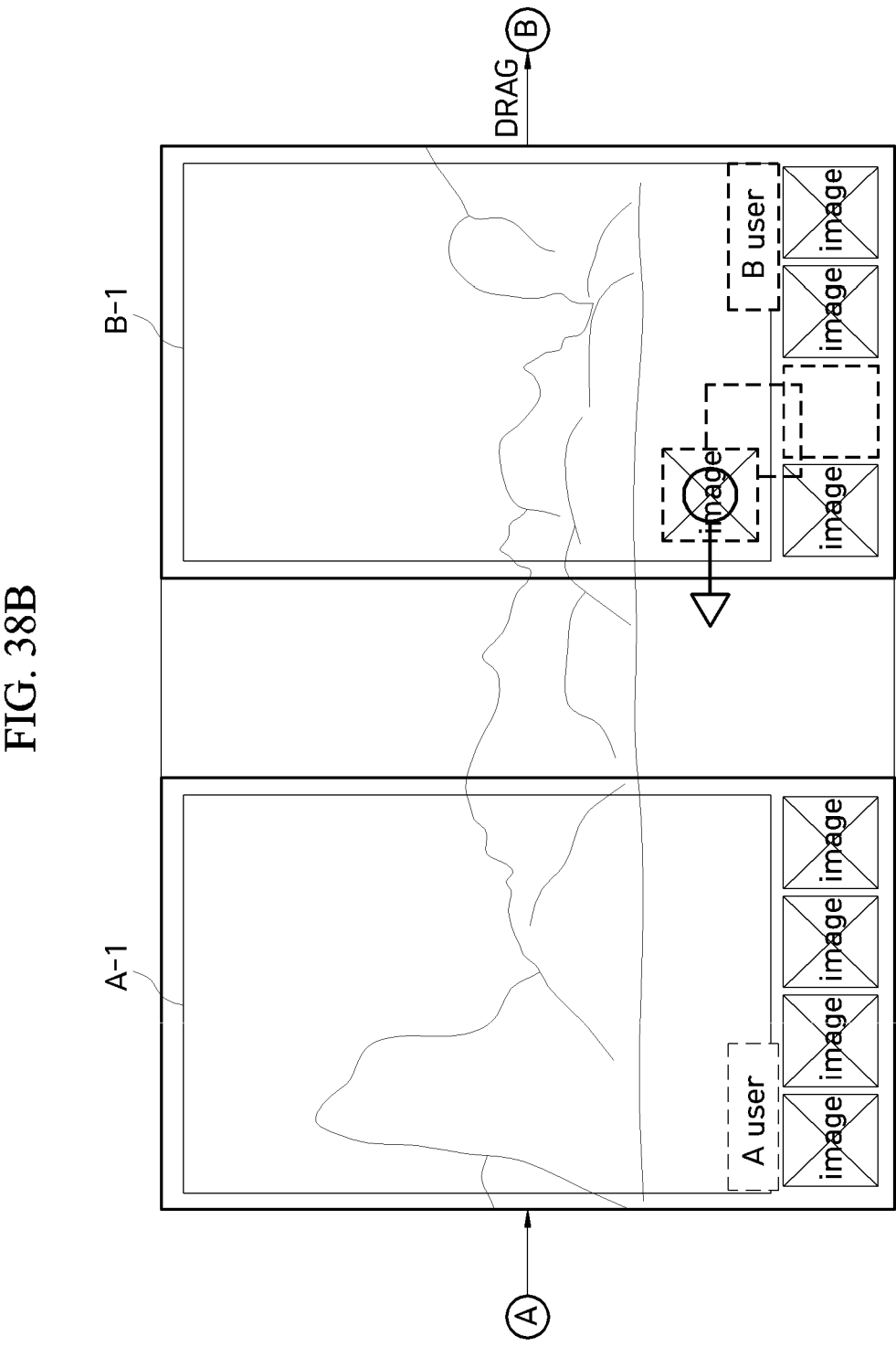
Figure 38C:
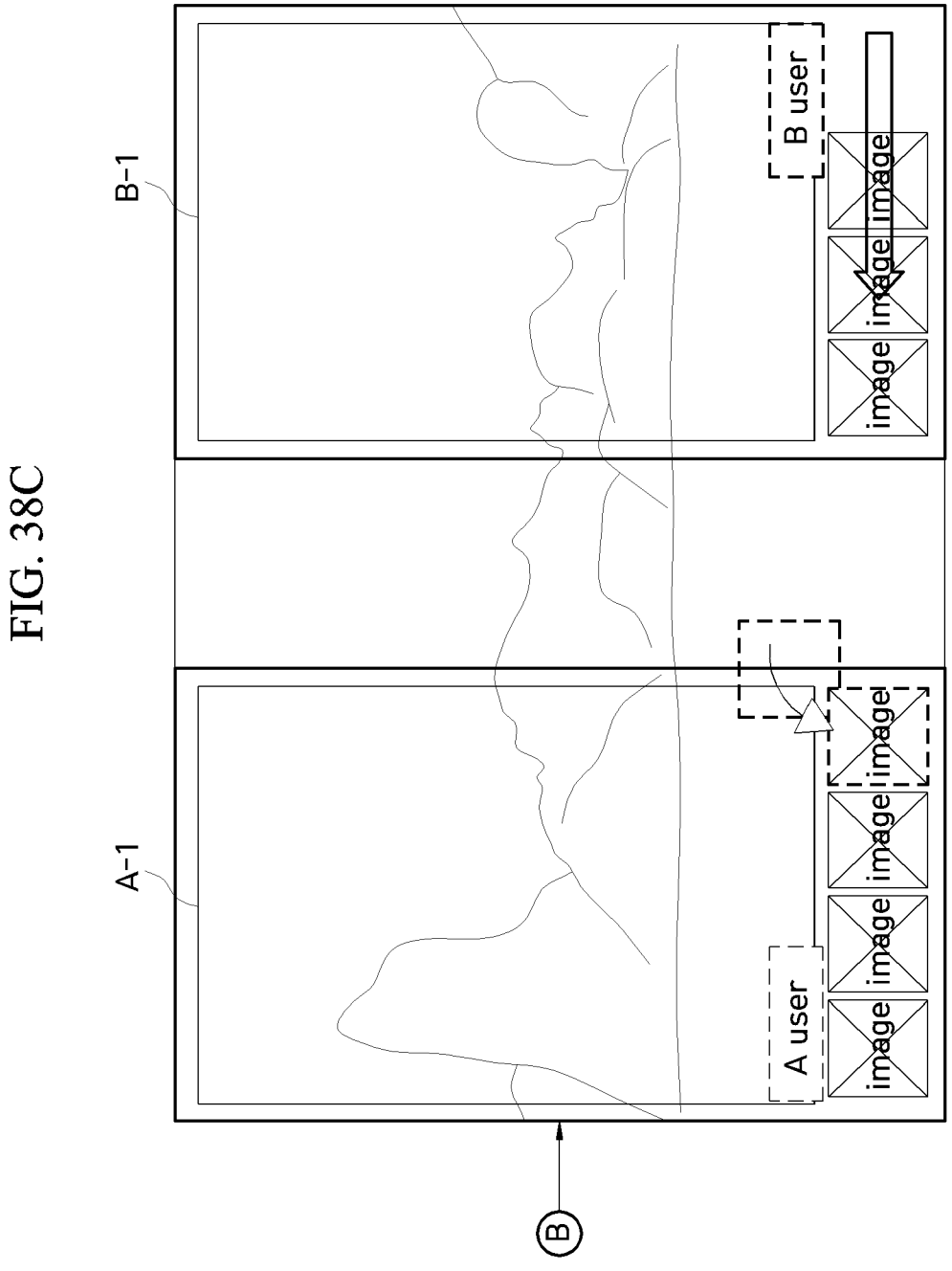

FIG. 38A to FIG. 38C are views showing the sharing of the external interest information between displays according to another embodiment of the present disclosure.

Figure 39:
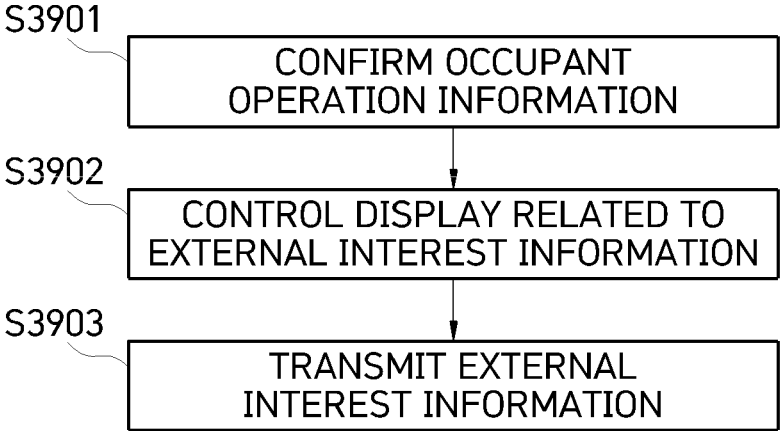

FIG. 39 is a view showing a vehicle display control method for storing and sharing external interest information according to another embodiment of the present disclosure.

Figure 40:
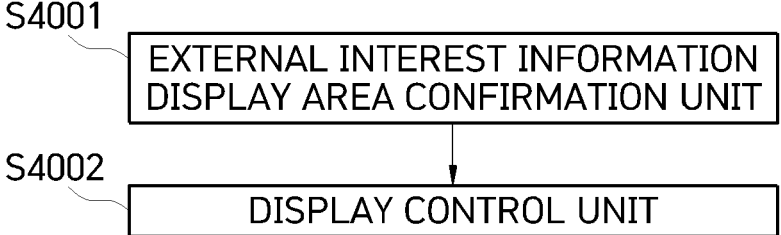

FIG. 40 is a view showing a vehicle display area control system for external interest information according to another embodiment of the present disclosure.

Figure 41A:
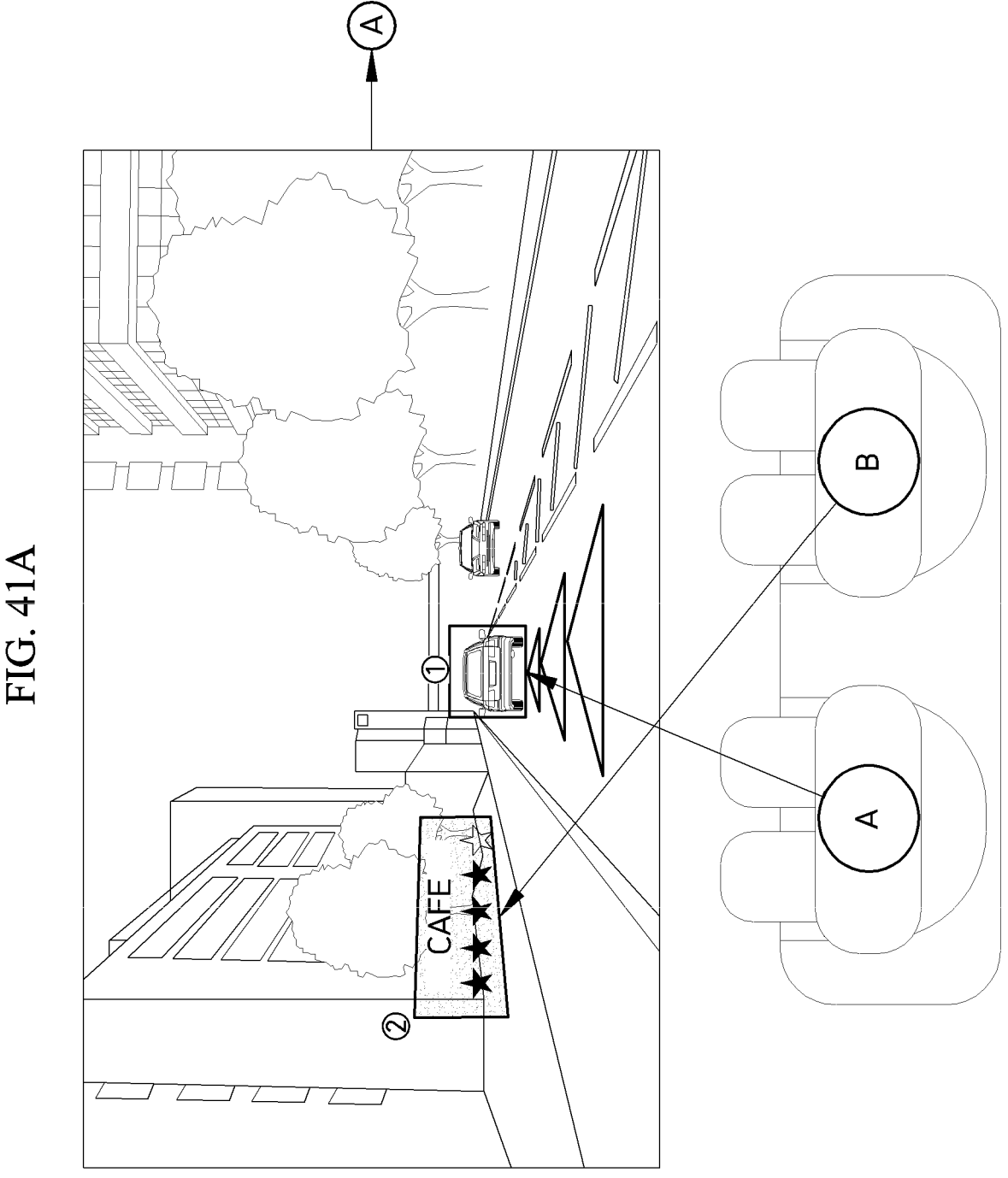
Figure 41B:
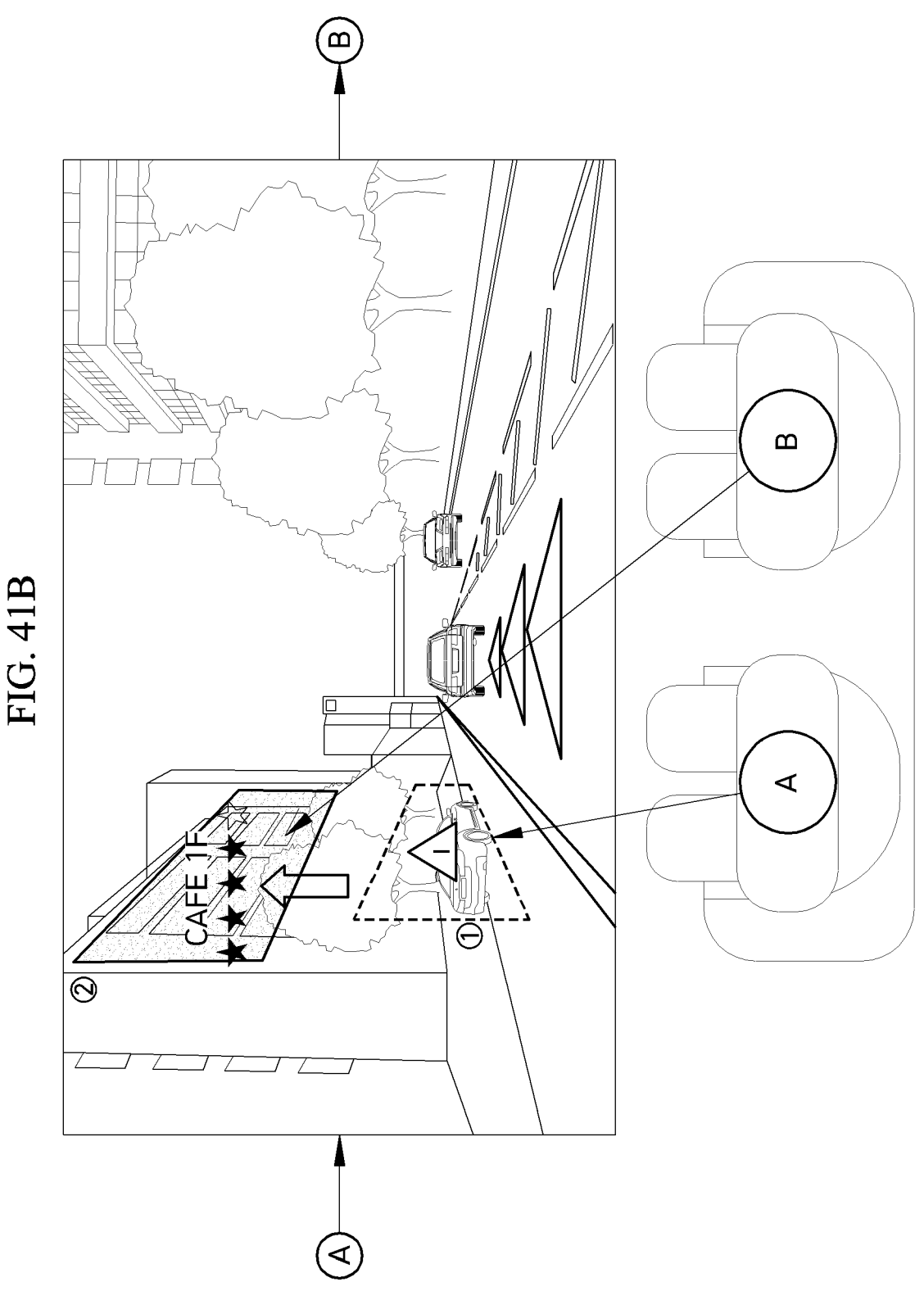
Figure 41C:
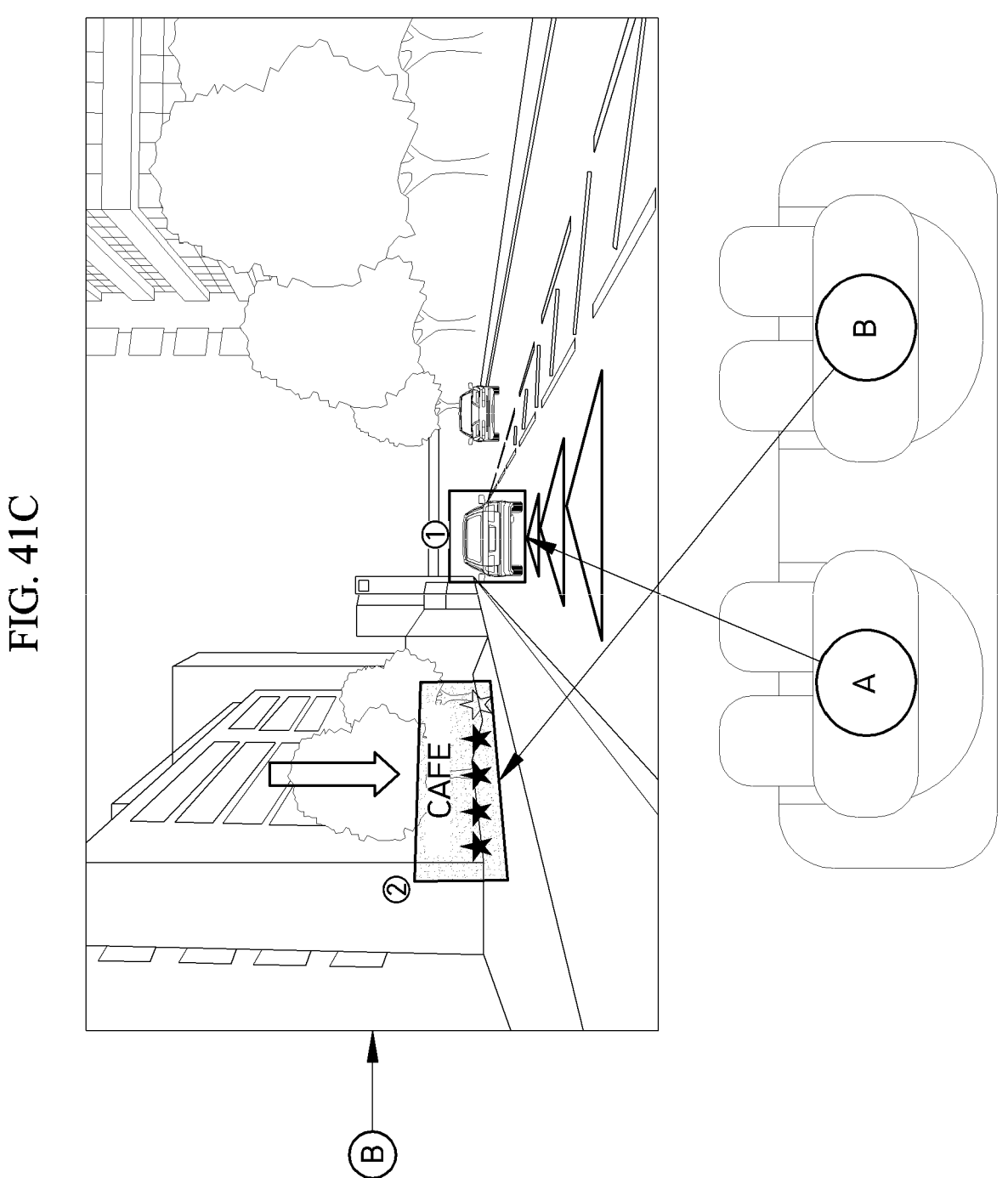

FIG. 41A to FIG. 41C are views showing a process of controlling a vehicle display area for the external interest information according to still another embodiment of the present disclosure.

Figure 42:
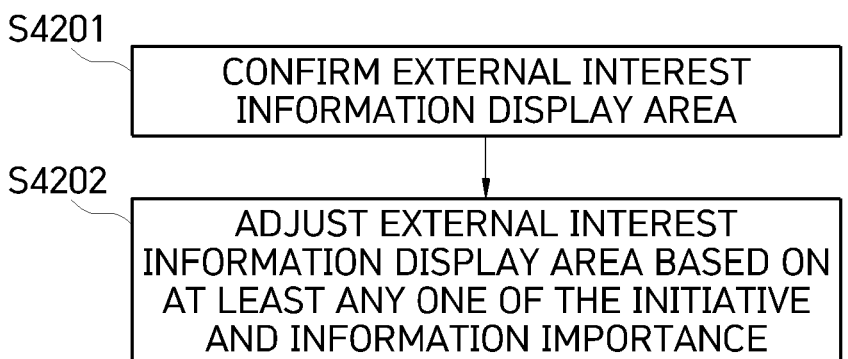

FIG. 42 is a view showing a method of controlling a vehicle display area for external interest information according to another embodiment of the present disclosure.

4

Figure 43:
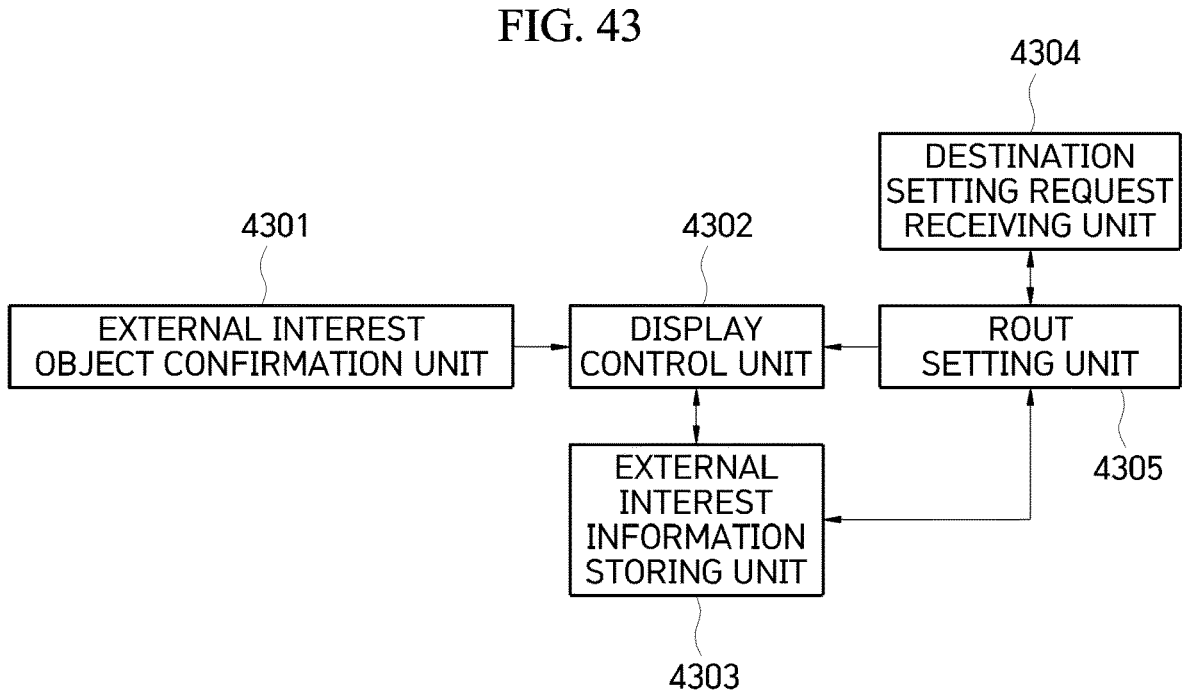

FIG. 43 is a view showing a vehicle display control system that displays and stores the external interest information according to still another embodiment of the present disclosure.

Figure 44A:
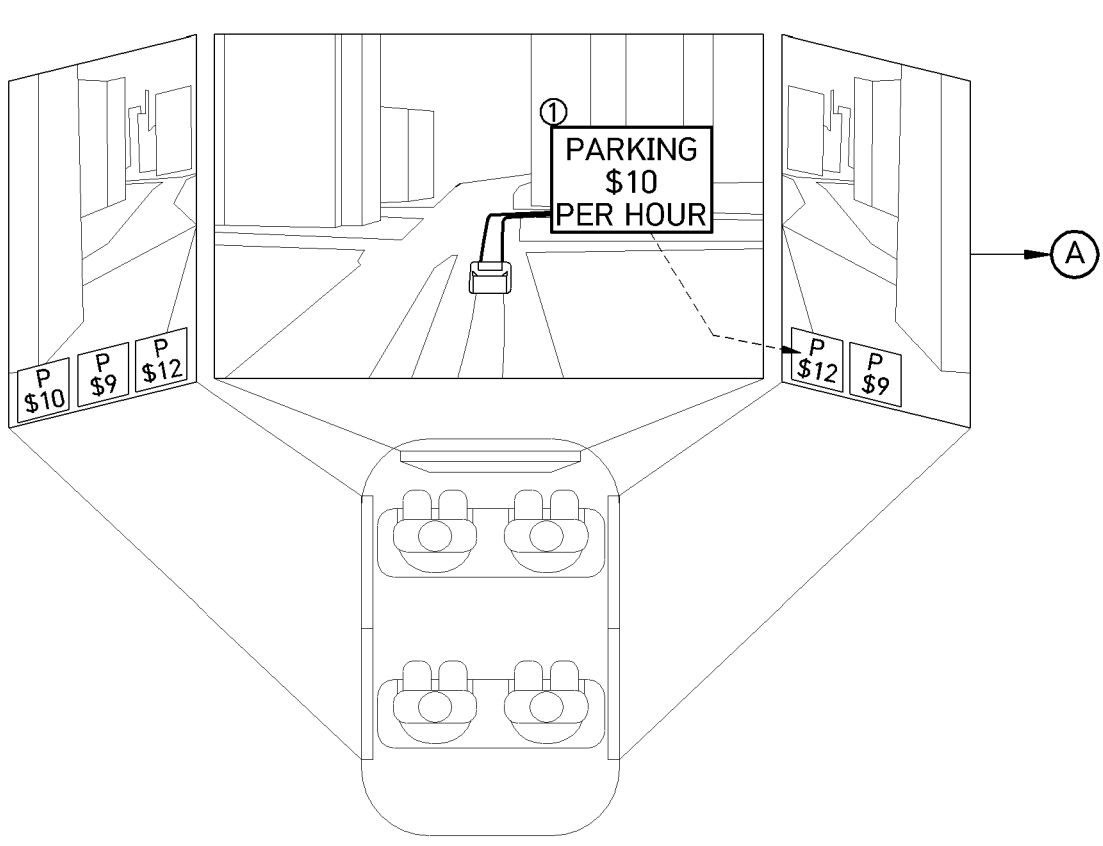
Figure 44B:
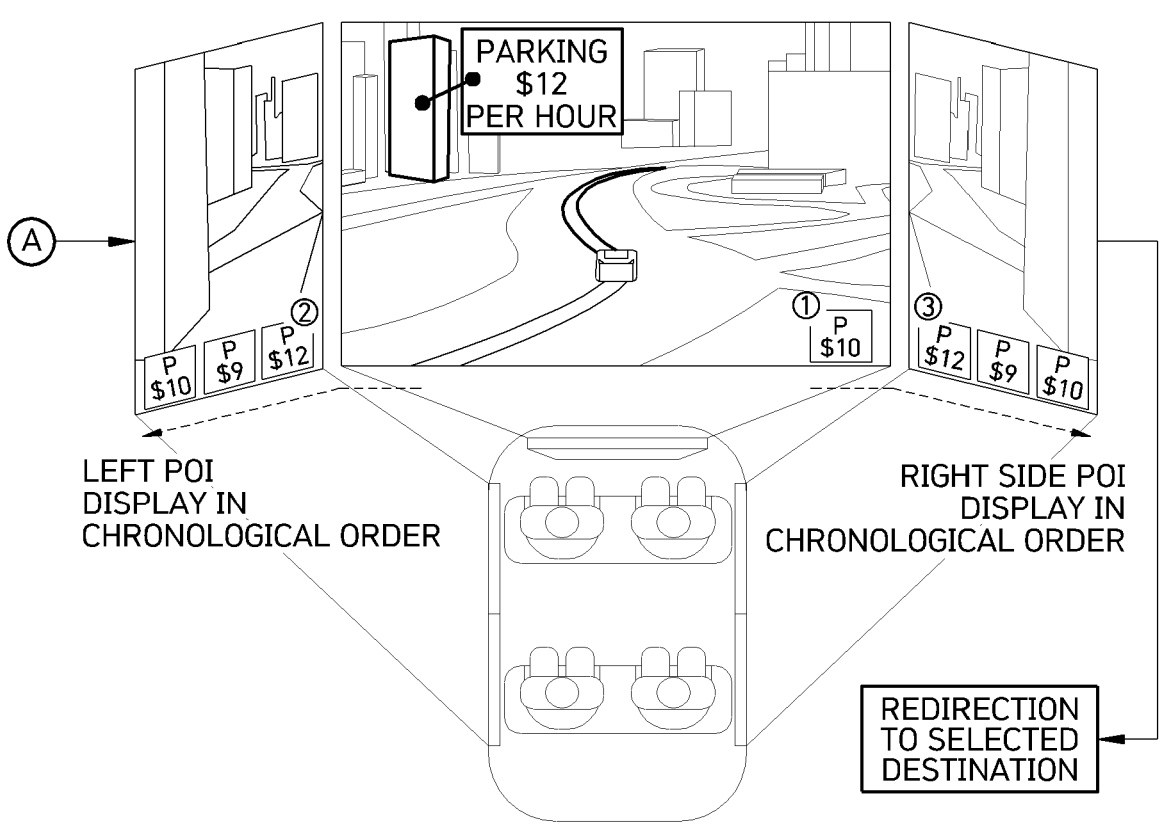

FIG. 44A and FIG. 44B are views showing an indication of the external interest information according to still another embodiment of the present disclosure.

Figure 45:
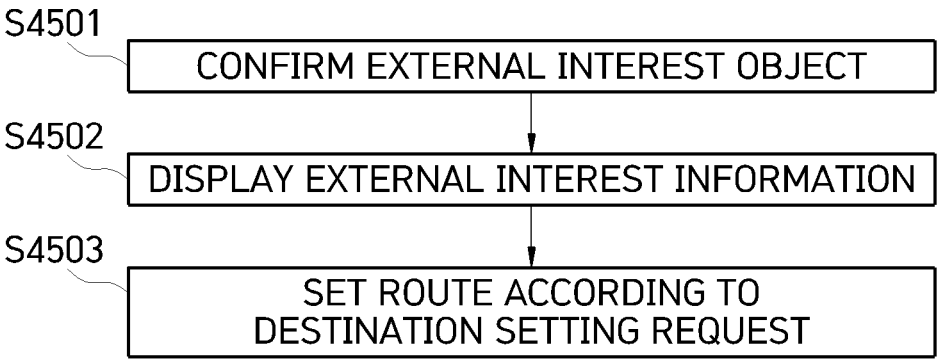

FIG. 45 is a view showing a vehicle display control method for displaying and storing the external interest information according to still another embodiment of the present disclosure.

Figure 46:
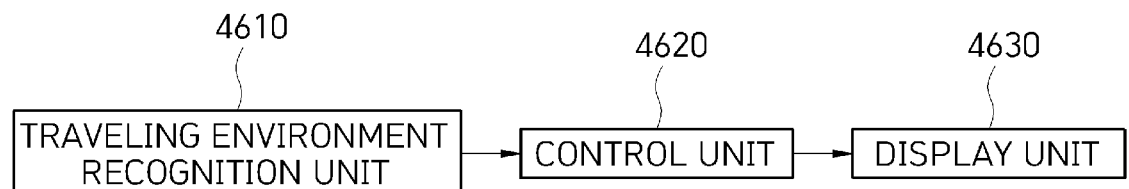

FIG. 46 is a block diagram illustrating a system for controlling a vehicle display according to still another embodiment of the present disclosure.

Figure 47:
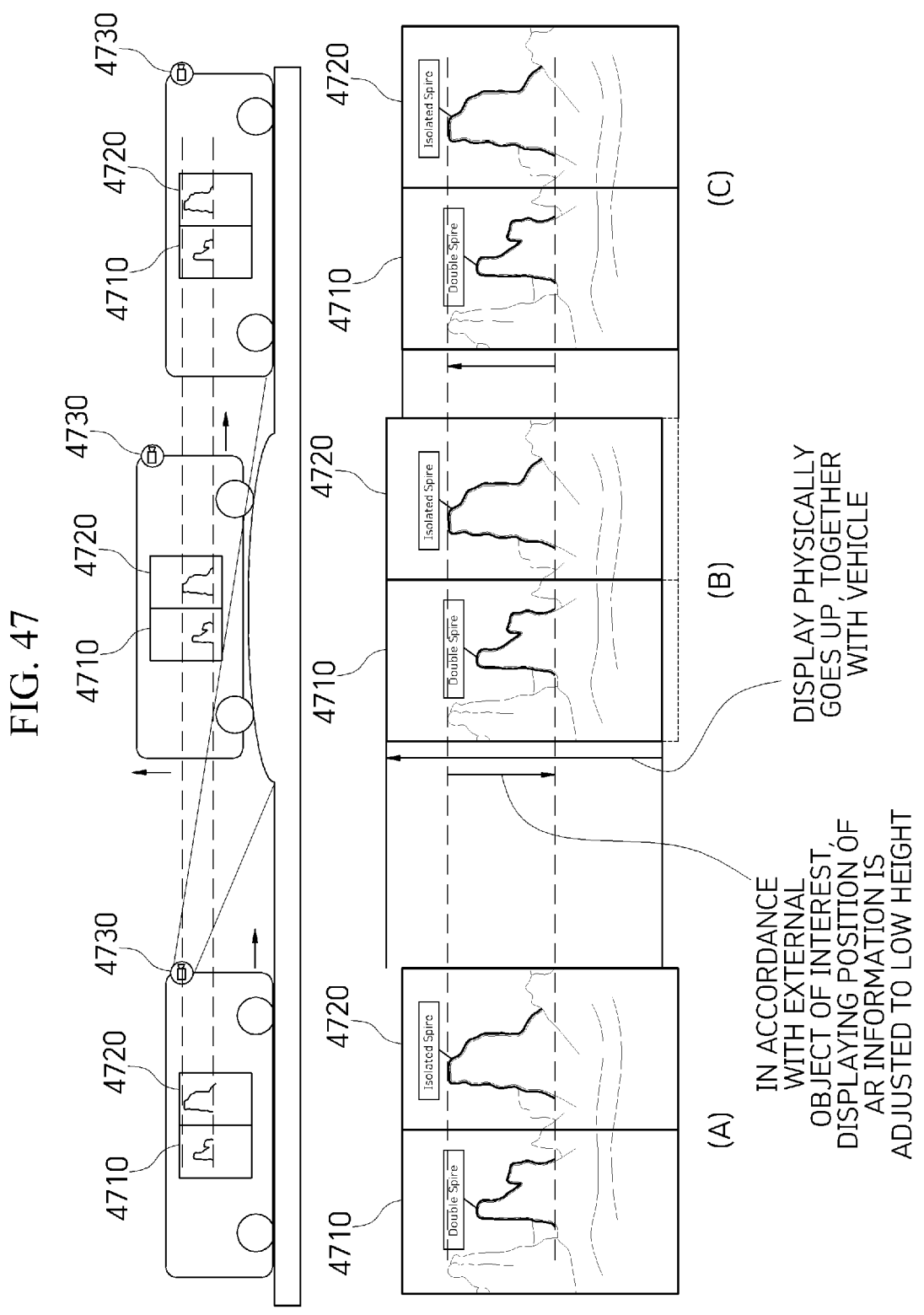

FIG. 47 is a view illustrating a vehicle display control process according to the present embodiment of the present disclosure.

Figure 48:
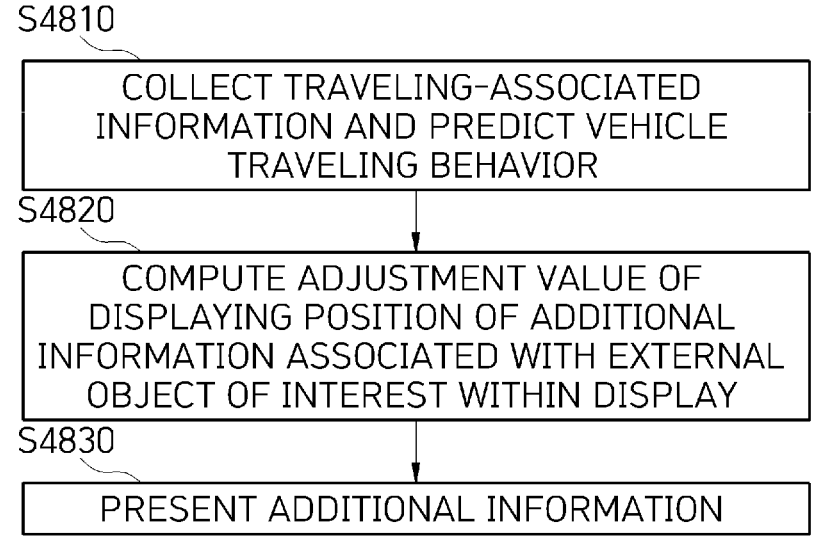

FIG. 48 is a flowchart illustrating a method of controlling a vehicle display according to still another embodiment of the present disclosure.

Figure 49:
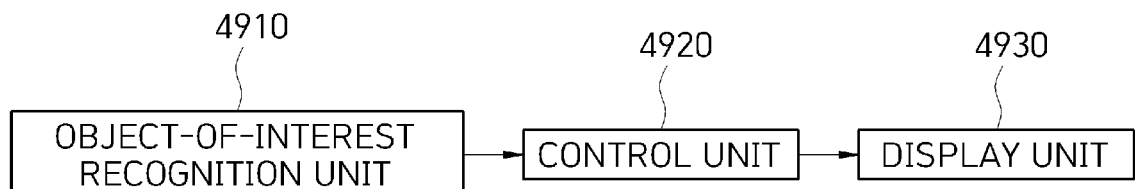

FIG. 49 is a block diagram illustrating a system for controlling a vehicle display according to still another embodiment of the present disclosure.

Figure 50A:
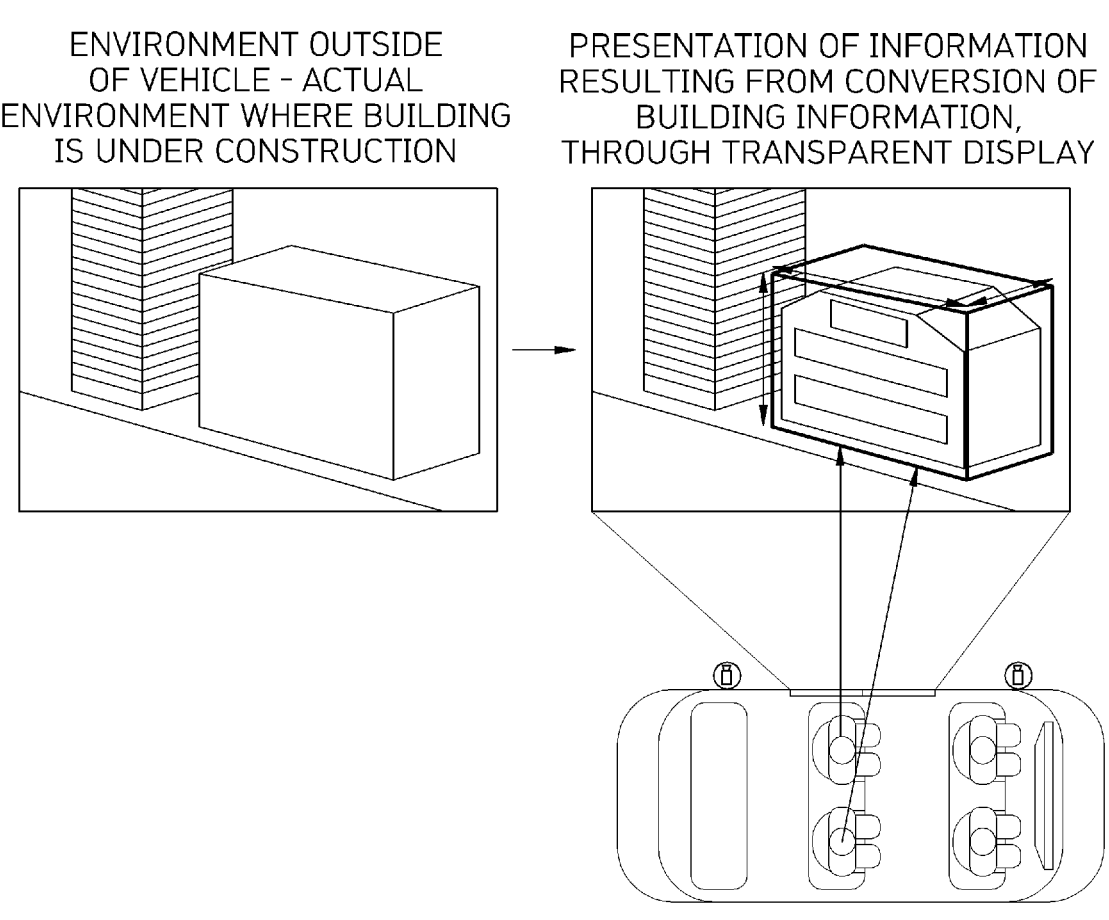

FIGS. 50A and 50B are views illustrating that size information and volume information of the object of interest outside of the vehicle according to the present embodiment of the present disclosure are displayed in a converted manner.

Figure 51:
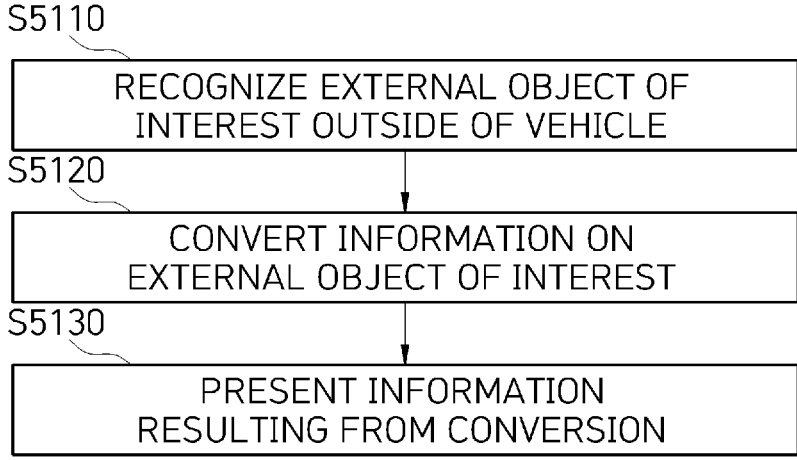

FIG. 51 is a flowchart illustrating a method of controlling a vehicle display according to still another embodiment of the present disclosure.

Figure 52:
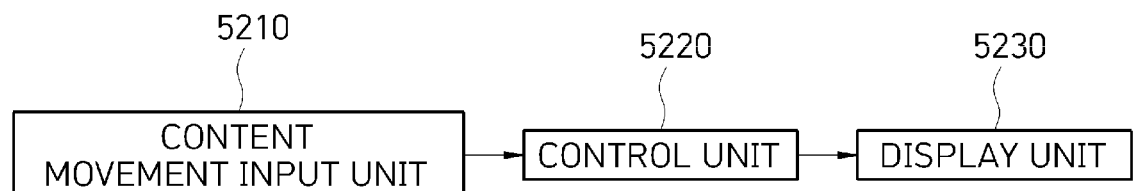

FIG. 52 is a block diagram illustrating a system for controlling a vehicle display according to still another embodiment of the present disclosure.

Figure 53A:
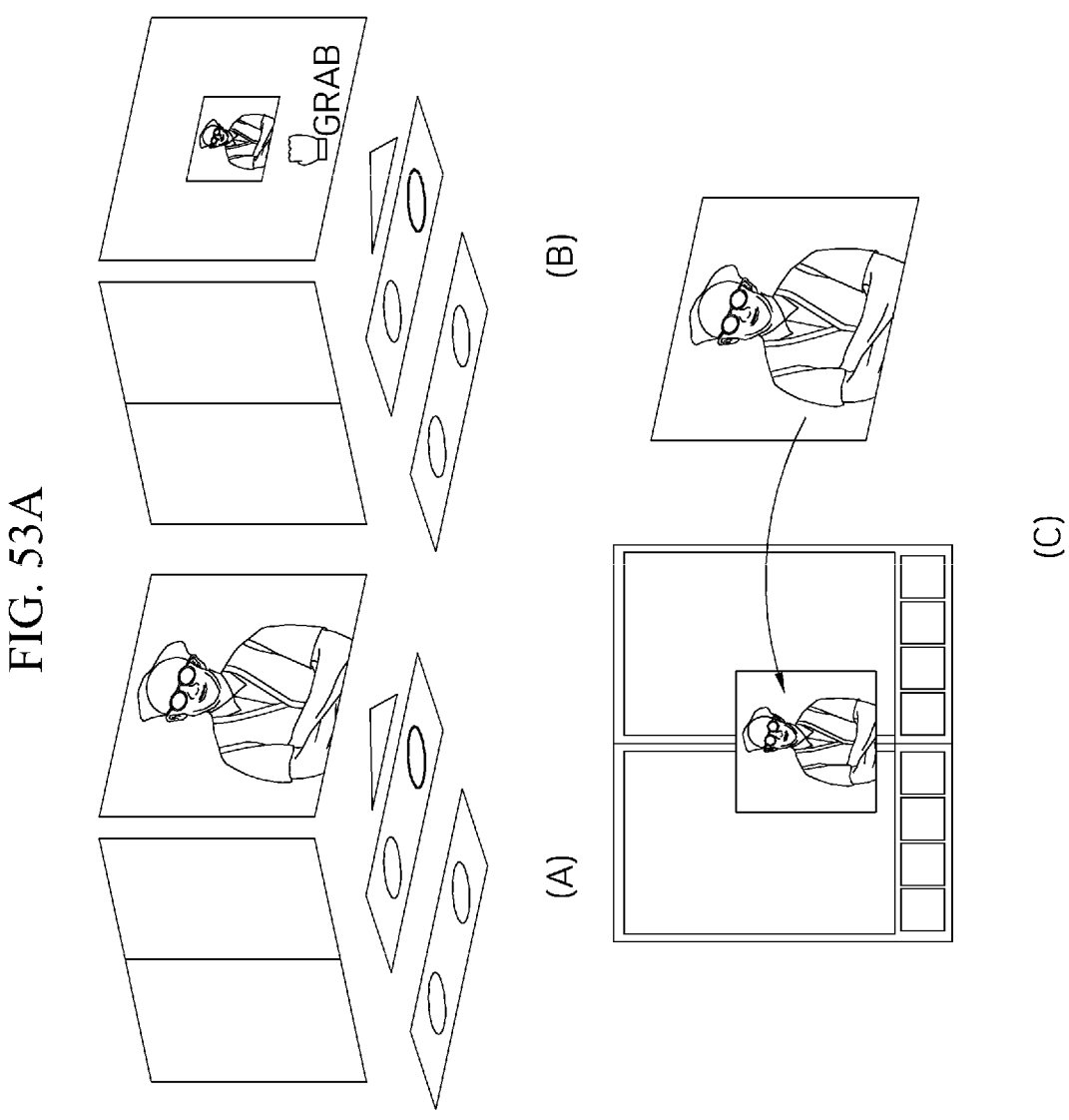
Figure 53B:
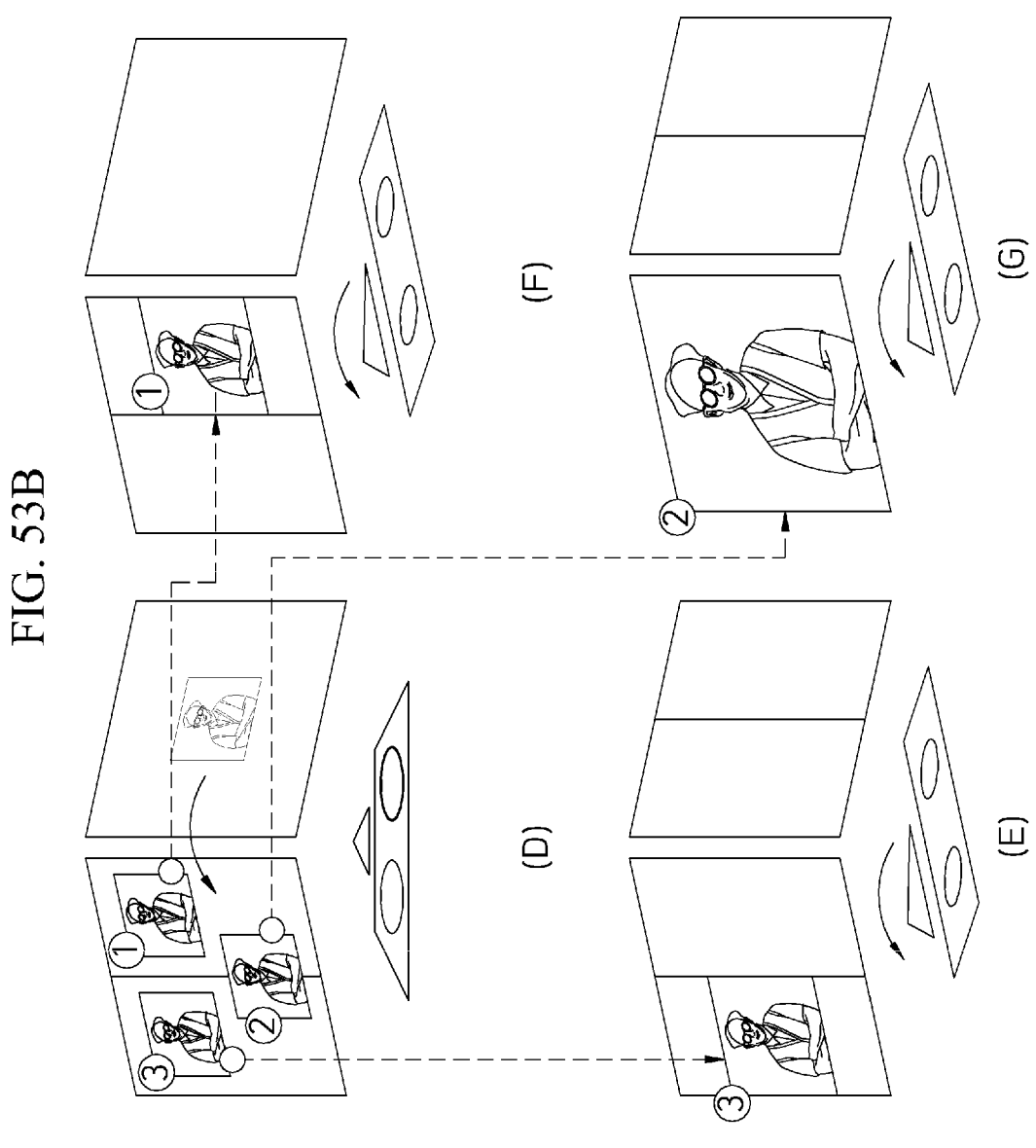

FIGS. 53A and 53B are views illustrating a display presentation region and an example of seat control when moving content according to the present embodiment of the present disclosure.

Figure 54A:
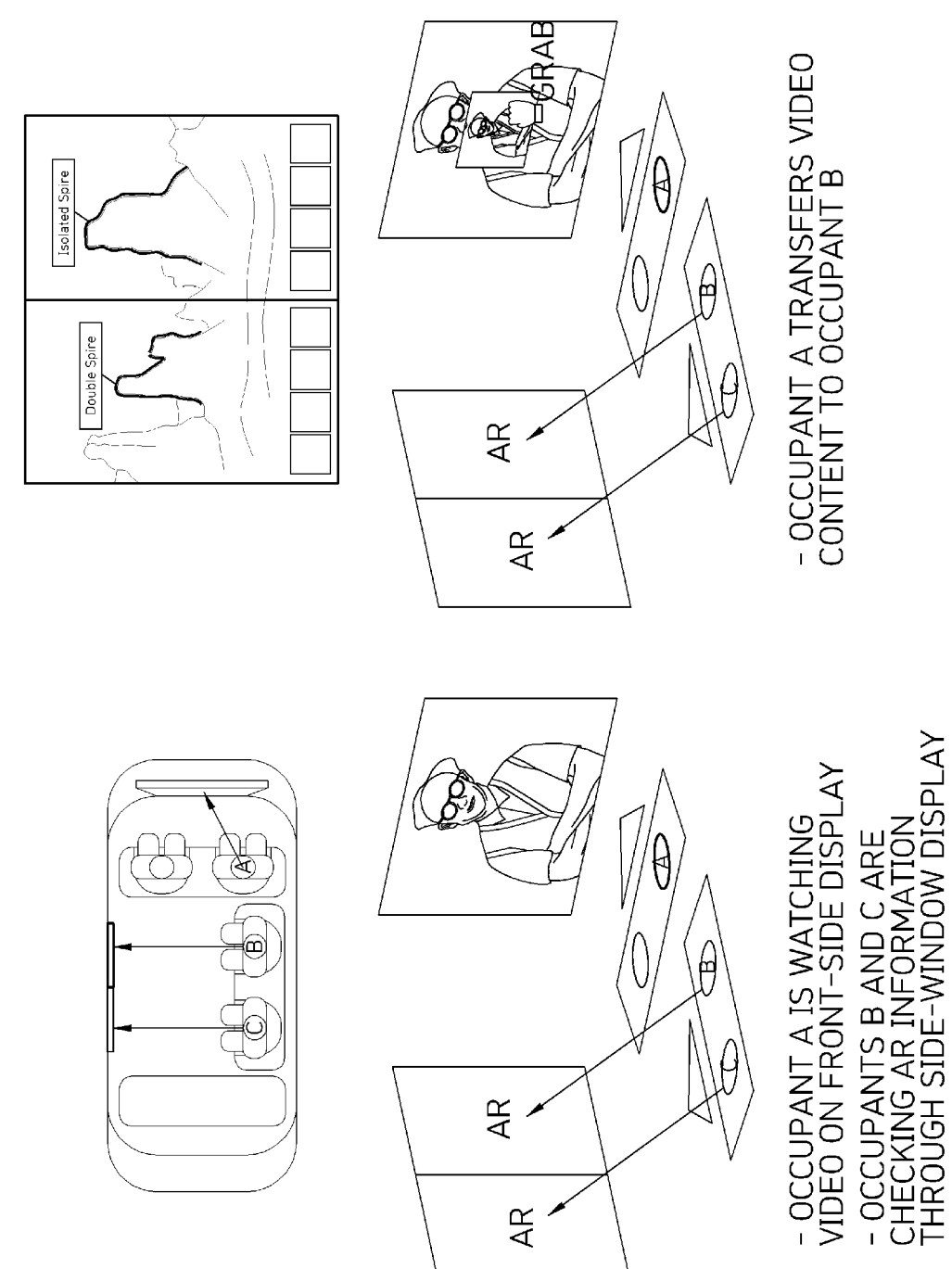
Figure 54B:
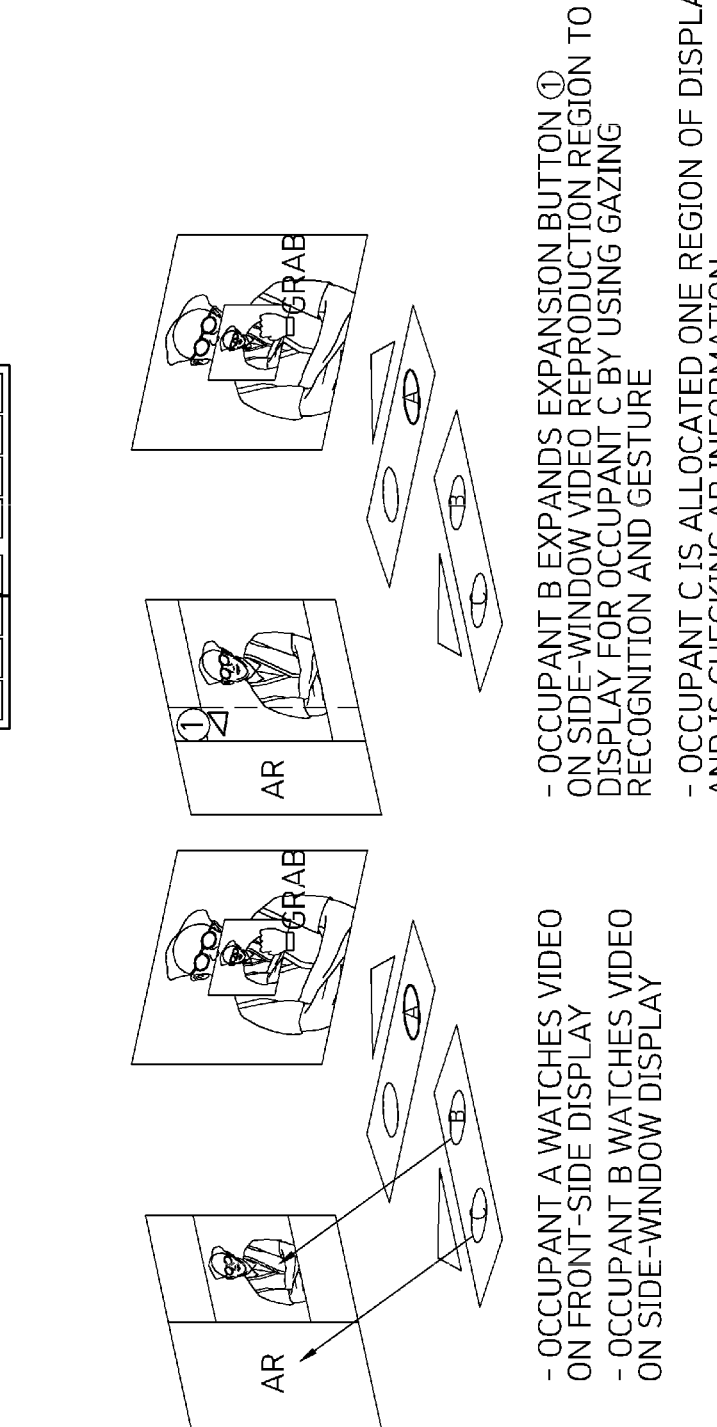

FIGS. 54A and 54B are views illustrating an example of control of a display presentation region when moving the content according to the present embodiment of the present disclosure.

Figure 55:
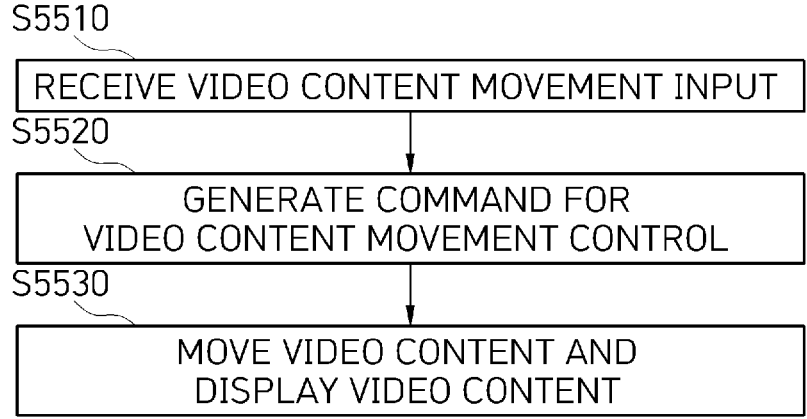

FIG. 55 is a flowchart illustrating a method of controlling a vehicle display according to still another embodiment of the present disclosure.

Figure 56:
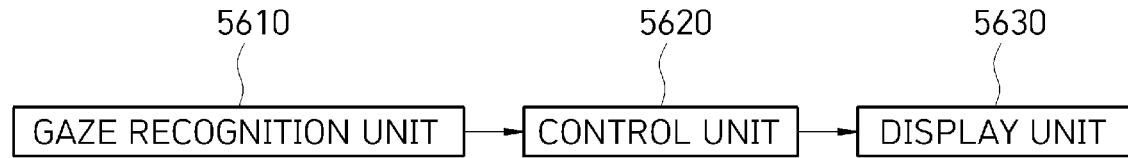

FIG. 56 is a block diagram illustrating a system for controlling a vehicle display according to still another embodiment of the present disclosure.

FIGS. 57A to 57C are views illustrating an example of display occupation control in accordance with a result of gaze monitoring according to the present embodiment of the present disclosure.

FIGS. 58A and 58B are views illustrating a situation of control for rejection of the request for the initiative that is in accordance with the result of the gaze monitoring according to the present embodiment of the present disclosure.

FIGS. 59A to 59C are views illustrating a situation of control for the request for and the acceptance of the initiative that are in accordance with the result of the gaze monitoring according to the present embodiment of the present disclosure.

Figure 60:
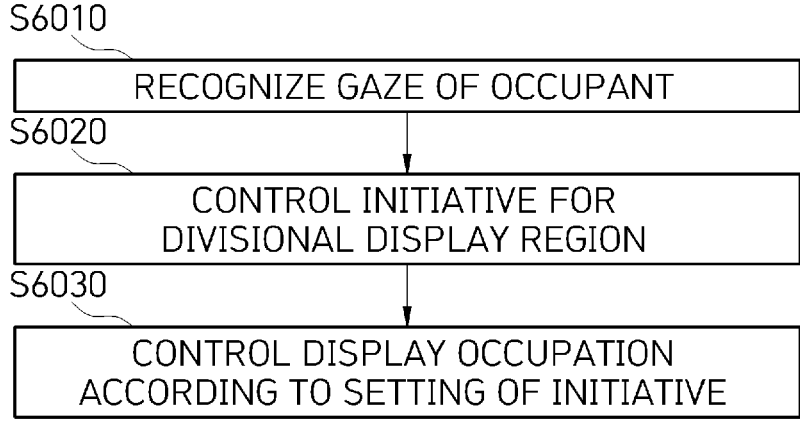

FIG. 60 is a flowchart illustrating a method of controlling a vehicle display according to still another embodiment of the present disclosure.

Figure 61:
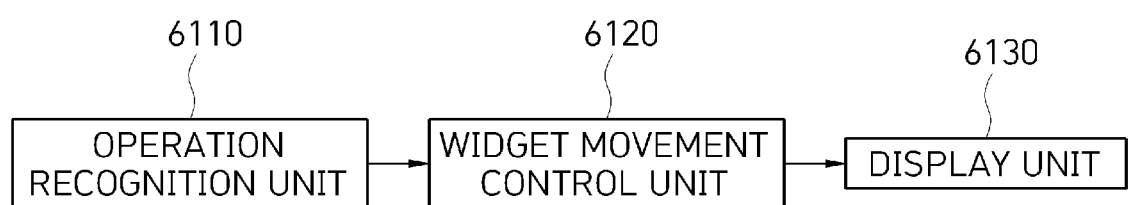

FIG. 61 is a block diagram illustrating a system for controlling a vehicle display according to still another embodiment of the present disclosure.

FIGS. 62A and 62B are views illustrating a process of operating a screen according to recognition of a plurality of users according to the present embodiment of the present disclosure.

Figure 63:
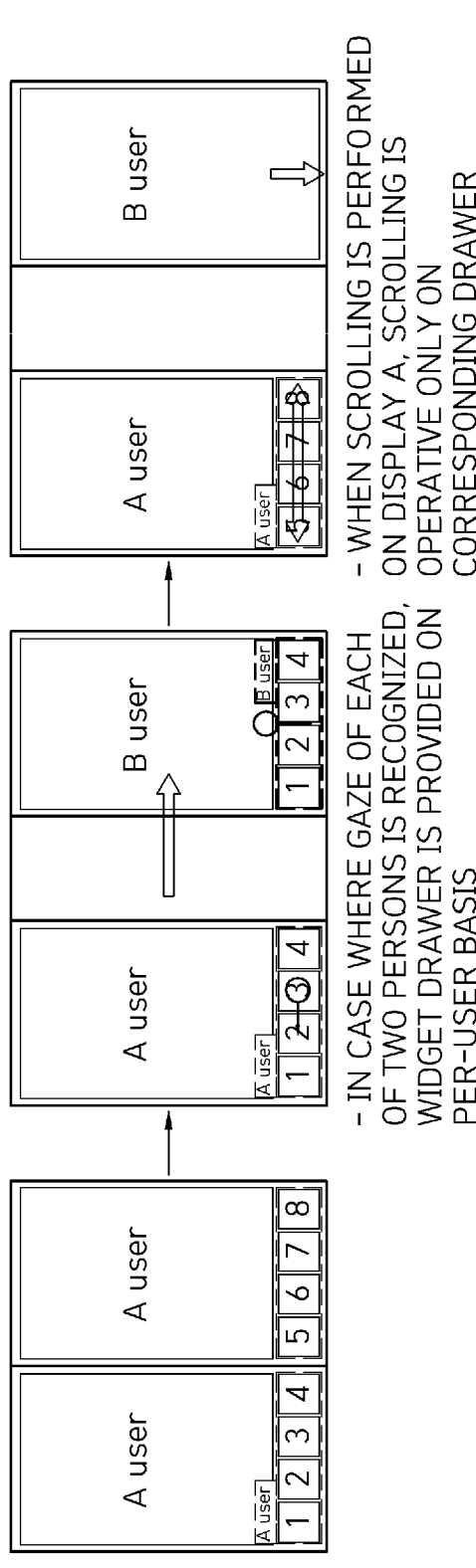

FIG. 63 is a view illustrating a process of personalization operation through display separation according to the present embodiment of the present disclosure.

Figure 64A:
Figure 64B:
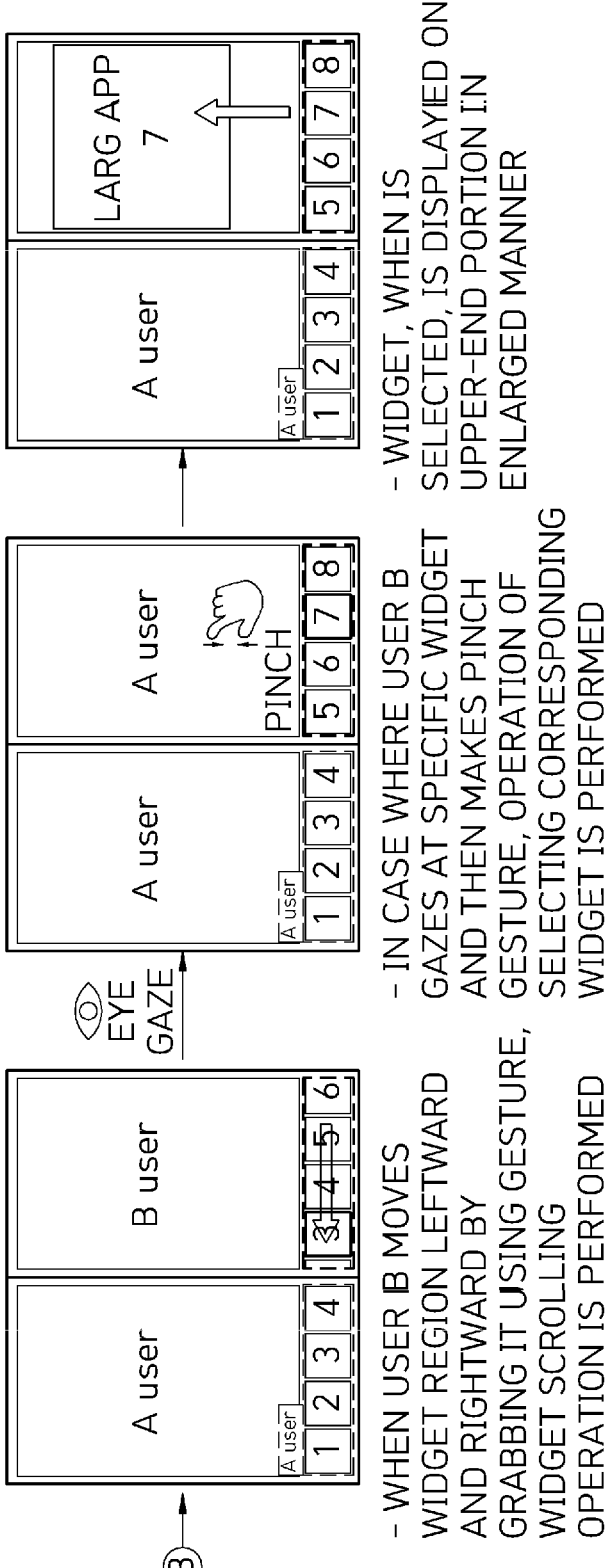

FIGS. 64A and 64B are views illustrating a process in which a user at a remote location operates the screen according to the present embodiment of the present disclosure.

FIG. 65 is a view illustrating a process of moving an individual widget using a touch input signal according to the present embodiment of the present disclosure.

Figure 66B:
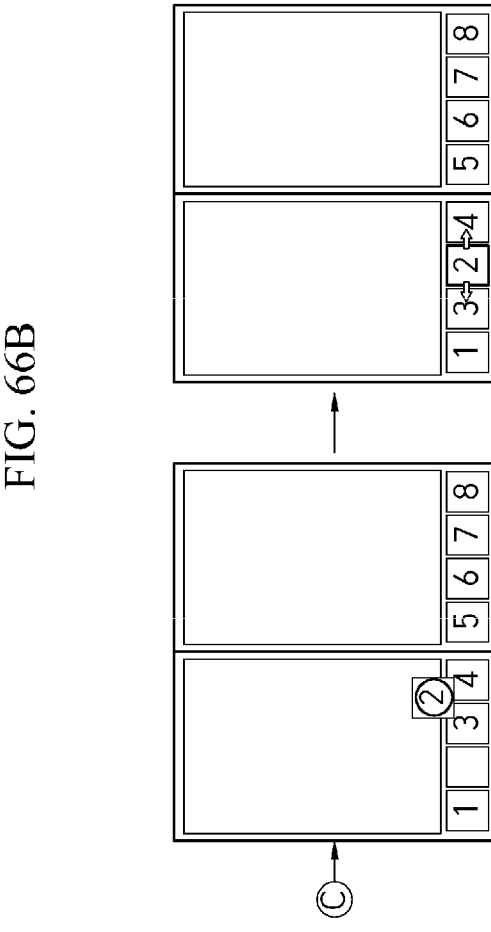

FIGS. 66A and 66B are views illustrating a process of moving the individual widget using gaze recognition and a gesture according to the present embodiment of the present disclosure.

Figure 67A:
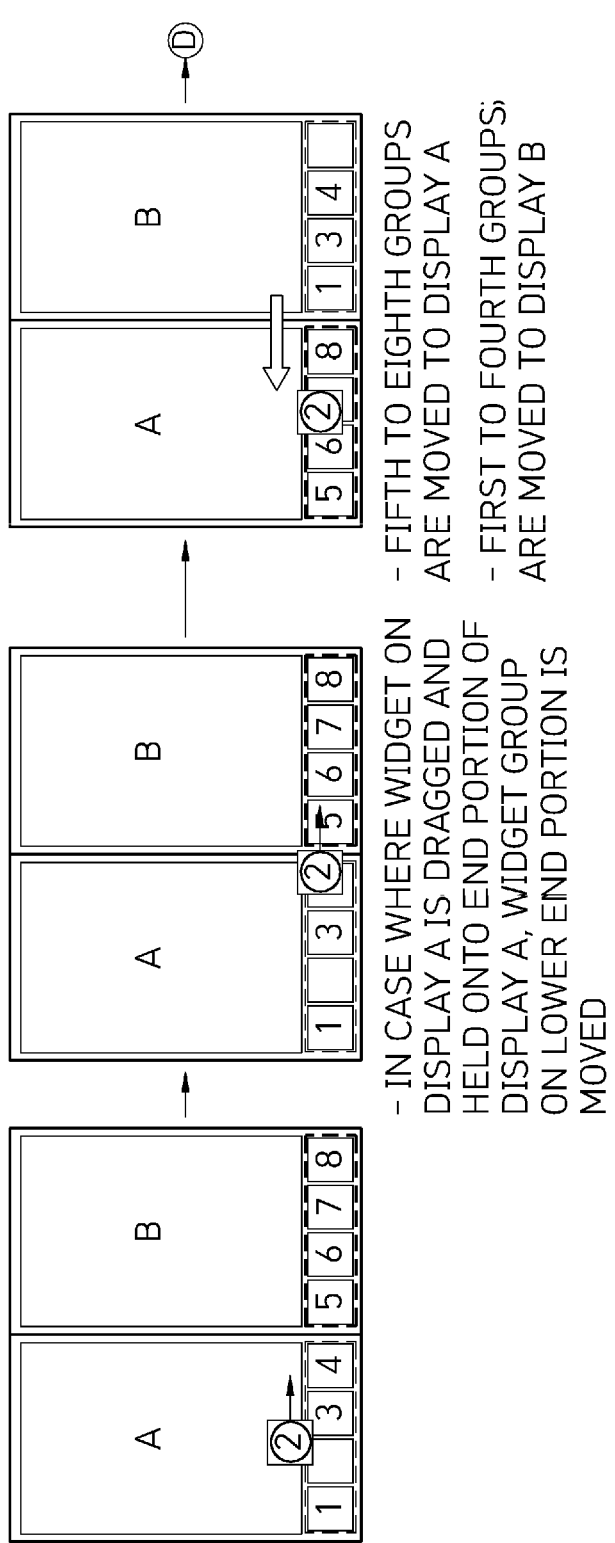

FIGS. 67A and 67B are views illustrating a process of moving a widget group by moving a single widget according to the present embodiment of the present disclosure.

Figure 68:
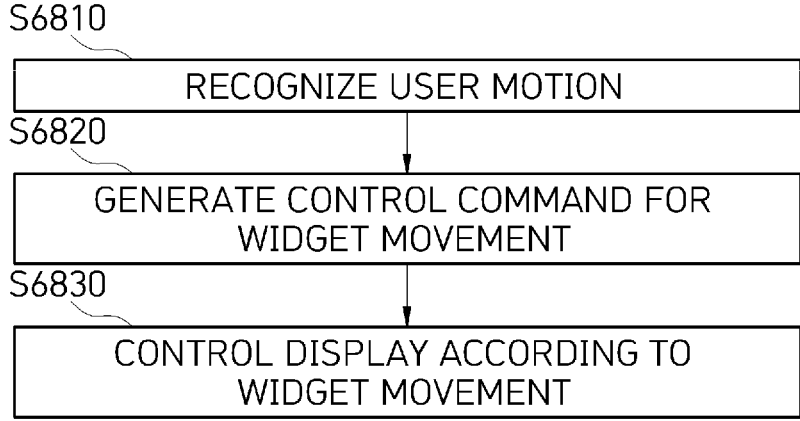

FIG. 68 is a flowchart illustrating a method of controlling a vehicle display according to still another embodiment of the present disclosure.

Figure 69:
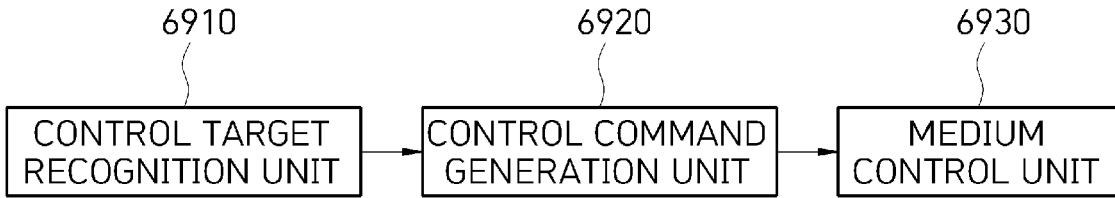

FIG. 69 is a block diagram illustrating a system for controlling reproduction of content on a medium according to still another embodiment of the present disclosure.

FIG. 70 is a view illustrating a process of distinguishing and recognizing operations for content on a medium that use smartphones of occupants inside of and outside of the vehicle according to the present embodiment of the present disclosure.

FIG. 71 is a view illustrating a process of distinguishing and recognizing the operations for the content on the medium using gaze recognition information and information for the operations for the content on the medium that use the smartphones according to the present embodiment of the present disclosure.

FIG. 72 is a view illustrating a process of distinguishing and recognizing the operations for the content on the medium using the gaze recognition information and UWB communication according to the present embodiment of the present disclosure.

Figure 73:
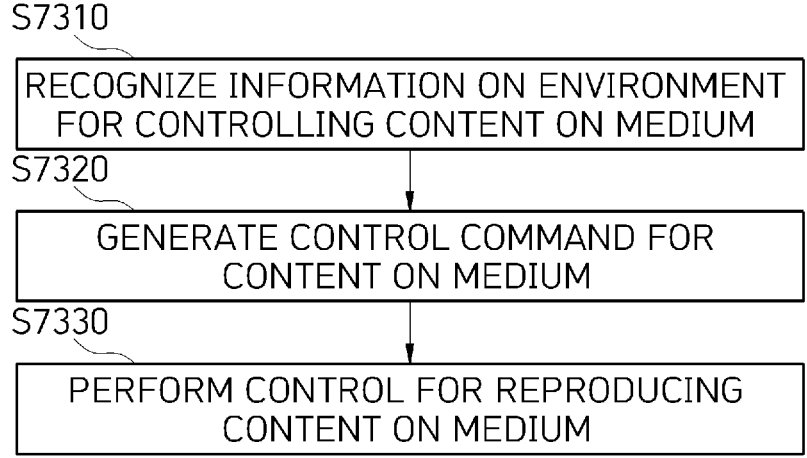

FIG. 73 is a flowchart illustrating a method of controlling reproduction of content on a medium according to still another embodiment of the present disclosure.

Figure 74:
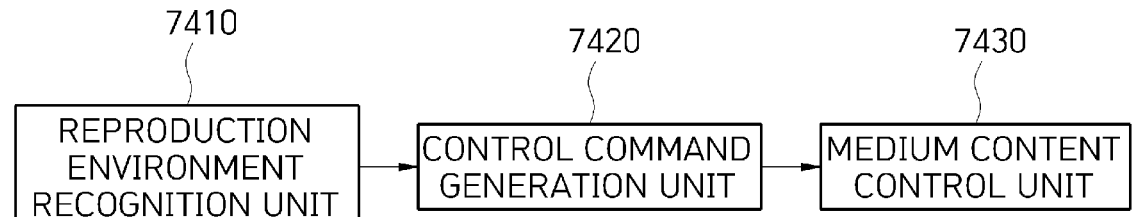

FIG. 74 is a block diagram illustrating a system for controlling reproduction of content on a medium according to still another embodiment of the present disclosure.

FIG. 75 is a view illustrating a process of preventing sound interference according to the present embodiment of the present disclosure.

Figure 76:
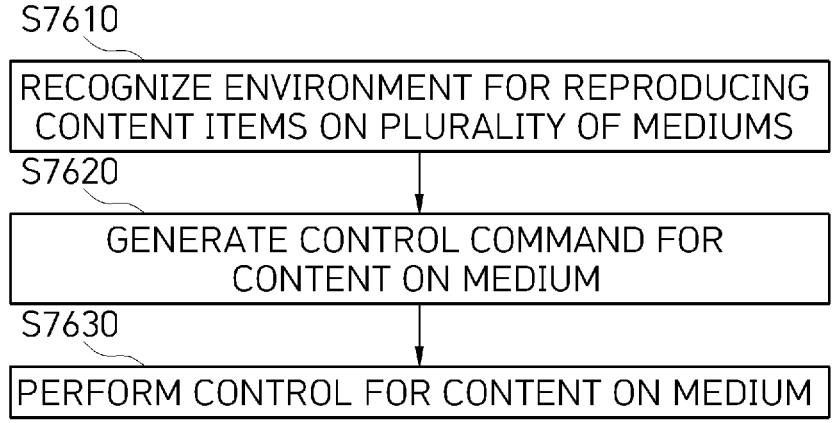

FIG. 76 is a flowchart illustrating a method of controlling reproduction of content on a medium according to still another embodiment of the present disclosure.

Figure 77:
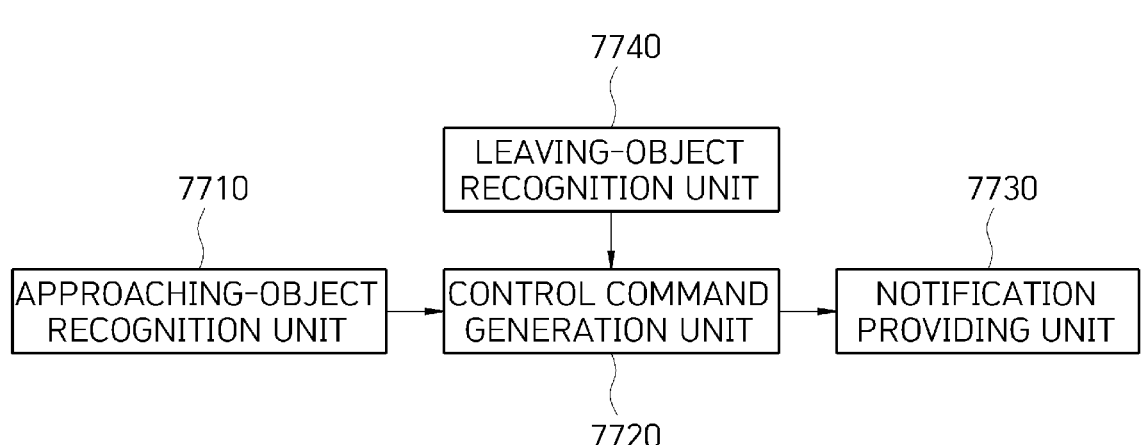

FIG. 77 is a block diagram illustrating a system for determining a risk element and providing a warning according to still another embodiment of the present disclosure.

Figure 78A:
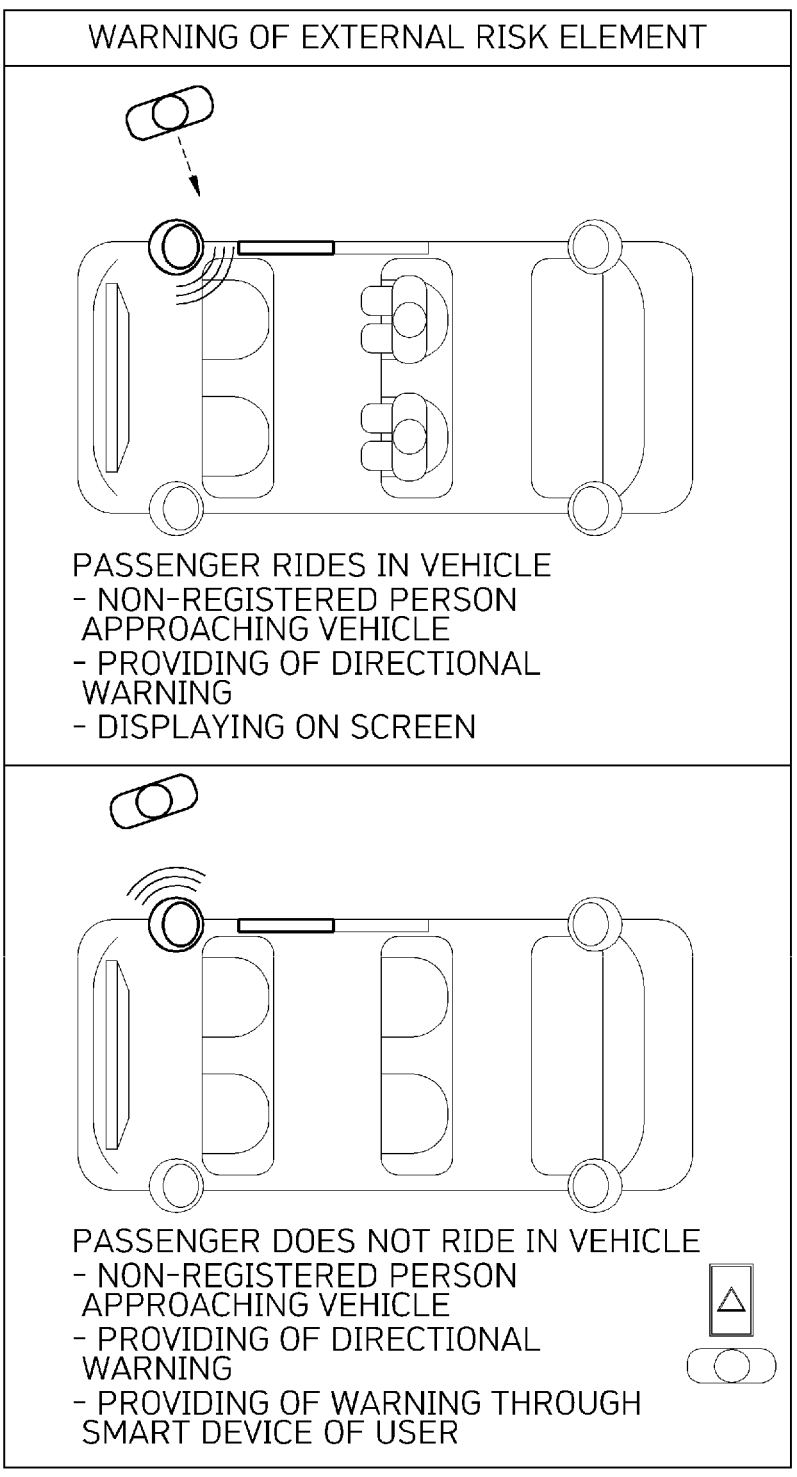
Figure 78C:
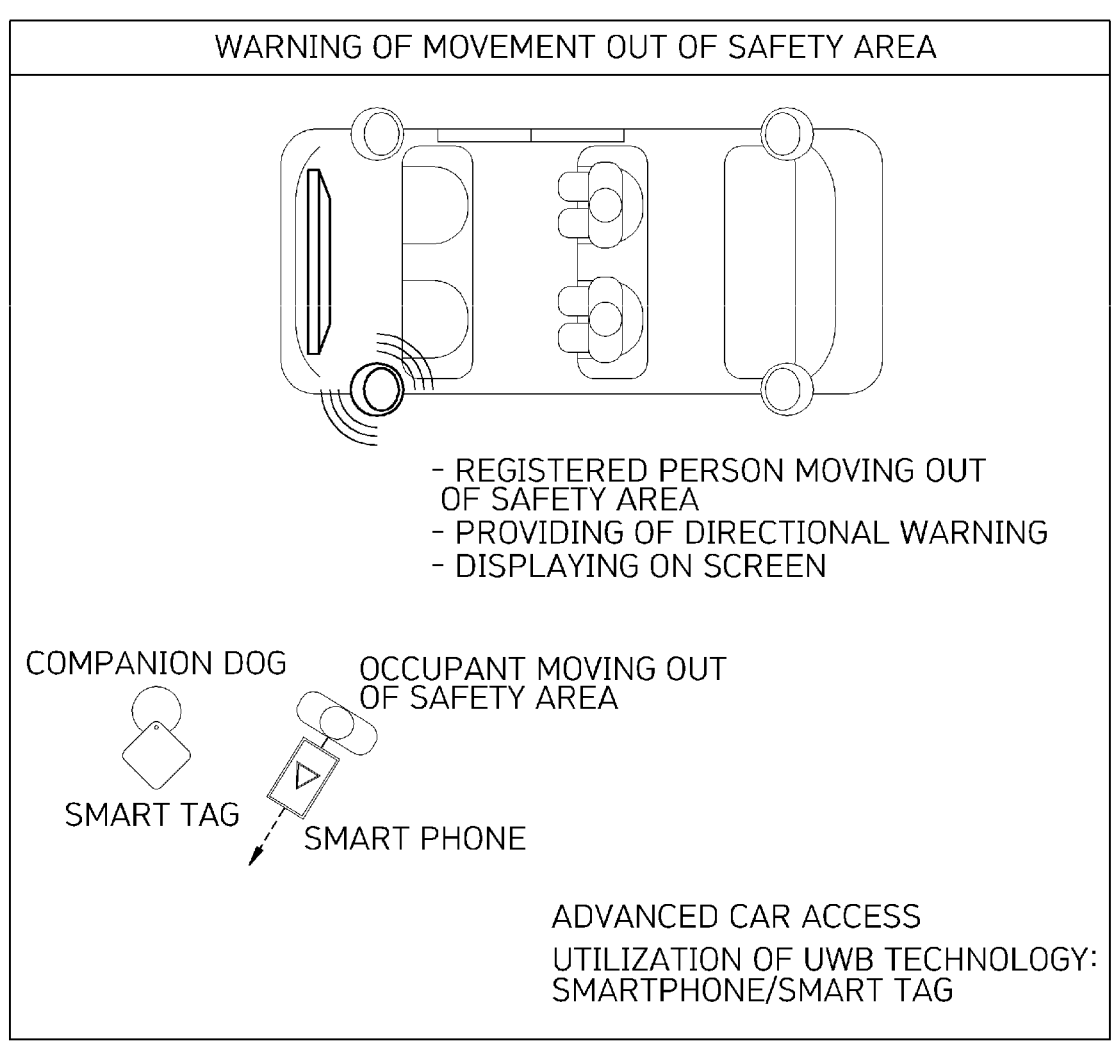

FIGS. 78A to 78C are views illustrating a situation of providing a warning of an external risk element and a warning of a movement out of a safety area according to the present embodiment of the present disclosure.

Figure 79:
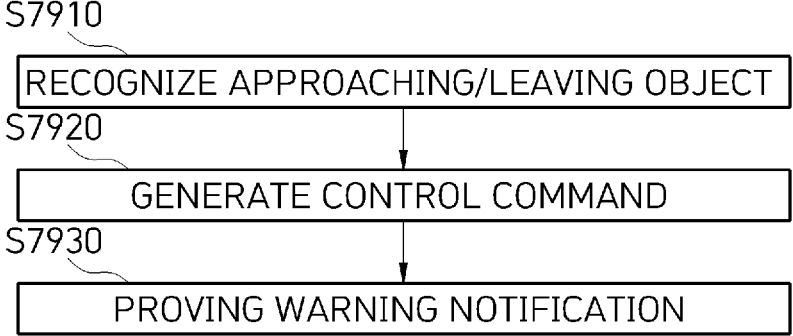

FIG. 79 is a view illustrating a method of determining a risk element and providing a warning according to still another embodiment of the present disclosure.

Figure 80:
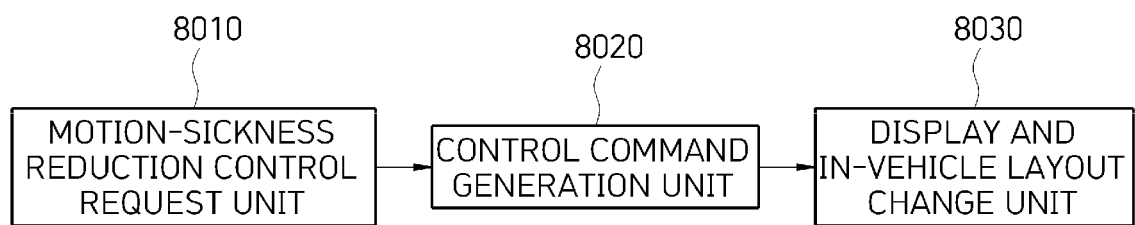

FIG. 80 is a block diagram illustrating a vehicle control system for reducing motion sickness according to still another embodiment of the present disclosure.

FIGS. 81A to 81C are views illustrating that a display and an in-vehicle layout are changed for motion-sickness reduction according to the present embodiment of the present disclosure.

Figure 82:
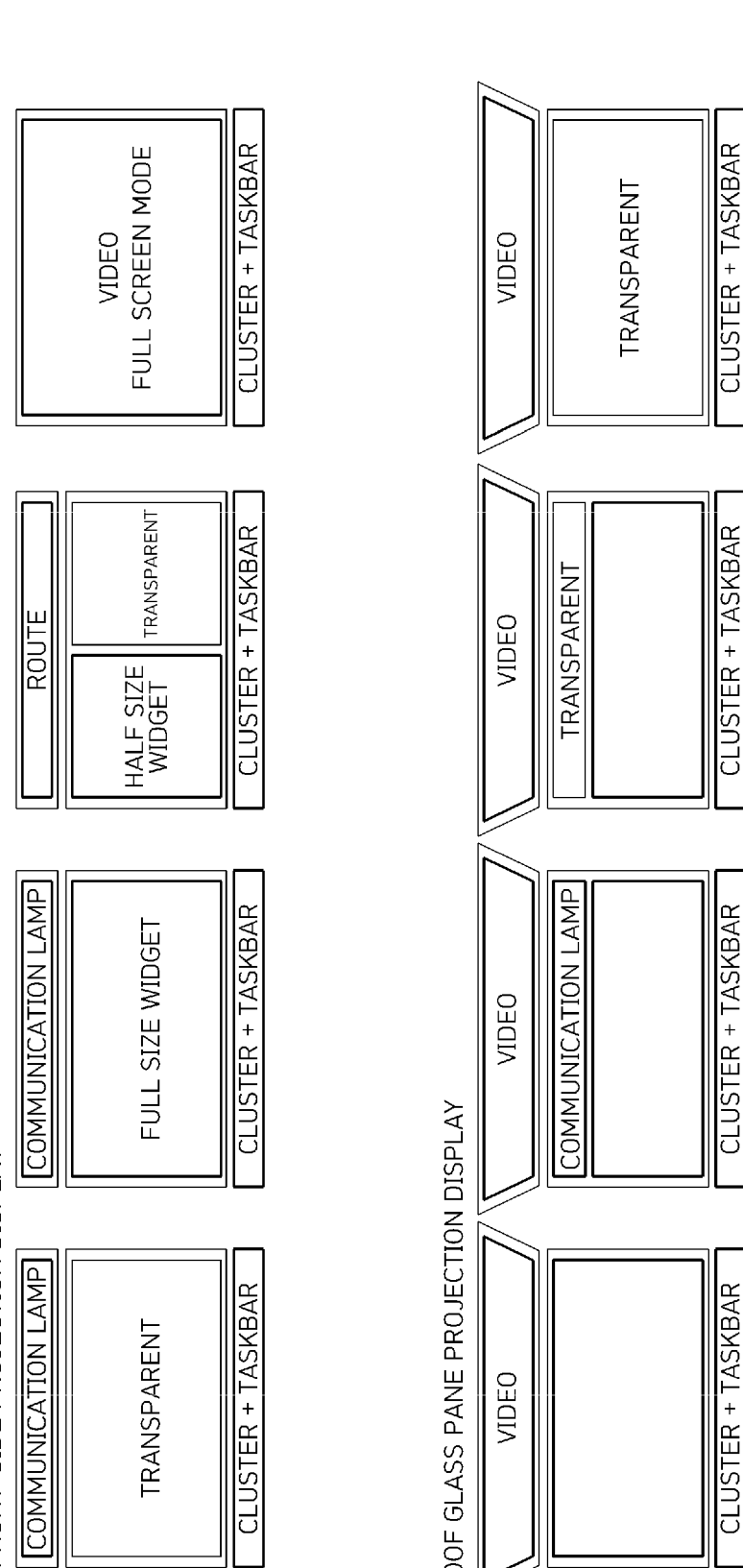

FIG. 82 is a view illustrating a variable display layout of a front-side display according to the present embodiment of the present disclosure.

Figure 83B:
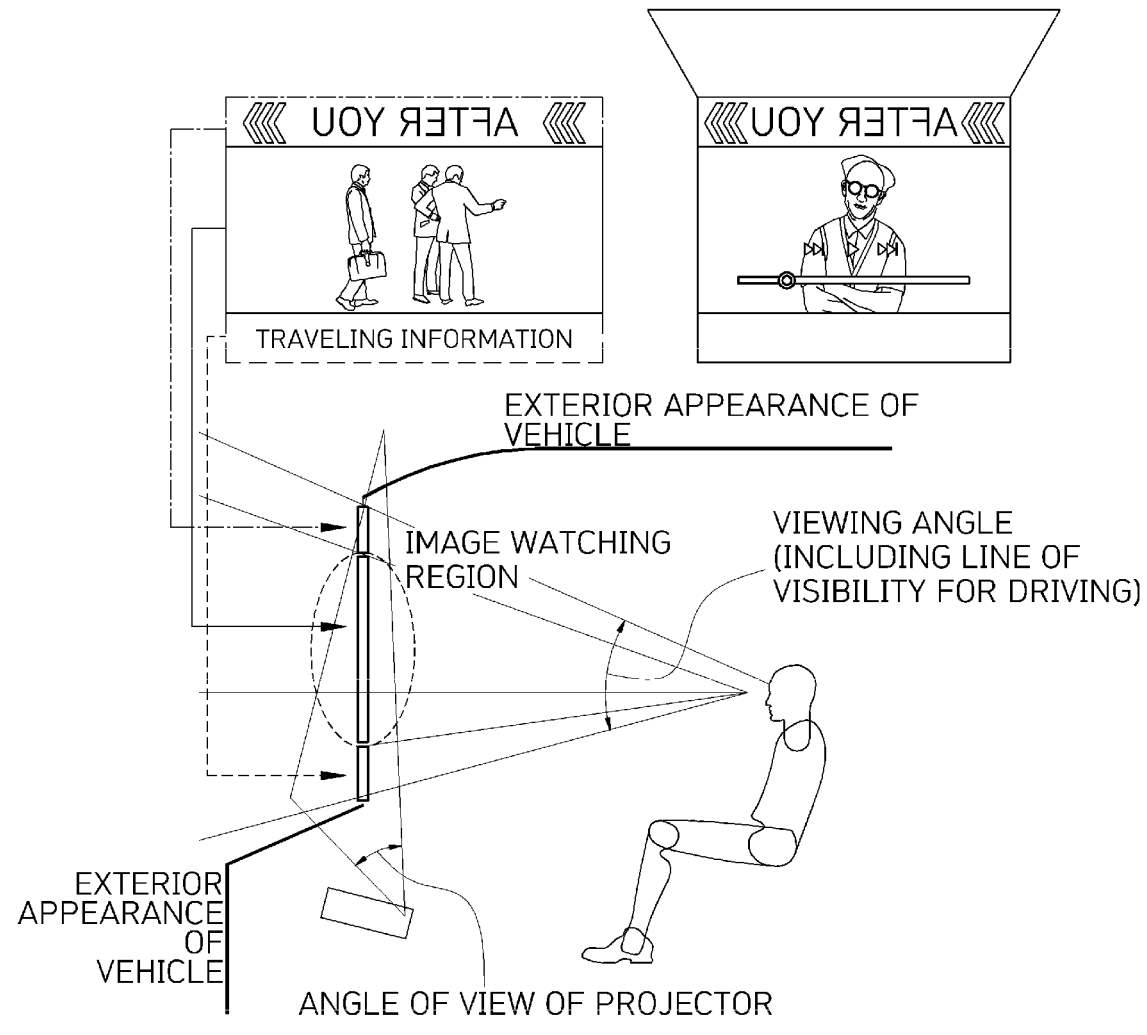

FIGS. 83A and 83B are views illustrating a projection display (a front-side glass pane) according to the present embodiment of the present disclosure.

Figure 84:
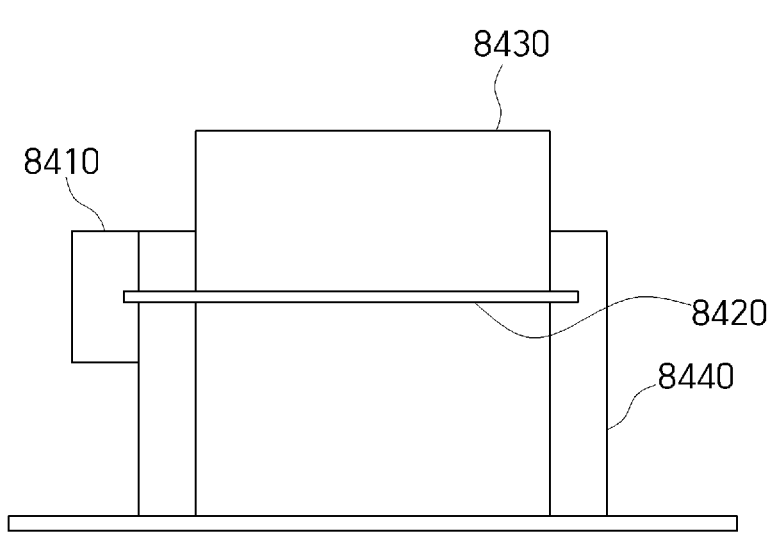

FIG. 84 is a view illustrating a projector in a situation where the projection display (the front-side glass pane) according to the present embodiment of the present disclosure is used.

Figure 85B:
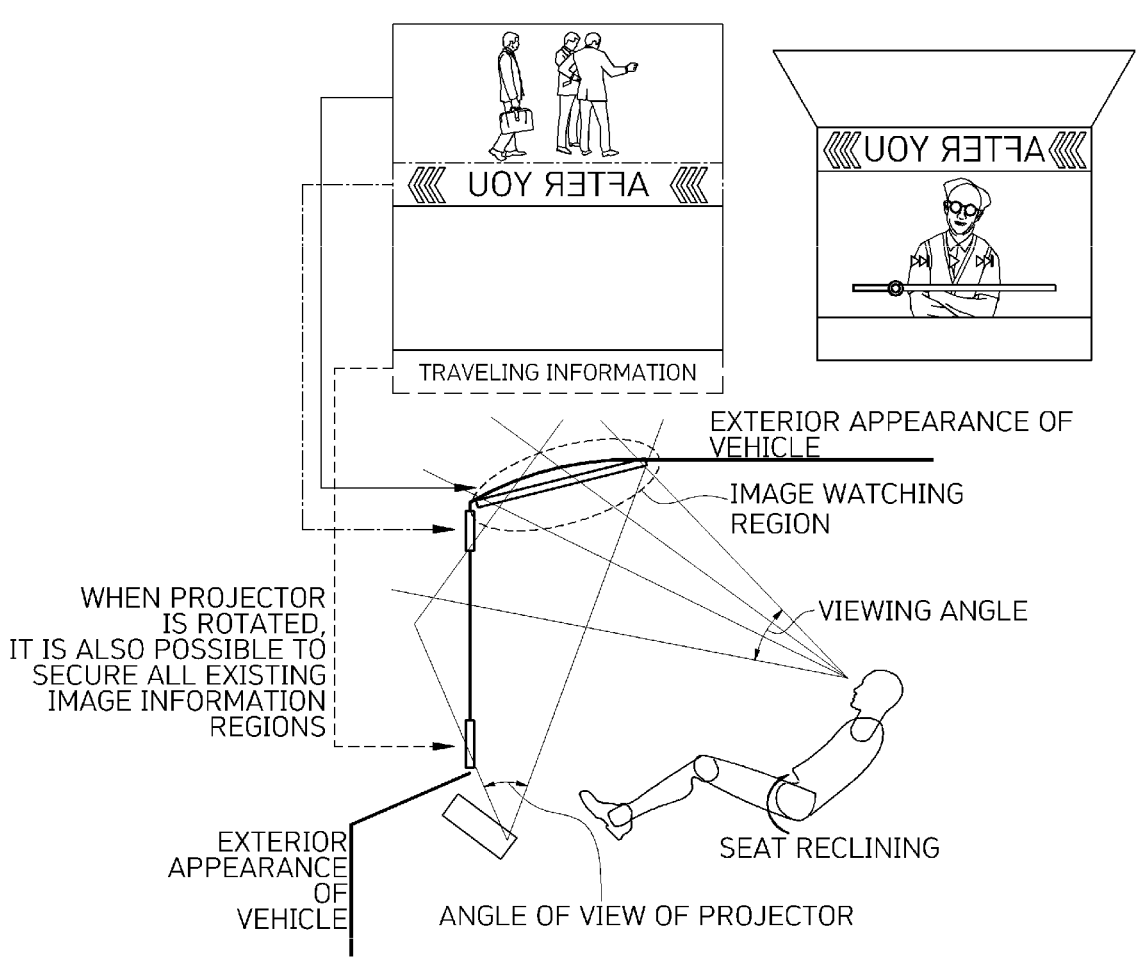

FIGS. 85A and 85B are views illustrating the projection display (a roof glass pane) according to the present embodiment of the present disclosure.

Figure 86:
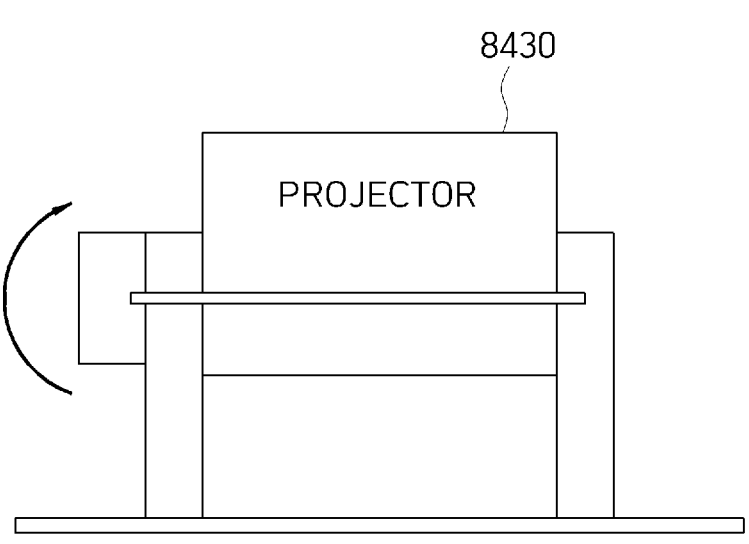
Figure 87A:
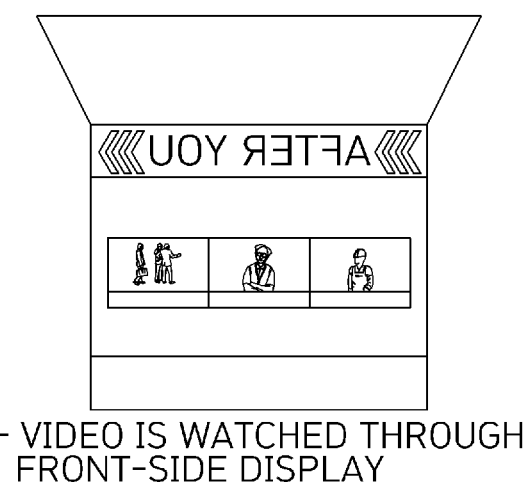
Figure 87B:
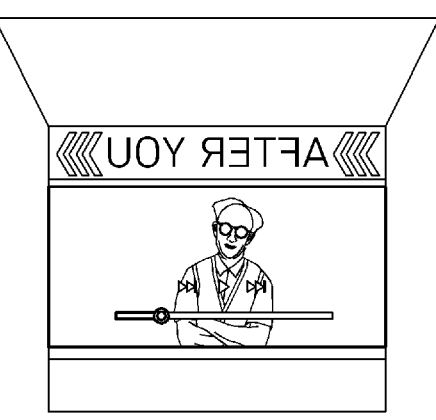
Figure 87C:
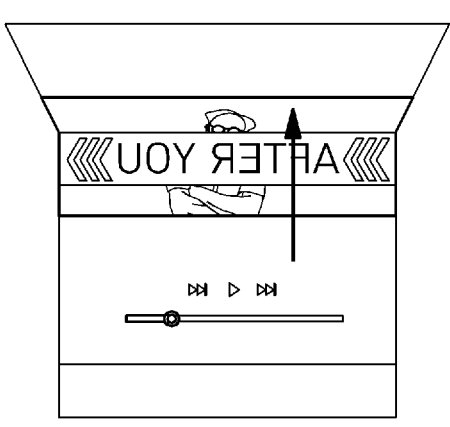
Figure 87D:
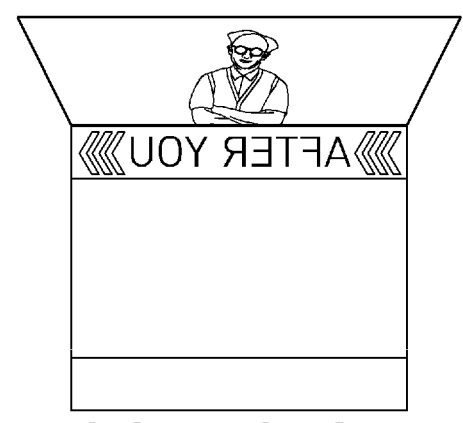
Figure 87E:
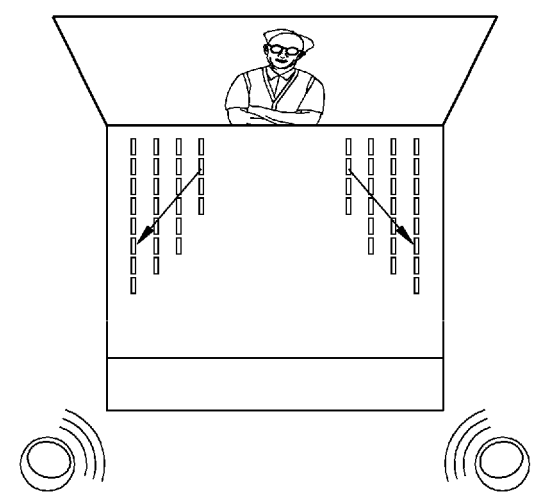
Figure 87F:
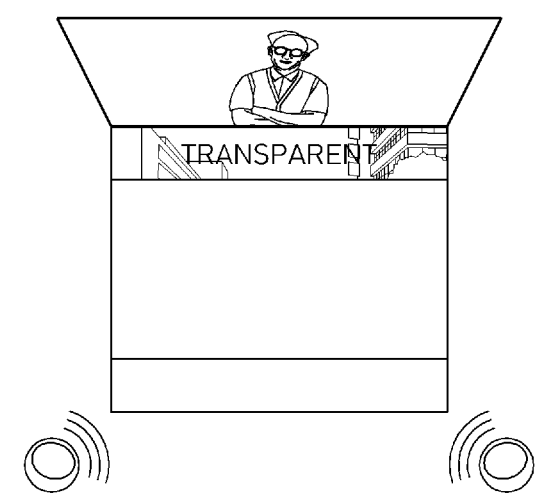
Figure 87G:
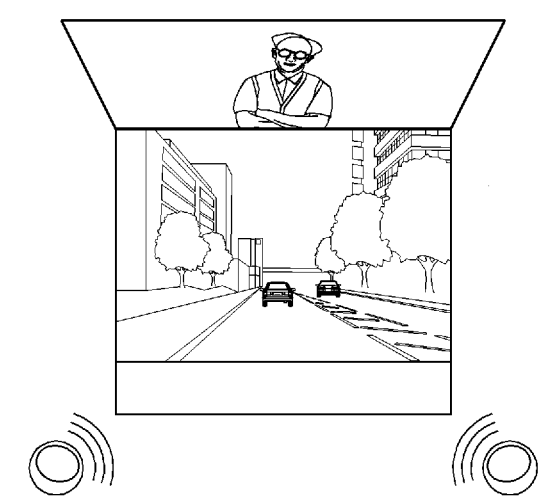

FIG. 86 is a view illustrating the projector in a situation where the projection display (the roof glass pane) according to the present embodiment of the present disclosure is used.

FIGS. 87A to 87G are views illustrating a process of moving an image according to the present embodiment of the present disclosure.

Figure 88:
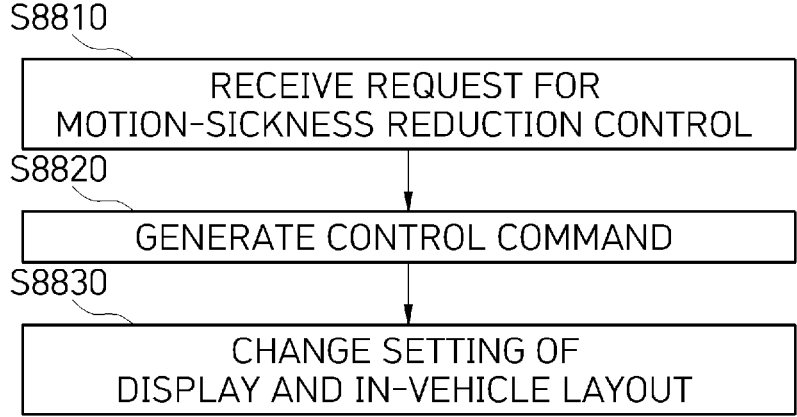

FIG. 88 is a flowchart illustrating a vehicle control method for reducing motion-sickness according to still another embodiment of the present disclosure.

Figure 89:
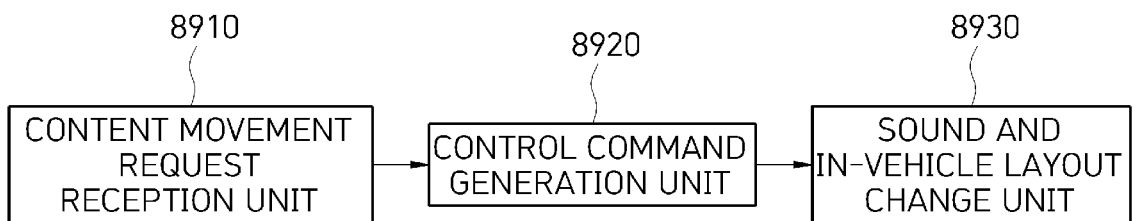
Figure 90A:
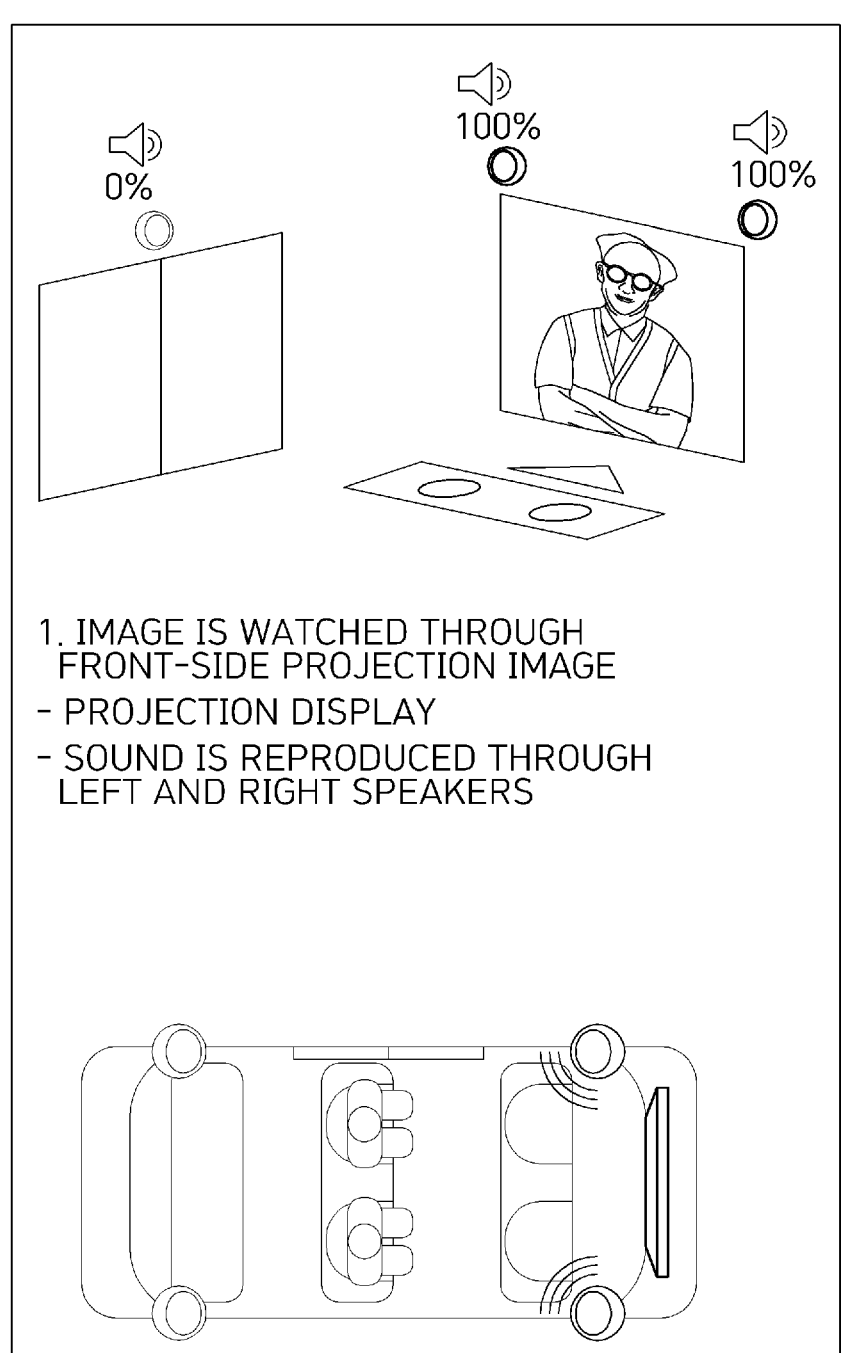

FIG. 89 is a block diagram illustrating a system for controlling a vehicle display according to still another embodiment of the present disclosure.

FIGS. 90A to 90D are views illustrating a process of changing a sound and an in-vehicle layout according to movement of the image between displays according to the present embodiment of the present disclosure.

Figure 91:
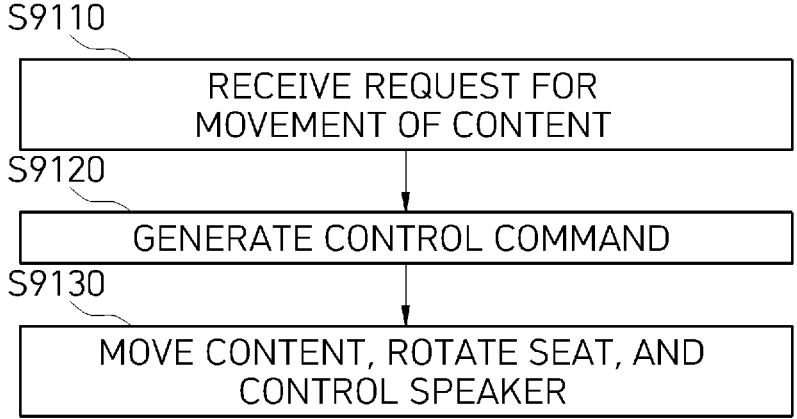

FIG. 91 is a flowchart illustrating a method of controlling a vehicle display according to still another embodiment of the present disclosure.

Figure 92:
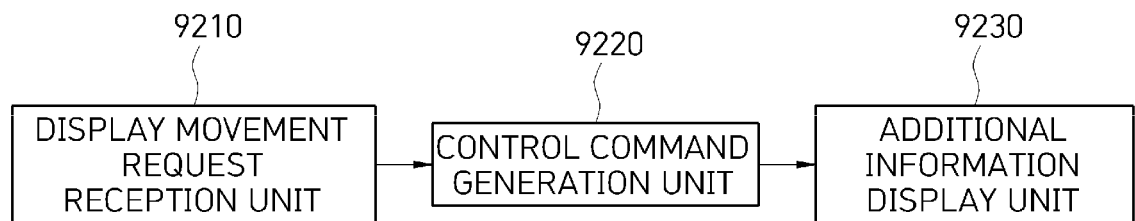

FIG. 92 is a block diagram illustrating a system for controlling a vehicle display according to still another embodiment of the present disclosure.

FIGS. 93A to 93E are views illustrating a sliding display according to the present embodiment of the present disclosure.

FIGS. 94A to 94C are views illustrating a process of moving the display and displaying AR content according to the present embodiment of the present disclosure.

Figure 95:
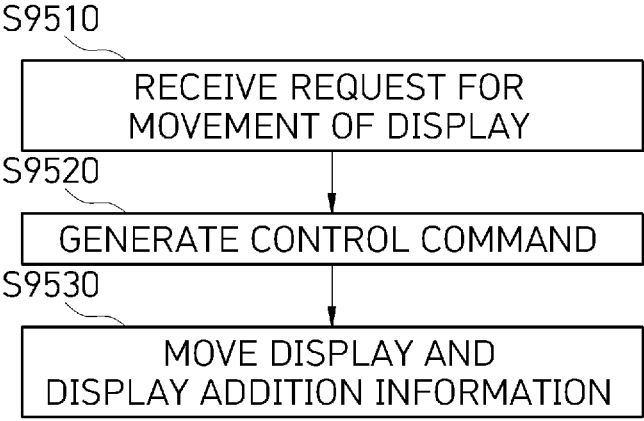

FIG. 95 is a flowchart illustrating a method of controlling a vehicle display according to still another embodiment of the present disclosure.

Figure 96:
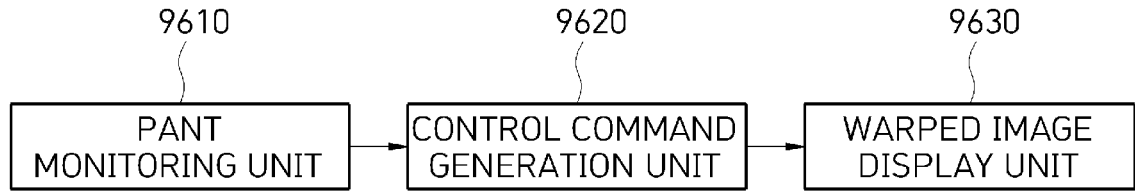

FIG. 96 is a block diagram illustrating a system for warping an image on a vehicle display according to still another embodiment of the present disclosure.

FIGS. 97A and 97B are views illustrating an example of an image based on each occupant's position and an example of warping according to the present embodiment of the present disclosure.

FIG. 98 is a view illustrating the warping of the image according to gaze information of the occupant according to the present embodiment of the present disclosure.

FIG. 99 is a view illustrating the warping of the image according to a distance to the occupant and the gaze information according to the present embodiment of the present disclosure.

Figure 100:
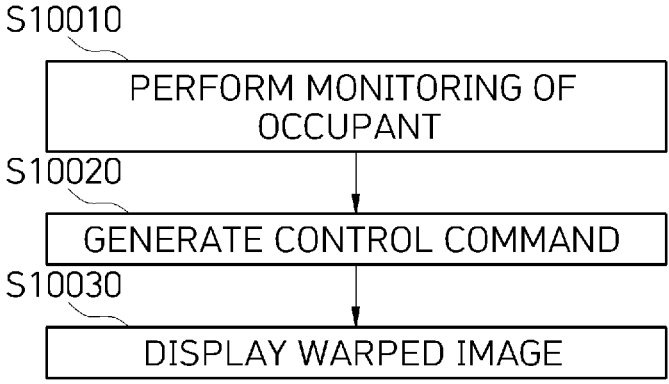

FIG. 100 is a view illustrating a method of warping an image on a vehicle display according to still another embodiment of the present disclosure.

Figure 101:
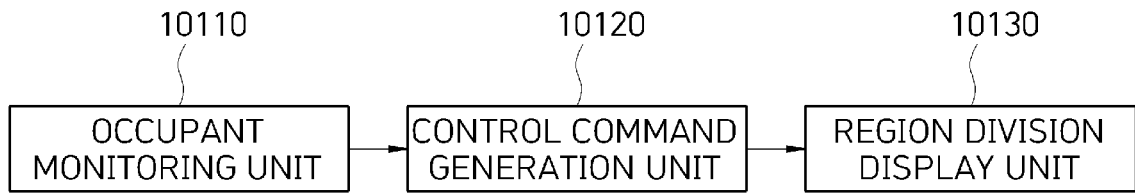

FIG. 101 is a block diagram illustrating a system for controlling a vehicle display according to still another embodiment of the present disclosure.

FIGS. 102A and 102B are views illustrating that the display is divided into regions according to the distance to the occupant according to the present embodiment of the present disclosure.

Figure 103:
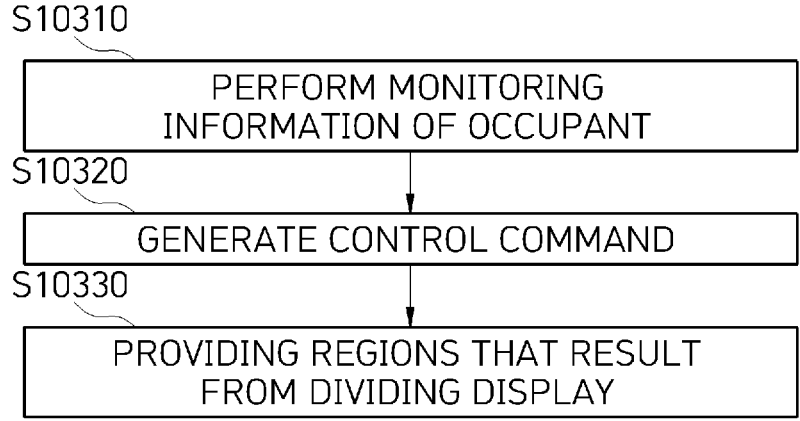

FIG. 103 is a flowchart illustrating a method of controlling a vehicle display according to still another embodiment of the present disclosure.

Figure 104:
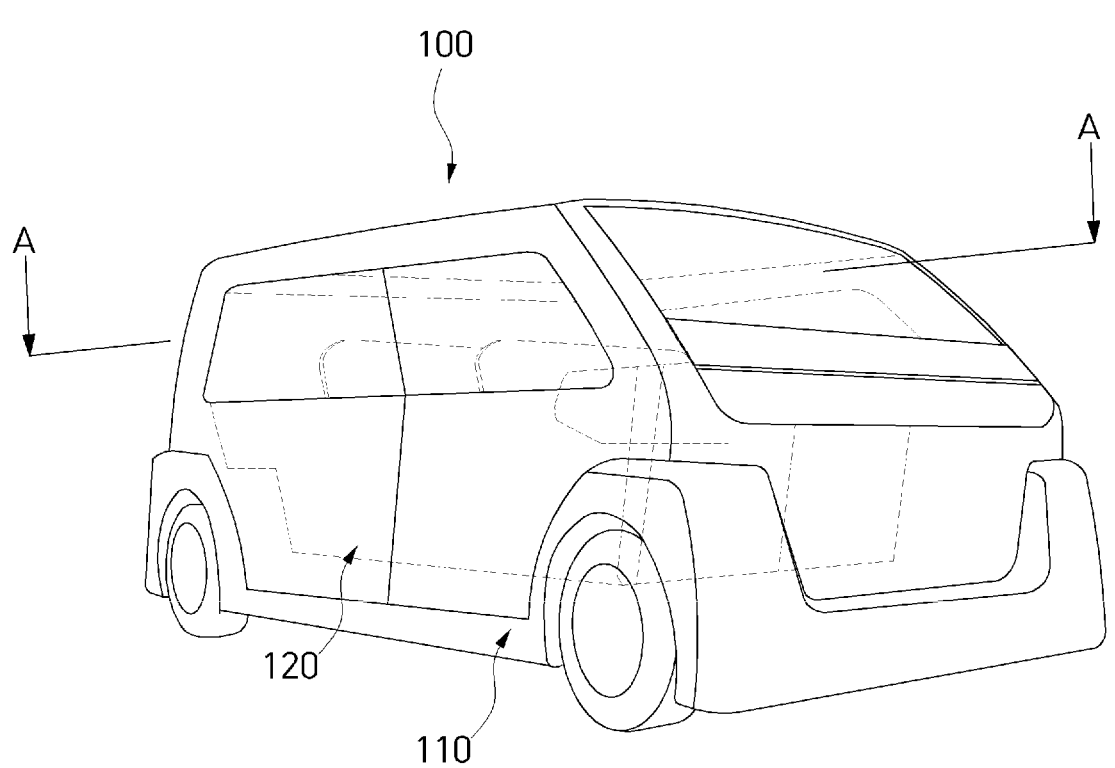

FIG. 104 is a view illustrating a purpose-built vehicle according to still another embodiment of the present disclosure.

Figure 105:
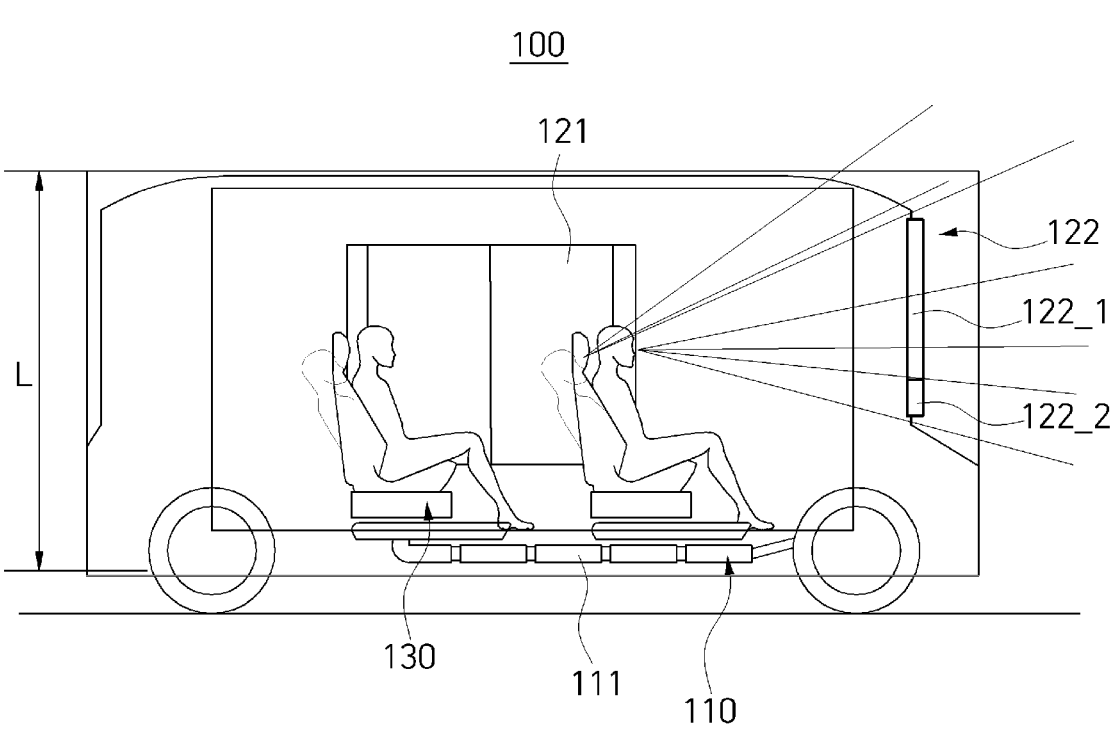

FIG. 105 is a vertical cross-sectional view taken along line A-A on FIG. 104.

Figure 106:
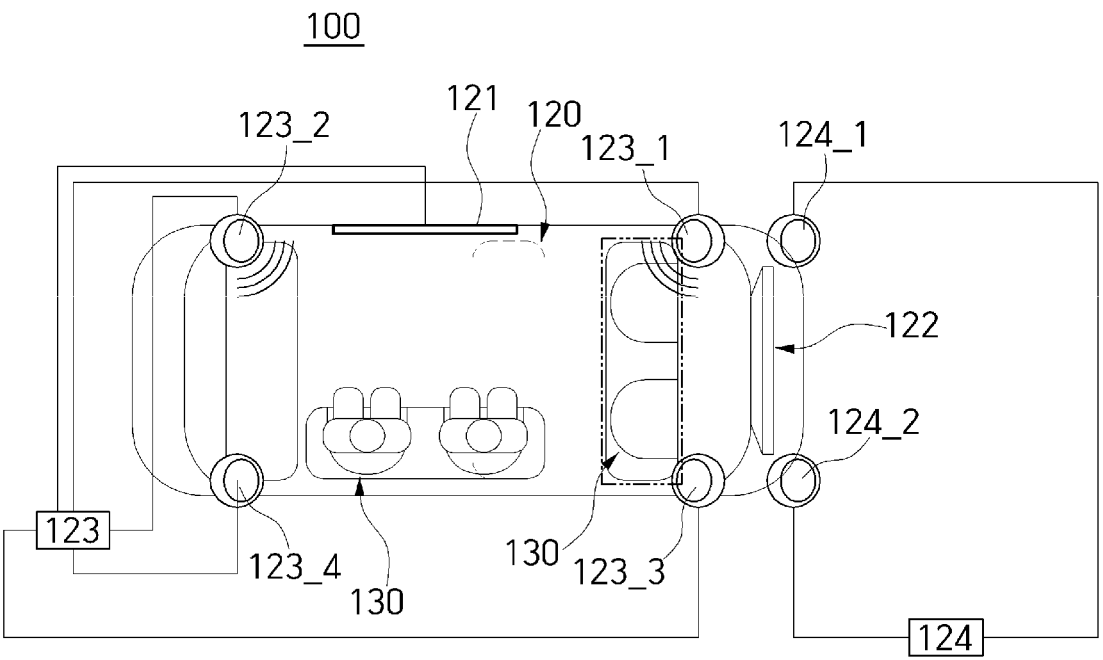
Figure 107:
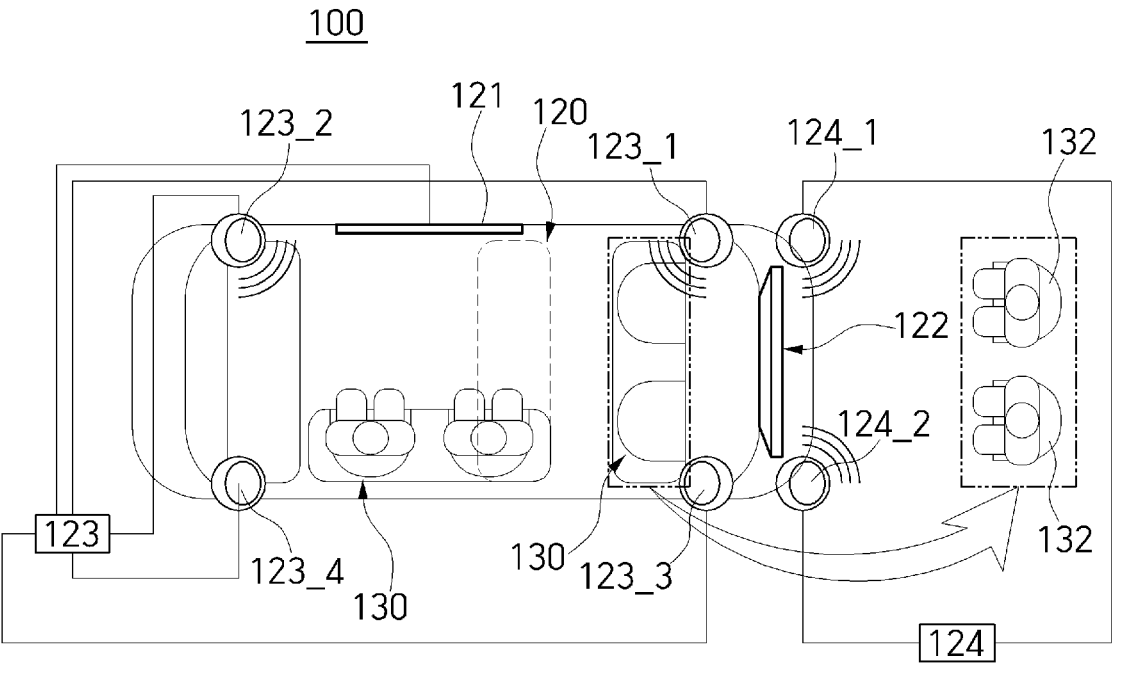
Figure 108:
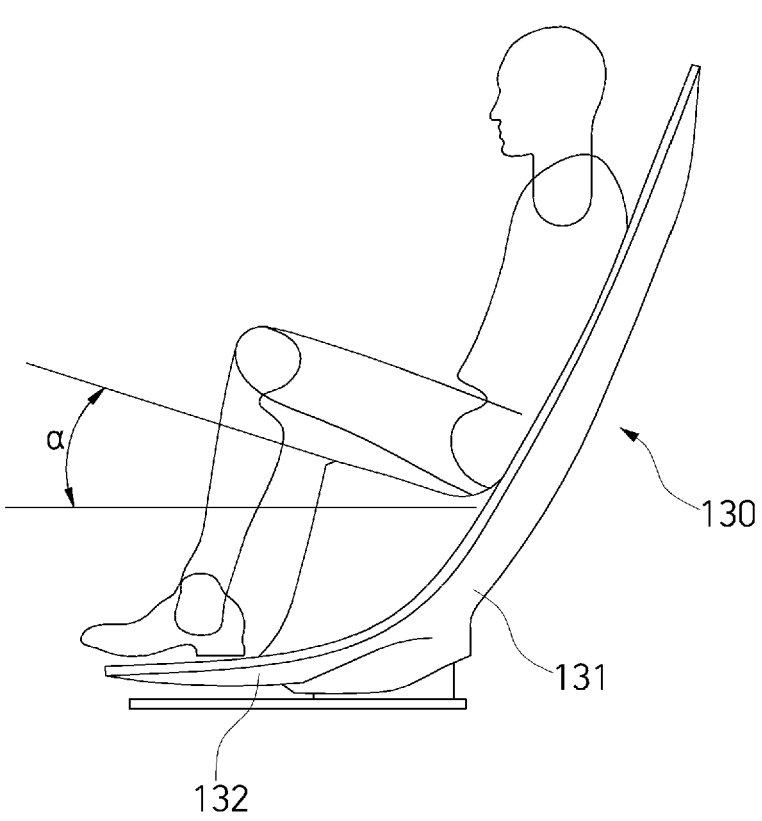
Figure 109:
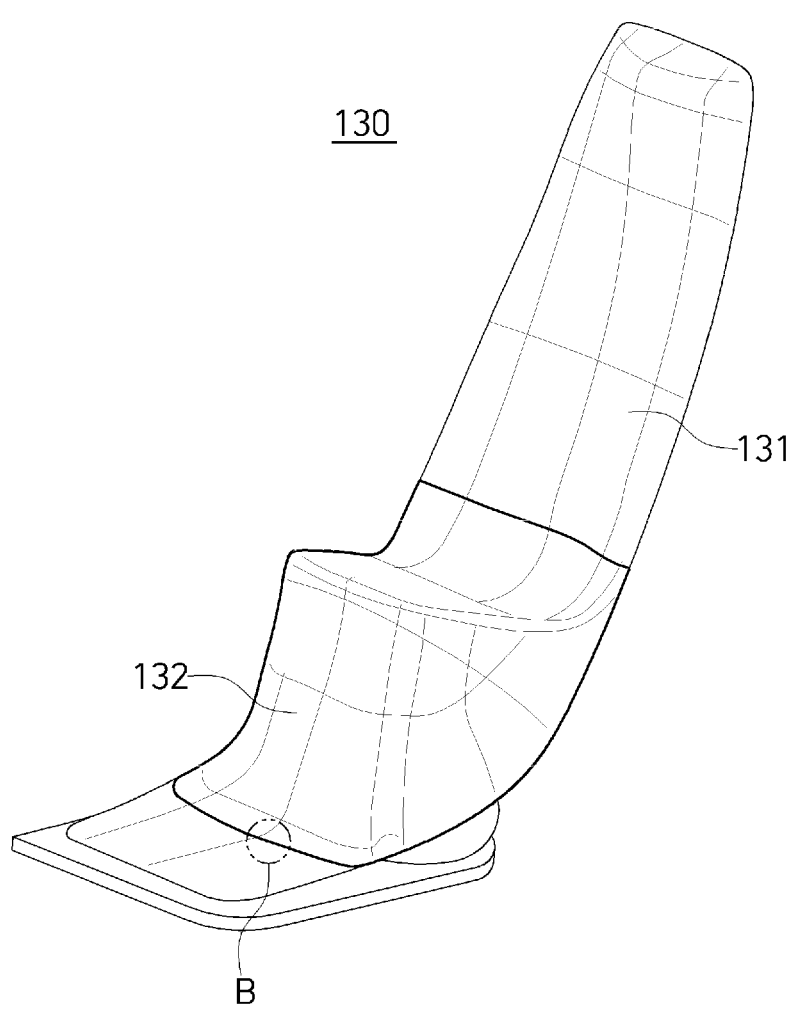
Figure 110:
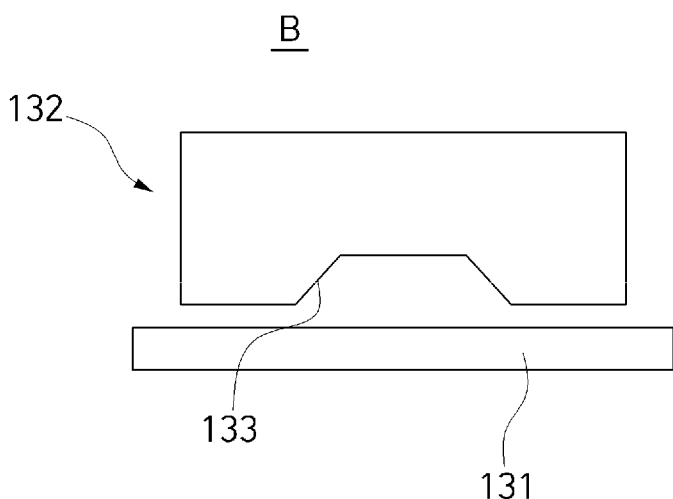
Figure 111:
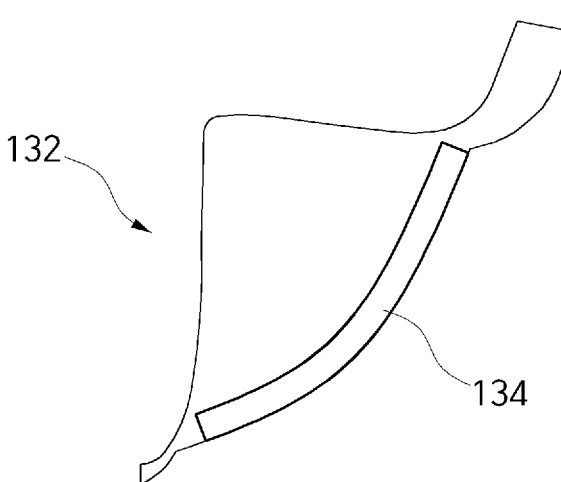
Figure 112:
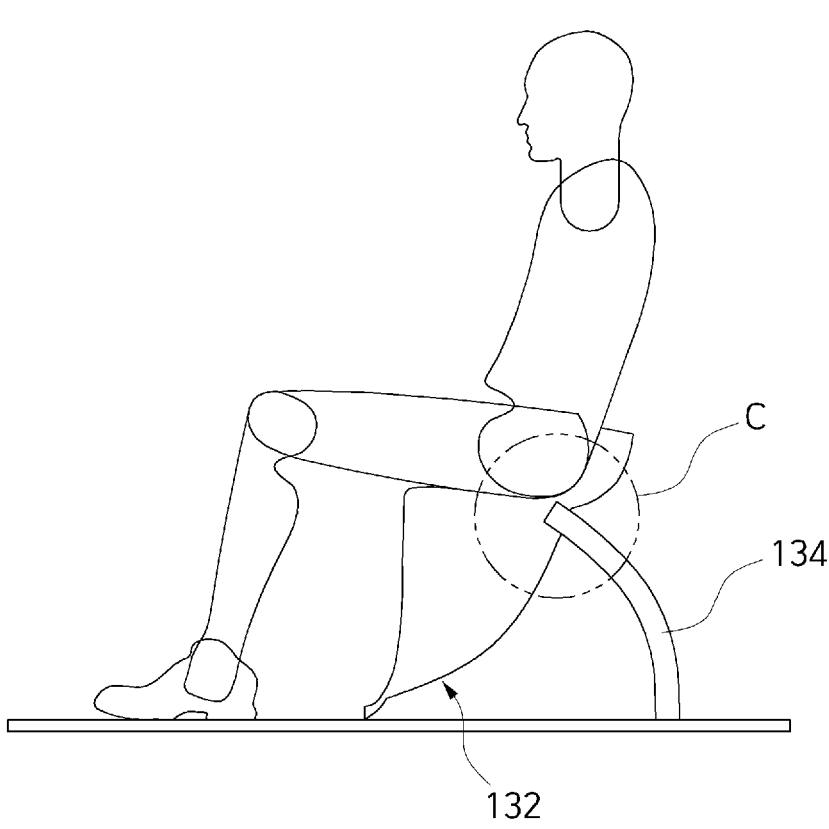

FIGS. 106 and 107 are horizontal cross-sectional views taken along line A-A on FIG. 104.

FIGS. 108 to 114 and FIG. 115 are views illustrating various seat structures, respectively, of the purpose-built vehicle according to the present embodiment of the present disclosure.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
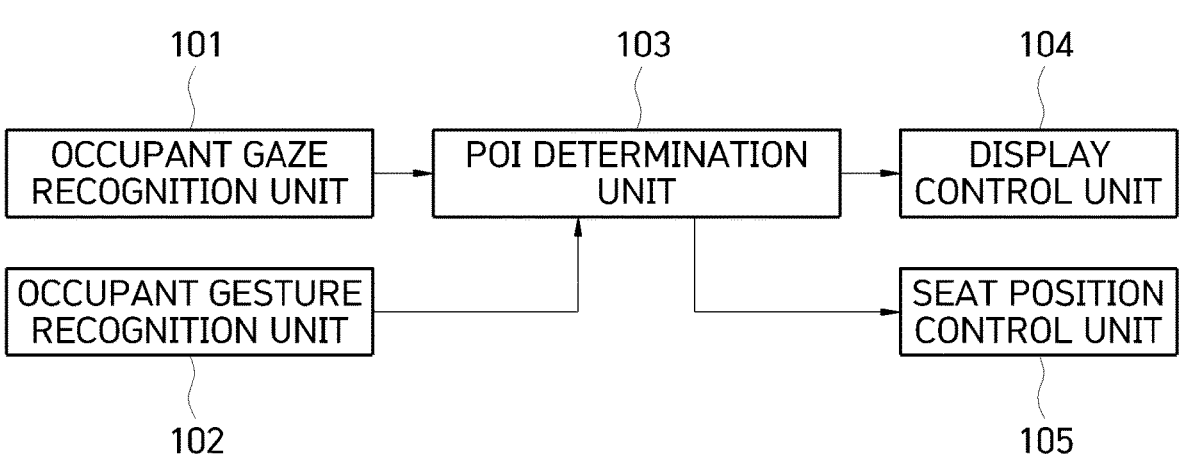
FIG. 1 is a view showing a system for controlling a vehicle based on an occupant's intent according to an embodiment of the present disclosure.

FIG. 1 is a view showing a system for controlling a vehicle based on an occupant's intent according to an embodiment of the present disclosure.

The system for controlling a vehicle based on an occupant's intent according to the embodiment of the present disclosure includes: an occupant gaze recognition unit 101 configured to recognize a gaze of an occupant in a vehicle; a point of interest determination unit 103 configured to determine a point of interest, among external objects viewed through a side window of the vehicle in consideration of the gaze of the occupant; and a seat position control unit 105 configured to change a seat position of the occupant to enable a continuous stare at the point of interest as the vehicle moves.

The system for controlling a vehicle based on an occupant's intent according to the present disclosure further includes: an occupant gesture recognition unit 102 configured to recognize at least any one of a touch input signal of the occupant and an air gesture of the occupant that is applied to the side window of the vehicle configured as a transparent display; and the point of interest determination unit 103 determines the point of interest as at least any one of the touch input signal and the air gesture is recognized.

The seat position control unit 105 transmits a control signal to rotate a seat in which the occupant is seated, in consideration of a traveling direction and travel speed of the vehicle.

The seat position control unit 105 transmits a control signal to rotate a seat of a first occupant, in consideration of gazes of a plurality of vehicle occupants that stare the same point of interest, and transmits a control signal to rotate a seat of a second occupant with forward or backward sliding for the seat of the second occupant.

The system for controlling a vehicle based on an occupant's intent according to the present disclosure further includes a display control unit 104 configured to control, when it is confirmed that the gazes of the plurality of vehicle occupants stare at the same point of interest and then it is determined that a field of view of the second occupant is blocked by the first occupant, an outer area, viewed through a first side window close to a seating position of the first occupant, to be displayed through a second side window close to a seating position of the second occupant. At this time, the seat position control unit 105 transmits the control signal to rotate the seat of the first occupant in a first direction, and transmits the control signal to rotate the seat of the second occupant in an opposite direction to the first direction.

Figure 2:
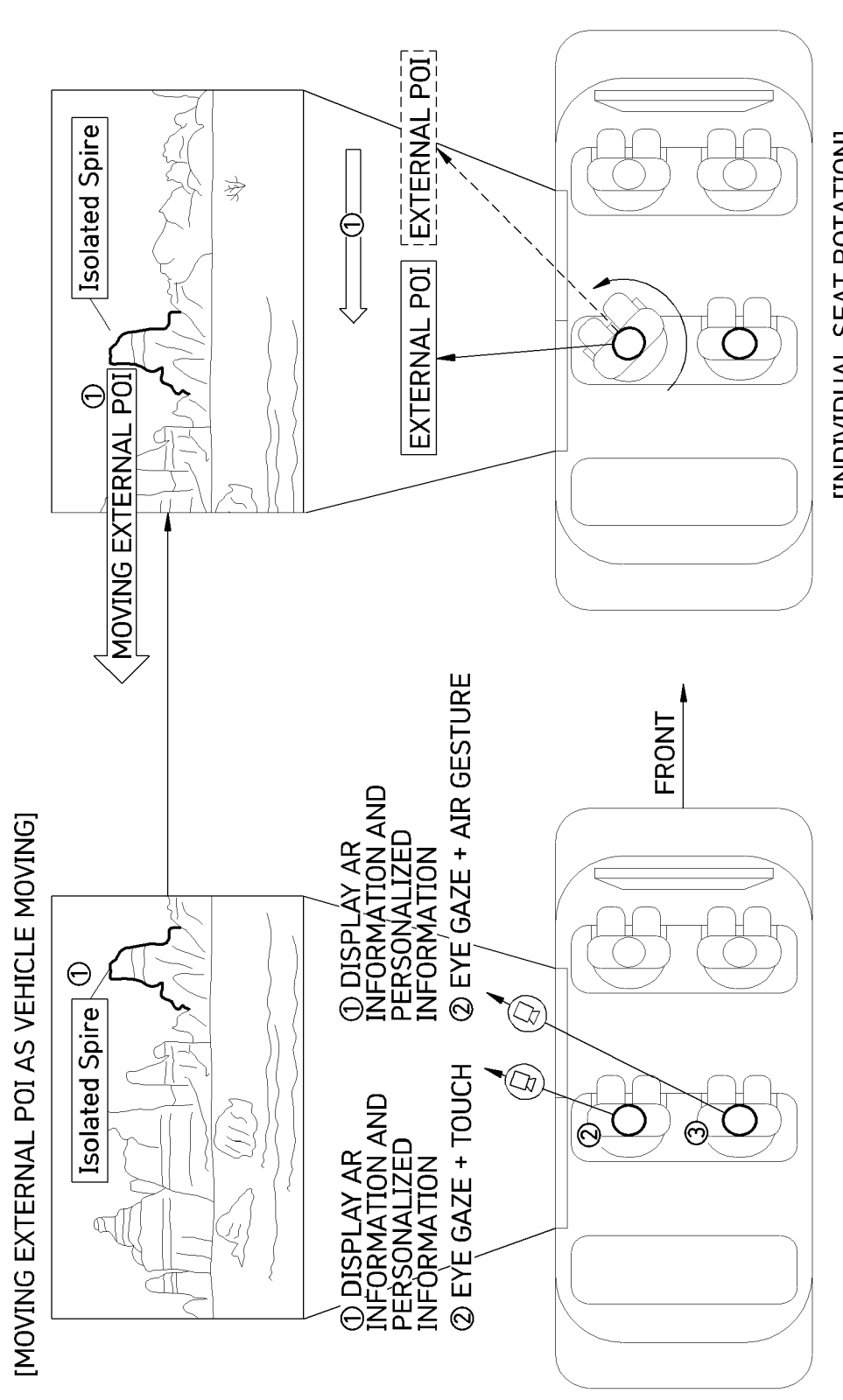
Figure 3:
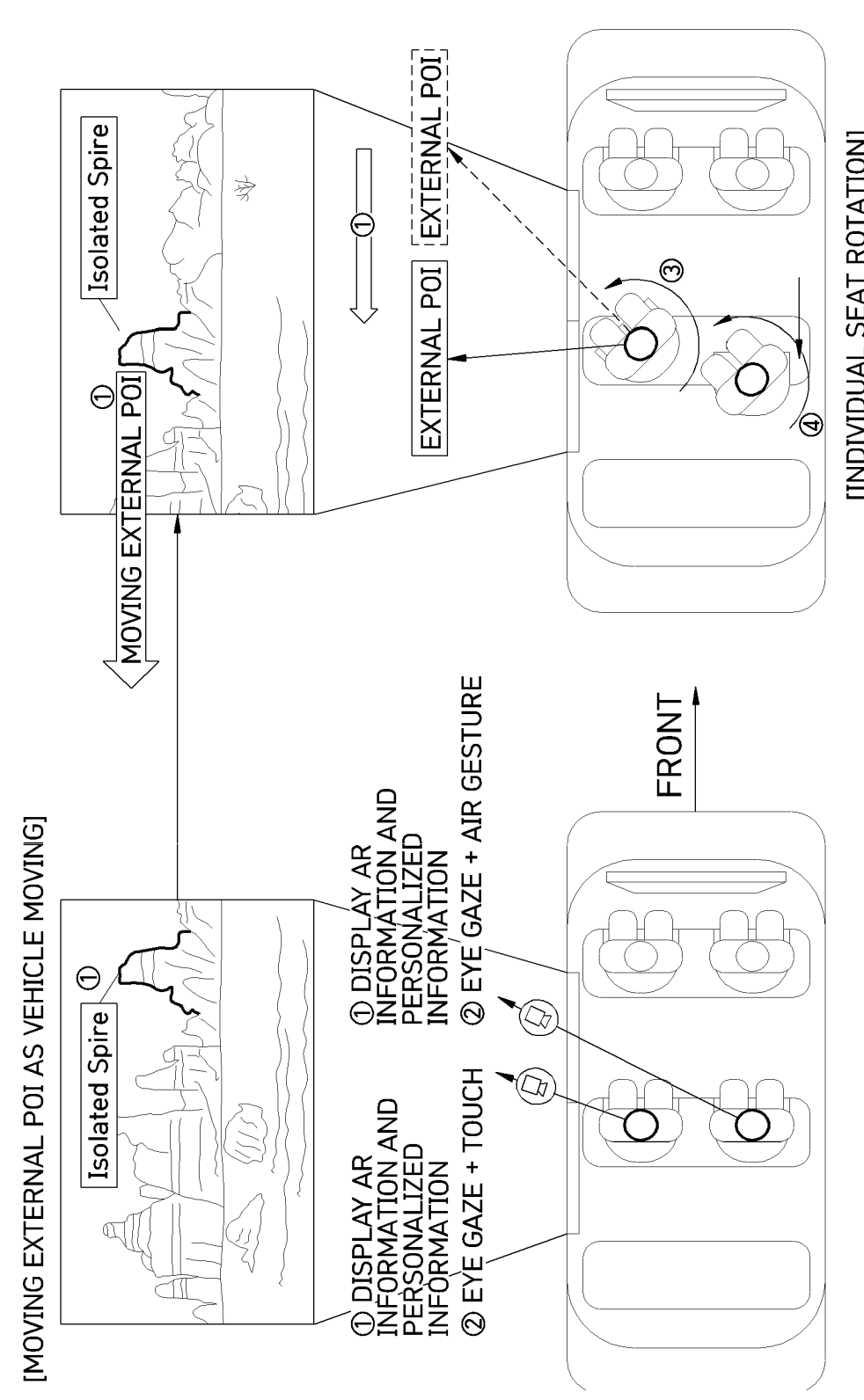

FIGS. 2 to 4 are a view showing an indoor layout change based on an occupant's intent according to the embodiment of the present disclosure.

Referring to FIGS. 2 to 4, it is assumed that among persons in the vehicle traveling forward, there is a first occupant in a left rear seat and a second occupant in a right rear seat.

The first occupant is a person close to a transparent display of a left side window, and performs touch operations on the transparent display, and the second occupant is a person far from the transparent display of the left side window, and performs an operation through an air gesture.

According to the embodiment of the present disclosure, the gaze of the occupant is recognized and augmented reality (AR) information personalized for each occupant based on a gaze information is displayed through the transparent display of the left side window.

Referring to FIG. 2, when the first occupant inputs a touch signal into the area of an external object (isolated spire) viewed through the transparent display of the left side window, the point of interest determination unit 103 determines that an external particular object is the interest object, in consideration of the gaze of the first occupant and the touch signal application area of the first occupant.

The display control unit 104 displays specific information about the interest object through the transparent display of the left side window, in the form of text, images, icons, etc.

In addition, the display control unit 104 may provide the information about the interest object as a sound source through a speaker and may also independently provide the sound source to the first occupant through a directional speaker or a headrest speaker disposed at the left rear seat.

As the vehicle travels forward, the external interest object viewed through the left side window is moved in a left backward direction relative to a vehicle body.

When it is checked that the gaze of the first occupant stays on the interest object and the first occupant turns his/her head in the left backward direction and intends to continuously stare at the interest object, the seat position control unit 105 rotates the left rear seat, on which the first occupant is seated, in a counterclockwise direction, allowing the first occupant to continuously stare at the interest object in a more comfortable position.

At this time, the seat position control unit 105 determines that the first occupant wants to continuously stare at the interest object when a staring duration time of the first occupant for the interest object obtained through the occupant gaze recognition unit 101 is equal to or longer than a preset time, and the seat position control unit 105 controls a rotational speed of the left rear seat on which the first occupant is seated in accordance with the driving speed of the driving vehicle and the relative movement speed of the external interest object.

When the seat position control unit 105 predicts that a sharp seat rotation will be required and will cause discomfort to the first occupant in a case in which the seat is rotated in accordance with the relative movement of the external interest object during high-speed driving equal to or higher than a predetermine speed (e.g., 50 Km/h), the seat position control unit 105 does not perform the rotation operation on the seat.

The occurrence of discomfort is predicted based on a predetermined reference seat rotation speed.

At this time, the seat position control unit 105 determines whether to perform a seat rotation operation based not only on the driving speed of the driving vehicle, but also on a distance information between the external interest object and the vehicle.

For example, in a situation where an external interest object is 50 meters away from the driving vehicle, when the seat is rotated so that the first occupant can continuously stare at the external interest object at the driving speed, a sharp seat rotation is required, whereas when an external interest object is 500 meters away from the driving vehicle, even if the seat is rotated so that the first occupant can continuously stare at the external interest object at the driving speed, a sharp seat rotation is not required.

Thus, the seat position control unit 105 comprehensively considers the driving speed of the driving vehicle and the distance between the external interest object at which the first occupant wants to continuously stare and the driving vehicle, to determine whether to rotate the seat of the first occupant so that the first occupant can continuously and comfortably stare at the external interest object without turning his/her head.

As the vehicle travels further forward, when it is determined that the interest object is out of the range of vision of the first occupant, the seat position control unit 105 rotates the left rear seat, on which the first occupant is seated, in a clockwise direction to return the left rear seat to its original position.

In addition, the seat position control unit 105 rotates the left rear seat, on which the first occupant is seated, in the clockwise direction to return the left rear seat to its original position when the gaze information obtained through the occupant gaze recognition unit 101 no longer stays on the interest object for a certain period of time or longer.

Referring to FIG. 3, it is assumed that the first occupant inputs a touch signal into a corresponding area while staring at an external object (isolated spire) viewed through the transparent display of the left side window, and the second occupant performs a predetermined air gesture while staring at the same external object (isolated spire) viewed through the transparent display of the left side window.

That is, the first occupant and the second occupant designate the same external object as an external point of interest (POI).

The point of interest determination unit 103 and determines that an external particular object is the interest object, in consideration of the gaze of the first occupant, the touch signal application area of the first occupant, the gaze of the second occupant, and the air gesture of the second occupant.

The display control unit 104 displays a specific information of the interest object through the transparent display of the left side window, in the form of text, images, icons, etc.

In addition, the display control unit 104 may provide the information about the interest object as a sound source through a speaker, and in this case, the display control unit 104 may also provide the sound source to the first and second occupants, through a directional speaker facing the occupants seated on the rear seats, a headrest speaker disposed at the left rear seat, and a headrest speaker disposed at the right rear seat.

As the vehicle travels forward, the external interest object viewed through the left side window is moved in the left backward direction relative to the vehicle body.

When it is confirmed that the gazes of the first occupant and the second occupant stay on the interest object and the first occupant and the second occupant are then continuously staring at the interest object by turning their heads in the left backward direction, the seat position control unit 105 rotates the left rear seat, on which the first occupant is seated, in the counterclockwise direction, allowing the first occupant to continuously stare at the interest object in a more comfortable position.

In addition, in consideration of the field of view of the second occupant obscured by the first occupant as the external interest object is relatively moved, the seat position control unit 105 slides the right rear seat, on which the second occupant is seated, backward of the vehicle body and rotates the right rear seat in the counterclockwise direction, so that the second occupant can more easily and continuously stare at the interest object.

As the vehicle travels further forward, when it is determined that the interest object is out of the ranges of visions of the first occupant and the second occupant, the seat position control unit 105 rotates the left rear seat, on which the first occupant is seated, in the clockwise direction, and slides forward the right rear seat on which the second occupant is seated and rotates the right rear seat in the clockwise direction, to return the left and right rear seats to their original seat positions.

Referring to FIG. 4, it is assumed that the first occupant inputs a touch signal into the area while staring at the external object (isolated spire) viewed through the transparent display of the left side window, and the second occupant performs a predetermined air gesture while staring at the same external object (isolated spire) viewed through the transparent display of the left side window.

That is, the first occupant and the second occupant designate the same external object as the external POI.

The point of interest determination unit 103 determines that an external particular object is the interest object, in consideration of the gaze of the first occupant, the touch signal application area of the first occupant, the gaze of the second occupant, and the air gesture of the second occupant.

The display control unit 104 displays the specific information of the interest object through the transparent display of the left side window, in the form of text, images, icons, etc.

In addition, the display control unit 104 may provide the information about the interest object as a sound source through a speaker, and in this case, the display control unit 104 may also provide the sound source to the first and second occupants, through a directional speaker facing the occupants seated on the rear seats, a headrest speaker disposed at the left rear seat, and a headrest speaker disposed at the right rear seat.

As the vehicle travels forward, the external interest object shown through the left side window is moved in a left backward direction relative to the vehicle body.

When it is confirmed that the gaze of the first occupant stays on the interest object and the first occupant is then continuously staring at the interest object by turning his/her head in the left backward direction, the seat position control unit 105 rotates the left rear seat, on which the first occupant is seated, in the counterclockwise direction, allowing the first occupant to continuously stare at the interest object in a more comfortable position.

In addition, in consideration of the field of view of the second occupant blocked by the first occupant as the external interest object is relatively moved, the display control unit 104 duplicates and displays the screen of an outer landscape viewed through the transparent display of the left side window through the display of the right side window, and the seat position control unit 105 rotates the right rear seat, on which the second occupant is seated, in the clockwise direction so that the second occupant can more easily and continuously stare at the interest object through the display of the right side window.

When it is determined that the interest object is out of the ranges of views of the first occupant and the second occupant as the vehicle travels further forward, the seat position control unit 105 rotates the left rear seat, on which the first occupant is seated, in the clockwise direction, and rotates the right rear seat, on which the second occupant is seated, in the counterclockwise direction, to return the left and right rear seats to their original seat positions.

Figure 5:
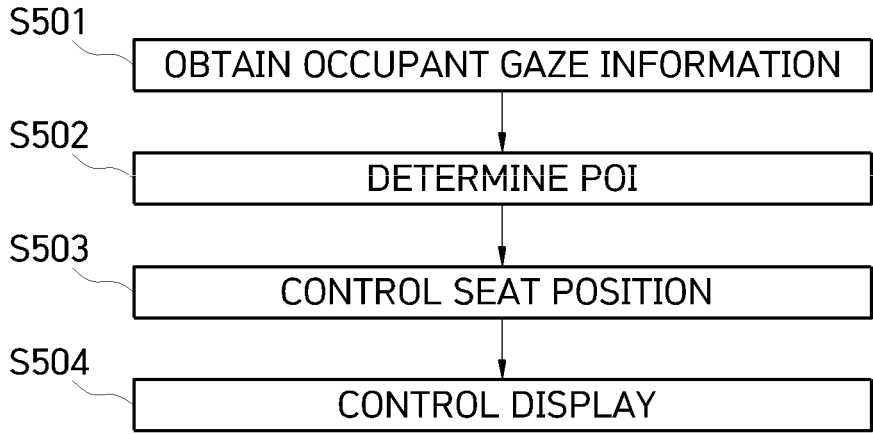
FIG. 5 is a view showing a method for controlling a vehicle based on an occupant's intent according to an embodiment of the present disclosure.

FIG. 5 is a view showing a method of controlling a vehicle based on an occupant's intent according to another embodiment of the present disclosure.

The method of controlling a vehicle based on an occupant's intent according to the embodiment of the present disclosure includes: a step S501 for obtaining gaze information of an occupant in a vehicle; a step S502 for determining a point of interest located outside the vehicle using the gaze information; and a step S503 for changing a seat position of the occupant to enable a continuous stare at the point of interest as the vehicle moves.

In the step S503, a seat on which the occupant is seated is rotated in consideration of the driving direction and driving speed of the vehicle.

When the gaze information of a plurality of occupants is obtained in the step S501, and the points of interest of the plurality of occupants are determined to be the same in the step S502, a seat of a first occupant is rotated, and a seat of a second occupant is slid forward or backward and rotated, in the step S503.

The method of controlling a vehicle based on an occupant's intent according to the present disclosure further includes a step S504 for controlling an outer area, including the points of interest, which are viewed through a first side window close to the seating position of the first occupant, to be displayed through a second side window close to the seating position of the second occupant, when the gaze information of the plurality of occupants is obtained in the step S501 and the points of interest of the plurality of occupants are determined to be the same in the step S502.

Figure 6:
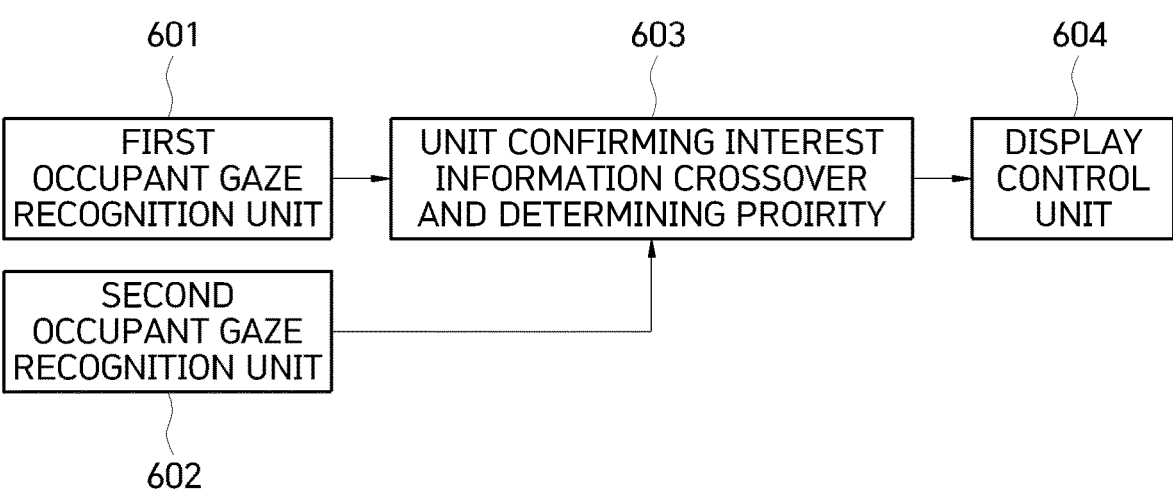
FIG. 6 is a view showing a vehicle display control system based on an occupant's gaze according to another embodiment of the present disclosure.

FIG. 6 is a view showing a vehicle display control system based on an occupant's intent according to another embodiment of the present disclosure.

The vehicle display control system based on an occupant's intent according to the embodiment of the present disclosure includes: a first occupant gaze recognition unit 601 configured to recognize a gaze of a first occupant in a vehicle; a second occupant gaze recognition unit 602 configured to recognize a gaze of a second occupant in the vehicle; a unit for confirming an interest information display area crossover and determining priority 603 configured to determine interest information from the gazes of the first occupant and the second occupant, to confirm whether areas for displaying the interest information crossover with each other on a windshield, and to determine a priority for display; and a display control unit 604 configured to control the display according to the priority for display.

The display control unit 604 performs display control in consideration of a predetermined initiative information when an interest information display area of the first occupant and an interest information display area of the second occupant overlaps with each other.

When the first occupant, not the second occupant, is set to have the initiative, The display control unit 604 performs control to display the interest information display area of the first occupant at a top position while covering the interest information display area of the second occupant with the interest information display area of the first occupant.

When the first occupant, not the second occupant, is set to have the initiative, the display control unit 604 performs control to move the interest information display area of the second occupant and to allow the interest information display area of the second occupant not to overlap with the interest information display area of the first occupant.

The display control unit 604 performs control in consideration of the importance of the interest information when the interest information display area of the first occupant and the interest information display area of the second occupant overlap with each other.

When the display control unit 604 determines that the interest information of the first occupant has the importance higher than that of the interest information of the second occupant, the display control unit 604 performs control not to display the interest information of the second occupant, but to display the interest information of the first occupant.

In consideration of at least any one of the types of content displayed in a display area assigned to the first occupant and an operation situation associated with the display area assigned to the first occupant, the display control unit 604 determines whether to display the interest information of the second occupant in the display area assigned to the first occupant.

Figure 7A:
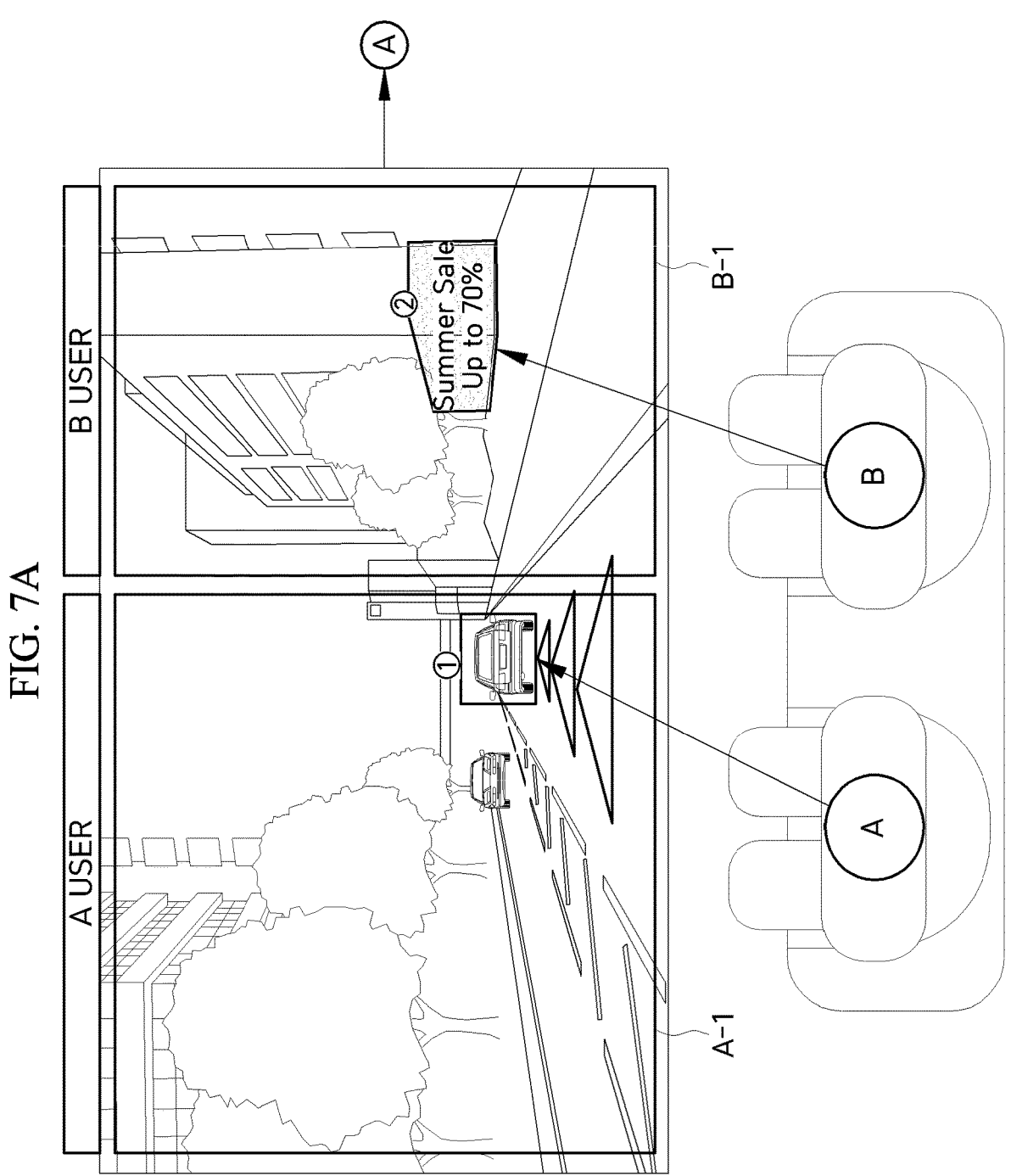
FIG. 7A and FIG. 7B are views showing vehicle windshield display control for each area, in consideration of priority, according to another embodiment of the present disclosure.
Figure 7B:
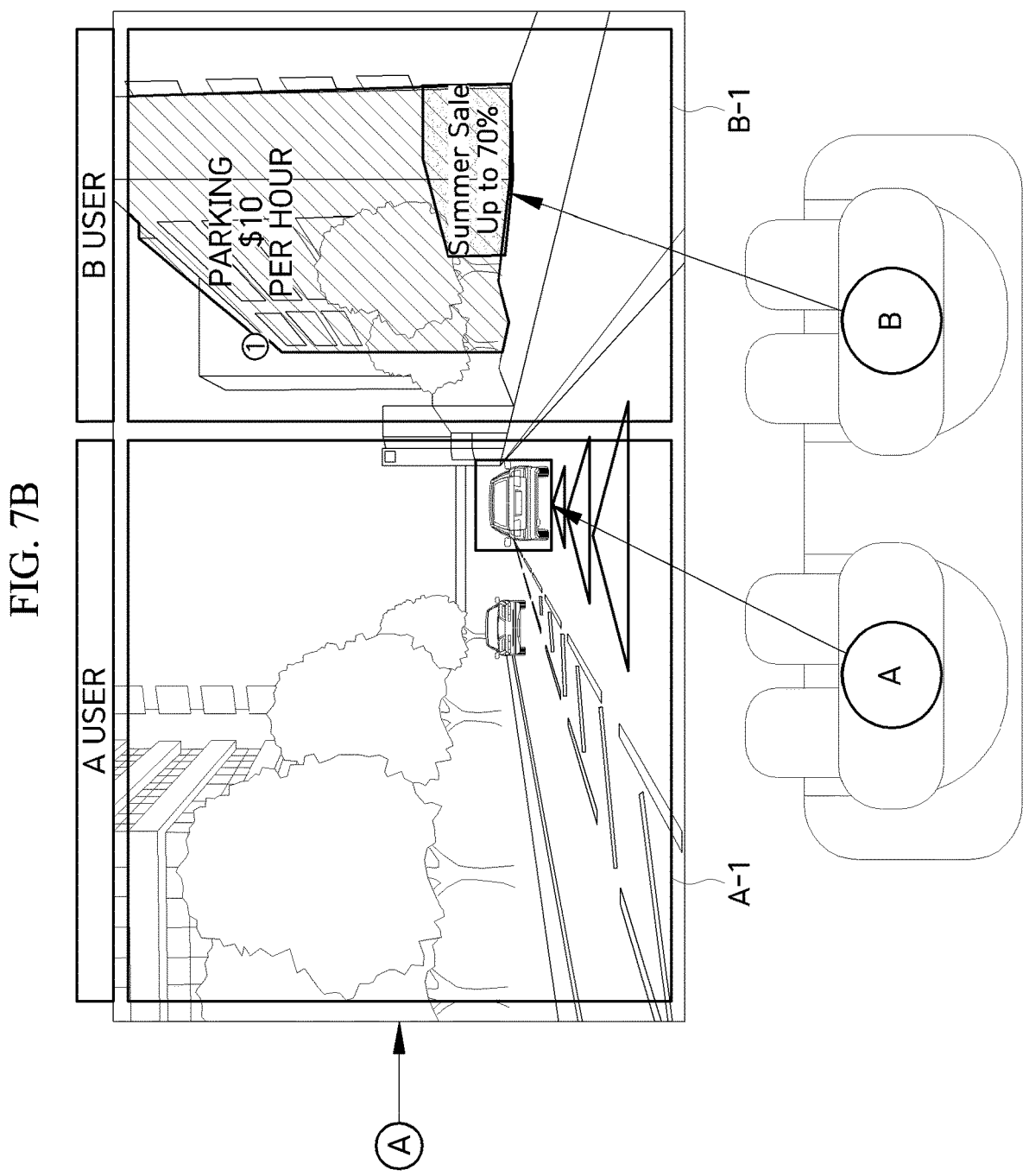

FIG. 7A and FIG. 7B are views showing vehicle windshield display control for each area, in consideration of priority, according to another embodiment of the present disclosure.

Referring to FIG. 7A, a driver A and a passenger B look at external objects through a front windshield of a vehicle.

At this time, when the driver A stares at a forward vehicle located in an area of ① for a preset time or longer, driving-related information is displayed according to a result of tracking a gaze of the driver A, for example, a distance from the forward vehicle, navigation information-based AR route guidance information, etc. are displayed in a first area A-1 of the front windshield which is a transparent display.

The passenger B stares at a store located in an area of ② for the preset time or longer, and accordingly, the information of the store (e.g., summer sale, up to 70%) is displayed in a second area B-1 of the front windshield, which is the transparent display.

Referring to FIG. 7B, the driver A looks at a parking tower (e.g., the parking tower is a destination set on a navigation route) located in the area of ①, and accordingly, the information of the parking tower (e.g., parking cost per hour) is displayed in the second area B-1 of the front windshield, which is the transparent display.

At this time, as described above, a display area (that is, some of the second area B-1 of the front windshield, which is the transparent display) for the information (e.g., summer sale, up to 70%) of the store located in the area of ② (e.g., summer sale, up to 70%) according to the gaze of the passenger B and a display area for the information of the parking tower located in the area of ① according to the gaze of the driver A overlap with each other.

For example, the display control unit 604 performs control to display the external interest information area of the driver A and the external interest information area of the passenger B while overlapping the areas with each other. At this time, on the contrary, as the gaze of the passenger B stares at the store located in the first area A-1, when displaying the information about the store located in the first area A-1 on the front windshield, which is the transparent display, if it is determined that the display area for the information will overlap with the display area for the object at which driver A stares, the display control unit 604 performs control to display only the information about the object, at which the driver A stares, but not to display the external interest information according to the gaze of the passenger B.

As another example, the display control unit 604 confirms that the display priority of the information displayed on the transparent display according to the gaze of driver A is higher than the display level of the information displayed on the transparent display according to the gaze of the passenger B, and displays the external interest information area of the driver A in front of the external interest information area of the passenger B (i.e., some of the external interest information area of the passenger B may be covered).

As still another example, the display control unit 604 confirms that the display priority of the information displayed on the transparent display according to the gaze of the driver A is higher than the display level of the information displayed on the transparent display according to the gaze of the passenger B, and moves the display area for the external interest information of the passenger B so that the display area does not overlap with the display area for the external interest information of the driver A.

For example, in the case of FIG. 7B, the display control unit 604 performs control to move the display area for the information of the store (e.g., summer sale, up to 70%) to the bottom right, so that the display area does not overlap with the display area for the information of the parking tower.

That is, when the driver A, not the passenger B, has the initiative, the display control unit 604 performs control to display the display area for the external interest information, at which the driver A stares, in preference to the display area for the external interest information at which the passenger B stares.

In addition, when the information provided according to the gaze recognition of the occupant is driving, safety-related information (e.g., a lane, a speed limit, a traffic light, information about a distance from a forward vehicle, etc.), the display control unit 604 performs control to display a display area for the external interest information in preference to other information (e.g., store information, etc.) display area.

Figure 8A:
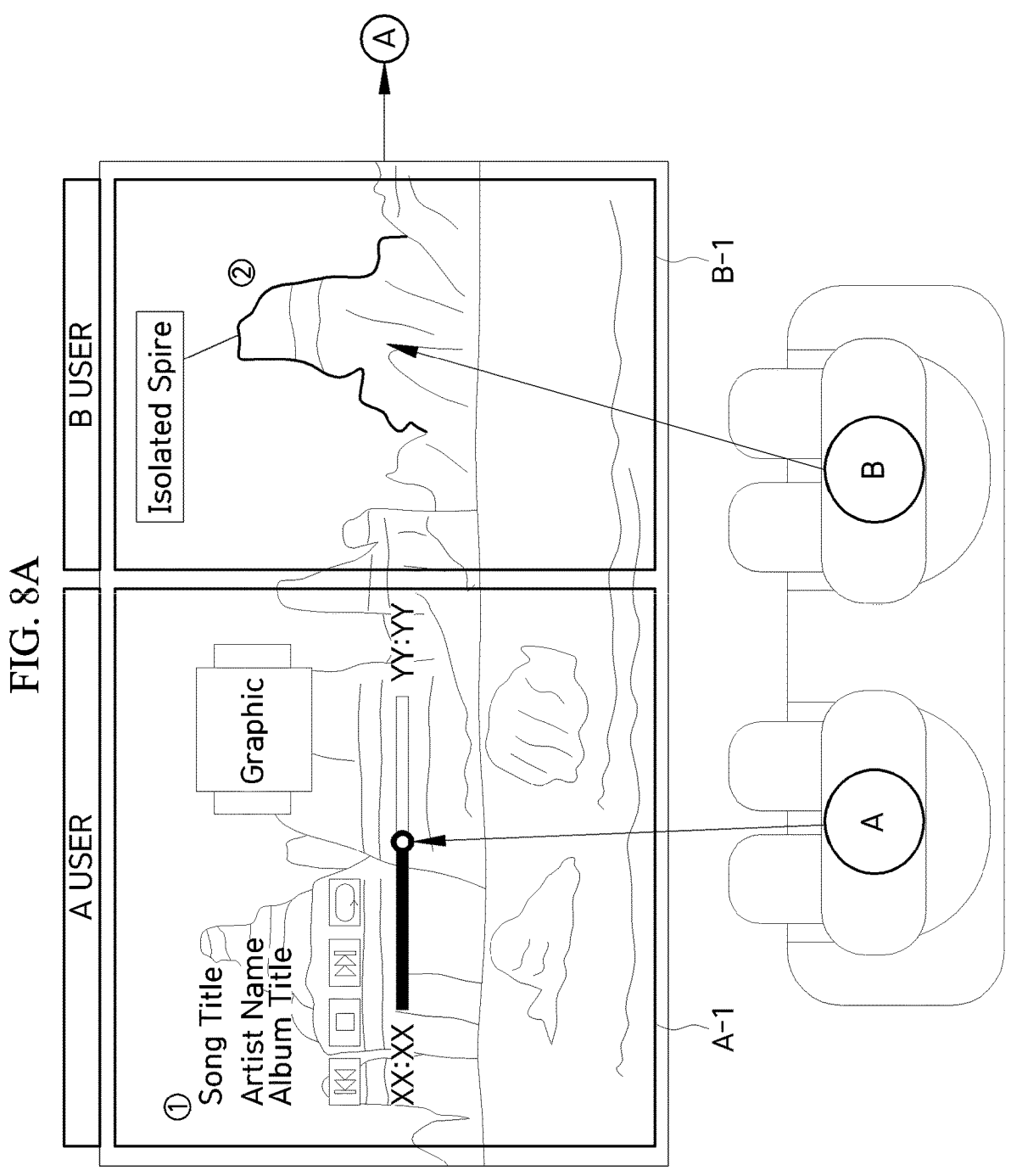
Figure 8B:
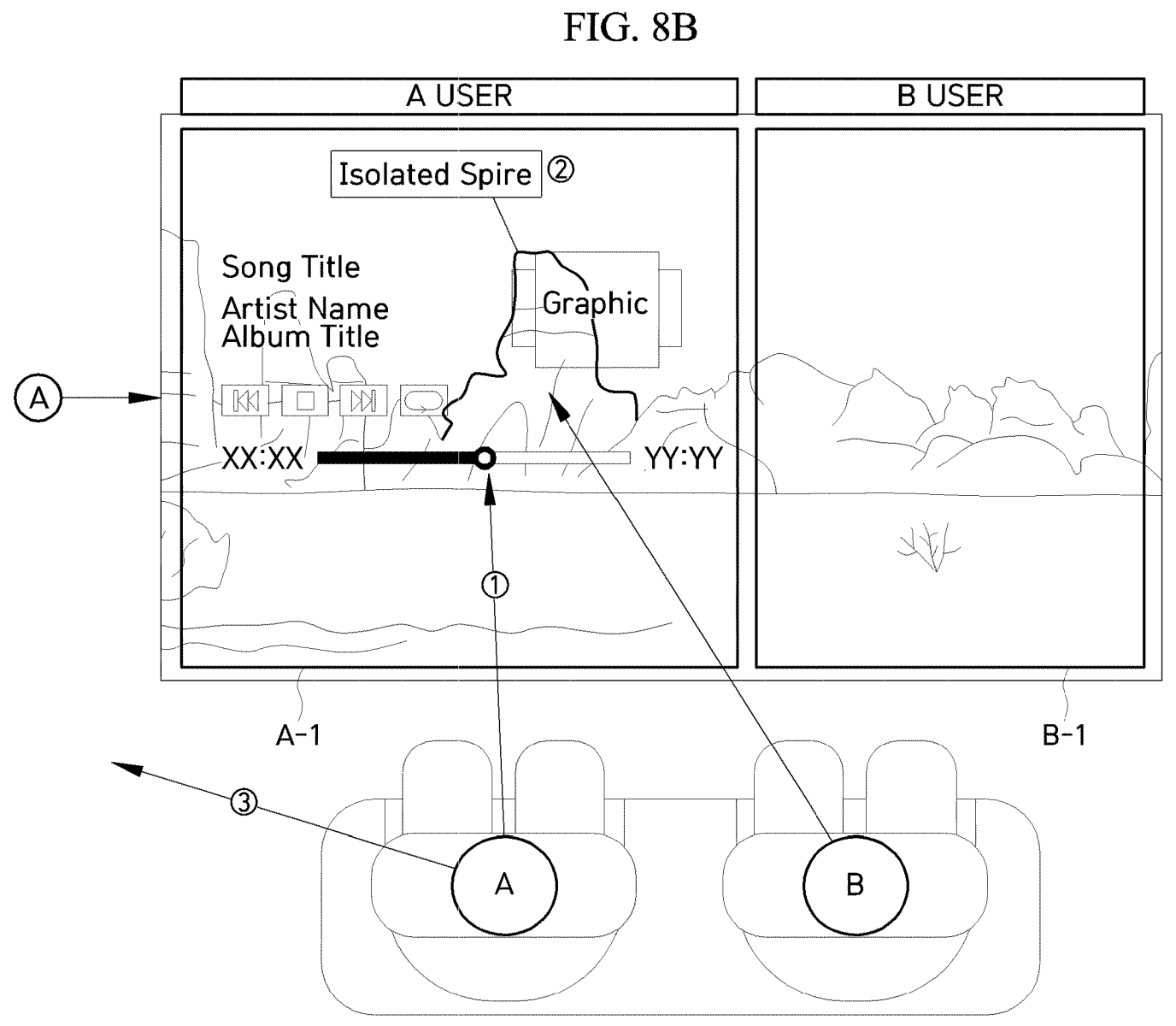

FIG. 8A and FIG. 8B are views showing the vehicle windshield display control for each area, in consideration of priority during a relative movement of an external interest object, according to the embodiment of the present disclosure.

Referring to FIG. 8A, a first occupant A and a second occupant B look an external object through a windshield of a left side window of a vehicle.

At this time, a music player is displayed in a first area A-1 according to the needs of the first occupant A, and an outline of the external interest object (Isolated Spire) is displayed in a second area B-1 according to the needs of the second occupant B.

Referring to FIG. 8B, as the vehicle travels forward, when the interest information of the second occupant B invades a display area A-1 of the first occupant A, the display control unit 604 performs display control for the first area A-1 and the second area B-1 in consideration of the attributes of the content and the gaze monitoring results of the first occupant A.

Referring to FIG. 8B, when the content displayed in the display area A-1 of the first occupant A is a content (e.g., music, weather, movies, etc.) that is not the external interest information based on the gaze information of the first occupant A, depending on the type of content or the screen operation state of the first occupant A, the display control unit 604 determines whether to display the information of the external interest object of the second occupant B on the first area A-1 while the information invades the first area A-1.

When the first occupant A selects music in the first area A-1, the display control unit 604 performs control not to display the information of the external interest object of the second occupant B in the first area A-1 so that the information does not interfere with the screen operation of the first occupant A.

In addition, if the first occupant A is watching a movie in the first area A-1, the display control unit 604 performs control not to display the information of the external interest object of the second occupant B in the first area A-1 so that the information does not interfere with the first occupant A that watches a movie.

As another example, when the first occupant A is not performing an operation on the content execution in the first area A-1, the display control unit 604 performs control to display the information of the external interest object of the second occupant B in the first area A-1.

In addition, if it is confirmed that the first occupant A is staring at another place for a certain period of time or longer, as in ③, the display control unit 604 performs control to display the information of the external interest object of the second occupant B in the first area A-1.

Figure 9:
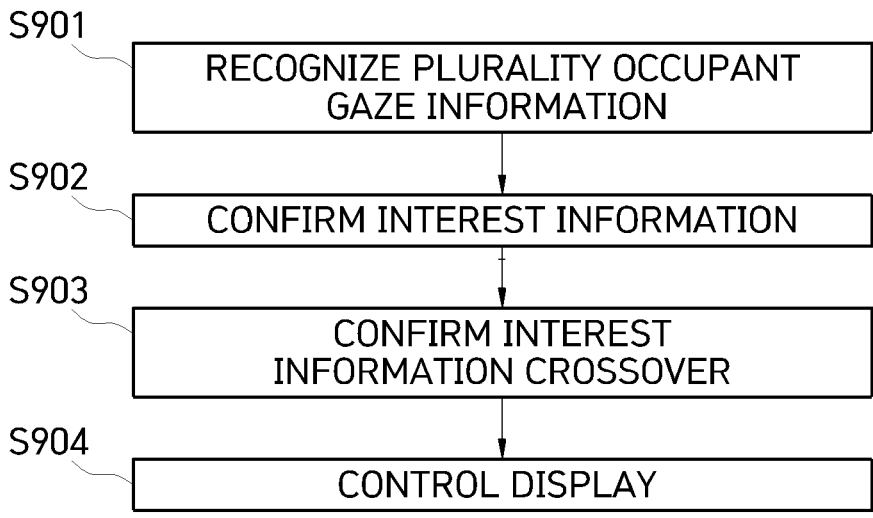
FIG. 9 is a view showing a vehicle display control method based on an occupant's gaze according to another embodiment of the present disclosure.

FIG. 9 is a view showing a vehicle display control method based on an occupant's gaze according to another embodiment of the present disclosure.

The vehicle display control method based on an occupant's gaze according to the embodiment of the present disclosure includes: a step S901 for recognizing gaze information of a plurality of occupants in a vehicle; a step S902 for confirming interest information using the gaze information; a step S903 for confirming whether display areas of the interest information displayed on a windshield being a transparent display crossover with each other; and a step S904 for performing display control when the display areas of the interest information crossover.

In the step S904, the display control is performed in consideration of predetermined initiative information according to the result that it is confirmed that an interest information display area of the first occupant and an interest information display area of the second occupant overlap with each other.

In the step S904, when the first occupant, not the second occupant, is set to have an initiative, the display control is performed such that the interest information display area of the first occupant is displayed at a top position while covering the interest information display area of the second occupant.

In step S904, when the first occupant, not the second occupant, is set to have the initiative, the display control is performed such that the interest information display area of the second occupant is moved so that the interest information display area of the second occupant does not overlap with the interest information display area of the first occupant.

In the step S904, when the interest information display area of the first occupant and the interest information display area of the second occupant overlap with each other, the display control is performed in consideration of the importance of the interest information.

In the step S904, when it is determined that the interest information of the first occupant the importance higher than that of the interest information of the second occupant, the display control is performed such that the interest information of the second occupant is not displayed, but the interest information of the first occupant is displayed.

In the step S904, in consideration of at least any one of the types of content displayed in the display area assigned to the first occupant and the operation situation associated with the display area assigned to the first occupant, it is determined whether to display the interest information of the second occupant in the display area assigned to the first occupant.

FIG. 10 is a view showing an external interest information display area determination and vehicle display control system based on an occupant's gaze according to another embodiment of the present disclosure.

The external interest information display area determination and vehicle display control system based on an occupant's gaze according to the embodiment of the present disclosure includes: a first occupant gaze recognition unit 1001 configured to recognize a gaze of a first occupant in a vehicle; an external interest information confirmation unit 1003 of the first occupant configured to confirm an external interest information of the first occupant from the gaze of the first occupant; a second occupant gaze recognition unit 1002 configured to recognize a gaze of a second occupant in the vehicle; an external interest information confirmation unit 1004 of the second occupant configured to confirm the external interest information of the second occupant from the gaze of the second occupant; an external interest information display area confirmation unit 1005 configured to confirm a display area for external interest information of the first occupant and a display area for external interest information of the second occupant; and a display control unit 1006 configured to determine a priority for display, in consideration of a recognition influence on the display area for the external interest information of the first occupant by the display area for the external interest information of the second occupant with relatively low information display importance.

When it is determined that the recognition influence is equal to or lower a predetermined value, the display control unit 1006 performs display control to display the external interest information of the second occupant together with the external interest information of the first occupant.

When it is determined that the recognition influence exceeds the predetermined value, the display control unit 1006 performs display control not to display the external interest information of the second occupant, but to display only the external interest information of the first occupant.

When it is determined that the recognition influence exceeds the predetermined value, the display control unit 1006 performs display control to move the display area for the external interest information of the second occupant so that the moved display area for the external interest information of the second occupant does not invade the display area for the external interest information of the first occupant.

The display control unit 1006 performs display control to display an outline information about an original position of an external interest object of the second occupant.

Figure 11A:
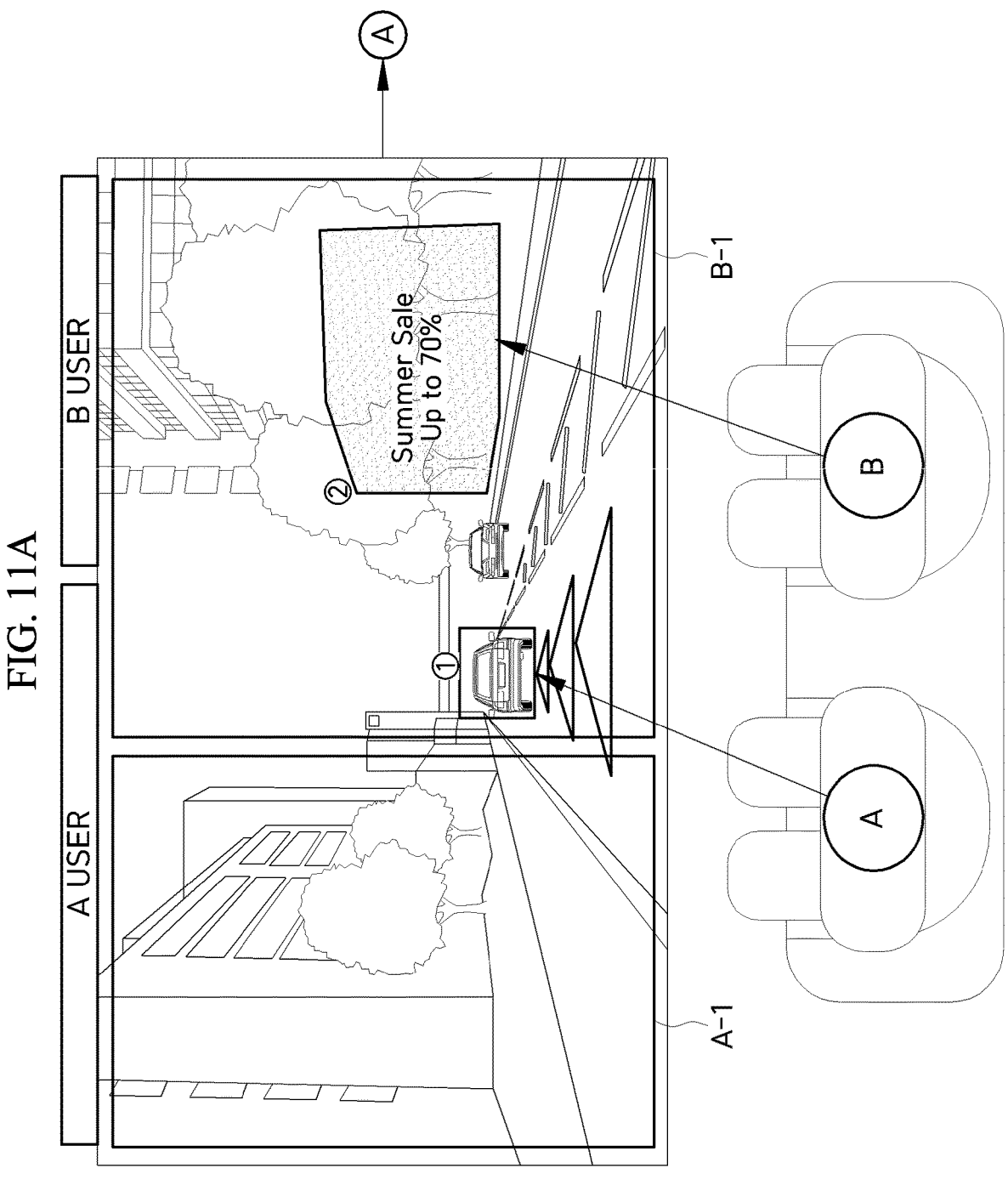
FIG. 11A to FIG. 11C are views showing external interest information display area determination and display control according to another embodiment of the present disclosure.
Figure 11B:
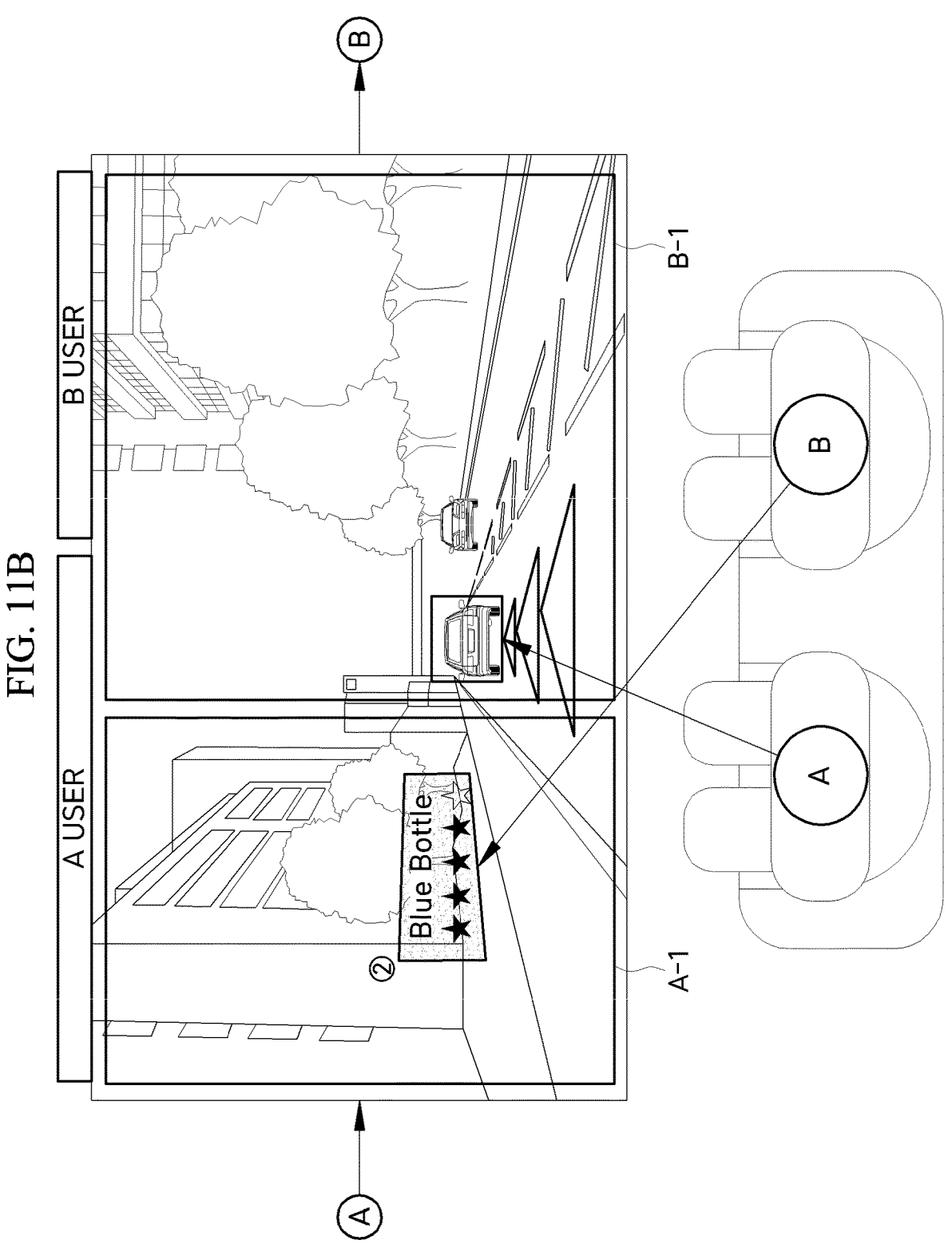
Figure 11C:
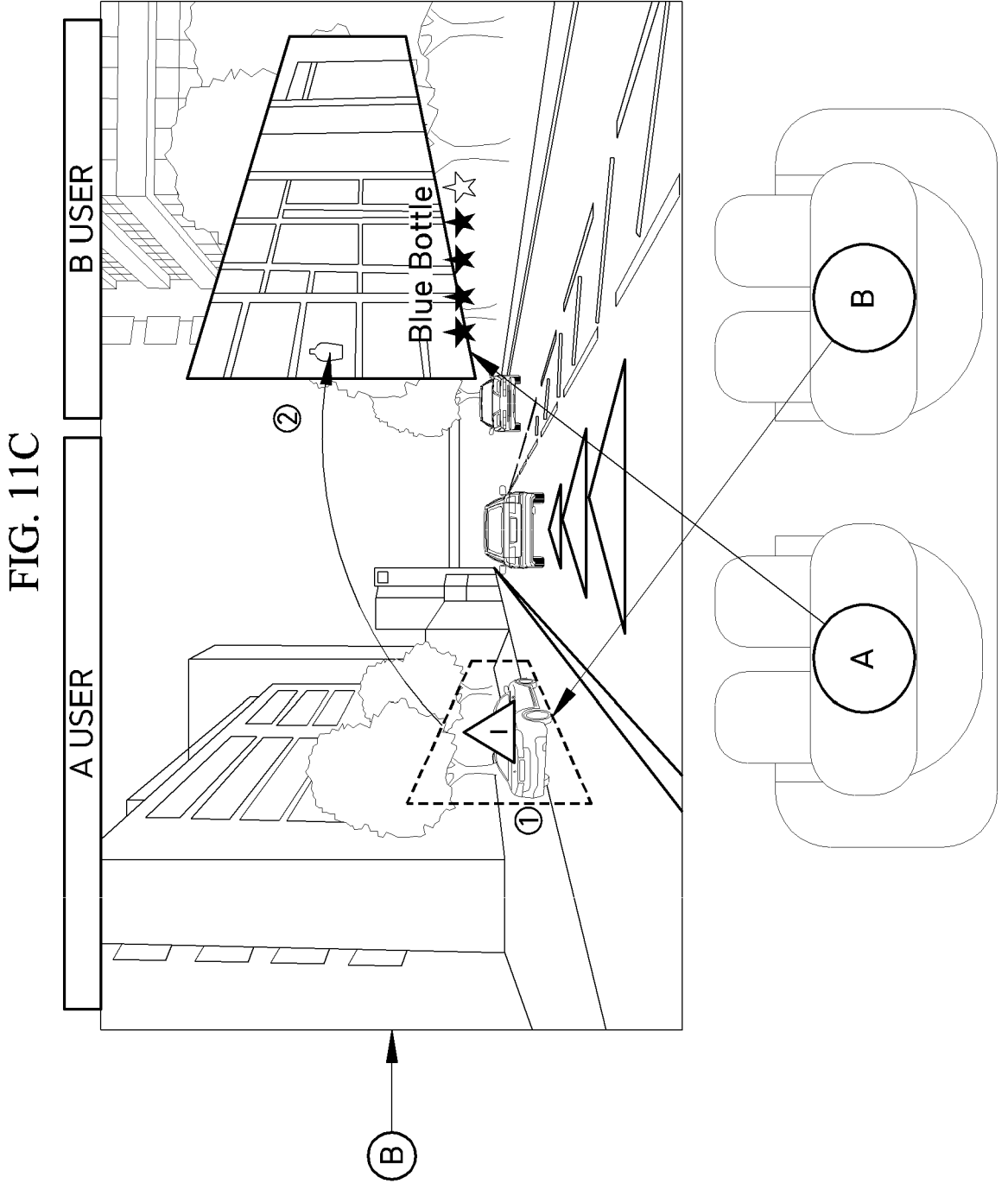

FIG. 11A to FIG. 11C are views showing external interest information display area determination and display control according to another embodiment of the present disclosure.

Referring to FIG. 11, a driver A and a passenger B in a vehicle look at external objects through a front windshield of the vehicle.

Referring to FIG. 11A, when the driver A stares at a forward vehicle located in the area of ① for a preset time or longer, driving-related information is displayed according to a result of tracking a gaze of the driver A, for example, a distance from the forward vehicle, navigation information-based AR route guidance information, etc. are displayed in a first area A-1 of the front windshield configured as a transparent display. The passenger B stares at a store located in the area of ② for the preset time or longer, and accordingly, the information of the store (e.g., summer sale, up to 70%) is displayed in a second area B-1 of the front windshield, which is a transparent display.

Referring to FIG. 11B, according to the gaze movement of the passenger B, a display area for the external interest information corresponding too is moved to the first area A-1.

At this time, the display control unit 1006 performs control to display the external interest information of the passenger B in the first area A-1 when it is confirmed that the display area for the external interest information of the passenger B does not overlap with the display area for the external interest information of the driver A.

Referring to FIG. 11C, according to the gaze movement of the driver A, a rear side warning notification corresponding to ① is displayed as the external interest information of the driver A.

In this case, it is determined that the display area for the external interest information of the passenger B described in FIG. 11B overlaps with the display area for the external interest information of the driver A, and the display control unit 1006 determines whether to display the external interest information of the passenger B.

At this time, the display control unit 1006 monitors the gaze information of the driver A and does not display the external interest information of the passenger B until the display area for the external interest information of the driver A does not overlap with the display area for the external interest information of the passenger B.

As another example, as shown in FIG. 11C, the display control unit 1006 moves the display area for the external interest information of passenger B so that the display area for the external interest information of the passenger B does not overlap with the display area for the external interest information of the driver A.

As shown in FIG. 11C, the display control unit 1006 moves the display area for the external interest information of the passenger B to the second area B-1 so that no obstacle interferes with the driver A to confirm the external interest information.

The display control unit 1006 performs control to display the external interest information of the passenger B as AR or displayed as a camera video.

The display control unit 1006 continuously displays the position of the external interest object of the passenger B in the form of a dotted line so that the position is recognized, and thus the display control unit 1006 performs control for the position display not to interfere with the gaze of the driver A.

Figure 12:
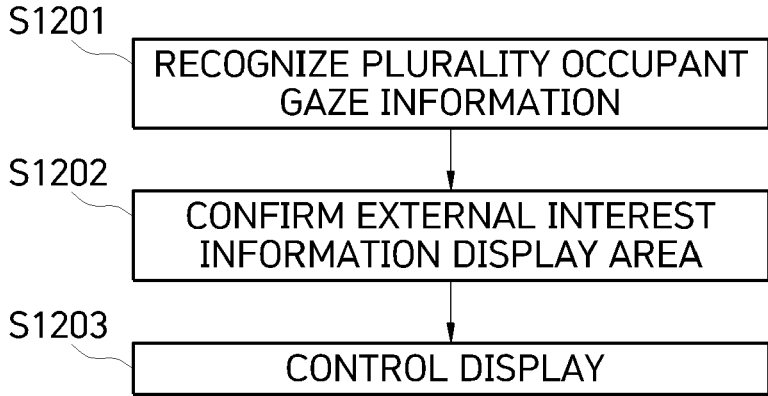
FIG. 12 is a view showing an external interest information display area determination and vehicle display control method based on an occupant's gaze according to another embodiment of the present disclosure.

FIG. 12 is a view showing an external interest information display area determination and vehicle display control method based on an occupant's gaze according to another embodiment of the present disclosure.

The external interest information display area determination and vehicle display control method based on an occupant's gaze according to the embodiment of the present disclosure includes: a step S1201 for recognizing gaze information of a first occupant and a second occupant in a vehicle; a step S1202 for confirming a display area for external interest information of the first occupant and a display area for external interest information of the second occupant using the gaze information of the first occupant and the second occupant; and a step S1203 for determining a priority for display and controlling the display in consideration of an recognition influence on the display area for the external interest information of the first occupant by the display area for the external interest information of the second occupant with relatively low information display importance.

In the step S1203, when it is determined that the recognition influence is equal to or lower than a predetermined value, the display control is performed such that the external interest information of the second occupant is displayed together with the external interest information of the first occupant.

In step S1203, when it is determined that the recognition influence exceeds the predetermined value, the display control is performed such that the external interest information of the second occupant is not displayed, but only the external interest information of the first occupant is displayed.

In step S1203, when it is determined that the recognition influence exceeds the predetermined value, the display control is performed such that the display area for the external interest information of the second occupant is moved, and the moved display area for the external interest information of the second occupant does not invade the display area for the external interest information of the first occupant.

In step S1203, the display control is performed such that an outline information about an original position of the external interest object of the second occupant is displayed.

Figure 13:
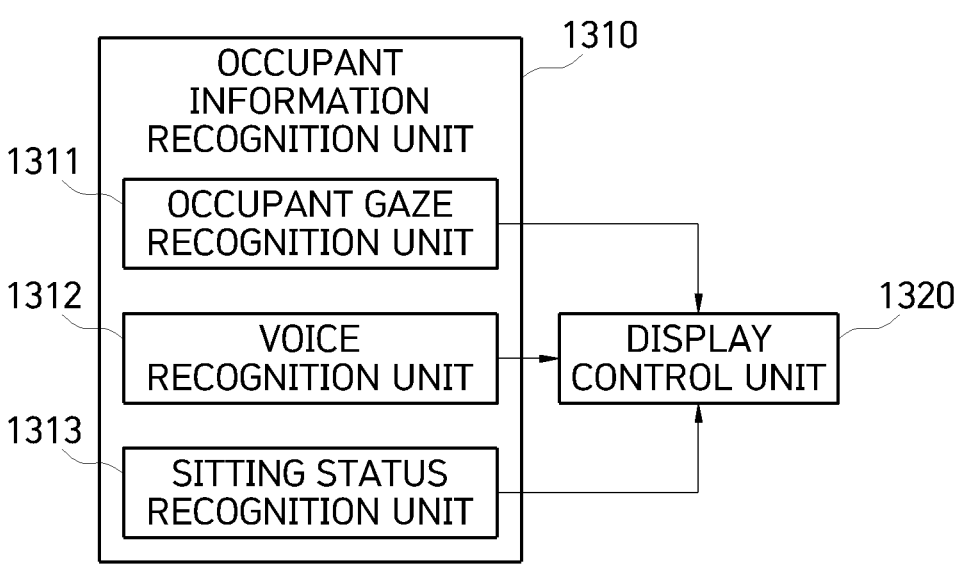
FIG. 13 is a view showing an occupant gaze departure determination and vehicle display control system according to another embodiment of the present disclosure.

FIG. 13 is a view showing an occupant gaze departure determination and vehicle display control system according to another embodiment of the present disclosure.

The occupant gaze departure determination and vehicle display control system according to the embodiment of the present disclosure includes: an occupant information recognition unit 1310 configured to recognize behavioral information related to viewing a display screen of an occupant in a vehicle; and a display control unit 1320 configured to perform control over the vehicle display using the behavior information related to viewing the display screen, and the display control unit 1320 analyzes the behavioral information related to viewing the display screen to determine that a gaze of the occupant departs from a display screen area, and accordingly, performs display control.

The occupant information recognition unit 1310 includes an occupant gaze recognition unit 1311 configured to obtain the gaze information of the occupant in the vehicle and recognize whether the gaze of the occupant in the vehicle departs from the display screen area, and a departure duration time.

The display control unit 1320 performs control to blur the screen of a video content when the duration time that the gaze of the occupant departs from the display screen area exceeds a preset time.

The occupant information recognition unit 1310 further includes a voice recognition unit 1312 configured to obtain in-vehicle voice information, and the display control unit 1320 confirms that a call or in-vehicle conversation is in progress, using the in-vehicle voice information, and performs control to pause for playback of video content corresponding to video playback.

The display control unit 1320 confirms that the call or in-vehicle conversation is in progress, using the in-vehicle voice information, and performs control to lower a playback volume of the video content.

The display control unit 1320 performs control to display a wallpaper rather than the video content when the departure duration time lasts for the preset time or longer.

The occupant information recognition unit 1310 further includes a sitting status recognition unit 1313 configured to recognize the occupant's sitting status for a seat in the vehicle, and the display control unit 1320 performs control to confirm the occupant approaching the seat to auto-play the video content when a first occupant who has the initiative is seated on the seat.

When it is confirmed that a second occupant who has no initiative is seated on the seat, the display control unit 1320 assigns a portion of the display screen area to the second occupant.

The display control unit 1320 performs control to display the external interest information of the second occupant beyond the area assigned to the second occupant, in consideration of at least any one of authorization setting information of the first occupant and boarding status information of the first occupant.

When the first occupant leaves the vehicle, the display control unit 1320 performs control to display a function previously used by the second occupant on the screen in consideration of usage history information of the second occupant.

FIGS. 14 to 17 are views showing an example of vehicle display control in an occupant gaze departure situation according to another embodiment of the present disclosure.

Referring to FIG. 14, when a gaze of an occupant (who has the initiative) who is watching a video content being played on a vehicle display deviates from a screen, the display control unit 1320 performs control to blur the screen of the vehicle display so that the video content displayed on the screen does not interfere with the occupant.

At this time, when it is determined that the occupant makes a call, or talks to another occupant in the vehicle, or is leaning on the seat with his eyes closed, etc., that is, when it is determined that the occupant has no intent to watch the video content, the display control unit 1320 performs control to lower the playback volume of the video content.

At this time, when the video content corresponds to video playback rather than real-time playback, such as TV content, the display control unit 1320 performs control to pause the video content.

Figure 15:
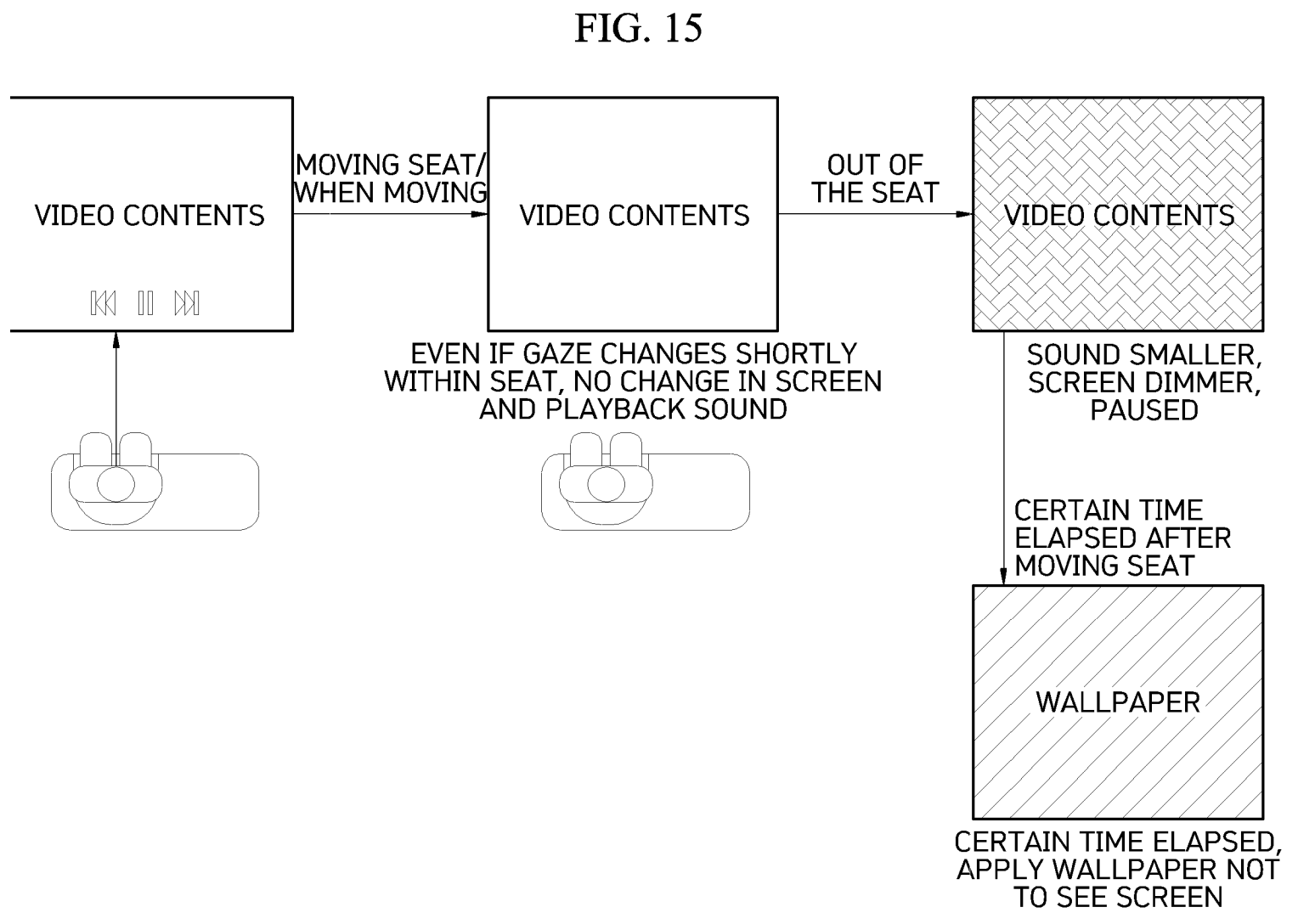

Referring to FIG. 15, when the occupant that is watching the video content being played on the vehicle display moves to another seat or moves, if the gaze movement of the occupant is within a reference value (e.g., if the gaze returns back into the screen area within 3 seconds) even if the gaze of the occupant is out of a preset range (e.g.: screen area), the display control unit 1320 performs control to play back the video content as it is without changing the video content screen and playback sound.

When the occupant leaves the seat, the display control unit 1320 performs control to lower the playback volume of the video content, to blur the vehicle display screen (at this time, control to lower the playback volume decreases sequentially over time from the moment that the occupant leaves the seat, and to gradually blur the screen), and to pauses the video content if the video content corresponds to video playback rather than real-time playback.

If the occupant does not return to the seat even after the preset time from the moment that the occupant leaves the seat, the display control unit 1320 performs control to convert the screen on which the video content is played into a wallpaper to display the wallpaper so that no other occupant cannot see the screen.

Figure 16:
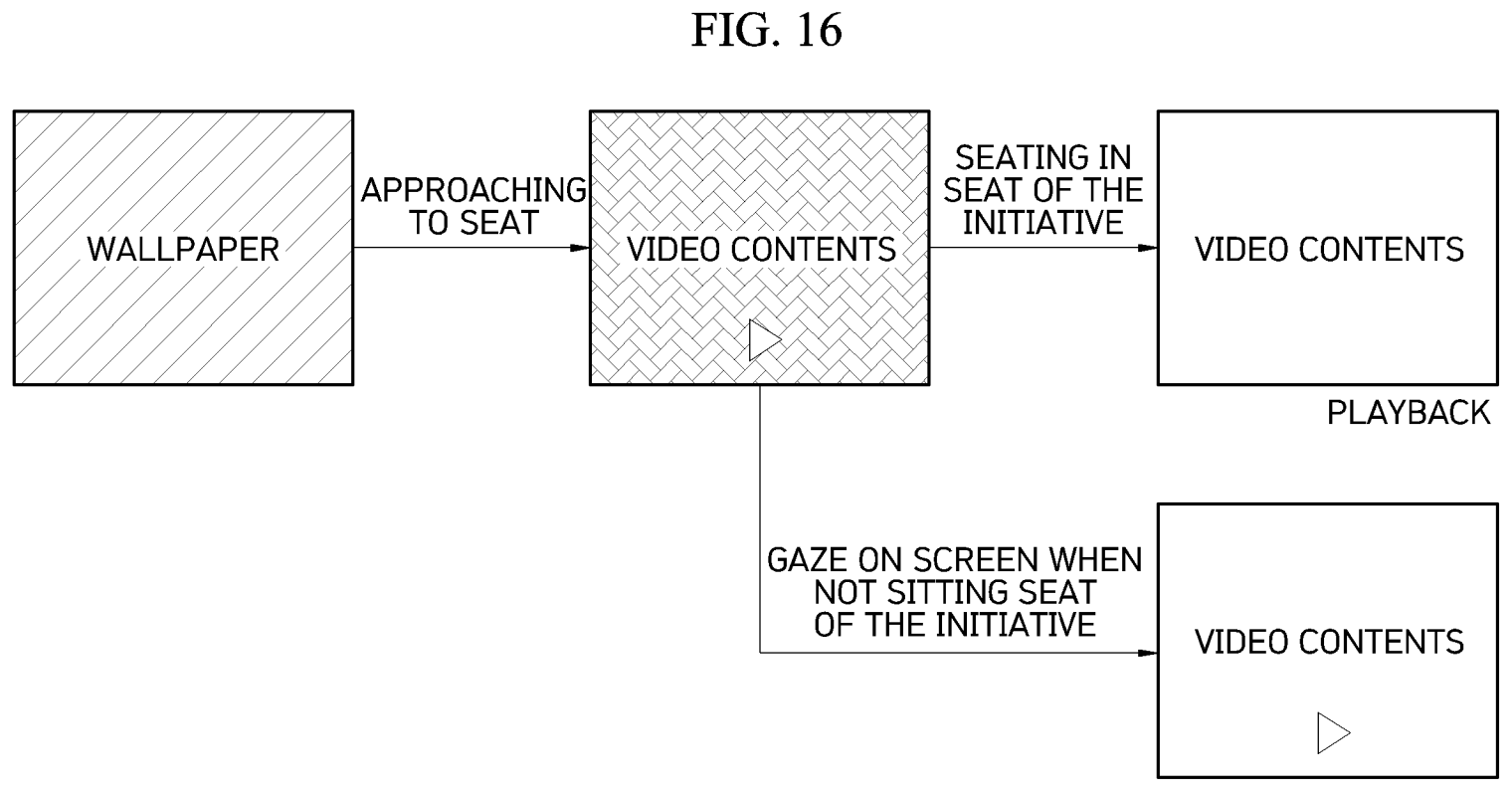

Referring to FIG. 16, when detecting that the occupant who has left the seat is approaching the seat, while the wallpaper is being displayed on the vehicle display, the display control unit 1320 performs control to stop the wallpaper display and to display the previously paused video content.

At this time, when it is confirmed that the occupant seated on the seat has the initiative, the display control unit 1320 performs control to auto-play the video content.

When the occupant who has approached the seat has the initiative, but is not seated on the seat with only the occupant's gaze located on the screen, the occupant clicks a play button to play the video content.

Referring to FIG. 17, as the gaze of the occupant deviates from the vehicle display screen for a certain time or longer, the wallpaper is displayed.

At this time, when another occupant that has no initiative approaches the seat, the display control unit 1320 assigns a portion of the corresponding vehicle display screen area to another occupant.

At this time, when a screen lock is set, the display control unit 1320 performs control not to display the video content that was previously played in the area assigned to the occupant having the initiative.

The area provided to another occupant (occupant B) who has no initiative is shown as a second area B-1, and the area provided to the occupant (occupant A) who has the initiative is shown as a first area A-1.

When the external interest information of the occupant B is to be displayed in the first area A-1 beyond the second area B-1, the display control unit 1320 performs control to display even the external interest information of the occupant B in the first area A-1 according to the boarding status of the occupant A or whether the authority of the occupant A having the initiative is set.

Figure 18:
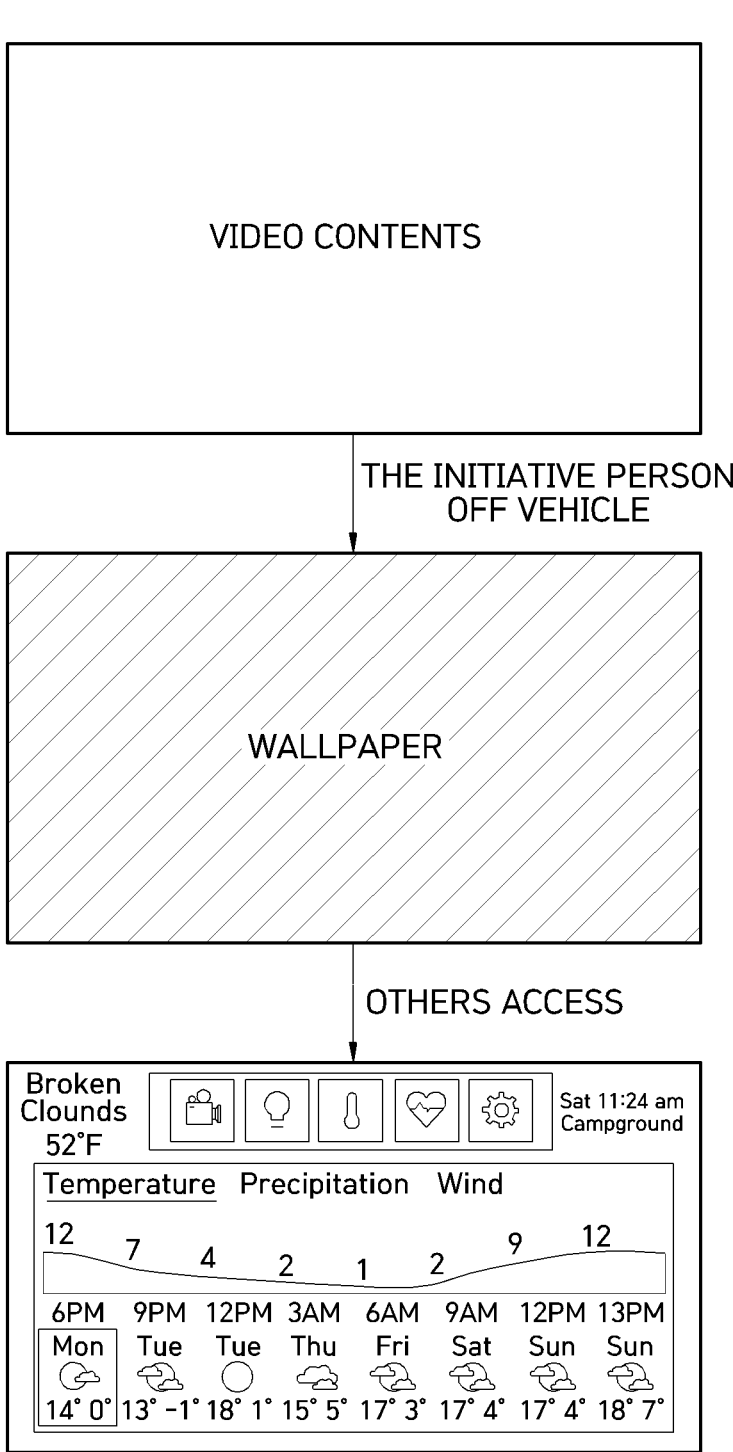
FIG. 18 is a view showing an example of vehicle display control upon departure from control authority according to another embodiment of the present disclosure.

FIG. 18 is a view showing an example of vehicle display control upon departure from control according to another embodiment of the present disclosure.

In a situation where the video content is played on the vehicle display, when the occupant having the initiative leaves the vehicle, the display control unit 1320 performs display control to display the wallpaper.

When the occupant having the initiative leaves the vehicle, the display control unit 1320 performs display control to display the functions previously used by another occupant as another occupant having no initiative approaches the display.

Figure 19:
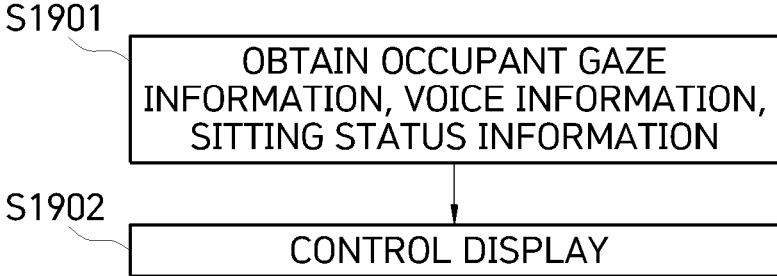
FIG. 19 is a view showing an occupant gaze departure determination and vehicle display control method according to another embodiment of the present disclosure.

FIG. 19 is a view showing an occupant gaze departure determination and vehicle display control method according to another embodiment of the present disclosure.

The occupant gaze departure determination and vehicle display control method according to the embodiment of the present disclosure includes: a step S1901 for obtaining at least any one of gaze information, voice information, and sitting status information of an occupant in a vehicle; and a step S1902 for confirming that the occupant's intent is to stop viewing a display screen, by using the information obtained in the step S1901, and controlling a vehicle display.

In the step S1901, when the gaze information of the occupant in the vehicle is obtained, the gaze information including whether the gaze of the occupant in the vehicle departs from the display screen area and the departure duration time is obtained.

In the step S1902, when the departure duration time exceeds the preset time, control is performed such that the screen of the video content is blurred.

When the voice information is obtained in the step S1901, in the step S1902, it is determined that a call or an in-vehicle conversation is in progress, using the voice information, and control is performed such that the video content corresponding to the video playback is paused.

When the voice information is obtained in the step S1901, in the step S1902, it is determined that the call or in-vehicle conversation is in progress, using the voice information, and control is performed such that the playback volume of the video content is lowered.

In the step S1902, it is confirmed that the occupant's intent is to stop viewing the display screen, and control is performed such that the wallpaper, not the video content, is displayed.

When the sitting status information is recognized in the step S1901, the video content is automatically displayed depending on whether the occupant seated in the seat in the step S1902 has been granted the initiative.

When it is confirmed in the step S1901 that an occupant who has been granted no initiative is seated, in the step S1902, a portion of the display screen area is assigned to the occupant who has been granted no initiative.

In the step S1902, in consideration of at least any one of the authorization setting information of the occupant who has been granted the initiative and the boarding status information of the occupant who has been granted the initiative, control is performed such that external interest information is displayed beyond the area assigned to the occupant who has been granted no initiative.

In the step S1901, when it is confirmed that the occupant who has been granted the initiative leaves the vehicle, and the occupant who has been granted no initiative is seated, in the step S1902, control is performed such that the previously used functions are displayed on the screen using the usage history information of the occupant who has been granted no initiative.

FIG. 20 is a view showing a button display control in an occupant gaze-based vehicle display and the initiative control system according to another embodiment of the present disclosure.

The occupant gaze-based button display control and initiative control system in a vehicle display according to the embodiment of the present disclosure includes: a first occupant gaze recognition unit 2001 configured to recognize a gaze of a first occupant in a vehicle display screen area; and a button display control unit 2003 that performs control to display a button on an video content according to the gaze of the first occupant.

When the first occupant gaze recognition unit 2001 confirms that the gaze of the first occupant stays on a predetermined screen area for a certain period of time or longer, the button display control unit 2003 generates and displays a cursor, and controls the movement and size change of the cursor according to the gaze movement of the first occupant and the gaze distance of the first occupant.

When the first occupant gaze recognition unit 2001 confirms that the gaze of the first occupant stays on the predetermined screen area for a certain period of time or longer, the button display control unit 2003 performs control to display at least any one of a player button and a progress button of the video content.

The occupant gaze-based button display control in the vehicle display and initiative control system according to the embodiment of the present disclosure further includes a second occupant gaze recognition unit 2002 configured to recognize a gaze of a second occupant participating in the use of the vehicle display, and the button display control unit 2003 performs control to display a button for the initiative switch.

The occupant gaze-based button display control and initiative control system in the vehicle display according to the embodiment of the present disclosure further includes a display control unit 2004 configured to assign the vehicle display screen area to the first occupant and the second occupant when the initiative switch is approved.

The display control unit 2004, with the approval of the first occupant, also displays the external interest information of the second occupant even in a first area assigned to the first occupant beyond a second area assigned to the second occupant.

When the second occupant stares at the video content displayed in the first area for a preset time or longer, the display control unit 2004 performs control to display the video content throughout the vehicle display screen area.

FIGS. 21 to 23 are views showing button display control according to another embodiment of the present disclosure.

Referring to FIG. 21, when it is confirmed that the occupant stares at a certain area on the screen of the video content played on the vehicle display, a desired (for example, necessary, corresponding, appropriate, etc.) button is created.

The button display control unit controls the movement and size of the cursor based on the gaze movement of the occupant and the gaze distance of the occupant.

The occupant selects a function item by staring at a certain area for a preset time or longer, or by inputting a gesture on a mobile phone screen connected to a vehicle AVN.

The button display control unit displays the player button (play, pause, move forward, move backward, volume, screen brightness, etc.) and the progress button, and executes a button display item for a function execution by item selection.

Referring to FIG. 22, when the occupant stares at a left area on the screen where the video content is played, a cursor is created, and the button display control unit changes the cursor to match the appearance of the widget, confirms that the occupant stares at the left area for the preset time or longer, and displays the player button and the progress button.

The button display control unit provides a widget to float the button in an area where the gaze does not stay when the gaze of the occupant moves.

Referring to FIG. 23, the button display control unit determines the size of the cursor differently, depending on the distance between the occupant and the vehicle display.

FIG. 24 is a view showing initiative switch in another occupant's participation according to another embodiment of the present disclosure.

In a situation where an occupant A is watching the video content played on the vehicle display screen, when an occupant B participates in the use of the vehicle display by staring at a particular area, a button for initiative switch is displayed.

At this time, as the occupant B selects a button for initiative switch, the initiative is provided to the occupant B, or a button to watch the video together is displayed.

When the initiative switch is requested by the gaze of the occupant B, a button for the occupant A, who currently has the initiative, to agree to the initiative switch is provided on the screen.

When the initiative switch is approved at the request of the occupant B, only the screen of the occupant B may be configured, which will be described with reference to FIG. 25.

FIG. 25 is a view showing display control based on screen area division and gaze information upon another occupant's participation according to another embodiment of the present disclosure.

The occupant A is watching the video content in a first area A-1 of the vehicle display, and according to the participation of the occupant B, a second area B-1 of the vehicle display area is assigned to the occupant B.

It is assumed that in the first area A-1, the video content selected by the occupant A is played, and in the second area B-1, the external interest information is displayed.

At this time, according to the approval of the occupant A, the external interest information is displayed on the first area A-1 beyond the second area B-1.

At this time, when the occupant B stares at the video content for a certain period of time or longer, it is confirmed that the occupant B has the intent to watch the video content instead of the external interest information, and control is performed such that the video content is displayed in the entire area of the vehicle display.

FIG. 26 is a view showing a method of button display control in an occupant gaze-based vehicle display and initiative control according to another embodiment of the present disclosure.

The method of button display control in an occupant gaze-based vehicle display and initiative control method according to the embodiment of the present disclosure includes: a step S2601 for recognizing a gaze of a first occupant in a vehicle display screen area; and a step S2602 for performing control to display a button on a video content according to the gaze of the first occupant.

When it is confirmed in the step S2601 that the gaze of the first occupant stays on a predetermined screen area for a certain period of time or longer, in the step S2602, a cursor is created and displayed, and the movement and size change of the cursor are controlled according to the gaze movement of the first occupant and the gaze distance of the first occupant.

When it is confirmed in the step S2601 that the gaze of the first occupant stays on the predetermined screen area for a certain period of time or longer, in the step S2602, control is performed such that at least any one of a player button and a progress button of the video content is displayed.

In the step S2601, a gaze of a second occupant participating in the use of the vehicle display is additionally recognized, and in the step S2602, control is performed such that a button for initiative switch is displayed.

The occupant gaze-based button display control in the occupant gaze-based vehicle display and initiative control method according to the embodiment of the present disclosure further includes a step S2603 of confirming the approval of the first occupant according to an initiative switching request of the second occupant, and performing initiative switching control.

The occupant gaze-based button display control based on the occupant gaze-based vehicle display and the initiative control method according to the embodiment of the present disclosure further includes a step S2604 of splitting and assigning the vehicle display screen area to the first occupant and the second occupant when the initiative switching request is approved, and performing display control using the gaze information of the first occupant and the second occupant.

In the step S2604, with the approval of the first occupant, the external interest information of the second occupant is also displayed in the first area assigned to the first occupant beyond the second area assigned to the second occupant.

In the step S2604, when the second occupant stares at the video content displayed in the first area for a preset time or longer, control is performed such that the video content is displayed throughout the vehicle display screen area.

FIG. 27 is a view showing a vehicle display control system for transmitting external interest information according to embodiment of the present disclosure.

The vehicle display control system for transmitting external interest information according to the embodiment of the present disclosure includes: an external interest information confirmation unit 2701 configured to confirm external interest information of a first occupant in a vehicle; and a display control unit 2703 configured to perform control to display the external interest information of the first occupant through a vehicle display.

The external interest information confirmation unit 2701 uses gaze information of the first occupant to confirm an external interest object.

The external interest information confirmation unit 2701 uses voice information and the gaze information of the first occupant to confirm the external interest object.

The external interest information confirmation unit 2701 confirms the external interest object using a gesture information and the gaze information of the first occupant.

The display control unit 2703 performs control to display the external interest information through at least any one of highlight, area display, contour display, and zoom display.

The vehicle display control system for transmitting external interest information according to the embodiment of the present disclosure further includes a boarding position recognition unit 2702 configured to confirm position information of the first occupant and a second occupant in the vehicle, and the display control unit 2703 performs control to display the external interest information through a display area recognizable by the second occupant in consideration of the position information.

FIG. 28A and FIG. 28B are views showing external interest information display and external interest information display area control according to another embodiment of the present disclosure.

Referring to FIG. 28A, a driver A recognizes an interest object (e.g., bear) viewed through the front windshield of the driving vehicle.

The external interest information confirmation unit confirms the external interest information when the gaze of the driver A stays on a certain area for a certain period of time or longer.

When the driver A says "Did you see that, guys?", the external interest information confirmation unit checks the external interest information based on the utterance information and gaze information of the driver A.

The external interest information confirmation unit confirms the external interest information when the gaze of the driver A stays on a certain area for a certain period of time or longer and performs a predetermined gesture (e.g., finger pointing operation) for indicating the external interest information.

The display control unit performs control to display the external interest information of the driver A through at least any one of highlight, area display, contour display, magnification display.

Referring to FIG. 28A, the display control unit performs control to display the area of the external interest object of the driver A through the area display on the front windshield, which is a transparent display.

Referring to FIG. 28B, as described above, when the external interest information of the driver A is displayed on the front windshield, it is assumed that it is difficult for a passenger B and passenger C, which are blocked by the driver A and located at the rear seat of the driver A, to easily confirm the corresponding external interest information.

At this time, in consideration of the seating position information of the passengers obtained through the boarding position recognition unit, the display control unit performs control to display the external interest information on the transparent display of the left side window located near the sitting position of the passenger B and to display the external interest information on the transparent display of the right side window located near the sitting position of the passenger C, so that the passenger B and the passenger C can easily confirm the external interest information.

The boarding position recognition unit recognizes the position of the occupant in the vehicle using at least any one of a seat sensor and an indoor camera, and the display control unit uses the position to determine a display area (the aforementioned rear seat left side window display area and rear seat right side window display area) that the passengers can comfortably see, and displays the external interest information in the determined area.

FIG. 29 is a view showing a vehicle display control method for transmitting external interest information according to another embodiment of the present disclosure.

The vehicle display control method for transmitting external interest information according to the embodiment of the present disclosure includes: a step S2901 for confirming external interest information of a first occupant in a vehicle; a step S2902 for confirming the boarding positions of the first occupant and the second occupant in the vehicle; and a step S2903 for performing control to display the external interest information through a vehicle display in consideration of the boarding positions.

In the step S2901, the external interest information is confirmed using at least any one of gaze information, voice information, and gesture information of the first occupant.

In the step S2903, control is performed such that the external interest information is displayed through at least any one of highlight, area display, contour display, or zoom display.

In the step S2903, when it is confirmed by using the boarding position that the field of view of the second occupant is not blocked, the external interest information confirmed by the first occupant beyond a first display area is displayed in the first display area.

In the step S2903, when it is confirmed by using the boarding position that the field of view of the second occupant is blocked, the external interest information confirmed by the first occupant beyond the first display area is displayed in a second display area that is different from the first display area.

FIG. 30 is a view showing a vehicle display control system for synthesizing and displaying external interest information according to another embodiment of the present disclosure.

The vehicle display control system for synthesizing and displaying external interest information according to the embodiment of the present disclosure includes: an external interest information confirmation unit 3001 configured to confirm an interest object outside a vehicle in which an occupant in the vehicle is interested; an occupant operation information recognition unit 3002 configured to recognize operation information of the occupant in the vehicle associated with the rotation of external interest information; and a display control unit 3003 configured to synthesize and display a 3D image for the interest object outside the vehicle, and to rotate and display the 3D image according to the operation information.

The external interest information confirmation unit 3001 confirms an interest object located in an area where the gaze of the occupant in the vehicle stays for a preset time or longer.

The occupant operation information recognition unit 3002 recognizes at least any one of a touch input, gesture input, and voice input as the operation information.

The display control unit 3003 determines the degree of rotation of the 3D image according to the operation information, rotates the 3D image to display the rotated 3D image, and displays the 3D image by restoring the 3D image to the actual position of the interest object when there is no further operation for a preset time or longer.

FIGS. 31A, 31B and 32 are views showing external interest information rotation and display according to another embodiment of the present disclosure.

Referring to FIG. 31A and FIG. 31B, the gaze information of the occupant in the vehicle is used to determine the external interest object among the objects viewed through the vehicle windshield, and the corresponding interest object is synthesized into a 3D form and displayed.

At this time, the external interest information synthesized in 3D form is displayed in the front windshield area, which is a transparent display.

When the occupant in the vehicle drags the external interest information synthesized in 3D form to the right using touch or gesture, the external interest information synthesized in 3D form is rotated to the right by the value of the drag.

When a preset time passes after the external interest information synthesized in 3D form is rotated and displayed according to the operation of the occupant in the vehicle, the position of the external interest information synthesized in the 3D form is restored to the position of the actual external interest object.

Referring to FIG. 32, the external interest object is synthesized and displayed in 3D form, and control is performed such that the 3D object is rotated by 360 degrees up and down/left and right through multimodal interactions such as touch, gesture, and voice recognition of the occupant in the vehicle.

FIG. 33 is a view showing a vehicle display control method for synthesizing and displaying external interest information according to another embodiment of the present disclosure.

The vehicle display control method for synthesizing and displaying external interest information according to the embodiment of the present disclosure includes: a step S3301 for confirming external interest information of an occupant in a vehicle; a step S3302 for recognizing operation information of the occupant associated with the rotation of the external interest information; and a step S3303 for performing control to synthesize and display the external interest information as 3D image, and to rotate and display the 3D image according to the operation information.

In the step S3301, the external interest information for an external object located in an area where the gaze of the occupant in the vehicle stays for a preset time or longer is confirmed.

In the step S3302, at least any one operation information of touch input, gesture input, and voice input is recognized.

In the step S3303, the 3D image is rotated and displayed according to the degree of rotation determined based on the operation information, and when there is no further operation for a preset time or longer, the 3D image is displayed by restoring the 3D image to the actual position of the interest object.

FIG. 34 is a view showing a vehicle display control system for storing and sharing external interest information according to another embodiment of the present disclosure.

The vehicle display control system for storing and sharing external interest information according to the embodiment of the present disclosure includes: an occupant operation recognition unit 3401 configured to receive operation information for an video storage request for an external interest object of a vehicle occupant; and a display control unit 3402 configured to perform video storage according to the operation information for the external interest object at which the vehicle occupant stares through a vehicle windshield configured as a transparent display.

The occupant operation recognition unit 3401 receives the operation information that is input using at least any one of gaze information, voice information, gesture information, and touch information.

The display control unit 3402 performs control to display information about the external interest object as AR information.

The display control unit 3402 captures and stores an external foreground and the AR information at the same time.

The display control unit 3402 controls the display for screen capture by white-out during a preset time.

The vehicle display control system for storing and sharing external interest information according to the embodiment of the present disclosure further includes: an external interest information transmission unit 3403 configured to transmit a video stored according to the operation information to at least any one of a divided area in a vehicle display, a mobile terminal of the vehicle occupant, and a mobile terminal of another user.

The display control unit 3402 performs control to divide and assign a display area to a plurality of occupants in the vehicle, store the external interest information video according to the video storage request made within each area, and display the stored video in a predetermined area of an assigned display area.

The display control unit 3402 transmits control information to move the transparent display in consideration of access control priorities of the plurality of occupants.

The display control unit 3402 performs control to move the video information stored in a predetermined area of a first occupant to a predetermined area of a second occupant according to the occupant request and sharing 권한 setting information.

Hereinafter, in FIGS. 35A, 35B, 35C, 36A, 36B, 37A, 37B, 37C, 38A, 38B, 38C, it is assumed that a rear seat left side occupant in a vehicle stares at the outside through a rear seat left side window transparent display.

FIG. 35A and FIG. 35C are views showing a process of capturing the external interest information according to another embodiment of the present disclosure.

Referring to FIG. 35A, the display control unit 3402 displays fixed information including at least any one of position information, weather, battery information, and transparency of a transparent display through the transparent display.

Referring to FIG. 35B, the occupant operation recognition unit 3401 confirms the area where the gaze of the occupant stays for a certain period of time or longer through the rear seat left side window, and the display control unit 3402 displays AR information based on the gaze tracking information.

At this time, the display control unit 3402 displays the information of a mountain name and height, weather, distance, and travel time (the time required for the vehicle to travel from the current position to the entrance to the mountain, the time required to climb the mountain from the entrance to the mountain to the top of the mountain, etc.) as AR information.

Referring to FIG. 35C, the occupant operation recognition unit 3401 recognizes various pieces of operation information of the occupant to determine the intent of storing the external interest information.

That is, the occupants request the storage of the corresponding external interest information in a variety of ways, including gaze recognition and a touch of a save button within a mobile device app, gaze recognition and a bottom swipe touch within the mobile device app, gaze recognition and a specific voice command (e.g., save it or capture this), gaze recognition and a specific gesture, and gaze recognition and a display swipe down touch.

Referring to FIG. 35B, the display control unit 3402 simultaneously captures the external foreground and AR information (as another example, it is also possible to cut and store only the area of the corresponding external interest information) according to the storage request received from the occupant operation recognition unit, and in this case, the capture information may include a photograph, video, AR information, GPS position information.

The display control unit 3402 whites the screen out for a preset time (e.g., 1 second) when capturing the screen.

The display control unit 3402 performs control to display the screenshot screen in a specific area of the display (e.g., bottom left) with a certain size (e.g., 15 cm×15 cm) for a certain period of time (e.g., 3 seconds).

FIG. 36A and FIG. 36B are views showing a process of sharing the external interest information with a smartphone according to another embodiment of the present disclosure.

According to the gaze tracking of the occupant, in a situation where the external interest information is displayed in AR through the rear seat side window transparent display, when the occupant operation recognition unit 3401 receives information that the occupant touches a particular button using his/her mobile terminal connected to the vehicle, the display control unit 3402 captures a screen according to a preset method (e.g., captures the external foreground and AR information at the same time), and when captured, the screen is whited out for the preset time (e.g., 1 second).

The external interest information transmission unit 3403 transmits the captured screen to the mobile terminal of the occupant, and the occupant can check whether a desired capture image has been received normally, through the app of the mobile terminal (e.g., album).

Through in-album manipulation, the occupant can flip through the image displayed in the mobile terminal, and presses a specific button (share button) to transmit the image to be shared to someone else's smartphone or a vehicle.

FIG. 37A to FIG. 37C are views showing a process of storing and confirming external interest information for each occupant through transparent display sliding according to another embodiment of the present disclosure.

Referring to FIG. 37A, an occupant A is seated on the rear left seat of the driving vehicle, an occupant B is seated on the rear right seat of the driving vehicle, and the occupant A and the occupant B stare at the outside through the rear seat side window.

The rear seat side window is configured as a transparent display and provides an area assigned for each occupant.

For example, in consideration of the viewing angle of the occupant, a first area A-1 is assigned to the occupant A and a second area B-1 is assigned to the occupant B.

As another example, it is possible to assign a display area based on the position of the external object at which the occupants currently stare. In other words, as an example different from that shown in FIG. 37A, when the occupant A stares at the isolated spire as the interest object, and the occupant B stares at the double spire as the interest object, it is also possible to assign the second area to the occupant A and the first area to the occupant B.

Referring to the illustrations in FIG. 37A, the occupant A stares at the double spire shown beyond the first area A-1 as the interest object, and when the occupant A performs swipe down on the display, the display control unit 3402 stores and displays the captured image in a specific personalization area at the bottom of the display area. In addition, since the occupant B is a person who is further away than the occupant A from the rear seat left side window, the occupant B transmits the capture intent through the gaze recognition and air gesture, and the display control unit 3402 stores and displays the capture image as requested by the occupant B in a specific personalization area at the bottom of the display area.

Referring FIG. 37B, it is assumed that in an autonomous driving situation, the driving control depends on the autonomous driving mode, an occupant C seated on the driver's seat is viewing the outside scenery through the left side window, and the occupant C has the left-side window display access control with a priority higher than that that of the occupant B (It is assumed that the priority for display access control is higher, the closer the display from the boarding position).

At this time, the occupant C slides forward the transparent display corresponding to the second area B-1, and thus, the second area B-1 is disposed at the left side of the occupant C, and the second area B-1 is assigned to occupant C as a third area C-1.

The occupant C requests the storage of the external interest information through a display swipe down, and the display control unit 3402 displays that the external interest information is stored as a capture image in a specific area at the bottom of the display.

Referring to FIG. 37C, in consideration of a face ID camera placed in the vehicle and the seat position information, authentication is performed for each occupant, and when authentication is completed, a personalized content history is displayed in an area at the bottom of the display area assigned to each occupant.

The content history display displays the image/video files in the order in which they are captured.

FIG. 38A to FIG. 38C are views showing the sharing of the external interest information between displays according to another embodiment of the present disclosure.

Referring to FIG. 38, a first area A-1 is assigned to an occupant A and a second area B-1 is assigned to an occupant B, and the content history of each occupant is displayed in a specific area at the bottom of each area.

Referring to FIG. 38A, the occupant B selects a certain content in the content history (long press, which can be selected through gesture), and drags the object and requests the transfer of the object to the display of the occupant A.

Referring to FIG. 38B, in consideration of the information sharing authorization setting information of the occupant A, when the information sharing is approved, the display control unit 3402 moves the corresponding particular content to the personalized area of the occupant A and displays it.

At this time, the display control unit 3402 performs control to allow not only the same side (rear seat left side window) display but the front or opposite side (rear seat rear side window) display based on the occupant's request and information sharing setting to share the external interest information according to the directionality of the drag and drop.

Referring to FIG. 38C, a particular content shared by the operation of the occupant B is added and stored into the personalization area of the occupant A.

FIG. 39 is a view showing a vehicle display control method for storing and sharing external interest information according to another embodiment of the present disclosure.

The vehicle display control method for storing and sharing external interest information according to the embodiment of the present disclosure includes: a step S3901 for receiving a video storage request for an external interest object of a vehicle occupant; and a step S3902 for performing a video storage for the external interest object at which the vehicle occupant stares through a vehicle windshield configured as a transparent display and performing display control.

In the step S3901, a video storage request input using at least any one of gaze information, voice information, gesture information, and touch information is received.

In the step S3902, display control is performed such that information about the external interest object is displayed as AR information.

In the step S3902, an external foreground and AR information are captured and stored at the same time.

In the step S3902, display control for screen capture is performed by white-out a screen during a preset time.

The vehicle display control method for storing and sharing external interest information according to the embodiment of the present disclosure further includes a step S3903 for sharing the external interest information by transmitting the stored video to at least any one of a divided area in a vehicle display, a mobile terminal of the vehicle occupant, and a mobile terminal of another user.

In the step S3902, control is performed such that the display area is divided and assigned to a plurality of occupants in the vehicle, and an external interest information video is stored according to the video storage request made within each area, and the stored video is displayed in a predetermined area of the assigned display area.

In the step S3902, in consideration of access control priorities of a plurality of occupants. display control is performed such that the transparent display is moved.

In the step S3902, control is performed such that video information stored in a predetermined area of a first occupant is moved to a predetermined area of a second occupant according to the occupant request and sharing 권한 setting information.

FIG. 40 is a view showing a vehicle display area control system for external interest information according to another embodiment of the present disclosure.

The occupant gaze-based external interest information display area determination and vehicle display control system according to the embodiment of the present disclosure includes: an external interest information display area confirmation unit 4001 configured to confirm a display area for displaying external interest information of a plurality of occupants in the vehicle; and a display control unit 4002 configured to adjust the display area of the external interest information, in consideration of at least any one of importance of the external interest information and the initiative granted to the plurality of occupants.

The display control unit 4002 moves the display area of the external interest information of a second occupant so that the display area of the external interest information of the second occupant does not overlap with the display area of the external interest information of a first occupant, when it is determined that the importance of the external interest information of the first occupant is higher than the importance of the external interest information of the second occupant.

The display control unit 4002 moves the display area of the external interest information of the second occupant when the first occupant has the initiative and it is determined that the display area of the external interest information of the first occupant and the display area of the external interest information of the second occupant overlap with each other in a certain part or more.

The display control unit 4002 performs control to display outline information about the original position of the external interest information of the second occupant.

In consideration of the gaze information of the first occupant, the display control unit 4002 restores the display area of the external interest information of the second occupant to the area before moving.

FIG. 41A to FIG. 41C are views showing a process of controlling a vehicle display area for external interest information according to another embodiment of the present disclosure.

Referring to FIG. 41A, a driver A and a passenger B look at external objects through a front windshield of a vehicle.

At this time, when the driver A stares at a forward vehicle located in the area of ① for a preset time or longer, driving-related information (e.g., distance from the forward vehicle and AR route guidance information based on navigation information) is displayed on the front windshield, which is a transparent display, according to the result of tracking the gaze of the driver A.

The passenger B stares at a store (café) located in the area of ② for a preset time or longer, and accordingly, the information about the store (e.g., phone number, the number of floors, menu) is displayed on the front windshield, which is a transparent display.

Referring to FIG. 41B, as the driver A looks at a stopped vehicle located in the area of ①, the display area for the external interest information of the passenger B overlaps with the display area for the external interest information of the driver A.

The display control unit 4002 changes the position of the display area for the external interest information of the passenger B in order to prevent the field of view of the initiative owner, the driver A, from being blocked by this overlapping phenomenon.

That is, while the passenger B is staring at the information about the café located on the first floor of the building, the driver A is provided with rear-facing warning information, and when the driver A stares at another vehicle, according to the priority of the initiative and information, the display control unit 4002 performs control to move and display the café information to the upper area of the building.

At this time, the display control unit 4002 continuously displays the position of the previous interest information in the form of a dotted line, so that the position can be recognized.

Referring to FIG. 41C, when the rear side warning information provided to the driver A is no longer transmitted, or when the driver A moves his/her gaze to another object (forward vehicle), the display control unit 4002 restores the position of the display area for the external interest information of the passenger B.

FIG. 42 is a view showing a method of controlling a vehicle display area for external interest information according to another embodiment of the present disclosure.

The occupant gaze-based external interest information display area determination and a vehicle display control method according to the embodiment of the present disclosure includes: a step S4201 for confirming an area for displaying external interest information of an occupant in a vehicle; and a step S4202 for adjusting the position of the area for displaying the external interest information, in consideration of at least any one of importance of the external interest information and information about the initiative granted to the occupant.

In the step S4202, when it is determined that the importance of the external interest information of a first occupant is higher than the importance of the external interest information of a second occupant, the positions of the display area of the external interest information of the second occupant is moved, so that the display area of the external interest information of the second occupant does not overlap with the display area of the external interest information of the first occupant.

In the step S4202, when the first occupant has the initiative, and it is confirmed that the display area for the external interest information of the first occupant and the display area for the external interest information of the second occupant overlap with each other in a certain part or more, the display area for the external interest information of the second occupant is moved.

In the step S4202, control is performed such that outline information about the original position of the external interest information of the second occupant is displayed.

In the step S4202, in consideration of the gaze information of the first occupant, the display area for the external interest information of the second occupant is restored to the area before moving.

FIG. 43 is a view showing a vehicle display control system for displaying and storing external interest information according to another embodiment of the present disclosure.

The vehicle display control system for displaying and storing external interest information according to the embodiment of the present disclosure includes: an external interest object confirmation unit 4301 configured to confirm an external interest object in which an occupant in a driving vehicle is interested; and a display control unit 4302 configured to perform control to display external interest information about the external interest object in a first display area, to move and display the external interest information to a second display area according to a driving situation, and to store the external interest information in an external interest information storing unit 4303.

The external interest object confirmation unit 4301 confirms the external interest object using at least any one of gaze information, voice information, and gesture information of the occupant.

When the gaze of the occupant departs from a display area for the external interest information, the display control unit 4302 performs control to simplify the external interest information, move the simplified external interest information to the second display area, which is a side window display, and to display the simplified external interest information.

The display control unit 4302 performs control such that the simplified external interest information is accumulated in chronological order and displayed in the second display area.

The vehicle display control system for displaying and storing external interest information according to the embodiment of the present disclosure further includes a destination setting request receiving unit 4304 configured to receive a destination setting request for the simplified external interest information.

The vehicle display control system for displaying and storing external interest information according to the embodiment of the present disclosure further includes a route setting unit 4305 configured to establish a route to an external point of interest selected in accordance with the destination setting request.

FIG. 44A and FIG. 44B are views showing external interest information display according to another embodiment of the present disclosure.

Referring to FIG. 44A, a driver in a driving vehicle stares at an interest object (parking lot) for a preset time or longer among external objects viewed through a front windshield configured as a transparent display, and accordingly, external interest information (e.g., information about the name, position and cost of the parking lot) is displayed as AR information.

At this time, the display control unit 4302 performs control to confirm the external interest object using voice information, head movement information, and gesture information in addition to occupant gaze information, and to display information about the external interest object.

Referring to FIG. 44A, the display control unit 4302 simplifies the corresponding external interest information (e.g., simplified information such as the distance from the current position, parking costs, etc.) when the driver's field of view departs from a display area for the external interest information, or when the external interest object becomes out of the field of view of the driver as the driving vehicle moves, and displays the simplified external interest information in the form of a log.

At this time, the display control unit 4302 performs control to display the simplified external interest information in a predetermined area of a front display or a side window display.

Referring to FIG. 44B, when the external point of interest moves relatively and is out of the driver's field of view as the vehicle travels, the display control unit 4302 displays the external interest information on the side window display by time. That is, the display control unit 4302 accumulates and displays the external interest information in the order of time elapsed.

At this time, the display control unit 4302 performs control to display information about the external interest object, located on the front left side of the driving vehicle, through the left side window display, and to display the information about the external interest object, located on the front right side of the driving vehicle, through the right side window display.

When receiving a destination setting request for particular external interest information among the plurality of stored external interest information, the route setting unit 4305 sets a path from the current position to the position of the corresponding external interest information.

The destination setting request receiving unit 4304 receives a destination setting request using touch, voice, air gesture, and a mobile device for external interest information stored in the side window display.

FIG. 45 is a view showing a vehicle display control method for displaying and storing external interest information according to another embodiment of the present disclosure.

The vehicle display control method for displaying and storing external interest information according to the embodiment of the present disclosure includes: a step S4501 for confirming an external interest object of a driving vehicle occupant; and a step S4502 for perform control to display external interest information for the external interest object in a first display area, and moving the external interest information to a second display area according to a driving situation to display the moved external interest information.

In the step S4501, the external interest object is confirmed using at least any one of the gaze information, voice information, and gesture information of the occupant.

In the step S4502, when the gaze of the driving vehicle occupant departs from the display area for the external interest information, control is performed such that the external interest information is simplified, and the simplified external interest information is moved to the second display area which is the side window display and displayed.

In the step S4502, control is performed such that the simplified external interest information is accumulated in chronological order and is displayed in the second display area.

The vehicle display control method for displaying and storing external interest information according to the embodiment of the present disclosure further includes a step S4503 for receiving a destination setting request for the simplified external interest information and setting a route to an external point of interest selected according to the destination setting request.

FIG. 46 is a block diagram illustrating a system for controlling a vehicle display according to still another embodiment of the present disclosure.

The system for controlling a vehicle display according to the present embodiment of the present disclosure incudes a traveling environment recognition unit 4610 that acquires traveling environmental information of a traveling vehicle, a control unit 4620 that generates control information associated with a displaying position of additional information that is to be presented through a display according to the traveling environmental information, and a display unit 4630 that displays the additional information on a display region according to the control information.

The traveling environment recognition unit 4610 collects the traveling environmental information associated with a state of a road surface in front of the traveling vehicle.

The control unit 4620 predicts a vehicle traveling behavior according to the traveling environmental information. According to a result of the prediction, the control unit 4620 computes an adjustment value of the displaying position of the additional information that is being currently presented through the display.

At this point, the traveling environment recognition unit 4610 transmits traveling information (for example, a traveling speed) of the traveling vehicle, and the control unit 4620 computes the adjustment value, considering the traveling information and the traveling environmental information. In a case where vehicles that travel at a speed of 30 km/h and at a speed of 50 km/h, respectively, go over the same speed bump, the external objects of interest that appear across side-window displays of the vehicles are also different from each other in a moving speed in an upward-downward direction. Therefore, the control unit 4620 computes the adjustment value, considering the traveling information, as well as the traveling environmental information. At this point, it is possible to compute the adjustment value, considering the traveling history information of each of the vehicles, for example, predicting how much the vehicle needs to reduce a speed per hour to go over the speed bump.

The traveling environment recognition unit 4610 transmits information on an occupant inside of the vehicle, and the control unit 4620 computes the adjustment value, considering the information on the occupant. For example, the traveling environment recognition unit 4610 transmits a position of a vehicle occupant, information on a region of the display region that is allocated to each of the vehicle occupant, a sitting height of the vehicle occupant, a position at which the vehicle occupant gazes toward the external object of interest, a direction in which the vehicle occupant gazes toward the external object of interest, and the like. The control unit 4620 computes an adjustment value for controlling the displaying position of the additional information on the external object of interest, considering these pieces of information on the occupant.

FIG. 47 is a view illustrating a vehicle display control process according to the present embodiment of the present disclosure.

With reference to FIG. 47, information on the state of the road surface in front of the traveling vehicle through the traveling environment recognition unit 4610 including a camera 4730. At this point, it is possible to collect the traveling environmental information by utilizing a sensor in addition to the camera, by using navigation information, or by collecting external-environment information through V2I communication.

In FIG. 47, it is assumed that it is recognized through a vehicle display (a side-window display is illustrated as an example thereof) that a region 4710 and a region 4720 are allocated to Occupant C and Occupant B, respectively. The control unit 4620 performs control in such a manner that the additional information (AR information) on a first external object of interest (double spire) at which Occupant C gazes and the additional information (AR information) on a second external object of interest (isolated spire) at which Occupant B gazes are presented on the vehicle display. The display unit 4630 displays the additional information (with reference to FIG. 47, the display unit 4630 displays a contour of each of the corresponding external objects of interest, using lines in sky blue and displays a name of each of the corresponding external objects of interest) on each of the first and second external objects of interest.

In a situation where, as can be seen from FIG. 47, the vehicle also goes up the speed bump, the display physically moves upward, together with the vehicle. At this point, in accordance with a position of the external object of interest, the control unit 4620 performs control in such a manner that the displaying position of the additional information (AR information) is adjusted to a relatively lower height as illustrated in than the displaying position. According to this control, the display unit 4630 displays the additional information at the displaying position.

In a situation where, as can be seen from FIG. 47, the vehicle goes down the speed bump, the display also physically moves downward, together with the vehicle. At this point, in accordance with the position of the external object of interest, the control unit 4620 performs control in such a manner that the displaying position of the additional information (AR information) is adjusted to a relatively higher height than the displaying position.

According to this control, the display unit 4630 displays the additional information at the displaying position.

According to the present embodiment of the present disclosure, the vehicle traveling behavior is predicted (for example, the vehicle traveling behavior is predicted to determine a height of the speed bump over which the vehicle will go) by analyzing information acquired using a camera, a sensor, navigation map information, and V2I communication. Accordingly, it is possible to generate, in advance, information for controlling the displaying position of the additional information that is to be presented on the display. Accordingly, in a traveling situation where the vehicle goes over the speed bump, it is possible to present in real time the additional information on the external object of interest that is located across a side window, on the side-window display in a manner that corresponds to the position of the external object of interest.

According to the present embodiment of the present disclosure, the pieces of information on the occupant, such as a sitting position of the vehicle occupant, the sitting height of the vehicle occupant, the position at which the vehicle occupant gazes toward the external object of interest, and the direction in which the vehicle occupant gazes toward the external object of interest, are acquired, and accordingly, a shaking compensation information for information on the external object of interest is generated. For example, in FIG. 47, it is assumed that Occupant C is an occupant, having a sitting height of 1 m, who sits on a seat positioned a 30 cm away from the allocation region 4710 of the side-window display and that Occupant B is an occupant, having a sitting height of 1 m, who sits on a seat positioned 3 m away from the allocation region 4720 of the side-window display. The control unit 4620 acquires the position of the vehicle occupant and the position at which the vehicle occupant gazes toward the external object of interest, and accordingly generates information on displaying-position adjustment of the additional information in a manner that varies from one region to another. That is, in a situation where the vehicles go over the same speed bump having a height of 50 cm, control is also performed in such a manner that the additional information on the external object of interest at which each occupant gazes is also in detail displayed by differentiating the degree to which the displaying position of the additional information is adjusted to a low height in the region 4710 allocated to Occupant C and the degree to which the displaying position of the additional information is adjusted to a low height in the region 4720 allocated to Occupant B.

FIG. 48 is a flowchart illustrating a method of controlling a vehicle display according to still another embodiment of the present disclosure.

The method of controlling a vehicle display according to the present embodiment of the present disclosure includes Step S4810 of collecting traveling-associated information and predicting the vehicle traveling behavior, Step S4820 of computing the adjustment value of the displaying position of the additional information associated with the external object of interest inside of and outside of the display, and Step S4830 of displaying the additional information.

In Step S4810, information on the state of the road surface in front of the traveling vehicle is collected using at least one of the camera, the sensor, and the navigation map, and the vehicle traveling behavior is predicted by analyzing the collected information.

In Step S4810, traveling speed information of the vehicle and information on predicted reduction of the traveling speed immediately before the speed bump are acquired. In Step S4820, the adjustment value of the displaying position of the additional information that varies with the vehicle traveling behavior is computed on the basis of the acquired traveling speed information and information on predicted reduction of the traveling speed immediately before the speed bump. For example, as described above, in a case where the vehicle traveling behavior, such as going over the speed bump, is predicted, while the vehicle goes up the speed bump, control is performed in such a manner that the additional information is presented at a position, relatively lower than a previous position, by adjusting a position at which the additional information of the external object of interest that is located across the side-window display is to be presented on the side-window display. Moreover, while the vehicle goes down the speed bump, control is performed in such a manner that the additional information is presented at a position, relatively higher than a previous position (at a point in time when the vehicle goes up the bump), by adjusting the position at which the additional information of the external object of interest that is located across the side-window display is to be presented on the side-window display.

FIG. 49 is a block diagram illustrating a system for controlling a vehicle display according to still another embodiment of the present disclosure.

The system for controlling a vehicle display according to the present embodiment of the present disclosure includes an object-of-interest recognition unit 4910 that recognizes the object of interest outside of the vehicle in which the vehicle occupant is interested, a control unit 4920 that performs control in such a manner that the additional information is presented in a composited manner through the vehicle display, using 3D information on the object of interest, and a display unit 4930 that displays the additional information.

The object-of-interest recognition unit 4910 receives image information from an image acquisition device that captures an image of an environment outside of the vehicle and recognizes the object of interest using monitoring information on a user.

The control unit 4920 generates the 3D information on the object of interest using distance information received from the image acquisition device and zoom setting information.

The control unit 4920 receives the 3D information on the object of interest from a server of a service provider, and performs control in such a manner that the 3D information is displayed in a composite manner.

FIGS. 50A and 50B are views illustrating that size information and volume information of the object of interest outside of the vehicle according to the present embodiment of the present disclosure are displayed in a converted manner.

With reference to FIG. 50A, the camera that is arranged on a lateral side of the vehicle captures an image of the environment outside of the vehicle and transmits the captured image to the object-of-interest recognition unit 4910. The object-of-interest recognition unit 4910 that includes at least one of a camera, a gesture acquisition unit, and a touch signal acquisition unit that are arranged inside the vehicle checks which object in the environment outside of the vehicle the occupant inside of the vehicle regards as the object of interest.

When the occupant inside of the vehicle is checked as being interested in a building under construction in an external environment, which is covered with a tent and is located cross the side-window display, the control unit 4920 retrieves information on the object of interest and performs control in such a manner that converted information on the building is presented as the additional information in a composited manner through a transparent display (the display unit 4930) arranged on the side window. At this point, 3D data on a height, a width, and a depth of the building may be displayed in a composited manner on a per-region basis, and a construction completion date (Sep. 25, 2022) may be displayed as the additional information, in a composite manner. When acquiring an image, the object-of-interest recognition unit 4910 provides the size information and the volume information of the external object of interest using a distance to a multi-camera that captures the image of the environment outside of the vehicle, and using the zoom setting information. The control unit 4920 performs control in such a manner that 3D AR information on the building that is currently under construction is presented through the transparent display. In the same manner as if the construction of the building were completed, the display unit 4930 displays the 3D AR information on the building in a composited manner, and presents the size (width, height, and depth) information, the volume information and width information through a side-window transparent display.

With reference to FIG. 50B, the camera arranged on the lateral side of the vehicle captures the image of the environment outside of the vehicle and transmits the captured image to the object-of-interest recognition unit 4910. It is assumed that the object of interest is a building in the environment outside of the vehicle that is under construction. The control unit 4920 is provided with final 3D data on the building currently under construction from a real estate service provider and performs control in such a manner that the shape of the building of which the construction is completed is displayed as the additional information (AR information). The display unit 4930 presents the building of which the construction is completed, through the side-window display. At this point, structure information and shape information of the building, as well as the size information and the volume information of the building, are presented. The control unit 4920 adjusts an angle of information that needs to be presented through the side-window transparent display, using the direction in which the occupant inside of the vehicle gazes at the object of interest, and a location of the vehicle. In addition, the control unit 4920 recognizes the needs of the user through a touch signal, a gesture signal, and a voice signal of the user that are received through a separate input unit. Moreover, by rotating the object of interest outside of the vehicle, the control unit 4920 performs display control in such a manner that the user can check whether or not his/her needs are satisfied. That is, in a situation where, as illustrated in FIG. 50B, in practice, the front surface of the building of which the construction is completed and which appears across the side window is displayed in a composited manner, it is assumed that, through a voice signal of the user, the user says, "Show me the rear surface of the building." At this point, the control unit 4920 enables the side-window display to be used as a screen, by performing electrochromic discoloration on the side-window transparent display. Moreover, the control unit 4920 generates image information on the rear surface of the corresponding building using 3D data on the corresponding building and performs control in such a manner that the generated image information is presented through the side-window display.

FIG. 51 is a flowchart illustrating a method of controlling a vehicle display according to still another embodiment of the present disclosure.

The method of controlling a vehicle display according to the present embodiment of the present disclosure includes Step S5110 of recognizing the object of interest outside of the vehicle, Step S5120 of converting information on the external object of interest, and Step S5130 of presenting information resulting from the conversion through the vehicle display.

In Step S5110, the environment outside of the vehicle is recognized using the multi-camera that captures the image of the environment outside of the vehicle, and which external object of interest the occupant inside of the vehicle is interested in is recognized using monitoring information (for example, the direction in which the occupant inside of the vehicle gazes at the object of interest, the touch signal, and the gesture signal) on the occupant inside of the vehicle.

In Step S5120, 3D data on the object of interest is generated or retrieved, and the control information is generated in such a manner that the information on the object of interest that is located across the vehicle display when viewed from the vehicle occupant is displayed in a composited manner. At this point, the size information and the volume information of the object of interest are converted using a distance to the object of interest and zoom information. In addition, the information on the object of interest is retrieved from a database, or is provided from the server of the service provider. Thus, the additional information, such as size information or a volume information, is generated.

FIG. 52 is a block diagram illustrating a system for controlling a vehicle display according to still another embodiment of the present disclosure.

The system for controlling a vehicle display according to the present embodiment of the present disclosure includes a content movement input unit 5210 that receives a request for movement of content among a plurality of display regions, a control unit 5220 that generates a content movement control command according to the request for the movement, and a display unit 5230 that displays the content according to the content movement control command.

The content movement input unit 5210 receives the request for the movement of the content by receiving a user request through at least one of gesture, voice, inputting through a home button, and inputting through a smartphone.

The control unit 5220 determines a content reproduction region, considering allocation information of a content display region according to the request for the movement, and accordingly generates the content movement control command.

The control unit 5220 generates a control command for controlling at least one of sound reproduction and seat rotation, considering movement information of the content reproduction region.

FIGS. 53A and 53B are views illustrating a display presentation region and an example of seat control when moving content according to the present embodiment of the present disclosure.

With reference to FIGS. 53A and 53B, the occupant inside of the vehicle (a portion indicated by a green circle) watches the content using a front-side display. At this point, the occupant inside of the vehicle watches an image on a front-side projection using a projection display technique, and audio sound is reproduced through left and right speakers. With reference to FIGS. 53A and 53B, the image is moved by recognizing a gesture of the occupant inside of the vehicle, by performing inputting through a button on a screen, or by performing inputting through the smartphone. The image is moved toward a front-side display of the transparent display in order to minimize a gap between two displays. With reference to FIGS. 53A and 53B, video content that is being displayed on the front-side display is moved to the side-window display in such a manner that it is continuously reproduced. At this point, a reproduction region varies according to a video arrangement position. It is assumed that the side-window display is divided into two regions, a first region and a second region. Content, when dropping on to the first region or the second, is reproduced on the first region or the second region, respectively. The content, when dropping in a manner that straddles the border between the first region and the second region, is reproduced on the entire screen (the first region and the second region).

With reference to With reference to FIGS. 53A and 53B, the image is moved from a projection display to the transparent display, and the seat rotation is performed. At this point, by adjusting a speaker phase, an audio output source is moved together with the image, and sound is reproduced. The image, the sound, and the seat are controlled according to the needs of the user. As described above, on the assumption that the side-window transparent display is divided into regions, the content, when dropping on to the first region ③ or the second region ①, is reproduced on the first region ③ or the second region ①, respectively. The content, when dropping in a manner that straddles the border between the first region ③ and the second region ①, is reproduced on the entire screen (the first region ③ and the second region ①).

FIG. 54 is a view illustrating an example of control of the display presentation region when moving the content according to the present embodiment of the present disclosure.

Occupant A watches the content using the front-side display. Occupant C and Occupant B are allocated regions, respectively, of the side-window display and check the additional information (AR information) on the external object of interest.

When Occupant A transfers the image content to Occupant B, Occupant A watches the same image content using the front-side display, and Occupant B watches the same image content on the allocated region of the side-window display.

Occupant B may make a request for a function of expanding a video reproduction region of the side-window display. At this point, Occupant B may make a request to expand a content watching region for Occupant B to a region allocated to Occupant C, through gazing recognition, gesture recognition, or the like. Occupant C may check the additional information (AR information) on the external object of interest, using a reallocated region of the display that results from the expansion.

FIG. 55 is a flowchart illustrating a method of controlling a vehicle display according to still another embodiment of the present disclosure.

The method of controlling a vehicle display according to the present embodiment of the present disclosure includes Step S5510 of receiving content movement input, Step S5520 of generating a command for content movement control, and Step S5530 of moving a content presentation region and performing content display according to the command.

In Step S5510, a request for movement of a display region for the content is received through at least one of the gesture of the occupant inside of the vehicle, the voice thereof, the inputting through the button on the screen, and the inputting through the smartphone.

In Step S5520, the command for the content movement control is generated in such a manner that the reproduction region is set according to the video arrangement position.

In Step S5530, by moving the content presentation region, sound reproduction is controlled, and a direction of the seat is changed.

FIG. 56 is a block diagram illustrating a system for controlling a vehicle display according to still another embodiment of the present disclosure.

The system for controlling a vehicle display according to the present embodiment of the present disclosure includes a gaze recognition unit 5610 that acquires gaze information on the display region for the occupant inside of the vehicle, a control unit 5620 that controls a request for and acceptance of an initiative to occupy the display according to the gaze information, and a display unit 5630 that displays the content according to whether or not the initiative is requested and accepted.

When, as a result of the recognizing by the gaze recognition unit 5610, it is checked that a first occupant does not gaze at a screen allocated to himself/herself and that a second occupant makes a request for the initiative while gazing at the screen allocated to the first occupant, the control unit 5620 performs control in such a manner that an initiative for the screen allocated to the first occupant is assigned to the second occupant.

In a case where, as a result of the recognizing by the gaze recognition unit 5610, the first occupant gazes at the screen allocated to himself/herself and the second occupant makes a request for the initiative while gazing at the screen allocated to the first occupant, when it is determined that a request for the initiative is not acceptable, the control unit 5620 performs control in such a manner that a notification of the request for the initiative is not transmitted to the first occupant.

In a case where, as a result of the recognizing by the gaze recognition unit 5610, the first occupant gazes at the screen allocated to himself/herself and the second occupant makes a request for the initiative while gazing at the screen allocated to the first occupant, when it is determined that the request for the initiative is acceptable, the control unit 5620 transmits the notification of the request for the initiative to the first occupant. Moreover, in a case where the first occupant accepts the request for the initiative, the control unit 5620 transmits to the display unit 5630 a control command for minimizing a function widget that is being used by the first occupant.

FIGS. 57A to 57C are views illustrating an example of display occupation control in accordance with a result of gaze monitoring according to the present embodiment of the present disclosure.

With reference to FIG. 57A, the vehicle display is divided into a preset number of regions (for example, two regions). The preset number of regions are allocated to occupants (for example, Occupant A and Occupant B), respectively. Occupant A listens to music using the region allocated to himself/herself, and a screen for music reproduction is displayed on the allocated region. Occupant B watches a video using the region allocated to himself/herself, and a screen for video reproduction is displayed on the allocated region. It is assumed that music is played on a display region for Occupant A and that, as a result of acquiring an image captured by an eye tracking camera, Occupant A does not gaze at the display region. At this point, whereas Occupant A may not make a request to Occupant B for the initiative, Occupant B may make a request to Occupant A for the initiative.

With reference to 57B, Occupant B gazes at the screen allocated to Occupant A for a preset time or longer or makes a request for the initiative for the screen allocated to Occupant A by making a specific gesture. With reference to FIG. 57C, it is possible for Occupant B to operate a screen operation on an entire vehicle display region by acquiring the initiative for the screen allocated to Occupant A.

FIGS. 58A and 58B are views illustrating a situation of control for rejection of the request for the initiative that is in accordance with the result of the gaze monitoring according to the present embodiment of the present disclosure.

With reference to FIG. 58A, the vehicle display is divided into a preset number of regions (for example, 2 regions). The preset number of regions are allocated to occupants (for example, Occupant A and Occupant B), respectively. Occupant A listens to music using the region allocated to himself/herself, and the screen for music reproduction is displayed on the allocated region. Occupant B watches a video using the region allocated to himself/herself, and the screen for video reproduction is displayed on the allocated region. A situation is assumed where, as a result of acquiring the image captured by the eye tracking camera, Occupant A and Occupant B gaze at the display regions, respectively, that are allocated to themselves (Occupant A searches for a song, using the gaze recognition function, and Occupant B is watching a video that is being reproduced on the display region allocated to himself/herself).

With reference to FIG. 58B, although Occupant B gazes at the screen allocated to Occupant A for a preset time or longer or makes a specific gesture, a state where an initiative button is not highlighted and where the request for the initiative is not acceptable is entered. That is, Occupants A and B can only reproduce content on the regions, respectively, that are allocated to themselves and cannot make a request for the initiative for the region to each other.

FIGS. 59A to 59C are views illustrating a situation of control for the request for and the acceptance of the initiative that are in accordance with the result of the gaze monitoring according to the present embodiment of the present disclosure.

With reference to FIG. 59A, the vehicle display is divided into a preset number of regions (for example, 2 regions). The preset number of regions are allocated to occupants (for example, Occupant A and Occupant B), respectively. Occupant A listens to music using the region allocated to himself/herself, and the screen for music reproduction is displayed on the allocated region. Occupant B watches a video using the region allocated to himself/herself, and the screen for video reproduction is displayed on the allocated region. A situation is assumed where, as a result of acquiring the image captured by the eye tracking camera, Occupant A and Occupant B gaze at the display regions, respectively, that are allocated to themselves (Occupant A searches for a song, using the gaze recognition function, and Occupant B is watching a video that is being reproduced on the display region allocated to himself/herself).

With reference to 59B, it is assumed that video content takes precedence over music content in making a request for an initiative for a region. Therefore, in a case where Occupant B gazes at the screen allocated to Occupant A for a preset time or longer or makes a specific gesture, a pop-up message for the request for the initiative by Occupant B is displayed.

With reference to FIG. 59C, when Occupant A accepts the request for the initiative by Occupant B, a music widget used by Occupant A is minimized, and it is possible for Occupant A to continuously search for a song. It is possible for Occupant B to use the display region allocated to himself/ herself as a region for wearing makeup and to watch a video on a large-sized video reproduction region, using the display region previously allocated to Occupant A.

FIG. 60 is a flowchart illustrating a method of controlling a vehicle display according to still another embodiment of the present disclosure.

The method of controlling a vehicle display according to the present embodiment of the present disclosure includes Step S6010 of recognizing a gaze of the occupant, Step S6020 of controlling an initiative for a divisional display region according to a result of recognizing the gaze, and Step S6030 of controlling display occupation according to setting of the initiative.

in a case where it is checked in Step S6010 that the first occupant does not gaze at the screen allocated to himself/ herself and that the second occupant gazes at the screen allocated to the first occupant, in Step S6020, the initiative is controlled in such a manner that the screen allocated to the first occupant is reallocated to the second occupant.

In a case where it is checked in Step S6010 that the first occupant gazes at the screen allocated to himself/herself and that the second occupant gazes at the screen allocated to the first occupant, the situation is that the request for the initiative is not acceptable. Therefore, in Step S6020, control is performed in such a manner that the notification of the request for the initiative is not transmitted.

In a case where it is checked in Step S6010 that the first occupant does not gaze at the screen allocated to himself/ herself and that the second occupant gazes at the screen allocated to the first occupant, the situation is that the request for the initiative is acceptable. Therefore, in Step S6020, the notification of the request for the initiative by the second occupant is provided to the first occupant. In a case where the first occupant allows the assigning of the initiative, in Step S6030, display occupation control is performed in such a manner that the function widget that is being used by the first occupant is minimized.

FIG. 61 is a block diagram illustrating a system for controlling a vehicle display according to still another embodiment of the present disclosure.

The system for controlling a vehicle display according to the present embodiment of the present disclosure includes an operation recognition unit 6110 that recognizes a user request for a widget movement, a widget movement control unit 6120 that generates a control command for a widget movement on a region of the vehicle display at the request of the user, and a display unit 6130 that displays a widget according to the control command for the widget movement.

The operation recognition unit 6110 recognizes the user request using at least one of a touch input signal, a gesture input signal, and the gaze information.

When scrolling is performed with a widget touch, the widget movement control unit 6120 generates a control command in such a manner that a widget group is moved among a plurality of regions of the vehicle display.

The widget movement control unit 6120 allocates regions to a plurality of occupants, respectively, according to their locations, and generates the control command for the widget movement at the request of each occupant.

When the scrolling is performed on a first region, the widget movement control unit 6120 generates a control command in such a manner that the scrolling is operative only on the corresponding widget drawer on the first region and that a widget drawer is hidden from view on a second region.

The widget movement control unit 6120 determines whether or not the user gazes at a widget and generates the control command for highlighting the corresponding widget.

In a case where a widget is dragged and held onto a preset end portion of the first region, the widget movement control unit 6120 generates a control command for moving a widget group on a lower end portion of the first region among the regions.

FIGS. 62A and 62B are views illustrating a process of operating a screen according to recognition of a plurality of users according to the present embodiment of the present disclosure.

With reference to FIGS. 62A and 62B, a side display is divided into a plurality of regions (for example, 2 regions). User A has the right to control a plurality of regions. First to fourth widgets are arranged on a lower end portion of a first region (a left-side region), and fifth to eighth widgets are arranged on a lower end portion of a second region (a right-side region).

When User A performs scrolling by applying a touch signal to a lower end portion of the display region, a group of 4 widgets is moved on a per-group basis among the plurality of regions of the display. That is, group are moved in such a manner that the first to fourth widgets are arranged on the second region and that the fifth to eighth widgets are arranged on the first region. These widgets are aligned by being magnetically snapped.

In a case where User A assigned the first region is using the first region and where User B assigned the second region is using the second region, User A who is relatively close to the side display performs widget scrolling using a screen touch. For remote control, User B who is relatively remoter from the side display performs the widget scrolling using at least one of a gazing recognition technique, a gesture recognition technique, and a technique of recognition through operation of the smartphone. For example, through the recognition of the gaze or gesture of User B, scrolling occurs in such a manner that a change from the first, second, third, and fourth widgets to the fifth, sixth, seventh, and eighth widgets occurs on the lower end portion of the second region for User B.

FIG. 63 is a view illustrating a process of personalization operation through display separation according to the present embodiment of the present disclosure.

It is assumed that the first region and the second region are allocated to User A and that the first to fourth widgets are arranged on a lower end portion of the first region and the fifth to eighth widgets are arranged on the lower end portion of the second region. At this point, in a case where a gaze of a different user (User B) is recognized, a widget drawer is provided on a per-user basis. At this point, one of the first region and the second region is reallocated, considering a riding position of the occupant and a gaze direction of the occupant. FIG. 63 illustrates that the first region and the second region are reallocated to User A and User B, respectively. When scrolling is performed on the first region (Display A), the scrolling is operative only on the corresponding drawer, and a drawer is hidden from view on the second region (Display B).

FIGS. 64A and 64B are views illustrating a process in which a user at a remote location operates the screen according to the present embodiment of the present disclosure.

A situation is assumed where, among divisional regions of the side display, the first region and the second region are allocated to User A and User B, respectively.

When it is recognized that User B gazes at the lower end portion of the display (widget eye gaze), a widget (Widget 3) corresponding to the gaze direction is highlighted. Subsequently, in a case where User B selects a widget region using a gesture (grab) and makes a request for movement in the leftward-rightward direction, a widget scrolling operation is performed. In addition, in a case where User B makes a pinch gesture while gazing at a specific widget, this pinch gesture is recognized as an operation of selecting the corresponding widget. In a case where the corresponding widget (Widget 7) is selected, the corresponding widget is displayed on an upper end portion of the second region in an enlarged manner.

FIG. 65 is a view illustrating a process of moving an individual widget using the touch input signal according to the present embodiment of the present disclosure.

In a case where Widget 2 is long-pressed through touch inputting, a rearrangement mode is entered. When the corresponding widget is dragged and dropped to a desired position, the order in which widgets are arranged is changed. For example, as illustrated in FIG. 65, there occurs a change from a state where the first, second, third, and fourth widgets are arranged in this order on the lower end portion of the first region described above to a state where the first, third, second, and fourth widgets are arranged in this order on the lower end portion of the first region described above.

FIGS. 66A and 66B are views illustrating a process of moving the individual widget using the gaze recognition and the gesture according to the present embodiment of the present disclosure.

When an occupant who is relatively remote from the side display gazes at the lower end portion of the display, a widget on a region corresponding to the corresponding gaze direction is displayed in a highlighted manner. In a case where the user grabs the widget region using a specific gesture and holds the widget region for a preset time (n seconds), the rearrangement mode is entered. It is possible to move the grabbed widget in the leftward-rightward direction. The user may change the order in which the widgets are arranged, by dragging and dropping the grabbed widget to the desired position. That is, there may occur a change from the state where the first, second, third, and fourth widgets are arranged in this order on the lower end portion of the first region described above to a state where the first, third, second, and fourth widgets are arranged in this order on the lower end portion of the first region described above.

FIGS. 67A and 67B are views illustrating a process of moving the widget group by moving a single widget according to the present embodiment of the present disclosure.

Like in the example described above, it is assumed that the first region and the second region are allocated to User A and User B, respectively. The first, second, third, and fourth widgets are arranged in this order on the lower end portion of the first region, the fifth, sixth, seventh, and eighth widgets are arranged in this order on the lower end portion of the second region.

In a case where User A drags and holds the widget (Widget 2) onto the end portion of the first region, the widget group on the lower end portion of the first region is moved. That is, a group including the first to fourth widgets is moved to the lower end portion of the second region, and a group including the fifth to eighth widgets is moved to the lower end portion of the first region.

In addition, in a case where User A releases the corresponding widget (Widget 2) onto a desired position, the order in which the widgets are arranged is completely changed. Thus, the fifth, sixth, second, and seventh widgets are arranged in this order on the lower end portion of the first region, and the eighth, first, third, and fourth widgets are arranged in this order on the lower end portion of the second region.

When the left side of the second region is swiped to the left-side widget group, the widget group is moved among the regions of the display. That is, the eighth, first, third, and fourth widgets are arranged in this order on the lower end portion of the first region, and the fifth, sixth, second, and seventh widgets are arranged in this order on the lower end portion of the second region.

in order to move one widget from one region of the display to the separated region of the display, the one widget may be arranged at a desired position by being dragged and dropped. However, in a case where the screen is physically divided, when dragging from the first region to the second region is performed, a phenomenon occurs where a touch does not occur between the first region and the second region. In order to easily move the widget between the two separated regions of the display, in a case where the widget on the first region is dragged and held farthest in the direction in which the widget on the first region is to be moved, the widget group on the lower end portion of the first region is move and arranged at a desired position (the lower end portion of the second region). It is possible to move a group of a plurality of widgets by moving one widget.

FIG. 68 is a flowchart illustrating a method of controlling a vehicle display according to still another embodiment of the present disclosure.

The method of controlling a vehicle display according to the present embodiment of the present disclosure includes Step S6810 of recognizing a user motion, Step S6820 of generating the control command for the widget movement, and Step S6830 of controlling the display according to a widget movement.

In Step S6810, the user motion is recognized using at least one of the touch input signal, the gesture input signal, and the gaze information.

In Step S6820, when scrolling is performed, with the widget touch, on a plurality of regions into which the vehicle display region is divided, a control command is generated in such a manner that a widget group is moved among the plurality of regions.

In Step S6820, the control command for the widget movement within regions that are allocated according to positions, respectively, of the plurality of occupants is generated at the request of each occupant.

In Step S6820, when scrolling is performed on the first region, a control command is generated in such a manner that the scrolling is operative only on the corresponding widget drawer, and a control command is generated in such a manner that the widget drawer is hidden from view on the second region.

In Step S6820, it is determined whether or not the user gazes at a widget, and a control command for highlighting the corresponding widget is generated.

In Step S6820, in the case where a widget is dragged and held onto a preset end portion of the first region, a control command for moving a widget group on the lower end portion of the first region among the regions is generated.

FIG. 69 is a block diagram illustrating a system for controlling reproduction of content on a medium according to still another embodiment of the present disclosure.

The system for controlling reproduction of content on a medium according to the present embodiment of the present disclosure includes a control target recognition unit 6910 that recognizes target content on a medium that is to be controlled by the user, among content items on mediums that are reproduced using the vehicle display, a control command generation unit 6920 that generates a control command according to a result of recognizing a user request for the target content on the medium, and a medium control unit 6930 that controls the content on the medium according to the control command.

The control target recognition unit 6910 recognizes the target content on the medium using at least one of gaze information of the user, control request information that is received from a device carried by the user, and positional information of the device carried by the user.

The control command generation unit 6920 checks whether that the device carried by the user is positioned inside of or outside of the vehicle, using a UWB sensor, and accordingly generates a control command for the target content on the medium.

The control command generation unit 6920 recognizes the user requests including a request for adjustment of the volume of sound from the target content on the medium and generates the control command.

The medium control unit 6930 adjusts the volume of sound from the target content on the medium according to the control command.

FIG. 70 is a view illustrating a process of distinguishing and recognizing operations for the content on the medium that use smartphones of occupants inside of and outside of the vehicle according to the present embodiment of the present disclosure.

With reference to FIG. 70, a first user group is watching first content on a medium using the side-window display inside of the vehicle, and a second user group is watching second content on the medium using the vehicle display outside of the vehicle.

Using the WiFi Direct technology, the display on which videocasting is performed is selected from the smartphone carried by the user, and the volume of sound from a speaker for the display on which the videocasting is performed is adjusted.

With reference to FIG. 70, among regions of the side-window display and among regions of the front-side display, a target region to be controlled is selected from a smartphone application, and the volume of sound from the content on the medium that is reproduced on the target region is adjusted. The display on which the content on the medium is to be reproduced is selected, and the volume of sound from the content is adjusted through dragging.

FIG. 71 is a view illustrating a process of distinguishing and recognizing the operations for the content on the medium, using gaze recognition information and information for the operations for the content on the medium that use the smartphones according to the present embodiment of the present disclosure.

The eye tracking camera is arranged inside of and outside of the vehicle, and the gaze information of the user who gazes at the side-window display or the front-side display is acquired using the eye tracking camera.

The target content on the medium, the volume of sound from which the user desires to adjust, is determined using the gaze information and information on functional operation of the smartphone. The volume of sound from the content on the medium is adjusted according to volume adjustment information that is input through the smartphone application.

When the menu item "eye gaze remote" is selected from the smartphone application, the user adjusts the volume of sound through the menu item "swipe up and down" while gazing at the display region on which the content on the medium is being reproduced.

FIG. 72 is a view illustrating a process of distinguishing and recognizing the operations for the content on the medium using the gaze recognition information and UWB communication according to the present embodiment of the present disclosure.

The eye tracking camera is arranged inside of and outside of the vehicle, and the gaze information of the user who gazes at the side-window display or the front-side display is acquired using the eye tracking camera.

Through the UWB sensor, it is checked whether or not the smartphone is positioned inside of the vehicle or outside of the vehicle.

The target content on the medium, the volume of sound from which the user desires to adjust, is determined using the gaze information and a result of sensing by the UWB sensor. The volume of sound from the content on the medium is adjusted according to the volume adjustment information that results from operating a hardware sound volume button of the smartphone.

That is, in a case where the user adjusts the volume of sound by operating the hardware sound volume button of the smartphone carried by himself/herself while gazing at the display on which the content on the medium is being reproduced, it is recognized that the user makes a request for the adjustment of the volume of sound from the content on the medium that is being reproduced on the region at which the user gazes. Accordingly, the volume of sound is adjusted.

FIG. 73 is a flowchart illustrating a method of controlling reproduction of content on a medium according to still another embodiment of the present disclosure.

The method of controlling reproduction of content on a medium according to the present embodiment of the present disclosure includes Step S7310 of acquiring information on the environment for controlling the content on the medium, Step S7320 of generating a control command for determining control-target content on the medium using the information on the environment for controlling the content on the medium, and generating a control command for the control-target content on the medium, and Step S7330 of performing control for reproducing the content on the medium according to the control command.

In Step S7310, pieces of information on a plurality of content items on mediums that are reproduced on a plurality of display regions, respectively, in the vehicle, are checked.

In Step S7320, the control-target content on the medium is determined using at least one of the gaze information of the user, the control request information received from a device carried by the user, and the positional information of the device carried by the user.

In Step S7320, it is checked whether a request is for controlling the content on the medium that the occupant staying inside of the vehicle watches or for controlling the content on the medium that the user staying outside of the vehicle watches and thus the request is recognized.

In Step S7330, control of the volume of sound from the content on the medium is performed on the basis of the control command according to the request for the adjustment of the volume of sound from the content on the medium.

FIG. 74 is a block diagram illustrating a system for controlling reproduction of content on a medium according to still another embodiment of the present disclosure.

The system for controlling reproduction of content on a medium according to the present embodiment of the present disclosure includes a reproduction environment recognition unit 7410 that recognizes an environment for reproducing content items on a plurality of mediums that are reproduced using the vehicle display, a control command generation unit 7420 that generates a control command for preventing sound interference among the plurality of mediums, and a medium content control unit 7430 that controls the content on the medium according to the control command.

The reproduction environment recognition unit 7410 recognizes information on a situation where the first user group watches first content in a state where one or several of vehicle seats are detached and are moved to the outside and information on a situation where the second user group watches second content in a state where one or several of the vehicle seats are rotated.

In a situation where the first user group watches the first content that is reproduced front side back through a front-side projection display, the control command generation unit 7420 receives a content control request from a device corresponding to the first user group and accordingly generates a control command.

In a situation where the second user group watches the second content that is reproduced through the side-window display, the control command generation unit 7420 generates a control command in such a manner that a sound bubble is formed using a headrest speaker.

FIG. 75 is a view illustrating a process of preventing the sound interference according to the present embodiment of the present disclosure.

With reference to FIG. 75, in a situation where the vehicle travels, the occupants inside of the vehicle watch content using the front-side projection display. One or several of the vehicle seats are detached and move to the outside, and the other vehicle seats are rotated. The first user group watches the first content while sitting on the vehicle seat that is detached and moved to the outside, and the second user group watches the second content while sitting on the rotated vehicle seat.

The first user group watches the first content through front-side-back reproduction on the front-side projection display (an external-theater mode). At this point, the first user group listens to sound from the first content through a surface vibration speaker. The first user group controls the volume of sound from the first content and reproduction of the first content using the smartphone. The surface vibration speaker is used for communication warning. The surface vibration speaker reproduces sound according to a direction that varies with the location of a pedestrian and reproduces the sound toward a direction in which a movement out of a safety area takes place. The surface vibration speaker generates an alarm sound in a direction in which an indicator light is turned on.

The second user group watches the second content using the side-window display while sitting on the rotated vehicle seat (an internal-theater mode). The second user group listens to the sound from the second content using the headrest speaker. The headrest speaker forms the sound bubble and thus prevents interference with external sound. In addition, the headrest speaker blocks external noise by performing an active noise canceling function.

FIG. 76 is a flowchart illustrating a method of controlling reproduction of content on a medium according to still another embodiment of the present disclosure.

The method of controlling reproduction of content on a medium according to the present embodiment of the present disclosure includes Step S7610 of acquiring information on an environment for reproducing content items on a plurality of mediums, Step S7620 of generating a control command associated with prevention of sound interference among the plurality of mediums, and Step S7630 of performing control for reproducing the content on the medium according to the control command.

In Step S7610, the information on the situation where the first user group watches the first content in the state where one or several of the vehicle seats are detached and are moved to the outside and the information on the situation where the second user group watches the second content in the state where one or several of the vehicle seats are rotated are acquired.

Step S7620, sound from the first content is reproduced through the surface vibration speaker, and a control command for a control request that is received through the device corresponding to the first user group is generated.

In Step S7620, sound from the second content is generated using the headrest speaker, and a control command for forming the sound bubble is generated.

FIG. 77 is a block diagram illustrating a system for determining a risk element and providing a warning according to still another embodiment of the present disclosure.

The system for determining a risk element and providing a warning according to the present embodiment of the present disclosure includes an approaching-object recognition unit 7710 that recognizes whether or not a non-registered object approaching the vehicle is present, a control command generation unit 7720 that determines whether or not a risk situation occurs due to the approaching by the non-registered object and controls a control command associated with providing a warning, and a notification providing unit 7730 that provides a warning notification according to the control command.

Using at least one of an image sensor, a radar sensor, and a lidar sensor, the approaching-object recognition unit 7710 checks whether or not the non-registered object is present.

The approaching-object recognition unit 7710 checks whether or not the non-registered object is present, by checking whether or not an already registered key is retained.

The control command generation unit 7720 analyzes a behavioral pattern of the non-registered object and determines whether or not the risk situation occurs.

Considering information on a situation where the vehicle is parked or stops, the control command generation unit 7720 determines whether or not the risk situation occurs due to the approaching by the non-registered object.

The control command generation unit 7720 checks whether or not the occupant stays inside of the vehicle and provides a warning using at least one of the speaker, the vehicle display, and a device of the user of the vehicle.

The system for determining a risk element and providing a warning according to the present embodiment of the present disclosure further includes a leaving-object recognition unit 7740 that recognizes an object moving out of a preset region of the vehicle. The control command generation unit 7720 generates a control command in such a manner that the warning notification is provided to the object that moves out of a preset region.

FIGS. 78A to 78C are views illustrating a situation of providing a warning of an external risk element and a warning of a movement out of a safety area according to the present embodiment of the present disclosure.

With reference to FIGS. 78A to 78C, in a situation where a passenger rides in the vehicle, when it is determined that a person that is not registered with the vehicle approaches the vehicle, a directional warning is provided using a speaker. In addition, screen displaying is performed using the vehicle display in a direction from which the non-registered person approaches the vehicle. A notification of a situation where the non-registered person approaches the vehicle is provided.

At this point, the situation where the non-registered person approaches the vehicle may be an actual risk element or may not be an actual risk element in a situation where the non-registered person may pass by or may approach the vehicle in order to ride in his/her vehicle parked in a nearby parking space. Therefore, information on a situation where vehicles are currently parked or stop (for example, a place, a time zone, and the presence or absence of a nearby vehicle) is analyzed, and it is determined whether or not to activate a process of providing a warning that the non-registered person approaches the vehicle. For example, in a case where, in a campsite on the bare ground, another vehicle is not parked around the vehicle and where there is no sidewalk, when the non-registered person approaches the vehicle, the warning that the non-registered person approaches the vehicle is provided. In contrast, in a situation where like in a parking lot in a shopping mall, another vehicle is parked around the vehicle and where many persons pass by around the vehicle, the warning that the non-registered person approaches the vehicle is not immediately provided. In this case, when it is detected that the non-registered person sneaks around the vehicle, peeps into the vehicle, or touches his/her hand on the vehicle, it is desirable that the warning is provided according to a result of the detection.

In a situation where a passenger does not ride in the vehicle, in a case where the non-registered person approaches the vehicle and where this is determined as an actual risk element, the directional warning is provided toward a direction from which the non-registered person approaches the vehicle, and the warning is provided to the non-registered person by performing screen displaying using the vehicle display. In addition, the warning is provided to a smart device of an already-registered user of the vehicle, and thus the user who stays outside of the vehicle is alerted that the risk element occurs, that is, the non-registered person approaches the vehicle.

In the above-mentioned example, in order to determine the external risk element, by distinguishing face IDs through an external camera, it is determined whether or not a person who approaches the vehicle is an already-registered user. The warning is provided to a person, having no digital key or smart key, who approaches the vehicle. In a case where the non-registered person stays at a short distance away from the vehicle for a preset time, touches his/her hand on the vehicle, or applies an impact to the vehicle, the warning is provided to the non-registered person. A distance and a shape are measured and recognized, respectively, through a radar or lidar sensor of the vehicle. Using the radar sensor, the presence or absence of an object, information on a distance to the object, information on a size of the object are determined. Using the lidar sensor, the shape of the object and a surrounding environment are recognized. Using a camera, a surrounding object is identified. The warning varies according to whether a warning target is a person or an animal. In a case where the warning target is a person, a warning message is displayed on an external display, and a warning siren sound is provided. In a case where the warning target is an animal, an external light source is caused to flicker, and a warning sound that varies according to a kind of animal is provided. For example, a warning sound having a low frequency (150 to 8000 Hz) is provided to a wild pig.

In the above-mentioned campsite on the bar ground, in a case where one or several occupants stay inside of the vehicle and where an object (a user, a companion dog, or the like) that stays close to the vehicle moves out of a preset area, a warning that the object moves out of a safety area is provided to the occupants who stay inside of the vehicle. At this point, a directional warning is provided toward a direction in which the object moves out of the safety area, and the warning message is presented using the vehicle display. In order to determine whether or not the object moves out of the preset area, a separation distance is determined by performing UWB communication with a smartphone carried by the user, a smart tag attached to the companion dog, or the like. In a case where the user, the companion dog, or the like moves out of the preset area, the warning is provided.

FIG. 79 is a view illustrating a method of determining a risk element and providing a warning according to still another embodiment of the present disclosure.

The method of determining a risk element and providing a warning according to the present embodiment of the present disclosure includes Step S7910 of recognizing at least one of an approaching object and an object moving out of an area that is preset with respect to the vehicle, Step S7920 of generating a control command for providing a warning of occurrence of a risk situation according to a result of the recognition, and Step S7930 of providing the warning notification according to the control command.

In Step S7920, in a case where it is recognized that the object approaches the vehicle, considering a result of analyzing the behavioral pattern of the object that is not registered with the vehicle and the information on the situation where the vehicle is parked or stops, it is determined whether or not the risk situation occurs.

In Step S7920, in a case where it is recognized that the object moves away from the vehicle, the object moving away from the vehicle is recognized by acquiring information on the separation distance to a device of the object moving away from the vehicle.

In Step S7930, the warning notification is provided using at least one of the speaker, the vehicle display, and the device of the user of the vehicle.

FIG. 80 is a block diagram illustrating a vehicle control system for reducing motion sickness according to still another embodiment of the present disclosure.

The vehicle control system for reducing motion sickness according to the present embodiment of the present disclosure includes a motion-sickness reduction control request unit 8010 that makes a request for motion-sickness reduction control according to at least one of a result of analyzing bio-information of the user and a request of the user, a control command generation unit 8020 that generates a control command for executing a logic for the motion-sickness reduction control, and a display and in-vehicle layout change unit 8030 that, according to the control command, determines a display region on which content is reproduced and changes a layout of an in-vehicle seat.

In a case where the bio-information is analyzed, the motion-sickness reduction control request unit 8010 acquires the bio-information using at least one of the camera and the radar, analyzes the acquired bio-information, and makes a request for the motion-sickness reduction control.

The control command generation unit 8020 generates a control command for performing seat reclining in a motion-sickness reduction mode.

The control command generation unit 8020 generates a control command for adjusting an angle of view of a projector according to an angle by which the seat is reclined and for changing the region of the display on which the content is reproduced.

FIGS. 81A to 81C are views illustrating that the display and the in-vehicle layout are changed for motion-sickness reduction according to the present embodiment of the present disclosure.

Content is reproduced using the projection display (a front-side glass pane). A heart rate and a respiration rate are measured on the basis of an image of the inside of the vehicle that is acquired by the camera and information acquired by a wireless radar, and thus a bio-signal is detected.

The logic for the motion-sickness reduction control is executed when, as a result of detecting the bio-signal, it is checked that there is a likelihood that motion sickness will occur, or at the request of the user. With the logic for the motion-sickness reduction control, the seat operates in a gravity-free seat mode. The reproduction region is changed in such a manner that content is reproduced using the projection display (a roof glass pane). A sound for the motion-sickness reduction is reproduced through the headrest speaker. The active noise canceling function is performed, and thus a seat-to-seat conversation function is provided. As the sound that is provided to the user, an external sound is reproduced in such a manner that the user can feel a vehicle speed, or a sound associated with relaxation or a sound of nature is reproduced. A channel in which the sound is reproduced varies according to the a situation where the vehicle travels. For example, when the vehicle travels in a straight line, the sound is reproduced in two channels, that is, left and right channels. When the vehicle turns to the left, the sound in the left channel is reproduced, and when the vehicle turns to the right, the sound in the right channel is reproduced.

FIG. 82 is a view illustrating a variable display layout of a front-side display according to the present embodiment of the present disclosure.

A communication lamp region is arranged on an upper end portion of the front-side projection display, and a cluster and task bar region is arranged on a lower end portion thereof. The external environment is shown through the center portion thereof (the transparent display).

The communication lamp region may be arranged on the upper end portion of the front-side projection display, the cluster and task bar region may be arranged on the lower end portion thereof, and a full-size widget screen may be arranged on the center portion thereof.

A path information provision screen may be arranged on the upper end portion of the front-side projection display, and the cluster and task bar region may be arranged on the lower end portion thereof. Moreover, the center portion thereof are divided into two parts, and a half-size widget screen and a transparent display region that is seen from the outside may be arranged on the two parts, respectively.

The cluster and task bar region may be arranged on the lower end portion of the front-side projection display, and the video content may be reproduced in a full screen mode on the remaining region thereof.

The video content may be reproduced on a roof glass pane projection display, and one portion of the video content may also be displayed on a front-side projection display region. The cluster and task bar region may be arranged on the lower end portion of the front-side projection display, an external environment may be seen through an upper end region of the front-side projection display, and the external environment may be seen through regions of the front-side projection display other than a lower end region thereof.

FIGS. 83A and 83B are views illustrating the projection display (a front-side glass pane) according to the present embodiment of the present disclosure.

The communication lamp region on which a text message that is provided to another vehicle or a pedestrian is displayed is arranged on an upper end region of the front-side projection display. Content information, traveling information, and the like are displayed on regions of the front-side projection display other than the upper end region thereof in such a manner that the occupant inside of the vehicle may check the content information, the traveling information, and the like. The angle of view of the projector is adjusted, and an image watching region and a viewing angle are adjusted.

FIG. 84 is a view illustrating a projector in a situation where the projection display (the front-side glass pane) according to the present embodiment of the present disclosure is used.

A rotational shaft of an actuator 8410 is connected to a rotational shaft of a support structure 8420, and a projector 8430 is supported by a projector-cradling bracket structure 8440.

FIGS. 85A and 85B are views illustrating the projection display (the roof glass pane) according to the present embodiment of the present disclosure.

As described above, the layout of the in-vehicle seat is changed to the motion-sickness reduction mode, and the sound for the motion-sickness reduction is provided through the headrest speaker.

The angle of view of the projector is adjusted, and content is reproduced on a region of the roof glass pane projection display. The seat is reclined, and the viewing angle is adjusted in such a manner that the content may be watched through the roof glass pane projection display.

FIG. 86 is a view illustrating the projector in a situation where the projection display (the roof glass pane) according to the present embodiment of the present disclosure is used.

Rotation of the actuator 8410 rotates the projector 8430, and thus the angle of view is changed.

FIGS. 87A to 87G are views illustrating a process of moving an image according to the present embodiment of the present disclosure.

A video is reproduced through the front-side projection display, and a communication message is displayed, toward the outside, on an upper end region of the front-side projection display.

At the request of the user, a region of an external communication lamp is maintained, and a video is reproduced on a lower end region of the external communication lamp in a manner that is fitted to the full size of a screen.

When a function of reducing motion-sickness is performed, in a state where the region of the external communication lamp is maintained, a video is moved to the roof glass pane projection display and is displayed thereon, and a seat reclining operation is performed.

The video is reproduced on a region of the roof glass pane projection display, and the external communication lamp operates concurrently.

While the video is being reproduced on the region of the roof glass pane projection display, a GUI animation is played on a film region of a lower end portion of the roof glass pane projection display in order for the user to feel a moving speed of the vehicle. A line animation may be reproduced as if the vehicle were passing between two lines of lampposts. In addition, a sound of which a speed corresponds to a speed of the vehicle, a sound of nature, or like may be reproduced through the headrest speaker.

While a video is being reproduced on the region of the roof glass pane projection display, an external traveling situation is made to be recognizable with the naked eye by making the external communication lamp region transparent. Thus, the sensation of the speed of the vehicle is possibly made to be experienced.

While a video is being reproduced on the region of the roof glass pane projection display, the external traveling situation is made to be recognizable with the naked eye by making the entire front-side projection display transparent. Thus, the sensation of the speed of the vehicle is possibly made to be experienced.

FIG. 88 is a flowchart illustrating a vehicle control method for reducing motion-sickness according to still another embodiment of the present disclosure.

The vehicle control method for reducing motion-sickness according to the present embodiment of the present disclosure includes Step S8810 of receiving a request for the motion-sickness reduction control using at least one of a result of analysis of the bio-information of the user and request information of the user, Step S8820 of generating a control command for the motion-sickness reduction control, and Step S8830 of changing a setting of the display and the in-vehicle layout according to the control command.

In Step S8810, in a case where the result of the analysis of the bio-information is used, the request for the motion-sickness reduction control is received using the result of acquiring and analyzing the bio-information associated with motion-sickness.

In Step S8820, a control command for performing the seat reclining is generated.

In Step S8820, a control command for reproducing the sound for the motion-sickness reduction is generated.

In Step S8820, a control command for adjusting the angle of view of the projector and changing the display region on which content is reproduced is generated.

In Step S8830, according to the control command, the display region on which the content is reproduced changed from the front-side projection display to the roof glass pane projection display, and a seat layout is changed by adjusting a reclining angle.

FIG. 89 is a block diagram illustrating a system for controlling a vehicle display according to still another embodiment of the present disclosure.

The system for controlling a vehicle display according to the present embodiment of the present disclosure includes a content movement request reception unit 8910 that receives the request for the movement of the content among the plurality of display regions, a control command generation unit 8920 that generates a control command for moving the content according to the request for movement of content, changing the speaker, and changing the in-vehicle seat layout, and a sound and in-vehicle layout changing unit 8930 that changes a sound and an in-vehicle seat layout according to the control command.

The content movement request reception unit 8910 receives at least one of the gesture of the vehicle occupant, the inputting through the button on the screen, and the request for movement of an image using a device of the occupant.

According to the request for the movement of the content from a first display to a second display, the control command generation unit 8920 generates the control command for display movement in such a manner that a separation distance between the first display and the second display is decreased.

The control command generation unit 8920 performs grouping of speaker groups that reproduce a sound, considering a direction in which the content is moved.

The control command generation unit 8920 generates the control command for changing the in-vehicle layout and rotating the seat, considering the direction in which the content is moved.

FIGS. 90A to 90D are views illustrating a process of changing the sound and the in-vehicle layout according to movement of the image between the displays according to the present embodiment of the present disclosure.

1. In a situation where the front-side projection image is watched, the occupant inside of the vehicle watches content using the front-side projection display. At this point, a sound is reproduced using a first speak group (for example, two speakers positioned in the front of the inside of the vehicle).

2. When an image is moved and reproduced, in a situation where the side-window display is moved, the request for the movement of the content between the plurality of display regions is received. At this time, a request for movement of an image is received using the gesture of the vehicle occupant, or by performing inputting through the button on the screen or inputting through the smartphone. When the image is moved, in order to minimize a distance between a pre-movement region (the front-side projection display) and a post-movement region (the side-window display), the side-window display that is a transparent display is slid toward the front-side projection display.

3. In a situation where the image is to be moved, image content that is being watched is moved from a region of the front-side projection display to a region of the side-window display, and according to a result of the movement, a seat of the vehicle occupant is rotated. In addition, a sound is reproduced through a second speaker group (with reference to FIG. 90, content is moved to a region of a left side-window display, and a speaker arranged on the left side of the rear of the vehicle is added to the first speaker group, thereby constituting the second speaker group).

4. In a situation where the side-window transparent display is completely moved, the image content is completely moved to the region of the side-window display, and the seat on which the occupant sits is rotated by 90 degrees in the leftward direction. Thus, a seat layout is completely changed. A stereo sound is reproduced using left and right speakers with respect to the side-window display.

FIG. 91 is a flowchart illustrating a method of controlling a vehicle display according to still another embodiment of the present disclosure.

The method of controlling a vehicle display according to the present embodiment of the present disclosure includes Step S9110 of receiving the request for the movement of the content among the plurality of display regions, Step S9120 of generating a control command associated with the movement of the content, the rotation of the seat, and control of the speaker according to the request, and Step of S9130 of moving the content, rotating the seat, changing the in-vehicle layout, and generating controlling a speaker that reproduces a sound, according to the control command.

In Step S9110, the request is received using at least one of the gesture of the vehicle occupant, the inputting through the button, and request information that is input through an application on a device of the vehicle occupant.

In Step S9120, considering a direction in which the content is moved, the control command for controlling the movement of the display is generated.

In Step S9120, considering the direction in which the content is moved, the control command for determining the speaker group through which the sound is reproduced is generated.

FIG. 92 is a block diagram illustrating a system for controlling a vehicle display according to still another embodiment of the present disclosure.

The system for controlling a vehicle display according to the present embodiment of the present disclosure includes a display movement request reception unit 9210 that receives a request for movement of a first display, a control command generation unit 9220 that generates a control command for moving the first display according to the request, and an additional information display unit 9230 that displays the additional information on the first display moved according to the control command and changes displaying of content presented on a region to which the first display is completely moved.

The display movement request reception unit 9210 receives the request for the movement of the first display using at least one of the gesture of the vehicle occupant, the inputting through the button, and the request information that is received from the device of the vehicle occupant.

The control command generation unit 9220 transmits the control command for moving along a moving rail the first display that is the transparent display.

The additional information display unit 9230 makes transparent a projection region, on which the content is presented, of the region to which the first display is completely moved, and displays the additional information, with the AR information corresponding to a position of an external object.

The additional information display unit 9230 adjusts a size of the content that is presented on the region to which the first display is completely moved, and displays the content of which the size is adjusted.

FIGS. 93A to 93E are views illustrating a sliding display according to the present embodiment of the present disclosure.

Figure 93:
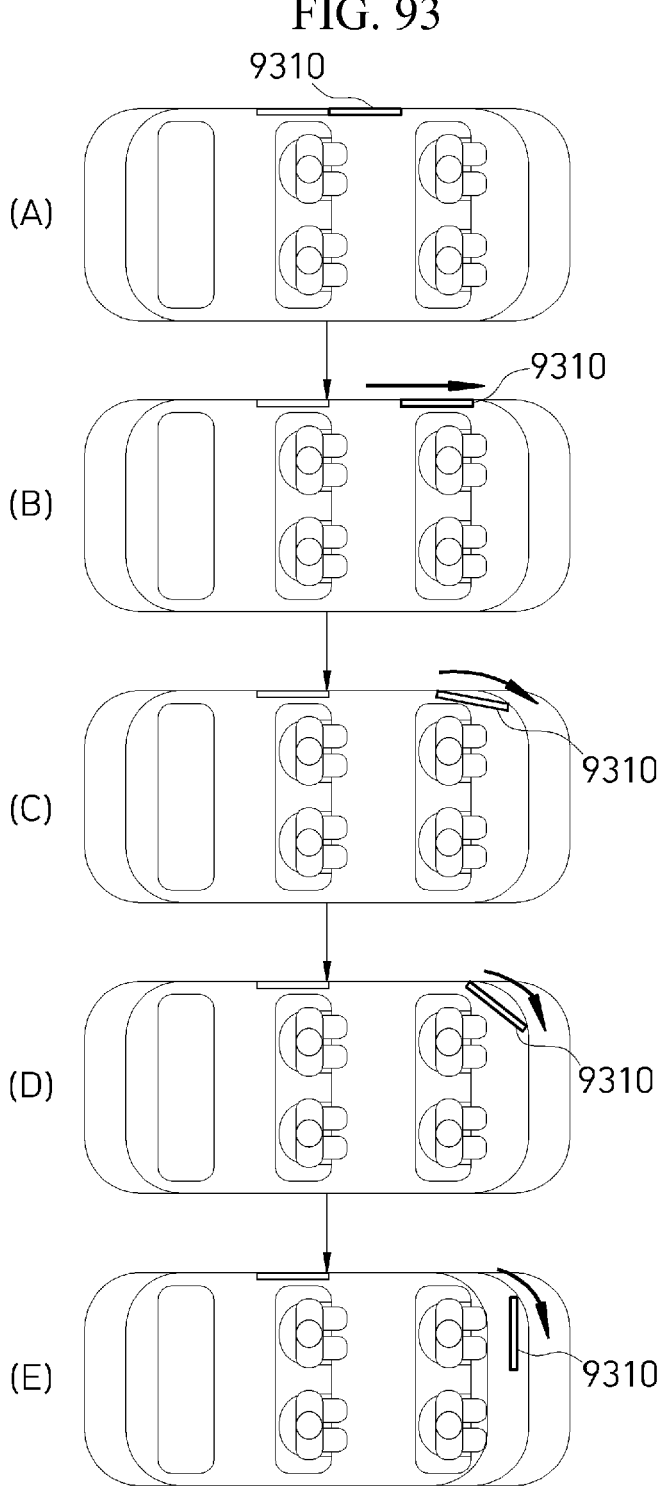

With reference to FIG. 93A, the side-window transparent display is divided into a plurality of regions. Among the plurality of regions, a first transparent display 9310 is selected as a moving-target display. At this point, selection information on the moving-target display is received using at least one of the gesture of the occupant inside of the vehicle, the inputting through the button, gazing information, and operational information of the device of the occupant inside of the vehicle.

With reference to FIG. 93B, the first transparent display 9310 is moved along a moving rail to a left region of the front of the vehicle.

With reference to FIGS. 93C to 93E, the first transparent display 9310 is moved along the moving rail and is arranged on a windshield region of the front of the vehicle.

FIGS. 94A to 94C are views illustrating a process of moving the display and displaying AR content according to the present embodiment of the present disclosure.

FIG. 94A illustrates a situation where the first transparent display is moved, but is not arranged on the windshield region of the front of the vehicle. The vehicle occupant watches path summarization information, navigation information, and medium information through the front-side projection display. At this point, the front-side projection display is variable in a transparent mode and a non-transparent mode, but cannot express information on a situation in front of the vehicle, in an AR format.

With reference to FIGS. 94B and 94C, the first transparent display is moved from the side of the vehicle to the front of the vehicle. A region of the front-side projection display, on which content (navigation information) is displayed is made to be transparent, and the additional information (the AR information) is displayed on the transparent content region through the first transparent display. That is, one region of the front-side projection display is made to be transparent, and navigation content is displayed as the AR content. Thus, it is possible that the vehicle occupant checks information through a more advanced surrounding-environment information display. With reference to FIG. 94C, the navigation information is displayed as the AR content on an actual road, and the additional information (coupon discount information, store information, or the like) on an object in which the user is interested (an object at which the user gazes) is displayed as the AR content. In a case where a region of the front-side display on which information is presented before the first transparent display is moved to the front of the vehicle overlaps a region of the transparent display, an amount of the front-side display information is adjusted for the vehicle occupant (an occupant on the right side of the first row), and thus the front-side display information is displayed without information loss using the front-side projection display.

FIG. 95 is a flowchart illustrating a method of controlling a vehicle display according to still another embodiment of the present disclosure.

The method of controlling a vehicle display according to the present embodiment of the present disclosure includes Step S9510 of receiving the request for the movement of the first display, Step S9520 of generating the control command for moving the first display, and Step S9530 of moving the first display according to the control command and displaying the additional information on the region to which the first display is completely moved.

In Step S9520, the control command for moving along the moving rail the first display that is the transparent display is generated.

In Step S9530, the projection region, on which the content is presented, of the region to which the first display is completely moved is made to be transparent, and the additional information is displayed, with the AR information corresponding to an external object.

In Step S9530, according to a state where the projection region and the region of the first display overlap each other, an amount of content that is presented on the projection region is adjusted.

FIG. 96 is a block diagram illustrating a system for warping an image on a vehicle display according to still another embodiment of the present disclosure.

The system for warping an image on a vehicle display according to the present embodiment of the present disclosure includes an occupant monitoring unit 9610 that checks information on a result of monitoring an occupant, a control command generation unit 9620 that generates a control command for warping an image according to the result of monitoring the occupant, and a warped image display unit 9630 that displays a warped image according to the control command.

The occupant monitoring unit 9610 checks at least one of a position of the user who rides in the vehicle, information on a separation distance between a reference point of the vehicle display and the user, and gazing position information of the occupant.

The control command generation unit 9620 generates the control command for determining the degree of warping according to the result of monitoring the occupant.

The warped image is provided to provide a visual effect in which an image that may appear twisted according to the position of the occupant appears in the same manner as when viewed from the front. At this point, the degree of the warping of the image is determined by determining positions of the occupant's eyes and measuring a distance to the central reference point of the display and an angle with respect thereof. Distances in the forward, backward, upward, and downward directions (a person's sitting height or like) to the central reference point of the display are all three-dimensionally measured. The warping of the image is performed to provide the visual effect in which an image appears from any angle in the same manner as when viewed from the front. An in-vehicle camera (for example, a ToF or RGB camera) is used to determine the distances. The measured distances are compared with references for measuring positions of a person's eyes and the person's head and posture. At this point, values of points are used to calculate values of length and thus a trigonometric ratio or the like. In a case where the position of the occupant is moved, warping may be performed in real time. Alternatively, after the position thereof is completely moved, the degree of the warping may be set.

FIGS. 97A and 97B are views illustrating an example of an image based on each occupant's position and an example of warping according to the present embodiment of the present disclosure.

With reference to FIGS. 97A and 97B, the image content is displayed through the side-window transparent display of the vehicle. At this point, it is assumed that a first user sits relatively close to the side-window transparent display and that a second user sits relatively remote therefrom.

When it is assumed that the first user and the second gaze at the same side-window transparent display, the degree of the warping is set to vary on the same display region.

That is, a different degree of warping is set for the first user who sits relatively close to the display than for the second user who sits relatively remote from the display.

From a front view of the display in FIG. 97, in a case where the side-window transparent display is viewed from the front, it can be seen that an image, having an actual degree of warping, that is provided to the first user and an image, having an actual degree of warping, that is provided to the second user are different in shape from each other.

FIG. 98 is a view illustrating the warping of the image according to the gaze information of the occupant according to the present embodiment of the present disclosure.

With reference to FIG. 98, the image content is displayed through the side-window transparent display of the vehicle. At this point, the first user having a relatively small sitting height gazes at the side-window transparent display at a different angle than the second user having a relatively great sitting height. When it is assumed that the first user and the second gaze at the same side-window transparent display, the degree of the warping is set to vary on the same display region.

That is, a different degree of warping is set for the first user having a relatively small sitting height than for the second user having a relatively great sitting height.

From the front view of the display in FIG. 98, in the case where the side-window transparent display is viewed from the front, it can be seen that an image, having an actual degree of warping, that is provided to the first user and an image, having an actual degree of warping, that is provided to the second user are different in shape from each other.

FIG. 99 is a view illustrating the warping of the image according to a distance to the occupant and the gaze information according to the present embodiment of the present disclosure.

It is assumed that the seat within the vehicle is rotated and where the image content is watched through the side-window display.

From FIG. 99, in a case where the occupant who sits at the sitting position watches the image content through the side-window display, it can be seen that the image content on the display region appears in the shape of a rectangle to the occupant's eyes.

From the front view of the display that illustrates a warping situation, it can be seen that a height of one end of the warped image that is close to the occupant is relatively smaller than a height of the other end thereof that is relatively remote from the occupant.

FIG. 100 is a view illustrating a method of warping an image on a vehicle display according to still another embodiment of the present disclosure.

The method of warping an image on a vehicle display according to the present embodiment of the present disclosure includes Step S10010 of performing monitoring of the occupant, Step S10020 of generating a control command for warping an image according to a result of monitoring of the occupant, and Step S10030 of displaying a warped image according to the control command.

In Step S10010, at least one of the riding position of the occupant who rides in the vehicle, the information on the separation distance of the user to the reference point of the vehicle display, and the gazing position information of the occupant is checked. In Step S10020, the control command for determining the degree of the warping according to a result of the checking in Step S10010 is generated.

In Step S10030, the warped image, in which the height of one end thereof that is close to the occupant is set to be smaller than the height of the other end thereof that is relatively remote from the occupant, is displayed.

FIG. 101 is a block diagram illustrating a system for controlling a vehicle display according to still another embodiment of the present disclosure.

The system for controlling a vehicle display according to the present embodiment of the present disclosure includes an occupant monitoring unit 10110 that checks the information on the separation distance between the reference point of the vehicle display and the occupant, a control command generation unit 10120 that generates a control command for dividing the vehicle display into regions using the information on the separation distance, and a region division display unit 10130 that allocates the resulting regions of the display to the occupants, respectively, according to the control command, and displays content on the resulting regions of the display according to the needs of the users, respectively.

The occupant monitoring unit 10110 checks the information on the separation distance using the in-vehicle camera.

The control command generation unit 10120 sets a value of a length of the display that is seen by each occupant's eyes, by determining positions of each occupant's eyes.

The control command generation unit 10120 generates the control command for adjusting the number of divisions of an image according to a width-to-length ratio of the image that is provided to each occupant.

FIGS. 102A and 102B are views illustrating that the display is divided into regions according to the distance to the occupant according to the present embodiment of the present disclosure.

With reference to FIGS. 102A and 102B, Users A and B who ride in seats, respectively, in the second row check the additional information (the AR information) on the external object of interest using a left-side transparent display. At this point, contour-line information on the external object of interest is displayed as the additional information. Separation distances of User A and User B to the central reference point of the left-side transparent display are different from each other. The left-side transparent display is divided into regions on the basis of the separation distances. That is, although there are two users, the transparent display are not divided in half, that is, into two regions. The number of divisions of the screen is determined considering the information on the separation distance.

Accordingly, although sitting on different seats, users may use the regions, respectively, that result from dividing the display at the same division ratio of the image.

The in-vehicle camera (for example, the ToF or RGB camera) is used to acquire the information on the separation distance between the transparent display and the user. Positions of the user's eyes are determined using a camera. The same value of the length of the display that is seen by the user's eyes is set not only by using a predetermined position of the display, but also by calculating the trigonometric ratio.

That is, a divisional-display function is provided by determining the value of the length and thus adjusting an image region in such a manner that screen image ratios are the same at the same distance toward directions, respectively, in which the occupants gaze at the display.

FIG. 103 is a flowchart illustrating a method of controlling a vehicle display according to still another embodiment of the present disclosure.

The method of controlling a vehicle display according to the present embodiment of the present disclosure includes Step S10310 of performing monitoring information of the occupant by checking the separation distance between the vehicle display and the occupant, Step S10320 of generating a control command for dividing the display into regions using the separation distance, and Step S10330 of providing regions that result from dividing the display according to the control command.

In Step S10310, the separation distance is checked using a camera capturing an image of the inside of the vehicle.

In Step S10320, the value of the length of the display that is seen by each occupant's eyes is set by determining the positions of each occupant's eyes, and the control command for adjusting the number of divisions of the image according to the width-to-length ratio of the image is generated.

In Step S10330, the regions that result from dividing the display are provided to the plurality of occupants, respectively, in an allocated manner, and content is displayed on the corresponding regions according to the needs of the plurality of occupants, respectively.

The methods according to the embodiments of the present disclosure may be realized on a computer system or may be recorded on a recording medium. The computer system may include at least one processor, a memory, a user input device, a data communication bus, a user output device, and a storage device. The constituent elements described above perform data communication with each other through the data communication bus.

The computer system may further include a network interface coupled to a network. The processor may be a central processing unit (CPU) or a semiconductor device that processes a command stored in the memory and/or the storage device.

Examples of the memory and the storage devices may include various types of volatile or non-volatile storage mediums. The examples of the memory may include a ROM and a RAM.

Therefore, the methods according to the embodiments of the present disclosure may be realized in a manner that is performable on the computer system. When the methods according to the embodiments of the present disclosure are performed on a computer apparatus, computer-readable commands may be executed to perform the methods according to the present disclosure.

It is possible that the above-described above methods according to the present disclosure are realized, as computer-readable codes, on a computer-readable recording medium. Computer-readable recording mediums include all types of recording mediums on which data that can be decoded by the computer system are stored. Examples of these computer-readable recording mediums include a read only memory (ROM), a random access memory (RAM), a magnetic tape, a magnetic disk, a flash memory, an optical data storage device, and the like. In addition, the methods according to the present disclosure may be stored and performed as codes on the computer-readable recording medium, the codes being distributed to computer systems connected over a computer network and being readable in a distributed manner.

FIG. 104 is a view illustrating a purpose-built vehicle according to still another embodiment of the present disclosure.

With reference to FIG. 104, a purpose-built vehicle (PBV) 100 includes a skateboard 110, a cabin 120, and a seat 130.

The skateboard 110 constitutes a bottom surface of a vehicle body.

The cabin 120 is combined with an upper end portion of the skateboard 110 and thus provides a riding space and a separate accommodation space.

For example, because a height of a bottom surface of the cabin 120 is small, in order to secure the field of vision of a driver's seat, a height of the seat 130 has to be increasingly adjusted to a position where the line of visibility is secured. Accordingly, the separate accommodation space can be secured in a lower end portion of the seat 130 installed in the riding space in the cabin 120.

FIG. 105 is a vertical cross-sectional view taken along line A-A on FIG. 104.

With reference to FIG. 105, a battery mounting space 111 is formed in the skateboard 110. The battery mounting space 111 has to be designed considering the degree of precision of installation of a battery (not illustrated) and the degree of precision of control thereof.

For convenience of the occupant, the cabin 120 has to be designed in such a manner that the seat 130 is not only reclinable, but also rotatable by itself. Particularly, the cabin 120 may be designed in such a manner that an overall height L thereof is such that the occupant can be in place on his/her legs.

At this point, the overall height L of the cabin 120 may be adjusted under separate control.

A display 121 installed in the cabin 120 may transmit an entertainment screen image for infotainment and other informational images to a screen.

A windshield 122 selectively presents an image toward the inside and the outside of the vehicle.

The windshield 122 includes an electrochromic image region 122_1 and a non-transparent image region 122_2.

Shading of the electrochromic image region 122_1 is adjustable in such a manner that, according to application of electric power, an image is selectively presented toward the inside and the outside of the vehicle.

The non-transparent image region 122_2 extends from a lower end of the electrochromic image region 122_1.

As another example, the windshield 122 may be divided into an internal display region and an external display region.

For example, the internal display region may present the image toward the inside of the vehicle, and the external display region may present the image toward the outside of the vehicle. At this point, the internal and external display regions may have respective electricity application paths that are separated from each other.

FIGS. 106 and 107 are horizontal cross-sectional views taken along line A-A on FIG. 104.

FIG. 106 illustrates an example where the occupant riding in the purpose-built vehicle 100 watches an image on the display 121 by performing switching to an autonomous traveling mode and activates front-side and rear-side left speakers 123_1 and 123_2 of an internal speaker 123.

A position of the seat 130 in each row is adjustable according to need. Thus, the occupant may watch the corresponding image in such a manner that the position of the seat 130 is comfortably adjusted to a position facing the display 121 installed inside of the vehicle.

At this point, the internal speaker 123 may provide sounds through a plurality of speakers 123_1, 123_2, 123_3, and 123_4 that are connected to each other, under the control of the occupant and/or according to a basic setting.

With reference to FIG. 107, in a situation in FIG. 106, the occupant may separately detach a sitting base of the seat 130 and may watch an external image on the windshield 122 after the sitting base is fitted in place outside of the vehicle.

At this point, the external speaker 124 may provide sounds through a plurality of speakers 124_1 and 124_2 that are connected to each other, under the control of the occupant and/or according to a basic setting.

FIGS. 108 to 114 and FIG. 115 are views illustrating various seat structures, respectively, of the purpose-built vehicle according to the present embodiment of the present disclosure.

With reference to FIGS. 108 to 114 and FIG. 115, the seat 130 includes a frame 131 and a sitting base 132.

The frame 131 is rotatable by itself and is reclinable in an adjustable manner. A headrest of the frame 131 is adjustable, and a lumber support thereof is adjustable.

In addition, the frame 131 is rotatable by itself, is reclinable by a predetermined angle α in an adjustable manner, and is movable backward and forward by a predetermined distance in an adjustable manner.

The frame 131 operates in conjunction with an ECU (not illustrated) that is possibly synchronized to big data. The frame 131 transmits a weight on the seating base 132 to the ECU. The ECU performs computation for comparison of the weight with statistical information accumulated in the big data. Then, the ECU may adjust a position of the frame 131 by applying a value of a result of the computation or may enable the occupant to check the corresponding information using the display and to select the position of the frame 131.

As another example, the position of the frame 131 is adjustable in a manner that is moved along a rail (not illustrated) installed within the cabin 120.

The seating base 132 is fastened to the frame 131 in a snap-fit way and thus provides a sitting space.

The seating base 132 may be configured to have such a rotatable structure that the seating base 132 is detached from the frame 131 of the seat 130 and then is possibly fitted in place in an arbitrary space.

In this case, the seating base 132 may have a separate grip groove 133 in a lower end portion thereof that is brought into contact with the frame 131 in such a manner that seating base 132 is easily detachable to and attachable from the frame 131. The grip groove 133 may be formed in the shape of a handle.

An upper end surface of the seating base 132 has such a curved structure that the upper end surface thereof is increasingly inclined upward toward the front. A lateral surface of the seating base 132 may be configured to have such a curved structure that the lateral surface thereof is increasingly expanded outward toward a downward direction in order for the user's calves to rest on the lateral surface thereof.

It is preferable that the seating base 132 is made of carbon fiber reinformed plastic (CFRP) to ensure rigidity for sitting on the seating base 132.

The seating base 132 may be configured to have such an integrated structure that three surfaces thereof are connected to each other.

A plurality of ribs are arranged in each of several sections of the inside of the seating base 132, and thus rigidity of the seating base 132 may be further enhanced.

As another example, an inner surface of the seating base 132 may be configured to have a honeycomb structure, and thus the rigidity of the seating base 132 may be further enhanced.

The seating base 132 has such a fitting structure that seating on the seating base 132 is possible by rotating supports 134 that are capable of supporting at least two surfaces of the seating base 132, respectively. In this case, it is important that the seating base 132 is fitted in place while keeping in parallel with a floor by setting lengths of the supports 134 and angles of rotation thereof. It is preferable that the seating base 132 is configured to have a three point or four point support structure.

The seating base 132 may include a cushioning member (not illustrated), capable of absorbing an impact, on an edge thereof that is brought into contact with the frame 131. In this case, the cushioning member is fastened to an inner edge of the seating base 132. Thus, the cushioning member cushions against a weight of the occupant sitting on the seating base 132 and absorbs an impact between the seating base 132 and the frame 131.

Figure 113:
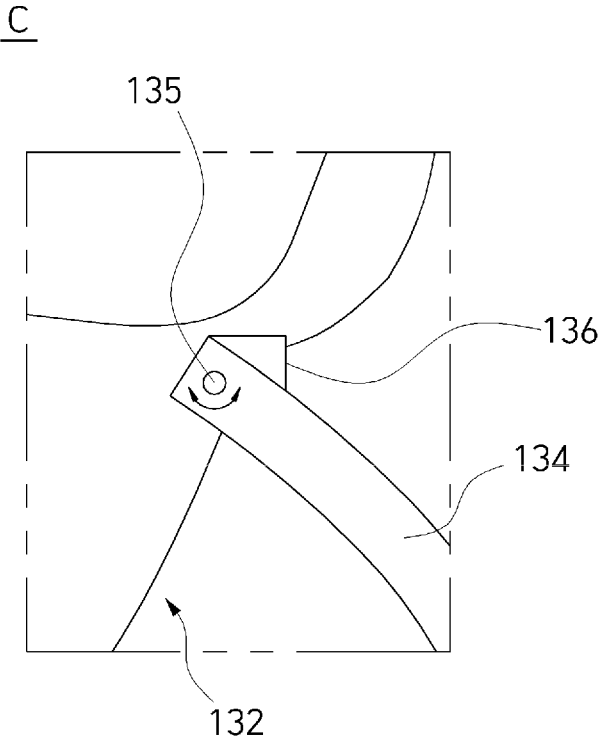

The seating base 132 in FIG. 113 includes the supports 134, a hinge shaft 135, and fixation end portions 136.

The supports 134 have a structure where they are rotatable with respect to both lateral surfaces, respectively, of the seating base 132.

The hinge shaft 135 rotatably connects the supports 134 to the both lateral surfaces, respectively, of the seating base 132.

The fixation end portions 136 may be positioned on respective sections, respectively, of lateral end portions of the seating base 132 in such a manner that the supports 134 are kept fitted in place in a state of being rotated outward. That is, the fixation end portions 136 may function as stoppers that fix the supports 134 that serve as stands.

Figure 114:
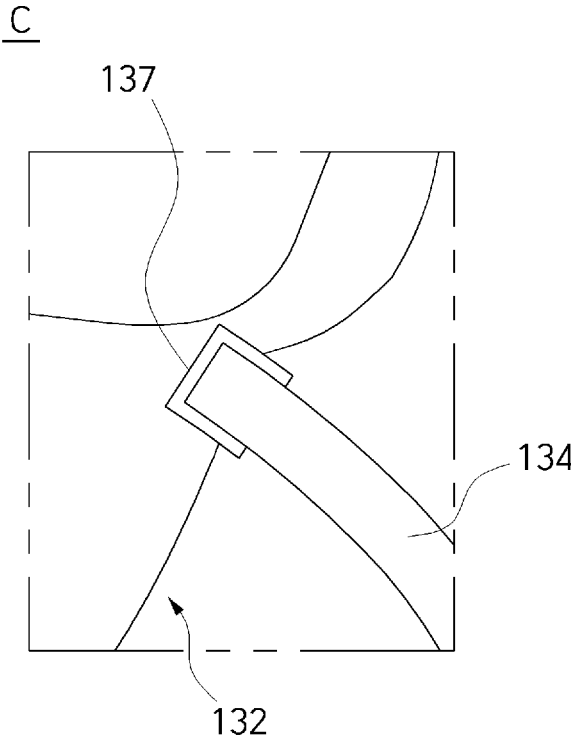

The seating base 132 in FIG. 114 includes the supports 134 and brackets 137.

In this case, the supports 134 are connected to the both lateral surfaces, respectively, of the seating base 132 in such a manner that they are rotatable with respect thereto.

The brackets 137 may be fastened to respective sections, respectively, of the lateral end portions of the seating base 132 in a snap-fit way in such a manner that the supports 134 maintain rigidities thereof in a state of being rotated outward.

Figure 115:
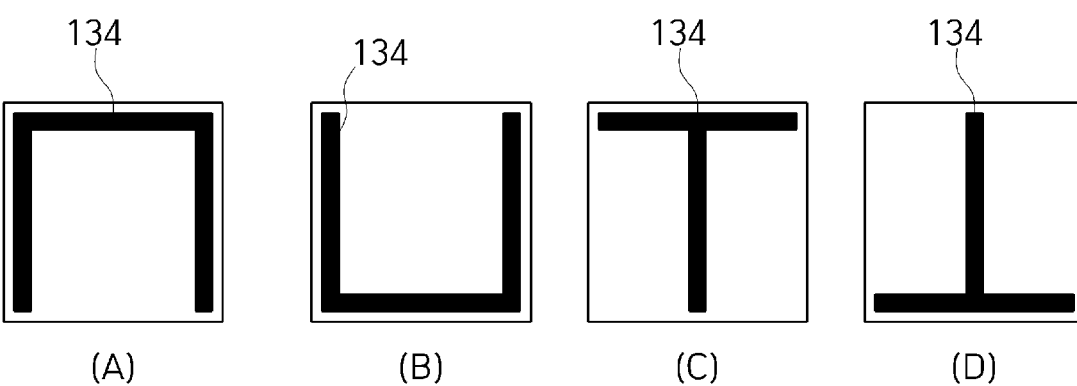

FIG. 115 is a view each illustrating a shape of the support 134 when viewed from behind the support 134.

The supports 134 are not limited to these exemplary shapes. Consequently, the above-mentioned shapes of the supports 134 are significant in enhancing the rigidities thereof.

The present disclosure is not limited to the embodiments described above. The embodiments described above may be practiced in a modified manner within the scope that does not depart from the technical idea of the present disclosure.

What is claimed is:

1. A system for controlling media play comprising:
one or more processors configured to:
recognize, from among respective contents of plural media displayed by a display of a vehicle, a target content to be controlled by a user;
determine, based on sensor data including Ultra-Wide Band (UWB) communication data, whether the user is located inside or outside of the vehicle;
generate a control command based on a recognition of a request from the user to control the target content and the determination of whether the user is located inside or outside the vehicle, wherein the control command is configured to:
control the target content displayed on a display located inside the vehicle if the user is determined to be inside the vehicle, and
control the target content displayed on a display located outside the vehicle if the user is determined to be outside the vehicle; and
control the target content based on the control command, wherein the control command is further adapted to reduce interference between the target content and at least one other media content being concurrently reproduced.

2. The system of claim 1, wherein the request is a request for an adjustment of a sound volume of the target content.

3. The system of claim 1, wherein the one or more processors are further configured to perform the recognition of the request.

4. The system of claim 1, wherein, for the recognition of the target content, the one or more processors are configured to recognize the target content using at least one of gaze information of the user, control request information that is received from a mobile device, or positional information of the mobile device.

5. The system of claim 4,
wherein the system further comprises an Ultra-Wide Band (UWB) sensor, and
wherein, for the generation of the control command, the one or more processors are configured to determine, using the UWB sensor, whether the mobile device is positioned inside or outside of the vehicle.

6. The system of claim 4, wherein the mobile device is configured to be carried by the user.

7. A method for controlling media play, the method comprising:

acquiring information regarding a vehicle environment corresponding to a reproduction of a target content among respective contents of plural media being played via at least one display associated with the vehicle;
generating a control command for controlling the target content, the generating comprising:
recognizing the target content using at least one of gaze information of a user, control request information received from a mobile device, or positional information of the mobile device,
determining, based on UWB-based localization or other sensor data, whether the request is from a user located inside the vehicle or outside the vehicle, and
generating the control command to control the target content displayed on a display inside the vehicle if the user is inside the vehicle, and to control the target content displayed on a display outside the vehicle if the user is outside the vehicle; and
controlling the target content based on the control command, wherein the control command is further configured to reduce or prevent sound interference between the target content and at least one other concurrently played content.

8. The method of claim 7, further comprising acquiring the information regarding the vehicle environment, including acquiring information on the respective contents of the plural media that are being reproduced in different display regions of a display.

9. The method of claim 7, wherein the generating of the control command further comprises recognizing the target content using at least one of gaze information of a user, control request information that is received from a mobile device, or positional information of the mobile device.

10. The method of claim 9, wherein the controlling of the target content comprises controlling a sound volume of the target content based on the control command.

11. The method of claim 9, wherein the mobile device is configured to be carried by the user.

12. A system for controlling media play, comprising:
one or more processors configured to:
recognize, from among respective contents of plural media displayed by a display of a vehicle, a target content to be controlled by a user;
receive and analyze sensor data comprising Ultra-Wide Band (UWB) communication data to determine a location of the user relative to the vehicle;
determine, based on the analyzed sensor data, whether the user is located inside or outside of the vehicle;
generate a control command based on a recognition of a request from the user to control the target content and the determination of whether the user is located inside or outside the vehicle, wherein the control command is configured to:
control the target content displayed on a display located inside the vehicle if the user is determined to be inside the vehicle, and
control the target content displayed on a display located outside the vehicle if the user is determined to be outside the vehicle; and
control the target content based on the control command, wherein the control command is further adapted to reduce interference between the target content and at least one other media content being concurrently reproduced.

* * * * *